US011260379B2

(12) United States Patent
Coates et al.

(10) Patent No.: US 11,260,379 B2
(45) Date of Patent: Mar. 1, 2022

(54) CATALYSTS AND METHODS FOR EPOXIDE-BASED POLYMERIZATIONS

(71) Applicant: Cornell University, Ithaca, NY (US)

(72) Inventors: Geoffrey W. Coates, Lansing, NY (US); Brooks Abel, McComb, MS (US); Claire Lidston, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 69 days.

(21) Appl. No.: 16/898,377

(22) Filed: Jun. 10, 2020

(65) Prior Publication Data

US 2020/0384450 A1 Dec. 10, 2020

Related U.S. Application Data

(60) Provisional application No. 62/859,602, filed on Jun. 10, 2019.

(51) Int. Cl.

| | |
|---|---|
| ***C08G 63/42*** | (2006.01) |
| ***B01J 31/14*** | (2006.01) |
| ***C08G 64/34*** | (2006.01) |
| ***C08G 64/02*** | (2006.01) |
| ***C08G 63/84*** | (2006.01) |

(52) U.S. Cl.

CPC ........... *B01J 31/143* (2013.01); *C08G 63/42* (2013.01); *C08G 63/84* (2013.01); *C08G 64/02* (2013.01); *C08G 64/34* (2013.01); *B01J 2531/0252* (2013.01)

(58) Field of Classification Search

None

See application file for complete search history.

(56) References Cited

PUBLICATIONS

Noh et al., JACS, 129, 8082-8083 (Year: 2007).*

* cited by examiner

*Primary Examiner* — Yun Qian

(74) *Attorney, Agent, or Firm* — Johnson, Marcou, Isaacs & Nix, LLC; Paul J. Roman, Jr.

(57) ABSTRACT

Provided are catalysts, methods of making catalysts, methods of using catalysts, and copolymers made utilizing the catalysts. The catalyst has a metal salen complex group, a bridging group, and one or more co-catalyst groups. The metal salen complex group is attached to the bridging group and the bridging group is attached to the co-catalyst group. The copolymers made utilizing the catalysts are polyesters or polycarbonates.

17 Claims, 69 Drawing Sheets
(61 of 69 Drawing Sheet(s) Filed in Color)

| entry | cocatalyst | conv. (%)[b] | TOF ($h^{-1}$)[c] | $M_n$ (kDa)[d] | $Đ$[d] |
|---|---|---|---|---|---|
| 1 | [PPN]Cl | 84 | 112 | 23.6 | 1.09 |
| 2 | [DMAP]Br | 46 | 61 | 13.5 | 1.12 |
| 3 | [$PPh_3$]Br | 36 | 48 | 10.1 | 1.16 |
| 4 | [TBA]Br | 45 | 59 | 13.2 | 1.14 |
| 5 | [CyPr]Cl | 86 | 114 | 23.8 | 1.09 |

[a] [1-AlCl]$_0$:[cocatalyst]$_0$:[CPMA]$_0$:[PO]$_0$ = 1:1:400:2000. [b] Determined by $^1$H NMR analysis of the crude reaction mixture. [c] TOF = Turnover frequency, mol anhydride consumed × mol 1-AlCl$^{-1}$ × $h^{-1}$. [d] Determined by GPC in THF, calibrated with polystyrene standards.

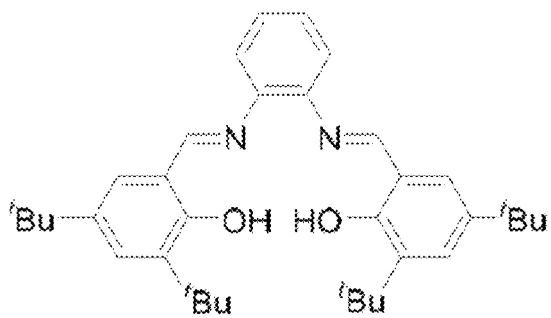
1
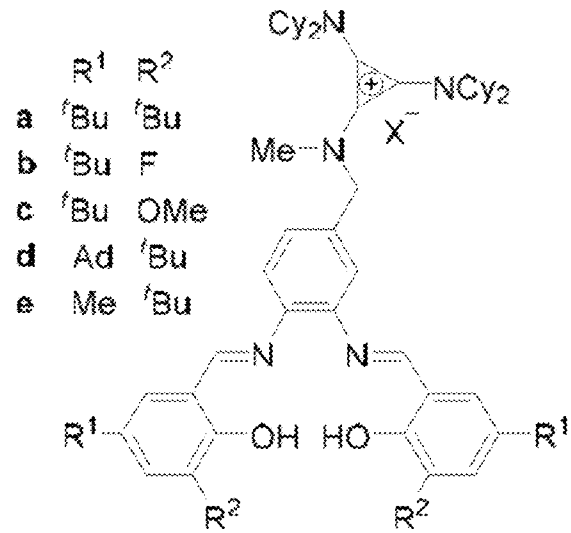
2a-e
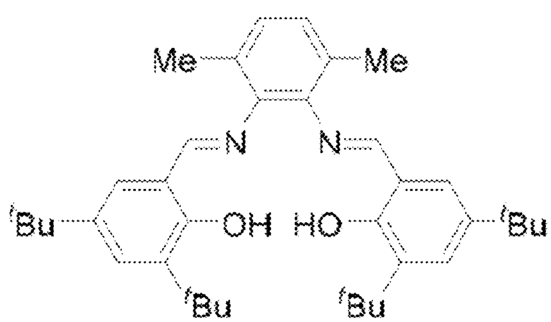
3
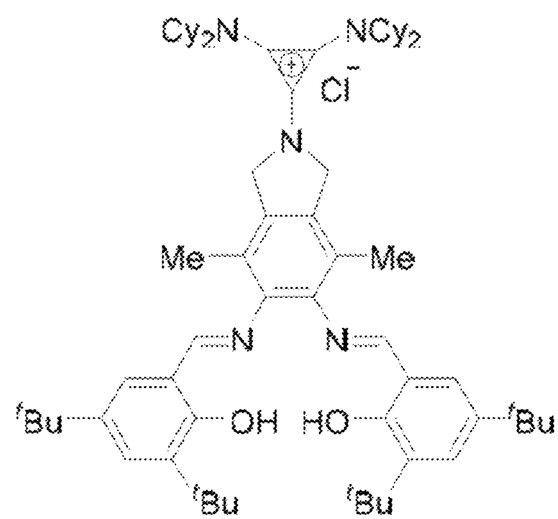
4
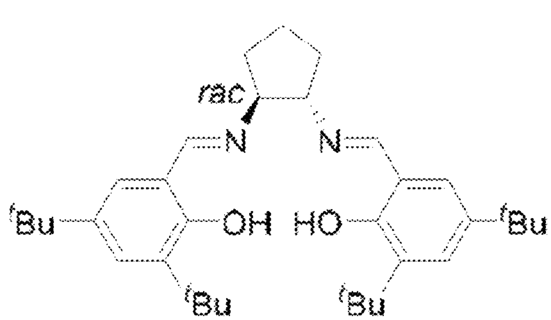
5
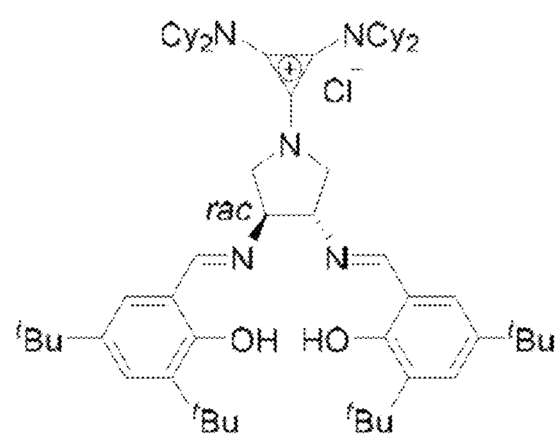
6
FIG. 5

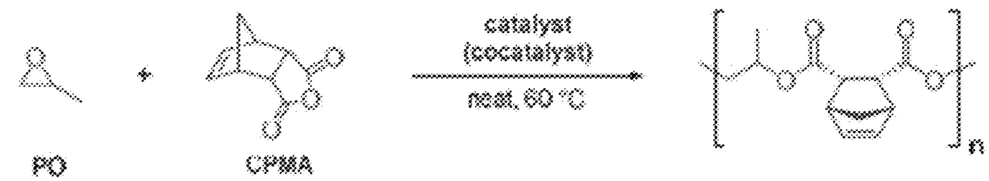

| entry | catalyst | cocatalyst | 1:400:2000[a] | | | | | 1:2000:10000[b] | | | | |
|---|---|---|---|---|---|---|---|---|---|---|---|---|
| | | | time (h) | conv. (%)[c] | TOF ($h^{-1}$)[d] | $M_n$ (kDa)[e] | $Đ$[e] | time (h) | conv. (%)[c] | TOF ($h^{-1}$)[d] | $M_n$ (kDa)[e] | $Đ$[e] |
| 1 | **1**-AlCl | [PPN]Cl | 3 | 84 | 112 | 23.6 | 1.09 | 48 | 53 | 22 | 36.2 | 1.18 |
| 2 | **2a**-AlCl | -[f] | 3 | 70 | 93 | 18.3 | 1.13 | 20 | 87 | 87 | 67.6 | 1.18 |
| 3 | **3**-AlCl | [PPN]Cl | 5 | 71 | 57 | 18.6 | 1.10 | 72 | 45 | 13 | 24.6 | 1.19 |
| 4 | **4**-AlCl | -[f] | 5 | 80 | 64 | 21.0 | 1.10 | 36 | 44 | 24 | 30.0 | 1.16 |
| 5 | **5**-AlCl | [PPN]Cl | 12 | 84 | 28 | 24.2 | 1.12 | 72 | 29 | 8 | 15.4 | 1.17 |
| 6 | **6**-AlCl | -[f] | 12 | 43 | 14 | 9.0 | 1.21 | 36 | 22 | 12 | 14.9 | 1.17 |

[a] $[catalyst]_0$:$[CPMA]_0$:$[PO]_0$ = 1:400:2000, entries 1, 3, and 5 $[catalyst]_0$:$[PPNCl]_0$ = 1:1. [b] $[catalyst]_0$:$[CPMA]_0$:$[PO]_0$ = 1:2000:10000, entries 1, 3, and 5 $[catalyst]_0$:$[PPNCl]_0$ = 1:1. [c] Determined by $^1$H NMR analysis of crude reaction mixture. [d] TOF = Turnover frequency, mol anhydride consumed × mol 1-AlCl$^{-1}$ × $h^{-1}$. [e] Determined by GPC in THF, calibrated with polystyrene standards. [f] No exogenous cocatalyst was used.

FIG. 6

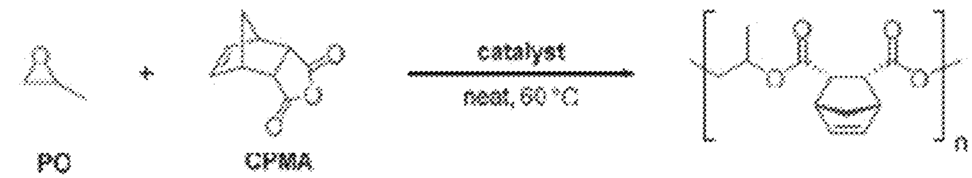

| entry | catalyst | R[1] | R[2] | time (h) | conv. (%)[b] | TOF ($h^{-1}$)[c] | $M_n$ (kDa)[d] | $Đ$[d] |
|---|---|---|---|---|---|---|---|---|
| 1 | 2a-CrCl | ᵗBu | ᵗBu | 3 | 83 | 111 | 19.3 | 1.23 |
| 2 | 2a-MnOAc | ᵗBu | ᵗBu | 16 | 9 | 2 | n.d.[e] | n.d.[e] |
| 3 | 2a-FeCl | ᵗBu | ᵗBu | 16 | 9 | 2 | n.d.[e] | n.d.[e] |
| 4 | 2a-CoOAc | ᵗBu | ᵗBu | 1 | 94 | 376 | 19.2 | 1.11 |
| 5 | 2a-ZnCl | ᵗBu | ᵗBu | 16 | 37 | 9 | 15.3 | 1.18 |
| 6 | 2a-AlCl | ᵗBu | ᵗBu | 3 | 70 | 93 | 18.3 | 1.13 |
| 7 | 2b-AlCl | ᵗBu | F | 9 | 56 | 25 | 6.9 | 1.24 |
| 8 | 2c-AlCl | ᵗBu | OMe | 9 | 96 | 43 | 15.9 | 1.17 |
| 9 | 2d-AlCl | Ad | ᵗBu | 9 | 36 | 16 | 4.1 | 1.27 |
| 10 | 2e-AlCl | Me | ᵗBu | 9 | 56 | 25 | 7.2 | 1.24 |

[a] $[catalyst]_0:[CPMA]_0:[PO]_0$ = 1:400:2000. [b] Determined by $^1H$ NMR analysis of the crude reaction mixture. [c] TOF = Turnover frequency, mol anhydride consumed × mol catalyst$^{-1}$ × $h^{-1}$. [d] Determined by GPC in THF, calibrated with polystyrene standards. [e] n.d. = not determined.

FIG. 7

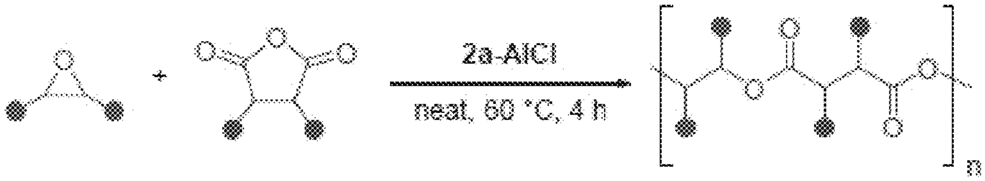

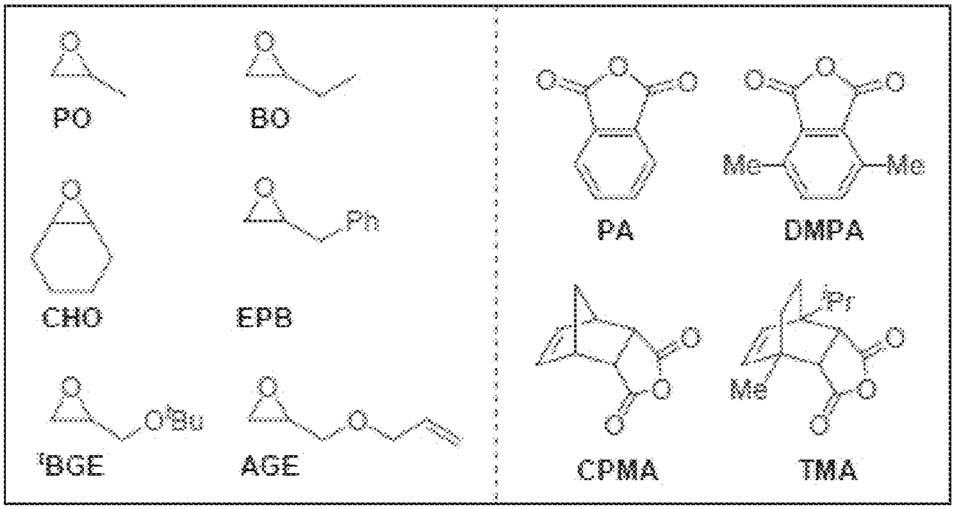

| entry | comonomers | conv. (%)[b] | TOF ($h^{-1}$)[c] | $M_n$ (kDa)[d] | $Đ$[d] |
|---|---|---|---|---|---|
| 1 | PO/PA | >99 | >100 | 22.1 | 1.14 |
| 2 | PO/DMPA | 88 | 88 | 21.9 | 1.08 |
| 3 | PO/TMA | 35 | 35 | 12.3 | 1.08 |
| 4 | PO/CPMA | 95 | 95 | 23.4 | 1.14 |
| 5 | BO/CPMA | 53 | 53 | 16.0 | 1.12 |
| 6[e] | CHO/CPMA | 51 | 34 | 8.2 | 1.24 |
| 7 | EPB/CPMA | 42 | 42 | 9.2 | 1.11 |
| 8 | tBGE/CPMA | 19 | 19 | 5.5 | 1.18 |
| 9 | AGE/CPMA | 54 | 54 | 12.7 | 1.16 |

[a] $[\mathbf{2a\text{-}AlCl}]_0$:$[\text{anhydride}]_0$:$[\text{epoxide}]_0$ = 1:400:2000. [b] Determined by $^1H$ NMR analysis of the crude reaction mixture. [c] TOF = Turnover frequency, mol anhydride consumed × mol 2a-AlCl$^{-1}$ × $h^{-1}$. [d] Determined by GPC in THF, calibrated with polystyrene standards. [e] Polymerization run to 6 h.

FIG. 13

| entry | $[CTA\text{-}1]_0$:$[2a\text{-}AlCl]_0$ | time (h) | conv. (%) [b] | TOF ($h^{-1}$) [c] | $M_{n,\,GPC}$ (kDa) [d] | $Đ$ [d] |
|---|---|---|---|---|---|---|
| 1 | 0:1 | 14.0 | 96 | 82 | 42.1 | 1.20 |
| 2 | 2:1 | 14.0 | 98 | 84 | 30.7 | 1.15 |
| 3 | 4:1 | 14.0 | 99 | 86 | 26.8 | 1.14 |
| 4 | 10:1 | 14.0 | 99 | 86 | 14.7 | 1.10 |
| 5 | 20:1 | 14.0 | 99 | 86 | 9.7 | 1.09 |
| 6 | 50:1 | 14.0 | 82 | 70 | 3.1 | 1.13 |
| 7 | 0:5 | 2.7 | >99 | 86 | 18.0 | 1.12 |
| 8 | 2:4 | 3.5 | >99 | 86 | 17.7 | 1.13 |
| 9 | 4:3 | 4.5 | >99 | 89 | 19.0 | 1.13 |
| 10 | 6:2 | 6.8 | >99 | 88 | 18.6 | 1.11 |
| 11 | 8:1 | 14.0 | >99 | 86 | 19.6 | 1.10 |

[a] $[2a\text{-}AlCl]_0$:$[CPMA]_0$: $[PO]_0$ = 1:1200:6000. [b] Determined by $^1H$ NMR analysis of crude reaction mixture. [c] TOF = Turnover frequency, mol anhydride consumed × mol 2a-AlCl$^{-1}$ × $h^{-1}$. [d] Determined by GPC in THF, calibrated with polystyrene standards.

| entry | $[TrOH]_0$: $[\mathbf{1}\text{-AlCl}]_0$ | conv. (%) [b] | TOF ($h^{-1}$) [c] | $M_{n,GPC}$ (kDa) [d] | $Đ$ [d] |
|---|---|---|---|---|---|
| 1 | 0:1 | 56 | 49 | 32.6 | 1.23 |
| 2 | 2:1 | 39 | 33 | 28.9 | 1.19 |
| 3 | 4:1 | 28 | 24 | 18.6 | 1.20 |
| 4 | 10:1 | 19 | 16 | 16.1 | 1.19 |
| 5 | 20:1 | 14 | 12 | 14.4 | 1.21 |
| 6 | 50:1 | 10 | 9 | 10.1 | 1.25 |

[a] $[\mathbf{1}\text{-AlCl}]_0$:$[CyPrCl]_0$:$[CPMA]_0$:$[PO]_0$ = 1:1:1200:6000. [b] Determined by $^1H$ NMR analysis of crude reaction mixture. [c] TOF = Turnover frequency, mol anhydride consumed × mol catalyst$^{-1}$ × $h^{-1}$. [d] Determined by GPC in THF, calibrated with polystyrene standards.

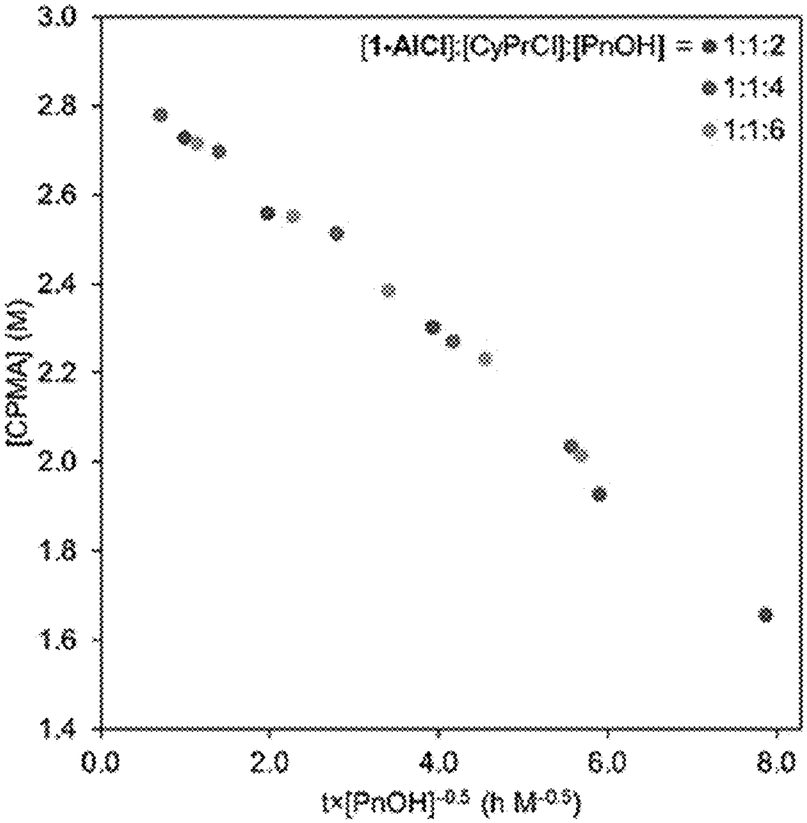
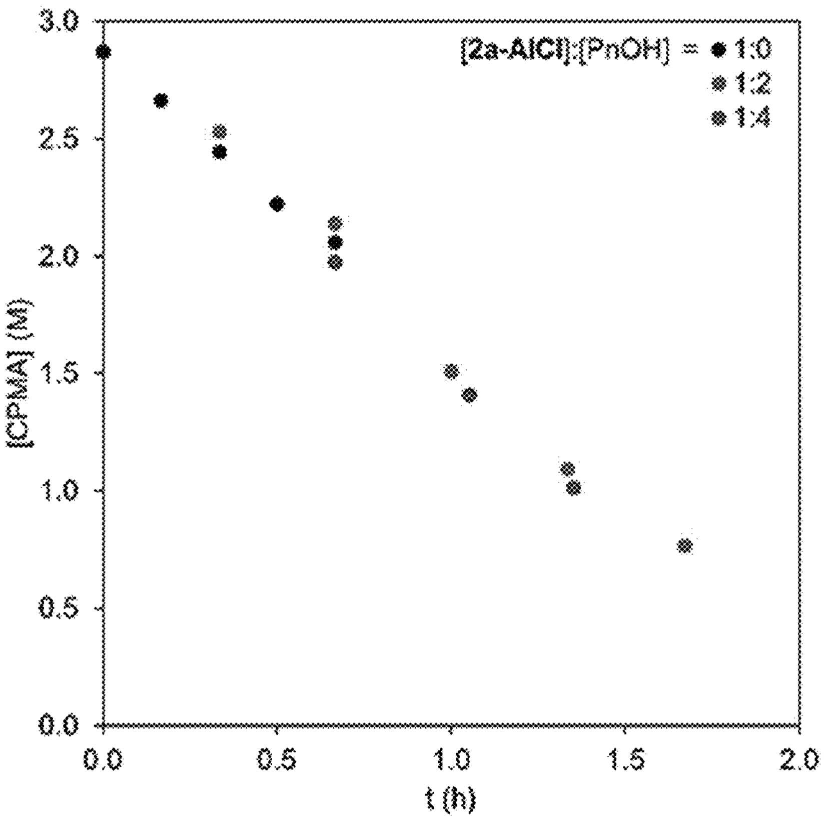
FIG. 19

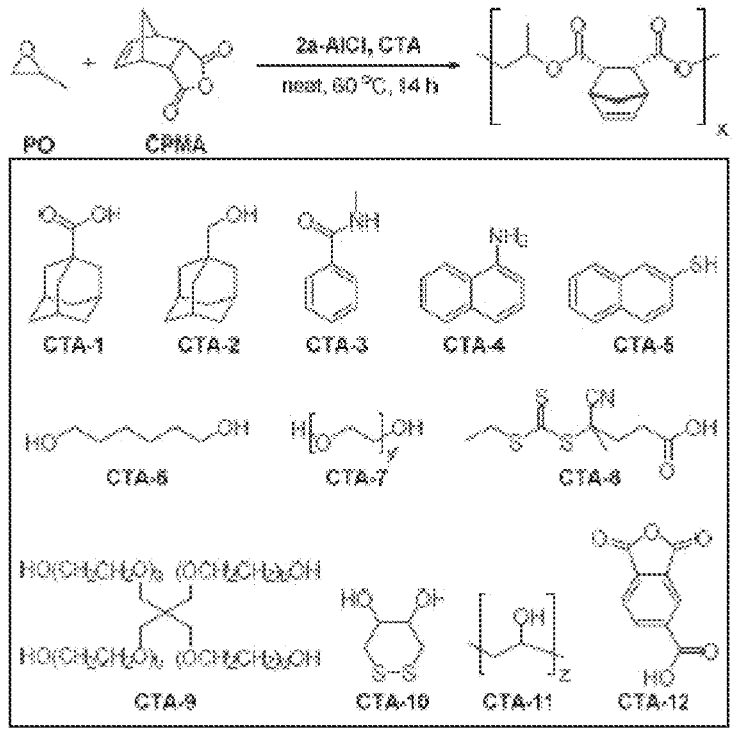

| entry | CTA | conv. (%)[b] | TOF (h⁻¹)[c] | $M_n$ (kDa)[d] | $Đ$[d] |
|---|---|---|---|---|---|
| 1 | **CTA-1** | >99 | 86 | 14.7 | 1.10 |
| 2 | **CTA-2** | >99 | 86 | 14.6 | 1.11 |
| 3 | **CTA-3** | 88 | 76 | 39.1 | 1.25 |
| 4 | **CTA-4** | >99 | 86 | 24.9 | 1.14 |
| 5 | **CTA-5** | >99 | 86 | 16.1 | 1.09 |
| 6 | **CTA-6** | >99 | 86 | 25.2 | 1.10 |
| 7 | **CTA-7** | >99 | 86 | 34.3 | 1.17 |
| 8 | **CTA-8** | >99 | 86 | 19.9 | 1.14 |
| 9 | **CTA-9** | 98 | 84 | 28.6 | 1.25 |
| 10 | **CTA-10** | >99 | 86 | 26.0 | 1.12 |
| 11 | **CTA-11** | 99 | 85 | 49.3 | 3.35 |
| 12 | **CTA-12**[e] | 50 | 43 | 4.5 | 2.20 |

[a] $[\text{2a-AlCl}]_0:[\text{H}]_0:[\text{CPMA}]_0:[\text{PO}]_0$ = 1:10:1200:6000. [b] Determined by $^1$H NMR analysis of the crude reaction mixture. [c] TOF = Turnover frequency, mol anhydride consumed × mol 2a-AlCl$^{-1}$ × h$^{-1}$. [d] Determined by GPC in THF, calibrated with polystyrene standards. [e] $[\text{2a-AlCl}]_0:[\text{CTA-12}]_0:[\text{CPMA}]_0:[\text{PO}]_0$ = 1:50:1150:6000.

FIG. 21

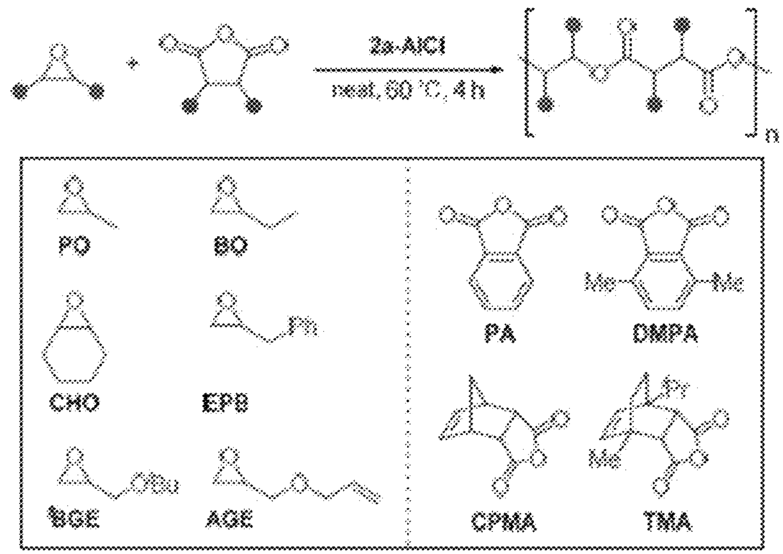

| entry | comonomers | conv. (%)[b] | TOF ($h^{-1}$)[c] | $M_n$ (kDa)[d] | Đ[d] |
|---|---|---|---|---|---|
| 1 | **PO/PA** | 90 | 108 | 45.4 | 1.19 |
| 2 | **PO/DMPA** | 63 | 75 | 31.4 | 1.14 |
| 3 | **PO/TMA** | 20 | 24 | 13.7 | 1.15 |
| 4 | **PO/CPMA** | 69 | 83 | 43.5 | 1.16 |
| 5 | **BO/CPMA** | 45 | 54 | 24.1 | 1.16 |
| 6[e] | **CHO/CPMA** | 56 | 38 | 12.4 | 1.18 |
| 7 | **EPB/CPMA** | 38 | 46 | 5.9 | 1.29 |
| 8 | **AGE/CPMA** | 48 | 58 | 22.2 | 1.17 |
| 9 | **$^t$BGE/CPMA** | 27 | 32 | 9.4 | 1.32 |

[a] $[\textbf{2a-AlCl}]_0$:[anhydride]$_0$:[epoxide]$_0$=1:1200:6000. [b] Determined by $^1$H NMR analysis of crude reaction mixture. [c] TOF = Turnover frequency, mol anhydride consumed × mol 2a-AlCl$^{-1}$ × $h^{-1}$. [d] Determined by GPC in THF, calibrated with polystyrene standards. [e] Reaction time of 18 h.

FIG. 28

| entry | time (h) | % conv.[b] | $M_{n,th}$ (kDa) | $M_{n,exp}$[c] (kDa) | $Đ$[c] | % *cis*[d] |
|---|---|---|---|---|---|---|
| 1 | 1 | 24 | 10.7 | 6.8 | 1.11 | >99 |
| 2 | 2 | 52 | 23.1 | 15.3 | 1.10 | >99 |
| 3 | 3 | 86 | 38.3 | 24.5 | 1.09 | >99 |
| 4 | 4 | >99 | 44.5 | 28.9 | 1.24 | >99 |
| 5 | 5 | >99 | 44.5 | 29.0 | 1.66 | 86 |
| 6 | 6 | >99 | 44.5 | 28.9 | 1.91 | 71 |
| 7 | 8 | >99 | 44.5 | 29.0 | 2.24 | 64 |
| 8 | 12 | >99 | 44.5 | 28.7 | 2.20 | 55 |
| 9 | 24 | >99 | 44.5 | 29.4 | 2.23 | 47 |

[a] $[1\text{-AlCl}]_0$:$[PPNCl]_0$:$[CPMA]_0$:$[PO]_0$ = 1:1:400:2000. [b] Determined by $^{1}H$ NMR analysis of the crude reaction mixture. [c] Determined by GPC in THF, calibrated with polystyrene standards. [d] Determined by quantitative $^{13}C$ NMR analysis of the crude reaction mixture.

| entry | time (h) | % conv.[b] | $M_{n,th}$ (kDa) | $M_{n,exp}$[c] (kda) | Đ[c] | % *cis*[d] |
|---|---|---|---|---|---|---|
| 1 | 1 | 24 | 10.8 | 6.8 | 1.11 | >99 |
| 2 | 2 | 61 | 27.2 | 17.2 | 1.09 | >99 |
| 3 | 3 | 97 | 43.2 | 27.4 | 1.09 | >99 |
| 4 | 4 | >99 | 44.5 | 31.3 | 1.31 | >99 |
| 5 | 5 | >99 | 44.5 | 35.9 | 1.33 | >99 |
| 6 | 6 | >99 | 44.5 | 37.4 | 1.34 | >99 |
| 7 | 8 | >99 | 44.5 | 37.7 | 1.38 | >99 |
| 8 | 12 | >99 | 44.5 | 37.4 | 1.31 | >99 |
| 9 | 24 | >99 | 44.5 | 40.1 | 1.49 | >99 |

[a] $[1\text{-AlCl}]_0:[\text{CyPrCl}]_0:[\text{CPMA}]_0:[\text{PO}]_0 = 1:1:400:2000$. [b] Determined by $^{1}$H NMR analysis of the crude reaction mixture. [c] Determined by GPC in THF, calibrated with polystyrene standards. [d] Determined by quantitative $^{13}$C NMR analysis of the crude reaction mixture.

| entry | time (h) | % conv.[b] | $M_{n,th}$ (kDa) | $M_{n,exp}$[c] (kDa) | Đ[c] | % *cis*[d] |
|---|---|---|---|---|---|---|
| 1 | 1 | 20 | 9.0 | 4.0 | 1.26 | >99 |
| 2 | 2 | 44 | 19.7 | 10.2 | 1.17 | >99 |
| 3 | 3 | 72 | 31.1 | 18.3 | 1.13 | >99 |
| 4 | 4 | 95 | 42.3 | 23.4 | 1.14 | >99 |
| 5 | 5 | >99 | 44.5 | 22.7 | 1.17 | >99 |
| 6 | 6 | >99 | 44.5 | 25.2 | 1.17 | >99 |
| 7 | 8 | >99 | 44.5 | 23.4 | 1.18 | >99 |
| 8 | 12 | >99 | 44.5 | 26.0 | 1.17 | >99 |
| 9 | 24 | >99 | 44.5 | 26.9 | 1.17 | >99 |

[a] $[2a\text{-AlCl}]_0:[CPMA]_0:[PO]_0$ = 1:400:2000. [b] Determined by $^{1}H$ NMR analysis of the crude reaction mixture. [c] Determined by GPC in THF, calibrated with polystyrene standards. [d] Determined by quantitative $^{13}C$ NMR analysis of the crude reaction mixture.

| entry | catalyst | cocatalyst [a] | $[catalyst]_0:[CPMA]_0$ | time (h) | % conv. [b] | TOF ($h^{-1}$)[c] |
|---|---|---|---|---|---|---|
| 1 | **1-AlCl** | [PPN]Cl | 1:1000 | 6 | 45 | 75 |
| 2 | **1-AlCl** | [PPN]Cl | 1:1600 | 24 | 64 | 42 |
| 3 | **1-AlCl** | [PPN]Cl | 1:2400 | 48 | 51 | 25 |
| 4 | **1-AlCl** | [PPN]Cl | 1:3200 | 72 | 34 | 15 |
| 5 | **1-AlCl** | [CyPr]Cl | 1:1000 | 6 | 44 | 73 |
| 6 | **1-AlCl** | [CyPr]Cl | 1:1600 | 24 | 50 | 34 |
| 7 | **1-AlCl** | [CyPr]Cl | 1:2400 | 48 | 56 | 27 |
| 8 | **1-AlCl** | [CyPr]Cl | 1:3200 | 72 | 43 | 19 |
| 9 | **2a-AlCl** | - [d] | 1:1000 | 6 | 52 | 87 |
| 10 | **2a-AlCl** | - [d] | 1:1600 | 9 | 50 | 90 |
| 11 | **2a-AlCl** | - [d] | 1:2400 | 14 | 52 | 89 |
| 12 | **2a-AlCl** | - [d] | 1:3200 | 18 | 52 | 89 |

[a] $[catalyst]_0:[cocatalyst]_0 = 1:1$. [b] Determined by $^1H$ NMR analysis of the crude reaction mixture. [c] TOF = Turnover frequency, mol anhydride consumed × mol $catalyst^{-1}$ × $h^{-1}$. [d] No exogenous cocatalyst was used.

FIG. 56

| entry | Equiv. TrOH | % conv.[b] | TOF ($h^{-1}$)[c] | $M_{n,exp}$[d] | $Đ$[d] |
|---|---|---|---|---|---|
| 1 | 2 | 98 | 84 | 55.8 | 1.20 |
| 2 | 4 | >99 | 86 | 55.7 | 1.24 |
| 3 | 10 | >99 | 86 | 50.4 | 1.23 |
| 4 | 20 | >99 | 86 | 49.3 | 1.23 |
| 5 | 50 | 98 | 84 | 46.0 | 1.27 |

[a] $[2a\text{-}AlCl]_0:[CPMA]_0:[PO]_0$ = 1:1200:6000. [b] Determined by $^1H$ NMR analysis of crude reaction mixture. [c] TOF = Turnover frequency, mol anhydride consumed × mol 2a-$AlCl^{-1}$ × $h^{-1}$. [d] Determined by GPC in THF, calibrated with polystyrene standards.

| entry | equiv. TrOH | time (h) | % conv. [b] | TOF ($h^{-1}$) [c] | $M_{n,exp}$ [d] | $Đ$ [d] |
|---|---|---|---|---|---|---|
| 1 | 2 | 36 | >99 | 33 | 61.6 | 1.41 |
| 2 | 4 | 50 | >99 | 24 | 62.8 | 1.38 |
| 3 | 10 | 75 | >99 | 16 | 54.9 | 1.39 |
| 4 | 20 | 100 | >99 | 12 | 50.3 | 1.34 |

[a] $[\textbf{1-AlCl}]_0$:$[CyPrCl]_0$:$[CPMA]_0$:$[PO]_0$ = 1:1200:6000. [b] Determined by $^1$H NMR analysis of crude reaction mixture. [c] TOF = Turnover frequency, mol anhydride consumed × mol 1-AlCl$^{-1}$ × $h^{-1}$. [d] Determined by GPC in THF, calibrated with polystyrene standards.

PO CPMA

| entry | equiv. 1 | equiv. [CyPr]Cl | % conv. [b] | TOF ($h^{-1}$) [c] |
|---|---|---|---|---|
| 1 | 0 | 0 | 56 | 84 |
| 2 | 1 | 0 | 57 | 86 |
| 3 | 2 | 0 | 54 | 81 |
| 4 | 4 | 0 | 60 | 90 |
| 5 | 0 | 1 | 63 | 93 |
| 6 | 0 | 2 | 64 | 94 |
| 7 | 0 | 4 | 80 | 120 |

[a] $[2a\text{-AlCl}]_0$:$[\text{CTA-1}]_0$:$[\text{CPMA}]_0$:$[\text{PO}]_0$ = 1:4:1200:6000. [b] Determined by $^1$H NMR analysis of crude reaction mixture. [c] TOF = Turnover frequency, mol anhydride consumed × mol 2a-$AlCl^{-1}$ × $h^{-1}$.

CATALYSTS AND METHODS FOR EPOXIDE-BASED POLYMERIZATIONS

CROSS REFERENCE TO RELATED APPLICATIONS

This application claims priority to U.S. Provisional Patent Application No. 62/859,602, filed on Jun. 10, 2019, the disclosure of which are incorporated herein by reference.

STATEMENT REGARDING FEDERALLY SPONSORED RESEARCH OR DEVELOPMENT

This invention was made with government support under contract nos. 1413862, 1650441, and 1531632 awarded by the National Science Foundation. The government has certain rights in the invention.

BACKGROUND OF THE DISCLOSURE

Aliphatic polyesters are receiving increased attention as sustainable alternatives to petroleum-based plastics due to their potentially renewable monomers, ease of recycling, and biodegradability. Yet many industrial methods of polyester production employ energy-intensive polycondensation reactions that produce small molecule byproducts, creating a pressing need for more sustainable synthetic routes. The ring-opening copolymerization (ROCOP) of epoxides and cyclic anhydrides provides a lowertemperature and atom-economical chain-growth approach to aliphatic polyester synthesis, producing materials with controlled molecular weights and low dispersities. Additionally, this strategy enables a wide range of monomer combinations, permitting the synthesis of polyesters with readily tunable renewable content and thermomechanical properties. Current catalyst/cocatalyst systems for ROCOP (FIG. 1) typically exhibit moderate to poor activities at low catalyst loadings and often fail to prevent deleterious side reactions, such as epoxide homopolymerization, transesterification, or epimerization.

In 1985, propylene oxide (PO) and phthalic anhydride (PA) were polymerized using an aluminum porphyrin complex in conjunction with a tetraalkylammonium salt. Subsequent efforts have resulted in diverse metal and organocatalysts, the most successful of which are based on the salenMX framework (salen=N,N'-bis(salicylidene)ethylenediamine). In these systems, the Lewis acid/nucleophilic cocatalyst pair initiates polymerization, activates epoxide towards ring-opening, and modulates the reactivity of the propagating chainends. Earlier mechanistic studies demonstrated that a mixed alkoxide/carboxylate intermediate preferentially ring-opens cyclic anhydride to generate a (bis) carboxylate resting state. From this species, epoxide binding at the Lewis acid is fast relative to rate-limiting epoxide ring-opening by a cocatalyst-associated carboxylate (FIG. 2). Therefore, dilution of the catalyst/cocatalyst pair at low loadings is anticipated to inhibit nucleophilic attack by the cocatalyst-associated propagating chain at the metal-bound epoxide. Nevertheless, performing polymerizations at decreased catalyst concentrations is highly desirable to reduce cost, minimize catalyst residue, and access high molecular weight materials.

To subvert the effects of dilution on binary catalyst activity in epoxide/$CO_2$ copolymerization, others have developed highly active cobalt salen catalysts in which the Lewis acid and nucleophilic cocatalyst are covalently tethered. Extending two of these bifunctional systems to terpolymerizations with cyclic anhydrides afforded block and gradient poly(carbonateco-ester) copolymers with attenuated activity at increasing ratios of anhydride:$CO_2$. Others have used a cobalt salen complex bearing four quaternary ammonium substituents in the absence of CO2. While they initially obtain turnover frequencies (TOFs) as high as 1600 $h^{-1}$ at 80° C. ($[Co]_0:[PA]_0:[PO]_0$=1:6400:85000), the catalytic activity decreases with prolonged reaction times. This single report suggests the potential efficacy of the bifunctional strategy for the ROCOP of epoxides and cyclic anhydrides at low catalyst loadings. However, it is unclear from these experiments whether the high polymerization rates were due to the covalent anchor, the catalyst:cocatalyst stoichiometry, or the inherent activity of the cobalt salen unit.

SUMMARY OF THE DISCLOSURE

The present disclosure provides catalysts and/or co-catalysts for making polymers. The present disclosure also provides methods of making the catalysts and methods of using the catalysts.

In an aspect, the present disclosure provides catalysts for making copolymers (e.g., polyesters or polycarbonates).

A catalyst of the present disclosure comprises a metal (e.g., metal ion, such as, for example, Al, Co, Cr, Fe, Zn, Mn, Ti, Ni, Ga, Sm, Y, V, and the like) salen complex group (e.g., an aluminum salen complex), a bridging group (e.g., a backbone, such as, for example, a tetherable backbone), and one or more co-catalyst groups (e.g., a substituted or unsubstituted cyclopropenium group), where the metal salen complex group is attached (e.g., covalently bonded) to the bridging group and the bridging group is attached (e.g., covalently bonded) to the co-catalyst group.

In an aspect, the present disclosure provides methods of making catalysts.

A method may comprise contacting a bridging group precursor (e.g., a backbone group, such as, for example, a tetherable backbone group) with one or more (e.g., 1 or 2) substituted or unsubstituted salicylaldehydes that may be the same or different, such that a first reaction product is formed; contacting the first reaction product with an alkyl halide-functionalized co-catalyst that may have one or more substituents (e.g., an alkyl halide-functionalized cyclopropenium or an alkyl halide-functionalized cyclopropenium having one or more substituents) such that a second reaction product is formed; contacting the second reaction product with a Lewis acid such that the catalyst is formed; and optionally, isolating the catalyst.

In an aspect, the present disclosure provides methods of using catalysts of the present disclosure to produce (e.g., synthesize) polymers (e.g., polyesters and polycarbonates).

Methods of making a polyester may comprise polymerizing an epoxide and a cyclic anhydride in the presence of a catalyst of the present disclosure, a catalyst of the present disclosure and a cyclopropenium co-catalyst, or a catalyst (e.g., a metal salen catalyst, a porphyrin, a trialkyl borane, and the like) and a cyclopropenium co-catalyst.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a fuller understanding of the nature and objects of the disclosure, reference should be made to the following detailed description taken in conjunction with the accompanying figures.

FIG. 5. Chart showing binary and bifunctional ligands synthesized and screened with various Lewis Acids to optimize activity and selectivity for alternating epoxide/cyclic anhydride copolymerization.

FIG. 6. Table showing the effect of backbone geometry on catalyst activity in the binary and bifunctional catalyst systems.

FIG. 7. Table showing the effect of steric and electronic perturbations on bifunctional catalyst activity.

FIG. 13. Table showing monomer variants polymerized by 2a-AlCl.

FIG. 19. Variable time normalization kinetic analysis showing inverse half-order dependence on dormant chain concentration, [PnOH], in the binary catalyst system 1-AlCl/[CyPr]Cl (top) and zero-order dependence on [PnOH] in the bifunctional system 2a-AlCl(bottom).

FIG. 21. Table showing scope of protic chain transfer agents for PO/CPMA copolymerization affording various polymer architectures.

FIG. 28. Table showing monomer variants polymerized by 2a-AlC1 at low catalyst loading.

FIG. 56. Table showing conversion as a function of catalyst loading in the binary 1-AlC1 and bifunctional 2a-AlC1 systems for PO/CPMA copolymerization.

DETAILED DESCRIPTION OF THE DISCLOSURE

Figure 1:
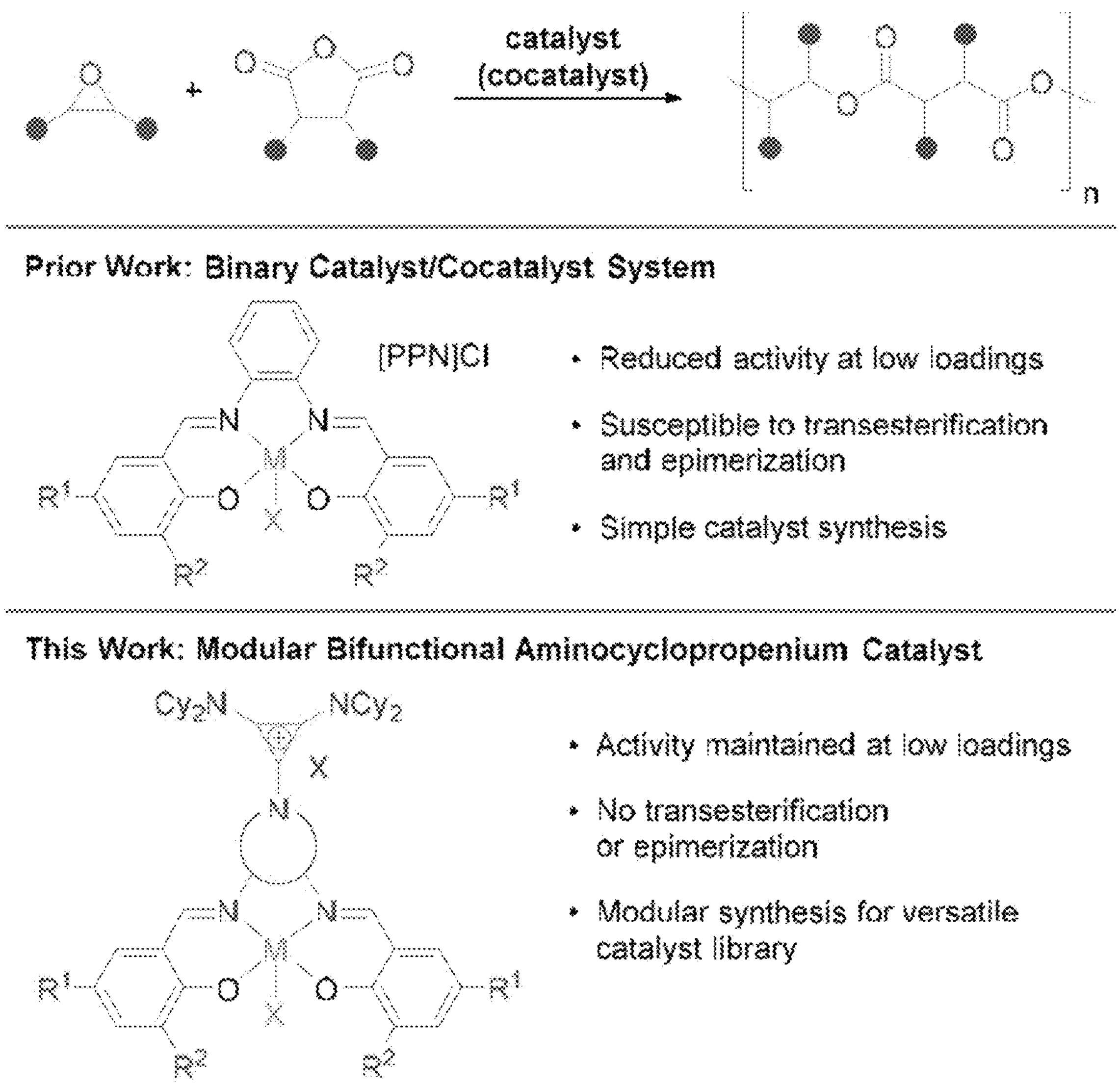
FIG. 1. Alternating ring-opening copolymerization of epoxides and cyclic anhydrides using a binary catalyst/cocatalyst system or bifunctional catalyst.

Although claimed subject matter will be described in terms of certain examples, other examples, including examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent radicals, trivalent radicals, and the like). Illustrative examples of groups include:

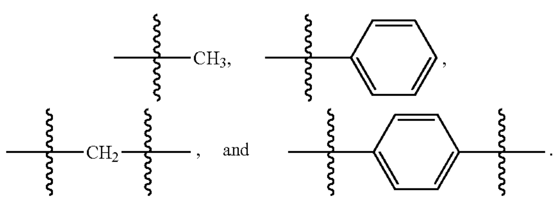

As used herein, unless otherwise indicated, the term "aliphatic" refers to branched or unbranched hydrocarbon groups that, optionally, contain one or more degrees of unsaturation. Degrees of unsaturation include, but are not limited to, alkenyl groups, alkynyl groups, and aliphatic cyclic groups. For example, the aliphatic groups are a $C_1$ to $C_{20}$ aliphatic group, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, and $C_{20}$). The aliphatic group may be unsubstituted or substituted with one or more substituents. Examples of substituents include, but are not limited to, halogens (—F, —Cl, —Br, and —I), aliphatic groups (e.g., alkyl groups, alkenyl groups, alkynyl groups, and the like), halogenated aliphatic groups (e.g., trifluoromethyl group and the like), aryl groups, halogenated aryl groups, alkoxide groups, amine groups, nitro groups, carboxylate groups, carboxylic acids, ether groups, alcohol groups, alkyne groups (e.g., acetylenyl groups and the like), and the like, and combinations thereof. Groups that are aliphatic may be alkyl groups, alkenyl groups, alkynyl groups, or carbocyclic groups, and the like.

As used herein, unless otherwise indicated, the term "alkyl group" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, the alkyl group is $C_1$ to $C_{20}$, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, and $C_{20}$). The alkyl group may be unsubstituted or substituted with one or more substituents. Examples of substituents include, but are not limited to, various substituents such as, for example, halogens (—F, —Cl, —Br, and —I), aliphatic groups (e.g., alkyl groups, alkenyl groups, alkynyl groups, and the like), aryl groups, alkoxide groups, carboxylate groups, carboxylic acids, ether groups, amine groups, and the like, and combinations thereof.

As used herein, unless otherwise indicated, the term "aryl group" refers to $C_5$ to $C_{30}$ aromatic or partially aromatic carbocyclic groups, including all integer numbers of carbons and ranges of numbers of carbons therebetween (e.g., $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, and $C_{30}$). An aryl group may also be referred to as an aromatic group. The aryl groups may comprise polyaryl groups such as, for example, fused ring, biaryl groups, or a combination thereof. The aryl group may be unsubstituted or substituted with one or more substituents. Examples of substituents include, but are not limited to, substituents such as, for example, halogens (—F, —Cl, —Br, and —I), aliphatic groups (e.g., alkyl groups, alkenyl groups, alkynyl groups, and the like), aryl groups, alkoxides, carboxylates, carboxylic acids, ether groups, and the like, and combinations thereof. Aryl groups may contain heteroatoms, such as, for example, nitrogen (e.g., pyridinyl groups and the like). Examples of aryl groups include, but are not limited to, phenyl groups, biaryl groups (e.g., biphenyl groups and the like), fused ring groups (e.g., naphthyl groups and the like), hydroxybenzyl groups, tolyl groups, xylyl groups, furanyl groups, benzofuranyl groups, indolyl groups, imidazolyl groups, benzimidazolyl groups, pyridinyl groups, and the like.

As used herein, the terms "cycloaliphatic," "carbocycle," or "carbocyclic," used alone or as part of a larger moiety, refer to a saturated or partially unsaturated cyclic aliphatic monocyclic, bicyclic, or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, and cyclooctadienyl. In some examples, the cycloalkyl has 3-6 carbons. The terms "cycloaliphatic," "carbocycle," or "carbocyclic" also include aliphatic rings that are fused to one or more aromatic or nonaromatic rings, such as decahydronaphthyl or tetrahydronaphthyl, where the radical or point of attachment is on the aliphatic ring. In some examples, a carbocyclic groups is bicyclic. In some examples, a carbocyclic group is tricyclic. In some examples, a carbocyclic group is polycyclic.

As used herein, the term "heteroaliphatic" refers to aliphatic groups wherein one or more carbon atoms are independently replaced by one or more atoms selected from the group consisting of oxygen, sulfur, nitrogen, phosphorus, or boron. In certain examples, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "heterocyclyl," "heterocycloaliphatic," or "heterocyclic" groups.

As used herein, the terms "heterocycle," "heterocyclyl," "heterocyclic radical," and "heterocyclic ring" are used interchangeably and refer to a stable 5- to 7-membered monocyclic or 7-14-membered bicyclic heterocyclic moiety that is either saturated or partially unsaturated, and having, in addition to carbon atoms, one or more (preferably one to four) heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^{+}NR$ (as in N-substituted pyrrolidinyl).

As used herein, the term "polymer" refers to a molecule of high relative molecular mass, the structure of which comprises the multiple repetition of units derived, actually or conceptually, from molecules of low relative molecular mass. In certain examples, a polymer is comprised of only one monomer species (e.g., polyethylene oxide). In certain examples, a polymer of the present disclosure is a copolymer, terpolymer, heteropolymer, block copolymer, or tapered heteropolymer of one or more epoxides and one or more cyclic anhydrides or one or more epoxides and $CO_2$.

The present disclosure provides catalysts and/or co-catalysts for making polymers. The present disclosure also provides methods of making the catalysts and methods of using the catalysts.

In an aspect, the present disclosure provides catalysts for making copolymers (e.g., polyesters or polycarbonates).

A catalyst of the present disclosure comprises a metal (e.g., metal ion, such as, for example, Al, Co, Cr, Fe, Zn, Mn, Ti, Ni, Ga, Sm, Y, V, and the like) salen complex group (e.g., an aluminum salen complex), a bridging group (e.g., a backbone, such as, for example, a tetherable backbone), and one or more co-catalyst groups (e.g., a substituted or unsubstituted cyclopropenium group), where the metal salen complex group is attached (e.g., covalently bonded) to the bridging group and the bridging group is attached (e.g., covalently bonded) to the co-catalyst group.

The metal salen complex group may have the following structure:

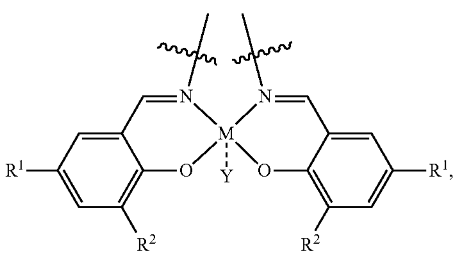

where M is chosen from Al, Co, Cr, Fe, Zn, Mn, Ti, Ni, Ga, Sm, Y, and V, $R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic group (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic group (e.g., F, Cl, Br, I, $CF_3$, $CCl_3$, and the like), nitrile groups, onium groups (e.g., ammonium groups, phosphonium groups, imidazolium groups, and the like), and the like, and Y is optional and may be a ligand, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like; the bridging group has the following structure:

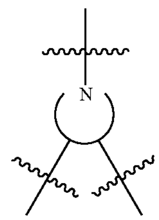

, where

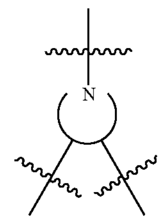

is chosen from

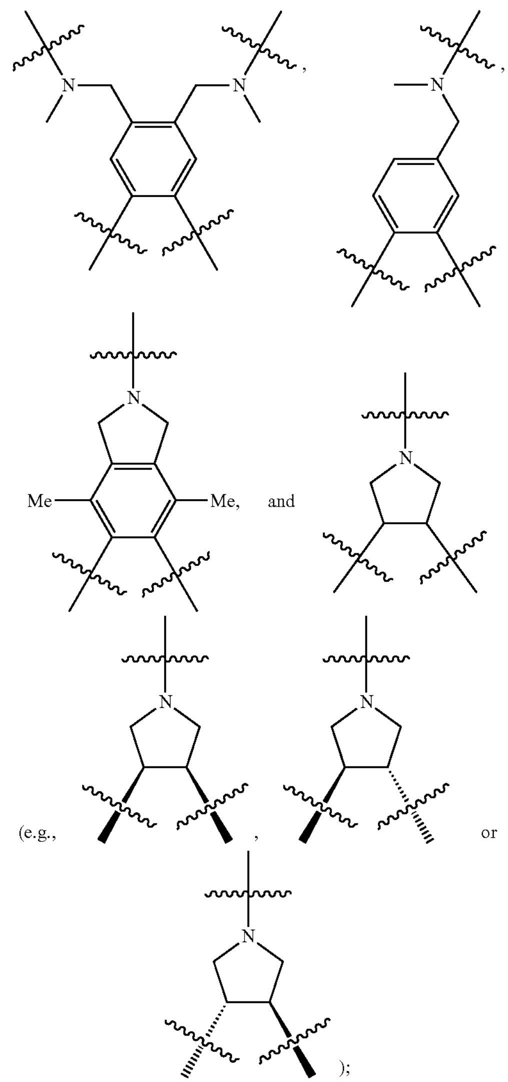

and the one or more co-catalyst groups has the following structure:

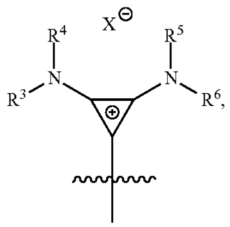

where $R^3$, $R^4$, $R^5$, and $R^6$ are independently at each occurrence chosen from hydrogen, linear alkyl group (e.g., methyl, ethyl, propyl, and the like), branched alkyl group (e.g., isopropyl, sec-butyl, tert-butyl, and the like), cycloaliphatic group (e.g., cyclopropyl, cyclobutyl, cyclopentyl, cyclohexyl, and the like), polycycloaliphatic group (e.g., adamantyl, terpenyl, and the like), unsaturated aliphatic group (e.g., vinyl, allyl, propargyl, norbornenyl, and the like), aryl group (e.g., phenyl, substituted phenyl, naphthyl, substituted naphthyl, and the like), and the like, and X is an anion, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like.

A catalyst of the present disclosure may have the following structure:

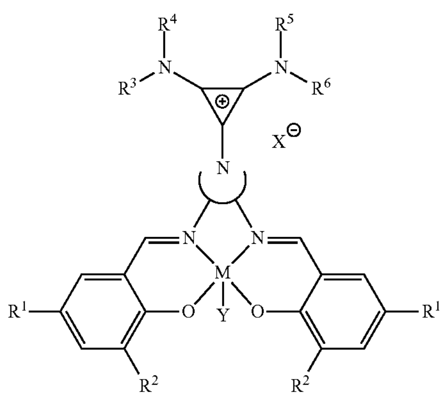

where M is chosen from Al, Co, Cr, Fe, Zn, Mn, Ti, Ni, Ga, Sm, Y, and V;

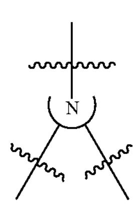

is chosen from

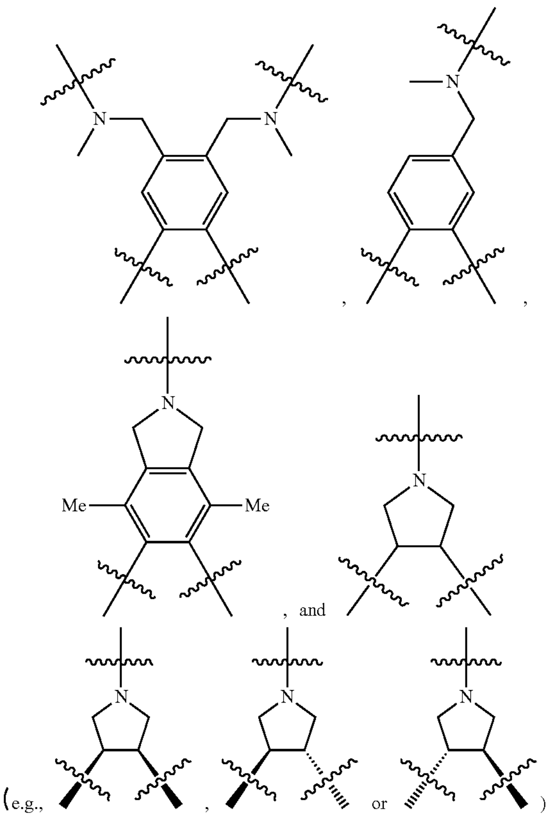

$R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic group (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like; $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), and the like; X is an anion, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like; and Y is optional and may be a ligand, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like. The individual R groups (e.g., $R^1$, $R^2$, $R^3$, $R^4$, $R^5$, and/or $R^6$) may be further substituted (e.g., one R group, some of the groups, or all of the R groups may be further substituted).

In an example, the catalyst of the present disclosure has the following structure:

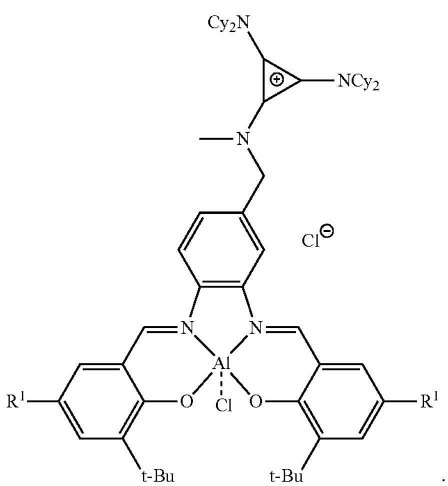

where R is independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like. $R^1$ may be further substituted (e.g., one or both $R^1$ groups may be substituted).

The catalyst may have one of the following structures:

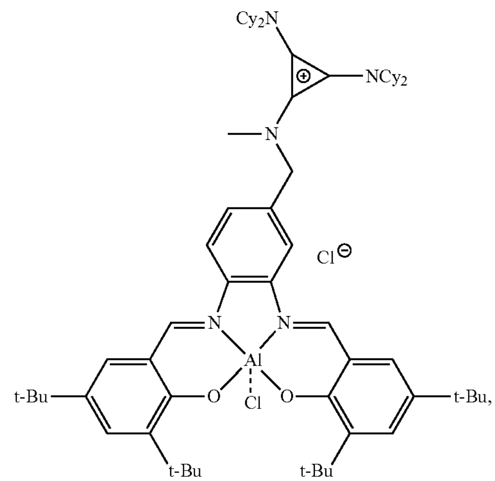

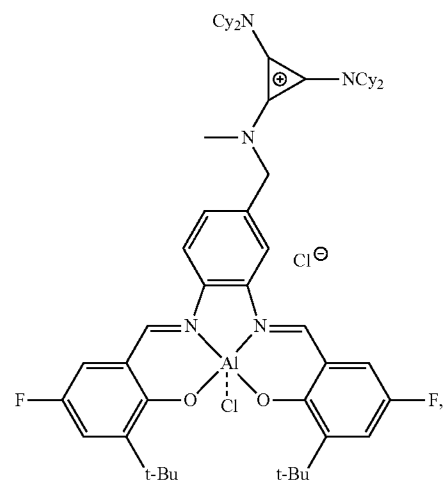

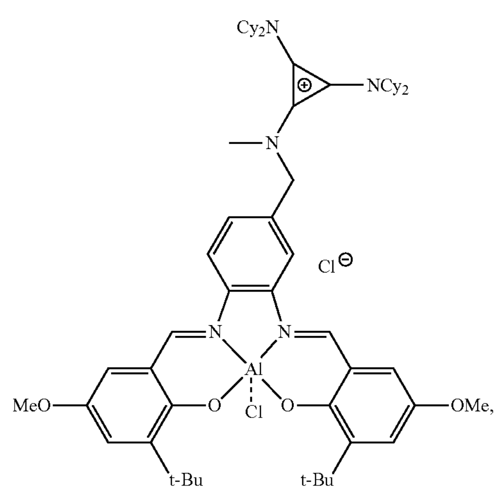

-continued

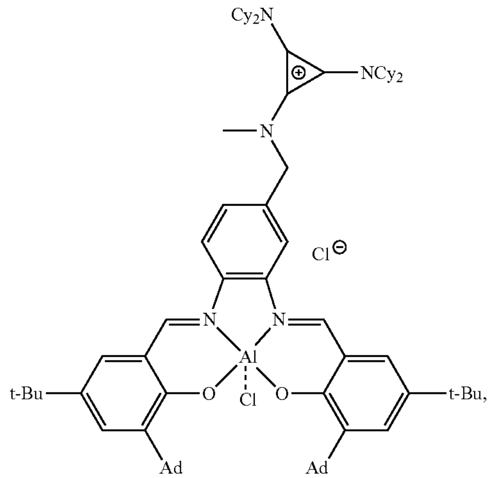

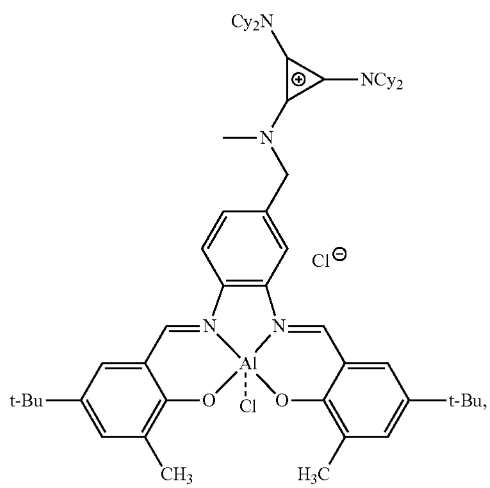

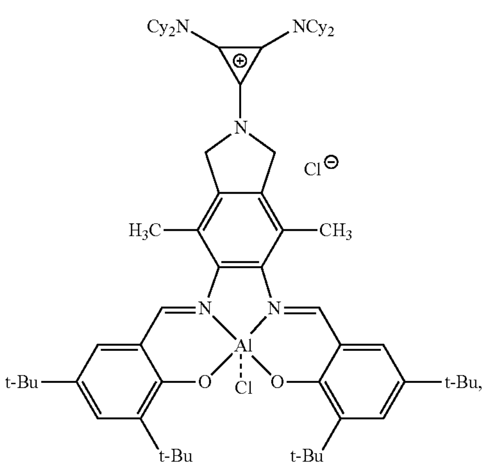

or

-continued

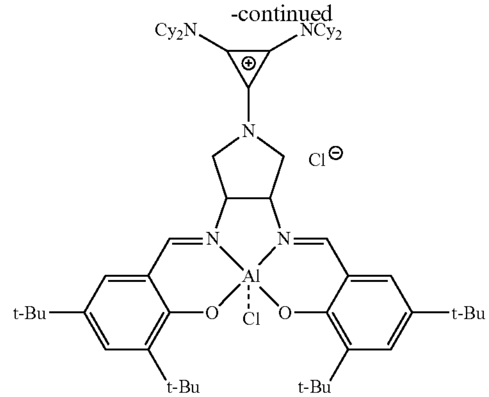

(e.g.,

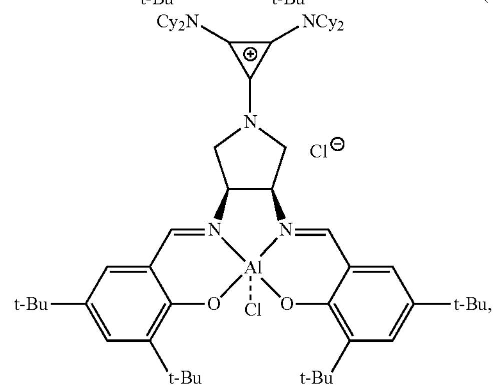

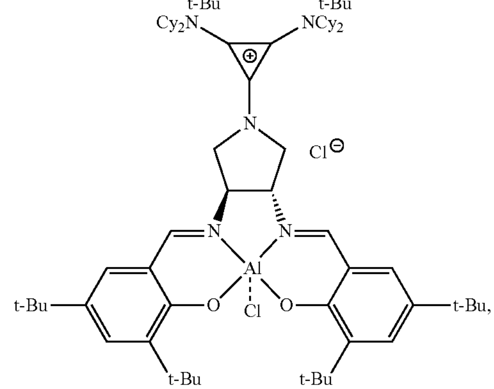

or

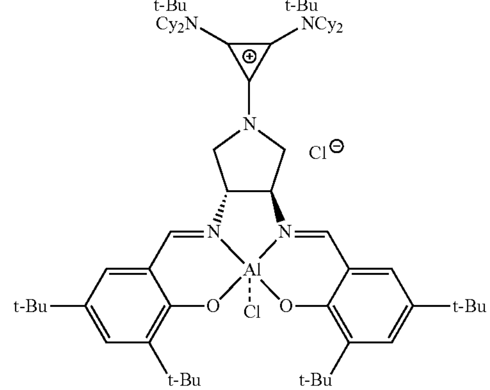

).

In an aspect, the present disclosure provides methods of making catalysts.

A method may comprise contacting a bridging group precursor (e.g., a backbone group, such as, for example, a tetherable backbone group) with one or more (e.g., 1 or 2) substituted or unsubstituted salicylaldehydes that may be the same or different, such that a first reaction product is formed; contacting the first reaction product with an alkyl halidefunctionalized co-catalyst that may have one or more substituents (e.g., an alkyl halide-functionalized cyclopropenium or an alkyl halide-functionalized cyclopropenium having one or more substituents) such that a second reaction product is formed; contacting the second reaction product with a Lewis acid such that the catalyst is formed; and optionally, isolating the catalyst.

The contacting steps may be performed in neat epoxide or in variety of solvents. Solvents include, but are not limited to, ethereal solvents (e.g., diethyl ether and the like), toluene, acetonitrile, and the like, and combinations thereof.

The method may further comprise heating. The contacting a bridging group precursor and substituted or unsubstituted salicylaldehyde may be heated during the contacting (e.g., 20-100° C., 60° C.). The contacting the first reaction product with the alkyl halide functionalized co-catalyst that may have one or more substituents may be heated during the contacting (e.g., 20-100° C., 60° C.). The temperature may be determined by the boiling point of the solvent or epoxide.

The Lewis acid comprises an oxidized metal (M) (e.g., $M^{1+}$, $M^{2+}$, $M^{3+}$, $M^{+4}$, and the like) and one or more ligands, where the ligand is chosen from alkyl groups (e.g., methyl, ethyl, propyl, and the like), alkoxides, phenoxides, azides, nitrates, acetates, carboxylates, halides, and the like, and combinations thereof, and, optionally, the Lewis acid is a hydrate. Depending on the metal, the method may comprise an additional oxidation step following the contacting the second reaction product with a Lewis acid. Non-limiting examples of Lewis acids include $Et_2AlCl$, $Me_2Zn$, $CrCl_2$, $Mn(OAc)_3.2H_2O$, $FeCl_3.6H_2O$, $Co(OAc)_2.4H_2O$, and the like.

The bridging group precursor comprises one or more secondary amines and one or more primary amines (e.g., two primary amines). The bridging group precursor may be chosen from:

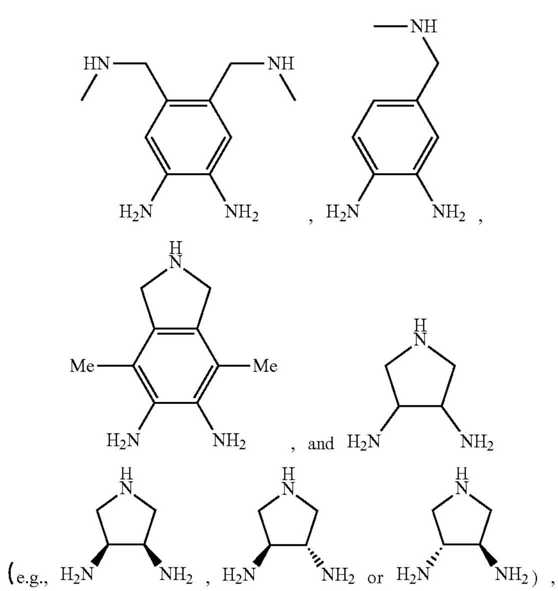

The salicylaldehyde may have one or more substituents. The salicylaldehyde may have the following structure:

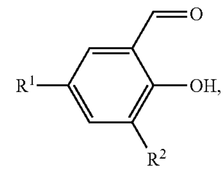

where $R^1$ and $R^2$ are independently chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like.

The alkyl halide-functionalized co-catalyst may have one or more substituents (e.g., an alkyl halide-functionalized cyclopropenium or an alkyl halide-functionalized cyclopropenium having one or more substituents). The alkyl halide-functionalized co-catalyst may have the following structure:

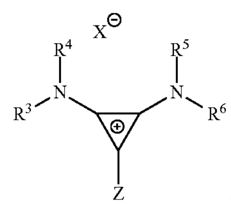

where $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), and aryl groups (e.g., phenyl, substituted phenyl, naphthyl, substituted naphthyl, and the like) and X is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like and Z is a halogen (e.g., $C_1$).

In an example, the method is used to a form a catalyst having the following structure:

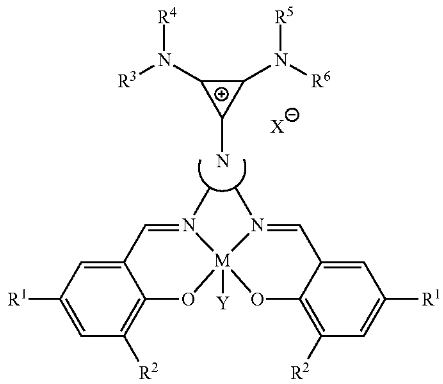

wherein M is chosen from Al, Co, Cr, Fe, Zn, Mn, Ti, Ni, Ga, Sm, Y, and V;

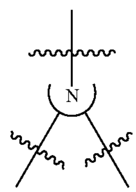

is chosen from

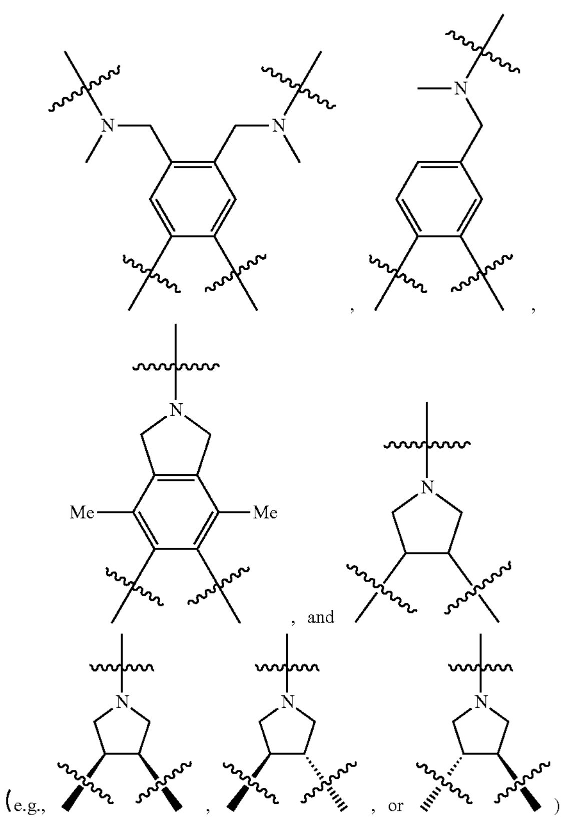

$R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl group (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like; $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), and the like; X is an anion, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like; and Y is optional and may be a ligand, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like. For example, the catalyst formed has the following structure:

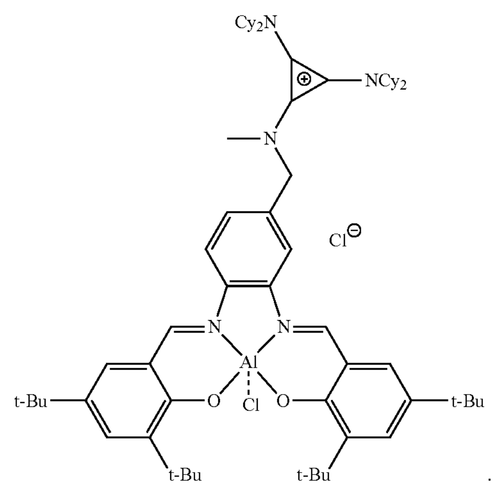

In an aspect, the present disclosure provides methods of using catalysts of the present disclosure to produce (e.g., synthesize) polymers (e.g., polyesters and polycarbonates).

Methods of making a polyester may comprise polymerizing an epoxide and a cyclic anhydride in the presence of a catalyst of the present disclosure, a catalyst of the present disclosure and a cyclopropenium co-catalyst, or a catalyst (e.g., a metal salen catalyst, a porphyrin, a trialkyl borane, and the like) and a cyclopropenium co-catalyst.

The cyclopropenium co-catalyst may have the following structure:

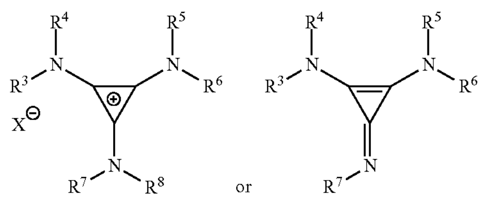

where $R^3$, $R^4$, $R^5$, $R^6$, $R^7$, and $R^8$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), and aryl groups (e.g., phenyl, substituted phenyl, naphthyl, substituted naphthyl, and the like); and X is an anion, is nucleophilic or non-nucleophilic, is coordinating or non-coordinating, and is independently chosen from F, Cl, Br, I, $N_3$, $NO_3$, carboxylate, benzoate, alkoxide, phenoxide, enolate, thiolate, amide, sulfonamide, thiocyanate, CN, $O(SO_2)R$, $BPh_4$, $SbF_6$, $ClO_4$, and the like.

Non-limiting examples of epoxides include:

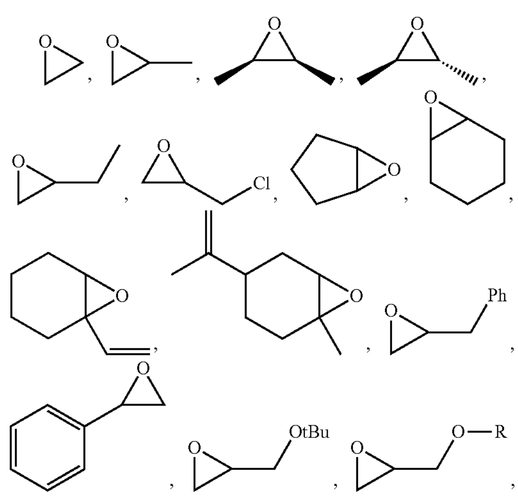

where R is a substituted or unsubstituted aliphatic group

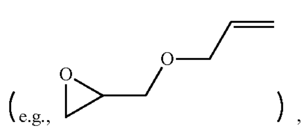

and the like.

Non-limiting examples of cyclic anhydrides include: substituted or unsubstituted cyclic anhydride Diels Alder adducts, substituted or unsubstituted diglycolic anhydrides (e.g.,

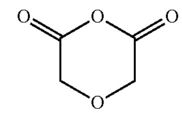

and the like),substituted or unsubstituted

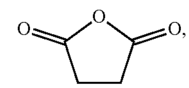

substituted or unsubstituted

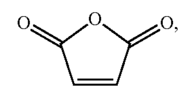

substituted or unsubstituted

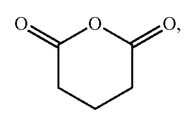

substituted or unsubstituted

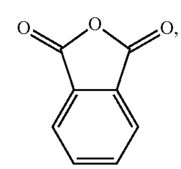 [SMILES: O=C1OC(=O)c2ccccc21]

substituted or unsubstituted

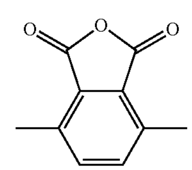

substituted or unsubstituted

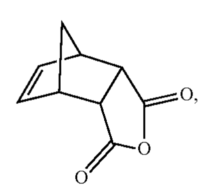 [SMILES: O=C1OC(=O)C2C3C=CC(C3)C12]

substituted or unsubstituted

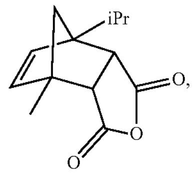 [SMILES: CC(C)C12C=CC(C)(C1)C1C(=O)OC(=O)C12]

substituted or unsubstituted

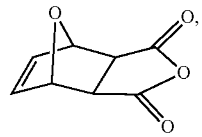 [SMILES: O=C1OC(=O)C2C3C=CC(O3)C12]

and the like.

Epoxides and cyclic anhydrides are polymerized using catalysts at various ratios. For example, the ratio of catalyst to cyclic anhydride to epoxide is 1:≥100:≥100 (e.g., 1: ≥100: >100) and there may be more epoxide than cyclic anhydride. In various examples, if additional co-catalyst is added, 0.5-100 equivalents relative to 1 equivalent catalyst can be added, including all 0.1 equivalent values and ranges therebetween (e.g., 0.5-1, 0.5-5, 0.5-10).

Polycarbonates may be produced by polymerizing epoxide and $CO_2$.

Epoxides and $CO_2$ are polymerized using catalysts at various ratios. For example, the ratio of catalyst to $CO_2$ to epoxide is 1:≥100:≥100 (e.g., $CO_2$ is in excess).

Polymers made by the methods disclosed herein can have various molecular weights (Mn) and various polydispersity indices (PDIs). A polymer may have an Mn of 500-1,000,000 g/mol, including all integer g/mol values and ranges therebetween (e.g., 500-1,000 g/mol, 500-2,000 g/mol, 500-3,000 g/mol, 500-4,000 g/mol, 500-5,000 g/mol, 500-10,000 g/mol, 500-20,000 g/mol, 500-50,000 g/mol, 500-100,000 g/mol, 10,000-50,000 g/mol, 10,000-100,000 g/mol, 50,000-100,000 g/mol, and 50,000-75,000 g/mol). A polyester polymer made by the methods disclosed herein may have a PDI of 1-50, including all 0.1 values and ranges therebetween (e.g., 1-1.3, 1-2, 1-5, 1-10, 1-20, 1-25, 1-50, or ≤1.3). A polycarbonate polymer made by the methods disclosed herein may have a PDI (e.g., 1-1.4, 1-2, 1-5, 1-10, 1-20, 1-25, 1-50, or ≤1.4).

A method of making polymers of the present disclosure may comprise using mixtures of epoxides or two or more different epoxides and/or mixtures of cyclic anhydrides or two or more different cyclic anhydrides.

In various examples, protic chain transfer agents (e.g., alcohols, amines, carboxylic acids, thiols, and the like) are used to control molecular weight. Protic chain transfer agents may be used to make polyester polymers and polycarbonate systems. In an aspect, the present disclosure provides polymers. The polymers may be polyesters or polycarbonates. In various examples, the polymers are aliphatic polyesters or aliphatic polycarbonates. Non-limiting examples of polymers are provided herein.

A polymer may be made by a method of the present disclosure. In various examples, a polymer, which may be an aliphatic polymer or an aliphatic polycarbonate, is made by a method of the present disclosure.

A polymer may have one or more desirable properties. A polymer may have an Mn of 500-1,000,000 g/mol, including all integer g/mol values and ranges therebetween (e.g., 500-1,000 g/mol, 500-2,000 g/mol, 500-3,000 g/mol, 500-4,000 g/mol, 500-5,000 g/mol, 500-10,000 g/mol, 500-20,000 g/mol, 500-50,000 g/mol, 500-100,000 g/mol, 10,000-50,000 g/mol, 10,000-100,000 g/mol, 50,000-100,000 g/mol, and 50,000-75,000 g/mol). A polyester polymer made by the methods disclosed herein may have a PDI of 1-50, including all 0.1 values and ranges therebetween (e.g., 1-1.3, 1-2, 1-5, 1-10, 1-20, 1-25, 1-50, or ≤1.3). A polycarbonate polymer made by the methods disclosed herein may have a PDI (e.g., 1-1.4, 1-2, 1-5, 1-10, 1-20, 1-25, 1-50, or <1.4).

The steps of the method described in the various examples disclosed herein are sufficient to carry out the methods of the present disclosure. Thus, in an example, the method consists essentially of a combination of the steps of the methods disclosed herein. In another example, the method consists of such steps.

The following Statements show various examples and/or embodiments of the present disclosure.

Statement 1. A catalyst comprising a metal (e.g., Al, Co, Cr, Fe, Zn, Mn, Ti, Ni, Ga, Sm, Y, V, and the like) salen complex group (e.g., an aluminum salen complex), a bridging group (e.g., a backbone, such as, for example, a tetherable backbone), and one or more co-catalyst groups (e.g., a substituted or unsubstituted cyclopropenium group), wherein the metal salen complex group is attached (e.g., covalently bonded) to the bridging group and the bridging group is attached (e.g., covalently bonded) to the co-catalyst group.

Statement 2. A catalyst having the following structure:

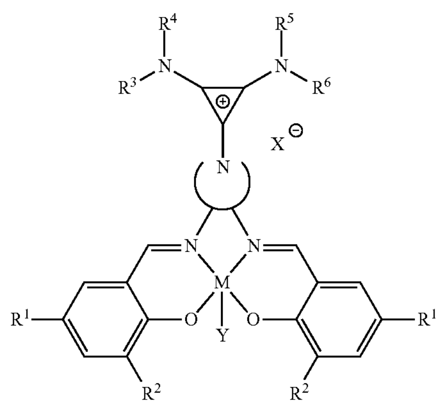

where M is chosen from Al, Co, Cr, Fe, Zn, Mn, Ti, Ni, Ga, Sm, Y, and V;

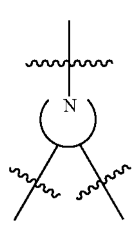

is chosen from:

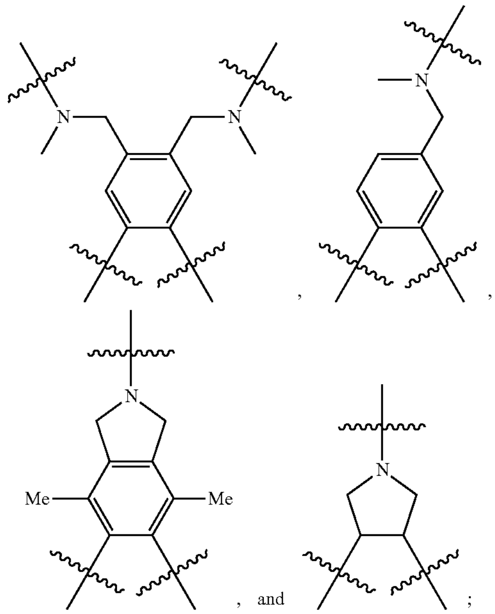

$R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic group (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like; $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), and the like; X is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like; and Y is optional and may be a ligand, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like.

Statement 3. A catalyst according to Statement 1, where the metal salen complex group has the following structure:

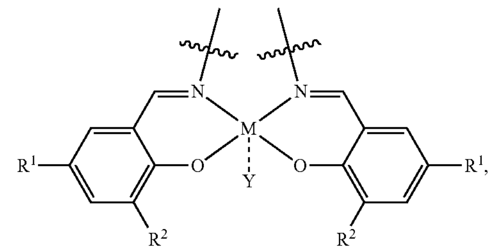

wherein M is chosen from Al, Co, Cr, Fe, Zn, Mn, Ti, Ni, Ga, Sm, Y, and V, $R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like, and Y is optional and may be a ligand, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like; the bridging group has the following structure:

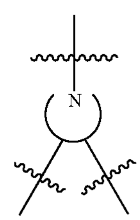

and is chosen from:

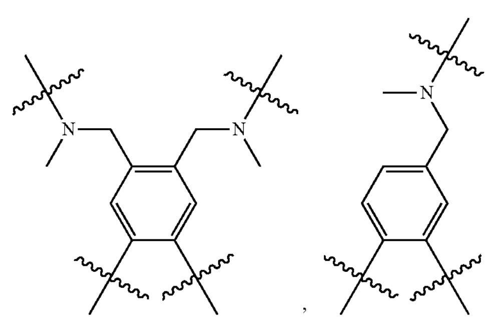

-continued

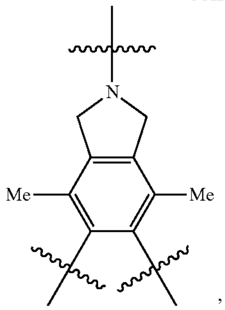

, and

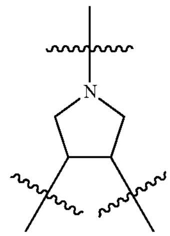

;

and the one or more co-catalyst groups has/have the following structure:

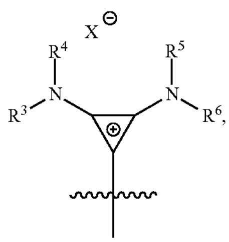

wherein $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), and the like, and is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like.

Statement 4. A catalyst according to any one of the preceding Statements, wherein the catalyst is:

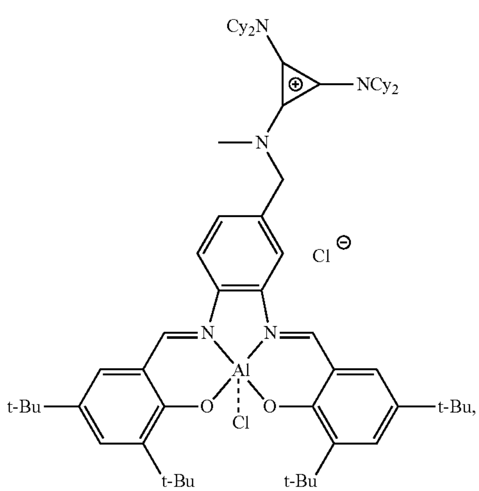

-continued

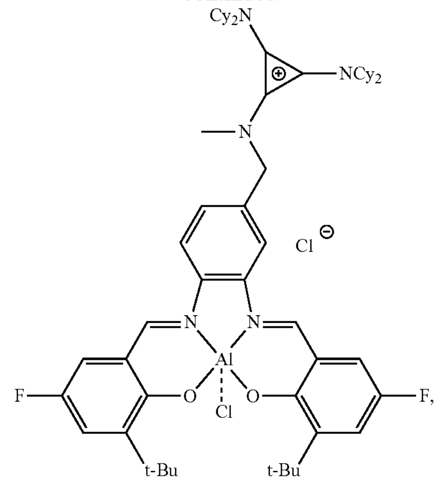

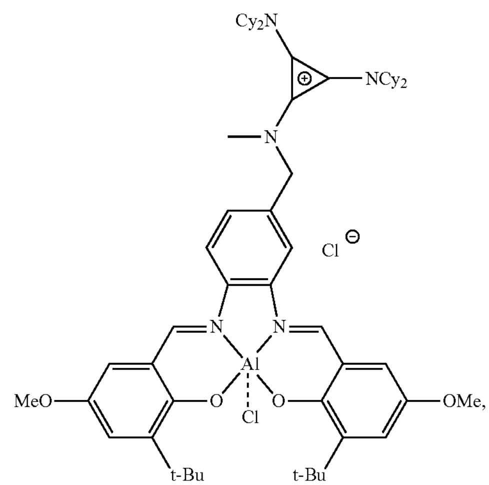

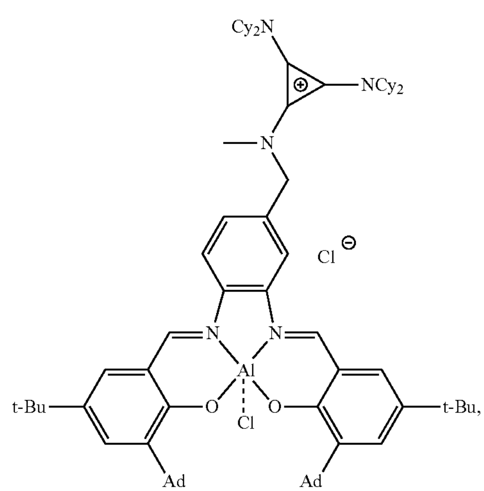

or

-continued

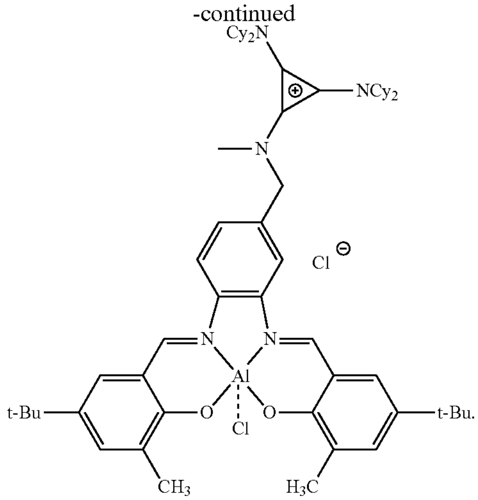

Statement 5. A catalyst according to Statement 4, wherein the catalyst is:

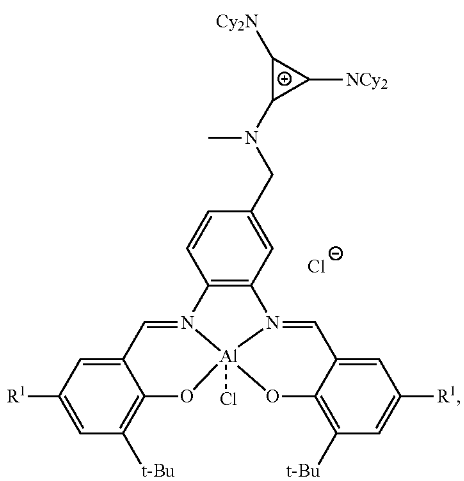

wherein $R^1$ is independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like.

Statement 6. A catalyst according to Statements 4 or 5, wherein the catalyst is:

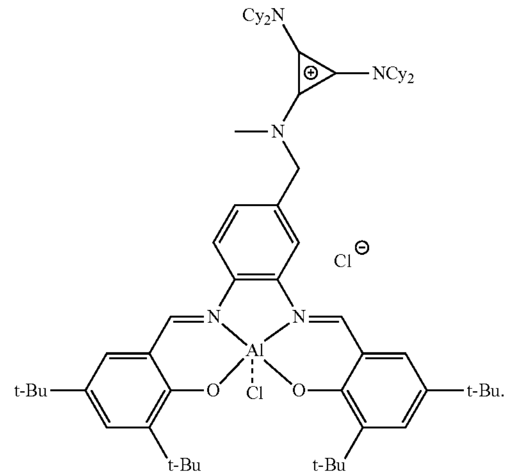

Statement 7. A catalyst according to any one of the preceding Statements, wherein the catalyst is:

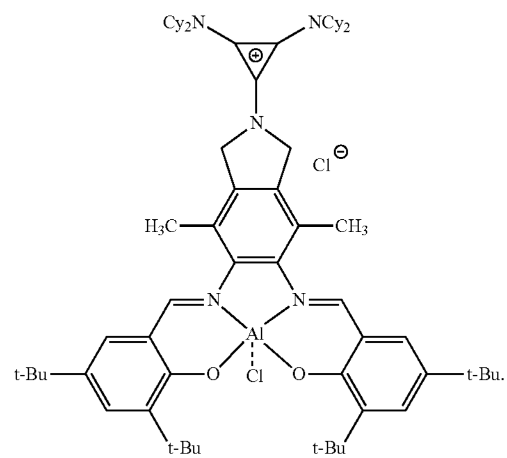

Statement 8. A catalyst according to any one of the preceding Statements, wherein the catalyst is:

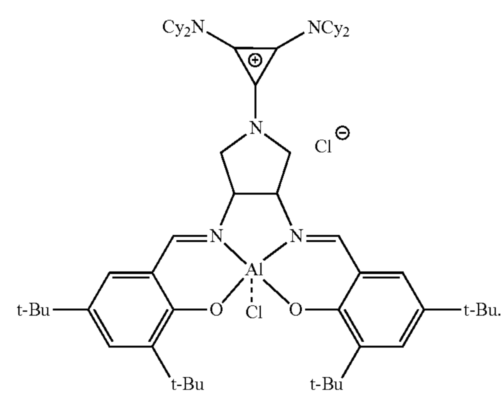

Statement 9. A method of making a catalyst according to any one of the preceding Statements, comprising: contacting a bridging group precursor (e.g., a backbone group, such as, for example, a tetherable backbone group) with one or more (e.g., 1 or 2) substituted or unsubstituted salicylaldehydes that may be the same or different such that a first reaction product is formed; contacting the first reaction product with an alkyl halide-functionalized co-catalyst that may have one or more substituents (e.g., an alkyl halide-functionalized cyclopropenium or an alkyl halide-functionalized cyclopropenium having one or more substituents) such that a second reaction product is formed; contacting the second reaction product with a Lewis acid such that the catalyst is formed; optionally, oxidizing the catalyst; and optionally, isolating the catalyst.

Statement 10. A method according to Statement 9, wherein the bridging group precursor is chosen from:

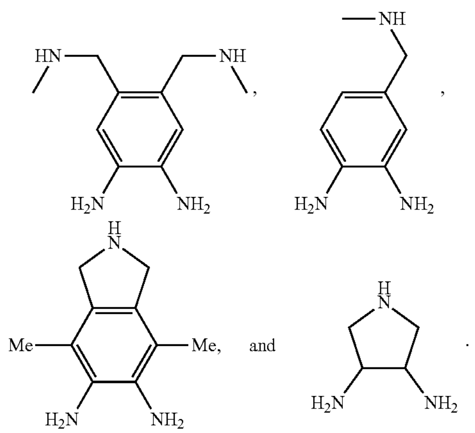

Statement 11. A method according to Statement 9, wherein the substituted or unsubstituted salicylaldehyde has the following structure:

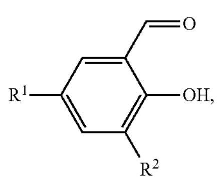

wherein $R^1$ and $R^2$ are independently chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like.

Statement 12. A method according to Statement 9, wherein the alkyl halide-functionalized co-catalyst that may have one or more substituents (e.g., an alkyl halide-functionalized cyclopropenium or an alkyl halide-functionalized cyclopropenium having one or more substituents) is:

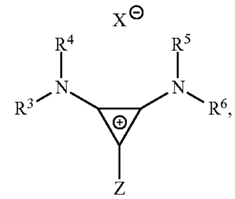

wherein $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like) and X is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like and Z is a halogen (e.g., Cl).

Statement 13. A method according to any one of Statement 9, wherein the Lewis acid comprises an oxidized metal (M) (e.g., M, $M^{2+}$, $M^{3+}$, $M^{4+}$, and the like) and one or more ligand, wherein the ligand is chosen from alkyl groups (e.g., methyl, ethyl, propyl, and the like), alkoxides, phenoxides, azide, nitrate, acetate, carboxylate, halides, and the like, and combinations thereof, and, optionally, the Lewis acid is a hydrate.

Statement 14. A method according Statement 9 or Statement 13, wherein the Lewis acid is chosen from $Et_2AlCl$, $Me_2Zn$, $CrCl_2$, $Mn(OAc)_3.2H_2O$, $FeCl_3.6H_2O$, $Co(OAc)_2.4H_2O$, and the like.

Statement 15. A method according to any one of Statements 9-14, wherein the catalyst formed has the following structure:

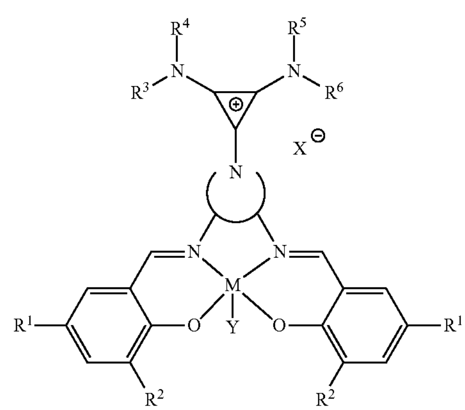

wherein M is chosen from Al, Co, Cr, Fe, Zn, Mn, Ti, Ni, Ga, Sm, Y, and V;

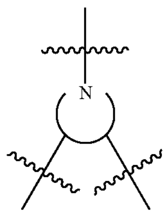

is chosen from:

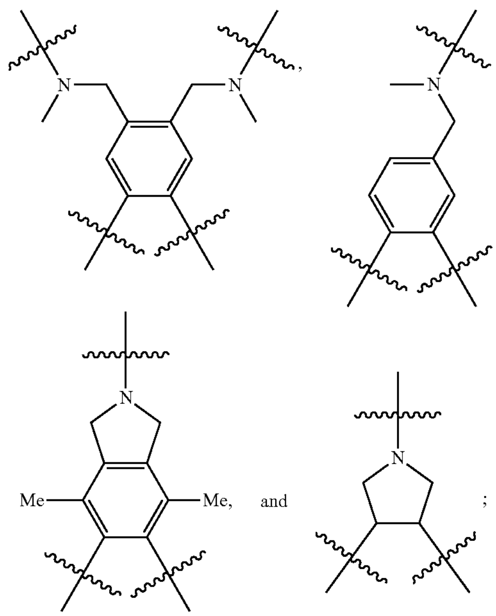

$R^1$ and $R^2$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), heterocyclic groups (e.g., pyrrolyl, imidazolyl, triazolyl, furfuryl, and the like), heteroaliphatic groups (e.g., ether, thioether, amine, aldehyde, ketone, ester, carbonate, imine, amide, carbamate, urea, nitro, phosphine, silane, siloxane, $SbF_5$, and the like), halogen/halogenated alkyl/aliphatic groups (e.g., F, Cl, Br, I, $CF_3$, $CCl_3$, and the like), nitrile groups, onium groups (e.g., ammonium groups, phosphonium groups, imidazolium groups, and the like), and the like; $R^3$, $R^4$, $R^5$, and $R^6$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), aryl groups (e.g., phenyl, substituted phenyl, naphthyl, substituted naphthyl, and the like), and the like; X is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like; and Y is optional and may be a ligand, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like.

Statement 16. A method according to any one of Statements 9-15, wherein the catalyst is:

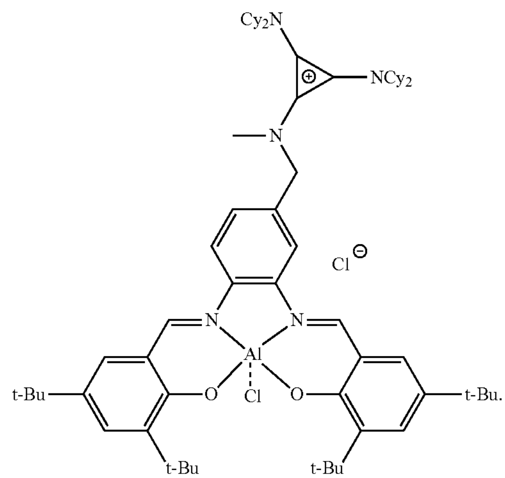

Statement 17. A method of making an aliphatic polyester comprising polymerizing an epoxide and a cyclic anhydride in the presence of a catalyst according to any one of Statement 1-8, a catalyst according to any one of Statements 1-8 and a cyclopropenium co-catalyst, or a catalyst (e.g., a metal salen catalyst, a porphyrin, a trialkyl borane, and the like) and a cyclopropenium co-catalyst.

Statement 18. A method according to Statement 17, wherein the cyclopropenium co-catalyst has the following structure:

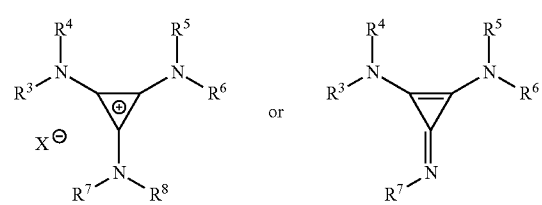

wherein $R^3$, $R^4$, $R^5$, $R^6$, $R^7$, and $R^8$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), and aryl groups (e.g., phenyl, substituted phenyl, naphthyl, substituted naphthyl, and the like); and X is an anion, is nucleophilic or non-nucleophilic, is coordinating or non-coordinating, and is independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, $ClO_4$, and the like.

Statement 19. A method according to Statement 18, wherein the ratio of catalyst to cyclic anhydride to epoxide is 1:≥100:>100 and there is more epoxide than cyclic anhydride.

Statement 20. A method according to Statements 17 or 18, wherein the epoxide is chosen from:

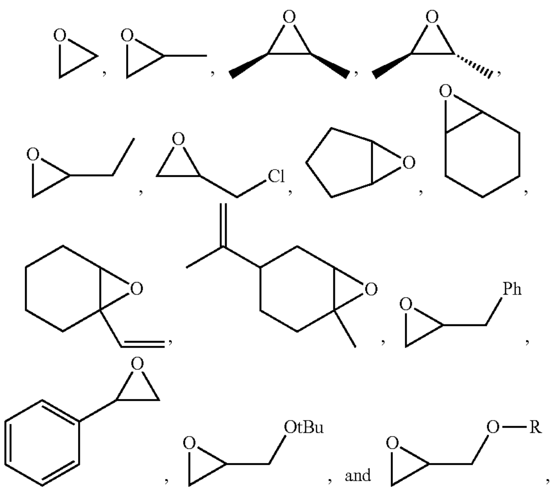

where R is a substituted or unsubstituted aliphatic group (e.g.,

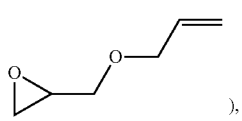

), and the like.

Statement 21. A method according to any one of Statements 17-20, wherein the cyclic anhydride is chosen from:

substituted or unsubstituted cyclic anhydride Diels Alder adducts, substituted or unsubstituted diglycolic anhydrides (e.g.,

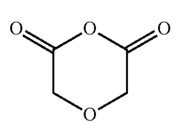

and the like), substituted or unsubstituted

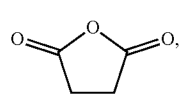

substituted or unsubstituted

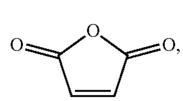

substituted or unsubstituted

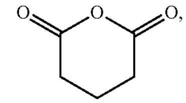

substituted or unsubstituted

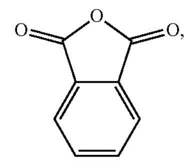 [SMILES: O=C1OC(=O)c2ccccc21]

substituted or unsubstituted

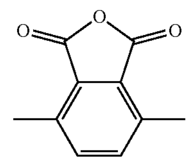

substituted or unsubstituted

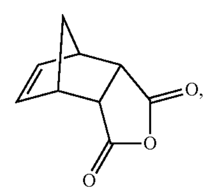 [SMILES: O=C1OC(=O)C2C3C=CC(C3)C12]

substituted or unsubstituted

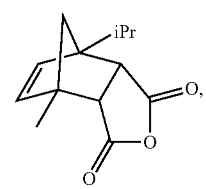 [SMILES: CC(C)C12C=CC(C)(C1)C1C(=O)OC(=O)C12]

substituted or unsubstituted

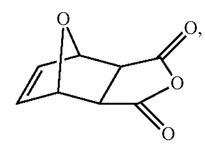 [SMILES: O=C1OC(=O)C2C3C=CC(O3)C12]

and the like.

Statement 22. A method according to any one of Statements 17-21, further comprising heating (e.g., 20-100° C., 60° C.).

Statement 23. A method according to any one of Statement 17-22, wherein the polymer has a molecular weight (Mn) of 500-1,000,000 g/mol, including all integer g/mol values and ranges therebetween (e.g., 500-1,000 g/mol, 500-2,000 g/mol, 500-3,000 g/mol, 500-4,000 g/mol, 500-5,000 g/mol, 500-10,000 g/mol, 500-20,000 g/mol, 500-50,000 g/mol, 500-100,000 g/mol, 10,000-50,000 g/mol, 10,000-100,000 g/mol, 50,000-100,000 g/mol, and 50,000-75,000 g/mol) and a PDI of 1-50, including all 0.1 values and ranges therebetween (e.g., 1-1.3, 1-2, 1-5, 1-10, 1-20, 1-25, 1-50, or <1.3).

Statement 24. A method of making an aliphatic polycarbonate comprising polymerizing an epoxide and $CO_2$ in the presence of a catalyst according to any one of Statements 1-8, a catalyst according any one of Statements 1-8 and a cyclopropenium co-catalyst, or a catalyst (e.g., a metal salen catalyst, a porphyrin, a trialkyl borane, and the like) and a cyclopropenium co-catalyst.

Statement 25. A method according to Statement 24, wherein the cyclopropenium co-catalyst has the following structure:

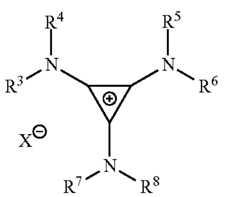

or

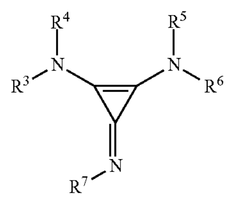

wherein $R^3$, $R^4$, $R^5$, $R^6$, $R^7$, and $R^8$ are independently at each occurrence chosen from hydrogen, linear alkyl groups (e.g., methyl, ethyl, propyl, and the like), branched alkyl groups (e.g., isopropyl, sec-butyl, tert-butyl, and the like), cycloaliphatic groups (e.g., cyclopropyl, cyclobutyl, cyclopentyl, cyclohexyl, and the like), polycycloaliphatic groups (e.g., adamantyl, terpenyl, and the like), unsaturated aliphatic groups (e.g., vinyl, allyl, propargyl, norbornenyl, and the like), and aryl groups (e.g., phenyl, substituted phenyl, naphthyl, substituted naphthyl, and the like); and X is nucleophilic and is coordinating or non-coordinating and are independently chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $ClO_4$, and the like.

Statement 26. A method according to Statements 24 or 25, wherein the ratio of catalyst to $CO_2$ to epoxide is 1:≥100:≥100 and there is more epoxide than cyclic anhydride.

Statement 27. A method according to any one of Statements 24-26, wherein the epoxide is chosen from:

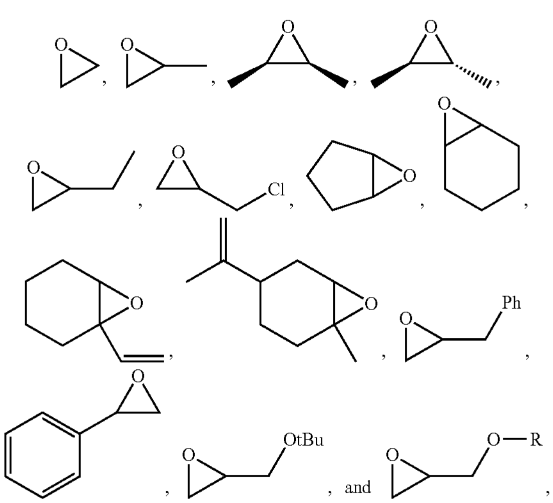

where R is a substituted or unsubstituted aliphatic group (e.g.,

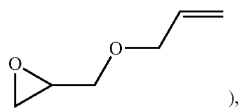

), and the like.

Statement 28. A method according to any one of Statements 24-27, wherein the polymer has a molecular weight (Mn) of 500-1,000,000 g/mol, including all integer g/mol values and ranges therebetween (e.g., 500-1,000 g/mol, 500-2,000 g/mol, 500-3,000 g/mol, 500-4,000 g/mol, 500-5,000 g/mol, 500-10,000 g/mol, 500-20,000 g/mol, 500-50,000 g/mol, 500-100,000 g/mol, 10,000-50,000 g/mol, 10,000-100,000 g/mol, 50,000-100,000 g/mol, and 50,000-75,000 g/mol) and a PDI of 1-50, including all 0.1 values and ranges therebetween (e.g., 1-1.4, 1-2, 1-5, 1-10, 1-20, 1-25, 1-50, or ≤1.4).

Statement 29. A method according to any one of Statements 17-28, wherein the method further comprises using one or more protic chain transfer agents.

The following example is presented to illustrate the present disclosure. It is not intended to be limiting in any matter.

Example 1

The following is an example describing the synthesis of catalysts of the present disclosure and uses thereof.

To better understand the effects of the covalent tether on catalytic activity, we have developed a bifunctional catalyst system that can be directly compared to binary analogues. With this approach, we hope to identify which catalyst features influence activity, control selectivity, and impact the polymerization mechanism at various catalyst loadings. Applying this strategy, we developed an aminocyclopropenium-tethered aluminum salen complex that maintains excellent activity under the same dilute conditions that render the binary system inactive (FIG. 1). Kinetic studies provide mechanistic justification for employing a bifunctional catalyst system at low catalyst concentrations. Serendipitously, the novel aminocyclopropenium cocatalyst suppresses transesterification and epimerization side reactions commonly observed in previous systems, ultimately preventing degradation of the polymer backbone. We also sought to apply the bifunctional catalyst at low loadings in conjunction with chain transfer agents to tune molecular weights while preserving good activity.

Figure 3:
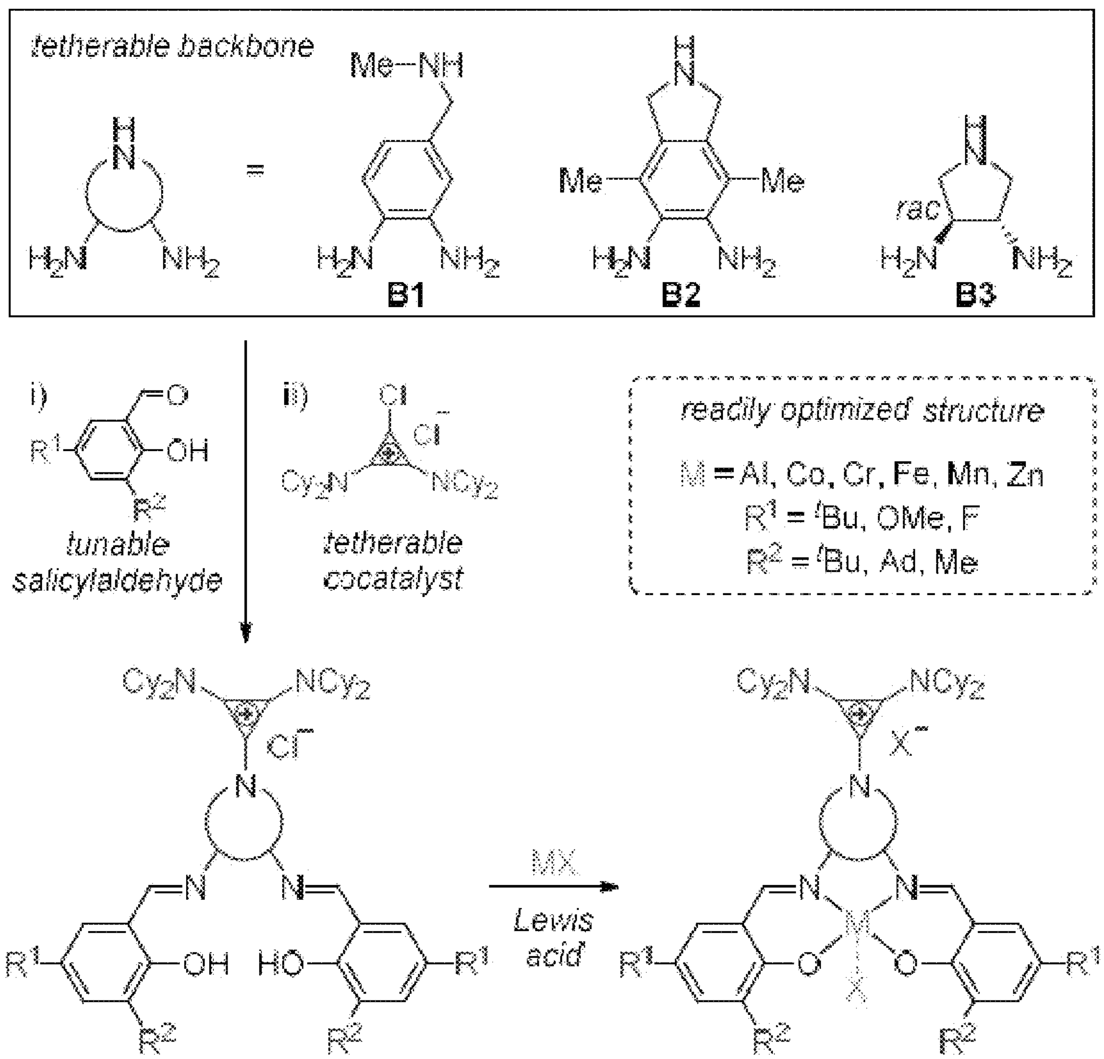
FIG. 3. Modular synthesis of bifunctional catalysts.

Modular Bifunctional Catalyst Strategy. Existing bifunctional systems tether the cocatalyst by functionalizing the salicylidene moiety. This approach requires extended linear syntheses that impede optimization and systematic study. We therefore sought a parallel synthetic route in order to independently tune the individual catalyst components (FIG. 3). We reasoned that tethering the cocatalyst via the diamine backbone of the salen ligand would allow us to systematically vary the electronic properties and steric profile of the catalyst through the many commercially available or readily synthesized salicylaldehydes. We envisioned reacting an alkyl halidefunctionalized cocatalyst with a secondary amine pendant to the salen backbone as the final step in ligand synthesis (FIG. 3).

Figure 4:
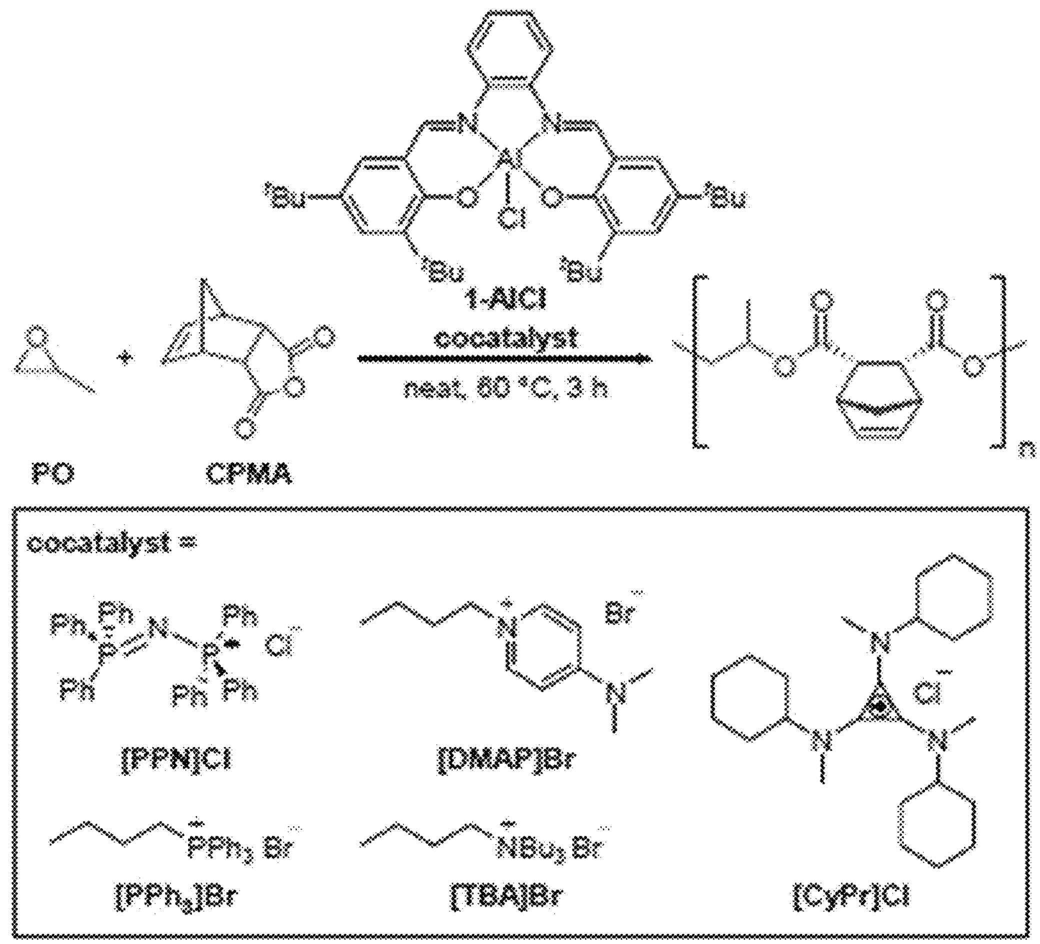
FIG. 4. Table showing cocatalyst optimization in the binary 1-AlC1 system.

Cocatalyst Optimization. Onium salts derived from non-coordinating cations, such as widely-used bis(triphenylphosphine)iminium chloride ([PPN]Cl), are highly effective nucleophilic cocatalysts for ROCOP. Cocatalysts such as 4-(dimethylamino)pyridine (DMAP), tetraalkylammonium, and phosphonium salts have also been used successfully in binary and bifunctional ROCOP systems. PO and carbic anhydride (CPMA) were copolymerized using 1-AlC1 and a series of onium salts. Of these cocatalysts, [PPN]C (FIG. 4, entry 1) achieved the highest catalytic activity and gave marginally lower dispersities as compared to the other onium salts (FIG. 4, entries 2-4).

We therefore sought to develop a cocatalyst of similar activity to [PPN]Cl that could be easily tethered to the ligand backbone. Recently, Lambert and coworkers demonstrated that tris(dialkylamino)cyclopropenium (TDAC) salts catalyze the coupling of epoxides with $CO_2$ or acyl chlorides to give cyclic carbonates or chlorohydrin esters, respectively. TDAC derivatives also promote the ringopening polymerization of lactones through H-bond donor/acceptor cooperative catalysis. The especially noncoordinating nature of the $TDAC^+$ counterion gives rise to the increased anion reactivity required for ring-opening, prompting our interest in TDAC salts. Furthermore, TDACs can be prepared on >10 g scale by coupling chlorobis(dialkylamino)cyclopropenium chlorides with secondary amines, affording a facile route to install TDACs on secondary amine-containing salen backbones.

Tris(methylcyclohexylamino)cyclopropenium chloride ([CyPr]Cl) was synthesized as a representative TDAC, and its activity was compared to PO/CPMA copolymerizations cocatalyzed by [PPN]Cl. With 1-AlCl, [PPN]Cl, and [CyPr]C cocatalysts afford polymers with low dispersities and nearly identical TOF values of 112 $h^{-1}$ and 114 $h^{-1}$, respectively (FIG. 4, entries 1 and 5). However, copolymerizations of PO and CPMA mediated by 1-AlCl/[PPN]Cl run past full anhydride conversion undergo extensive transesterification and epimerization due to the formation of persistent alkoxide chain-ends. To our surprise, transesterification and epimerization were not observed in polymerizations with 1-AlCl/[CyPr]Cl after CPMA was fully consumed (vide infra). This result demonstrates that cocatalysts with similar catalytic activities can produce markedly different copolymers due to the counterion's influence on side reactions.

Backbone Optimization. Metal salens containing chiral backbones such as (R,R)- or (S,S)-1,2-diaminocyclohexane (salcy-type ligands) have been used to synthesize stereoregular polyesters, whereas metal salens incorporating achiral planar 1,2-phenylenediamine backbones (salph-type ligands) have achieved some of the highest activities in aluminum salen-catalyzed ROCOP of epoxides and cyclic anhydrides. Mimicking those geometries, we synthesized several 1,2-diamino backbones with pendant secondary amines (B1, B2, and B3) that could orthogonally react with salicylaldehydes and a tetherable aminocyclopropenium cocatalyst (FIG. 3).

Using this strategy, we prepared tethered ligands 2a, 4, and 6 (FIG. 5) from the sequential reaction of backbones B1, B2, and B3, respectively, with 3,5-di-tertbutylsalicylaldehyde and chlorobis(dicyclohexylamino)-cyclopropenium chloride (see Supporting Information for synthetic details). Ligands 1, 3, and 5 (FIG. 5) were prepared as binary catalyst controls to deconvolute the influences of backbone geometry and the covalently tethered cocatalyst on catalytic activity. Metalation with diethylaluminum chloride afforded the associated aluminumsalen catalysts (see below for metalation conditions).

Catalyst activities for the copolymerization of PO and CPMA were evaluated at 60° C.; [PPN]Cl was used as a cocatalyst with binary systems 1-AlCl, 3-AlCl, and 5-AlC1 (FIG. 6). All catalyst systems afforded perfectly alternating copolymers with low dispersities, indicative of controlled polymerization behavior. As anticipated, the bifunctional catalysts 2a-AlCl, 4-AlCl, and 6-AlC1 maintained their activities at low catalyst loadings, whereas their binary analogues slowed significantly (FIG. 6, vide infra for discussion of polymerization kinetics). The salph-inspired bifunctional catalysts 2a-AlC1 and 4-AlC1 exhibited higher polymerization rates (TOFs of 93 and 64 h-1, respectively) than the trans-pyrrolidine catalyst 6-AlC1(TOF=14 $h^{-1}$). A similar trend in activity was also observed for polymerizations catalyzed by the corresponding binary catalysts 1-AlC1 (TOF=112 $h^{-1}$), 3-AlCl (TOF=57 $h^{-1}$), and 5-AlC1 (TOF=28 $h^{-1}$) (FIG. 6, entries 2, 4, and 6, respectively), indicating that backbone geometry is primarily responsible for the relative activities of the bifunctional catalysts. These results are consistent with previous reports that salenAlX complexes with distorted ONNO equatorial ligand planes produce slower rates due to disrupted epoxide binding and activation.

Although the salph backbone is conserved across catalysts 1-AlC1 to 4-AlCl, ortho-substituted 3-AlC1 and 4-AlClexhibited notably slower rates than unsubstituted 1-AlC1 and 2a-AlCl. Cort and coworkers have shown that o-Me substitution of atropisomeric salph$UO_2$ complexes significantly reduces the rate of enantiomer interconversion due to steric destabilization of the intermediate planar conformer. We hypothesize that steric interference from the imine protons and proximal o-Me substituents in 3-AlC1 and 4-AlC1 results in out-of-plane twisting of the C═N moieties, disrupting planarity and reducing catalytic activity. Attempts to crystallize 4-AlC1 for X-ray structural validation have been unsuccessful but are ongoing. Nonetheless, the unsubstituted and easily-synthesized phenylene diamine backbone (B1) imparts high catalytic activity and was therefore selected for further optimization.

Lewis Acid Optimization. Extensive ROCOP catalyst development has demonstrated that the choice of Lewis acid significantly influences polymerization rates and selectivities. Consistent with previous reports, Cr, Co, and Al derivatives of 2a exhibited the highest activities (TOFs=376, 111, and 93 $h^{-1}$, respectively; FIG. 7, entries 1, 4, and 6), whereas the Mn, Fe, and Zn bifunctional catalysts only achieved modest conversions in 16 h (FIG. 7, entries 2, 3, and 5). While 2a-CoOAc initially appeared promising, efforts to apply this catalyst at low loadings resulted in catalyst deactivation as evidenced by non-linear conversion vs. time plots (FIG. 49) that deviate from the expected first-order catalytic kinetic behavior. Further study revealed that prolonged heating of 2a-CoOAc under dilute reaction conditions resulted in the formation of a paramagnetic species whose $^1H$ NMR spectrum matched that of the 2a-Co(II) synthetic precursor. This observation is consistent with previous reports detailing the thermallyinduced reduction of active salenCo(III)X complexes to inactive Co(II) species. While the chromium catalyst 2a-CrCl is slightly faster than the aluminum analogue 2a-AlCl, salenCr(III)X complexes are known to homopolymerize epoxides via a bimetallic mechanism, which may be a concern at high catalyst loadings or high conversions of anhydride. For this reason, the diamagnetic aluminum catalyst 2a-AlC1 was chosen for further ligand optimization due to its high activity and selectivity towards ROCOP, relative ease of synthesis and characterization, and use of an earth-abundant nontoxic metal.

Salicylidene Optimization. The salicylidene moiety of the salen ligand provides an additional opportunity to tune the Lewis acidity and steric environment of the metal center. Our group previously demonstrated that electron withdrawing para-substituents enhance the Lewis acidity of salphAl (III)Cl complexes, suppressing side reactions but also reducing catalyst activity. Consistent with this observation, the p-F-substituted catalyst 2b-AlCl polymerized PO and CPMA at slower rates than the p-$^t$Bu catalyst 2a-AlC1 (FIG. 7, entries 6 and 7). Interestingly, the p-OMe variant 2c-AlC1 was also less active; its attenuated Lewis acidity likely disfavors epoxide binding and activation (FIG. 7, entry 8). The ortho position of the salicylidene moiety can be used to adjust the steric environment surrounding the active site. The Lee group has observed that o-Me substituents enhanced rates of epoxide/$CO_2$ copolymerization. However, both o-Me- and o-Ad-substituted catalysts (2d-AlCl and 2e-AlCl, respectively) exhibited reduced reaction rates relative to the o-$^t$Bu catalyst (2a-AlCl) (FIG. 7, entries 6, 9, and 10). The increased steric projection of the adamantyl group likely distorts the backbone from the most active planar geometry. We therefore selected the 3,5-di-tert-butyl-substituted bifunctional catalyst 2a-AlC1 for further investigation.

Figure 2:
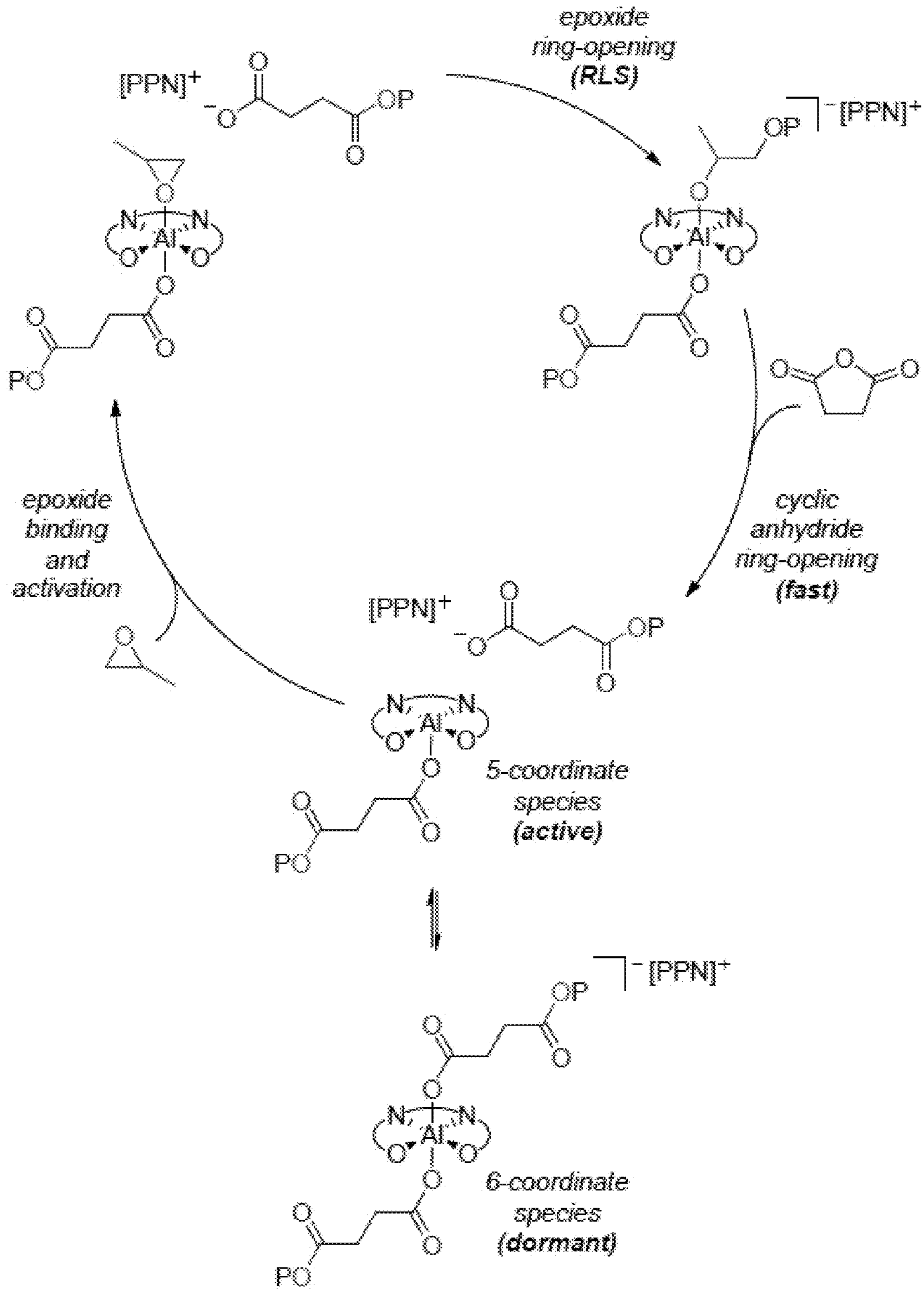
FIG. 2. Scheme showing simplified mechanism of epoxide/cyclic anhydride copolymerization in the binary system.
Figure 8:
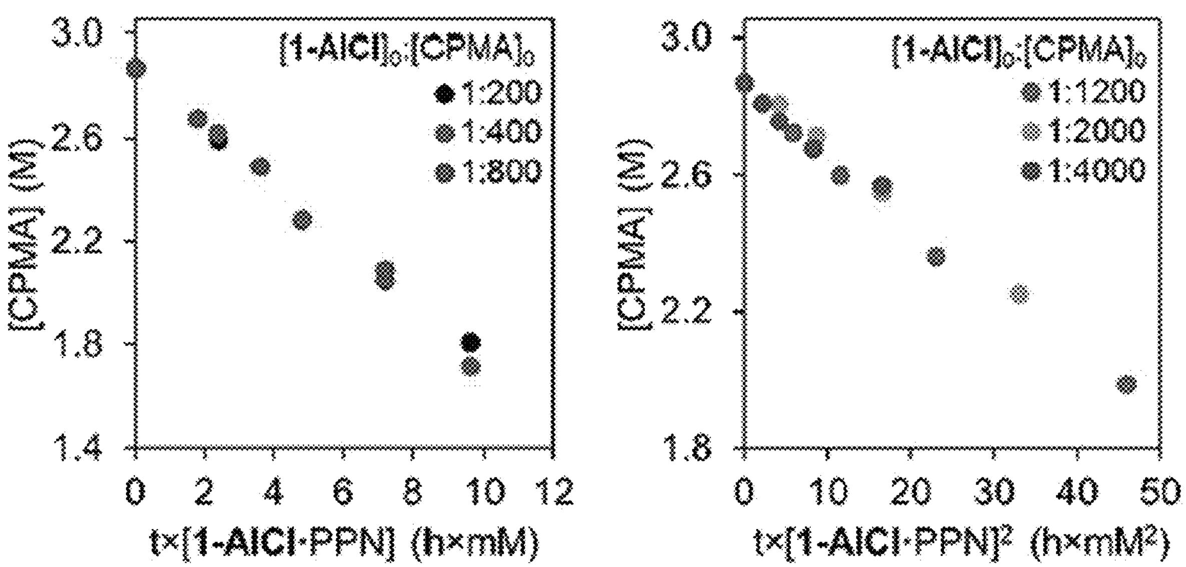
FIG. 8. Anhydride decay versus normalized time scale showing a change in the reaction order in the binary catalyst pair 1-AlCl/[PPN]Cl. First-order fit applied when $[1\text{-AlCl}]_0$:$[\text{PPNCl}]_0$:$[\text{CPMA}]_0$:$[\text{PO}]_0$=1:1:200:1000-1:1:800:4000 (left). Second-order fit applied when $[1\text{-AlCl}]_0$:$[\text{PPNC}]_0$:$[\text{CPMA}]_0$:$[\text{PO}]_0$=1:1:1200:6000-1:1:4000:20000 (right).
Figure 43:
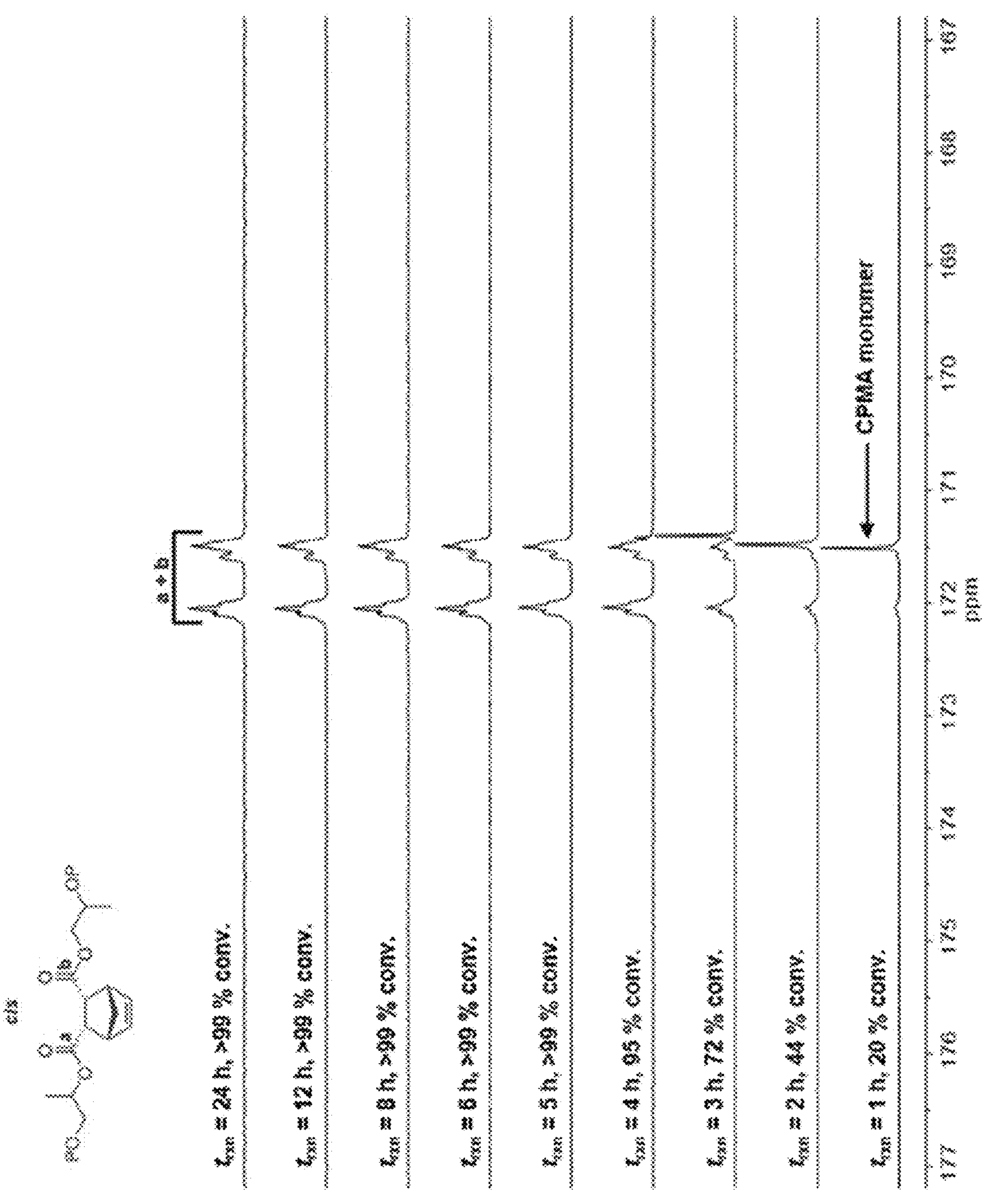
FIG. 43. $^{13}$C NMR spectra of CPMA/PO copolyester synthesized using 2a-AlCl showing conserved diester stereochemistry at extended reaction times.
Figure 45:
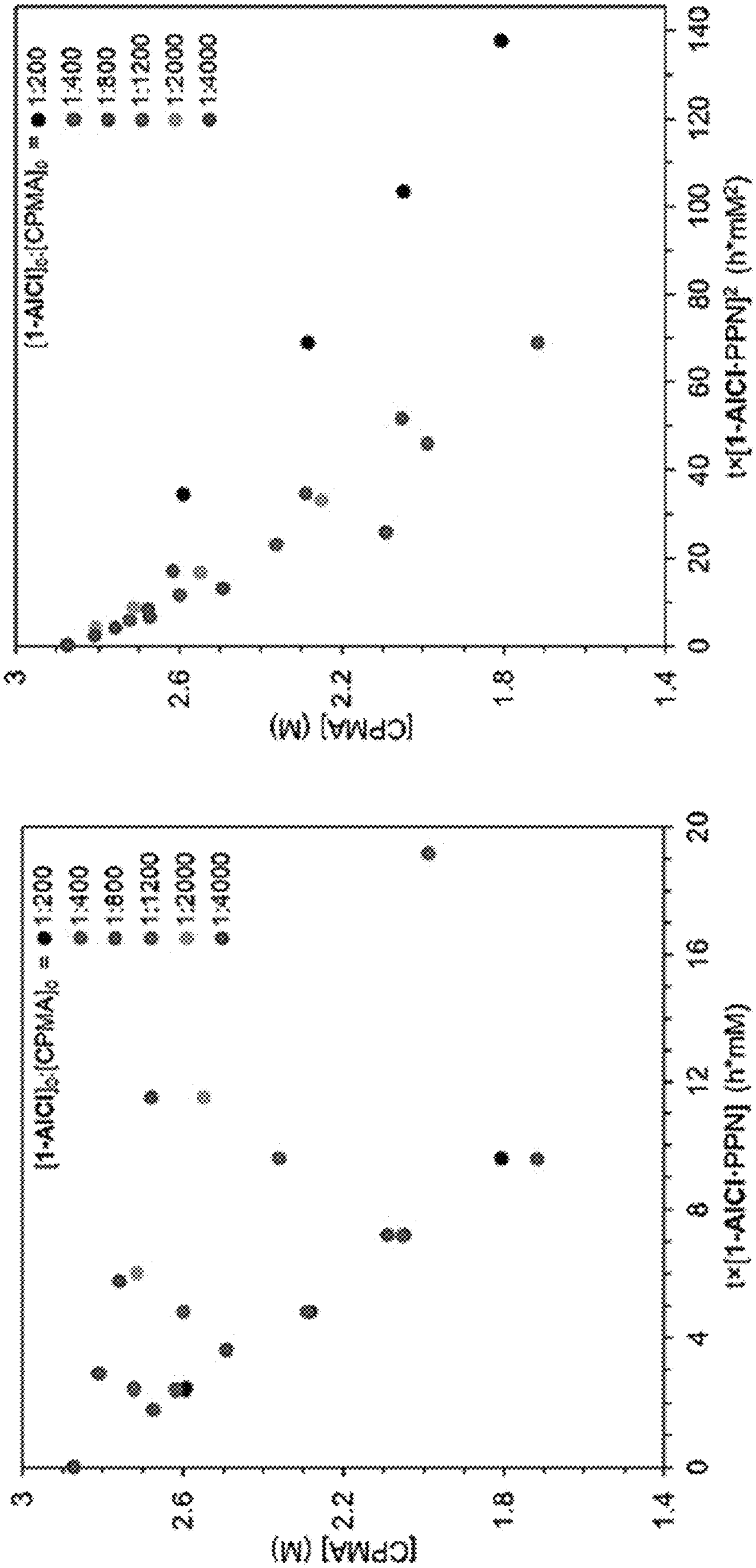
FIG. 45. Anhydride decay versus normalized time scale for first-order (left) and second-order (right) behavior in the binary catalyst system 1-AlCl/PPN.
Figure 48:
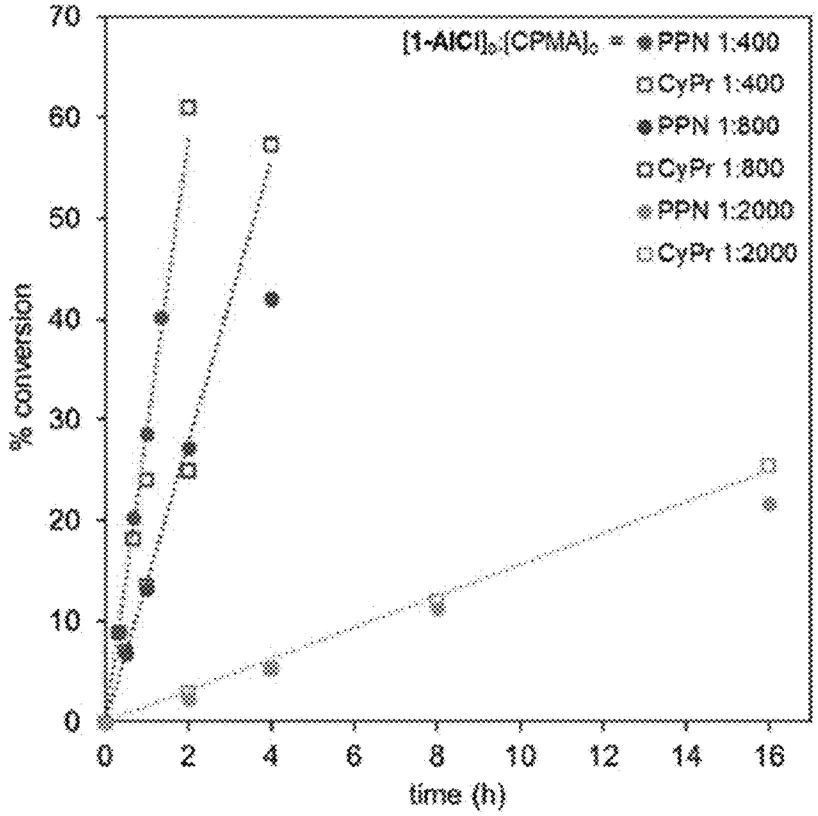
FIG. 48. Comparison of PO/CPMA copolymerization kinetics using 1-AlCl/[PPN]Cl (closed circles) and 1-AlCl/[CyPr]Cl (open squares) demonstrating comparable rates.

Polymerization Kinetics in the Binary and Bifunctional Catalyst Systems. To understand the effect of covalently tethering the cocatalyst and Lewis acid, we compared the kinetic behavior of the optimized bifunctional catalyst 2a-AlC1 with that of the binary system 1-AlCl/[PPN]Cl. We varied the concentrations of 1-AlC1 and [PPN]C concurrently, maintaining a 1:1 stoichiometry, and monitored the consumption of cyclic anhydride. Bures's time normalized method was used to determine the reaction order in the 1-AlCl/[PPN]C catalyst pair. At high catalyst loadings ($[1\text{-AlCl}]_0:[PPNC]_0:[CPMA]_0:[PO]_0$=1:1:200:1000-1:1:800: 4000), excellent overlay was obtained using a time normalization of t×[1-AlCl PPN](FIG. 8, left), consistent with the previously reported first-order dependence on the concentration of the catalyst pair. However, as the catalyst loading was reduced, the time normalized reaction profiles began to deviate from the first-order fit (FIG. 45). At low catalyst loadings ($[1\text{-AlCl}]_0:[PPNC]_0:[CPMA]_0:[PO]_0$=1:1:1200: 6000-1:1:4000:20000), the reaction profiles overlay when a second-order time normalization of t×$[1\text{-AlCl PPN}]^2$ was applied (FIG. 8, right). Varying the epoxide concentration (3.5-14.3 M) revealed that the first-order dependence on [PO] is maintained at low catalyst loadings ($[1\text{-AlCl}]_0$: $[PPNCl]_0$:[CPMA]o=1:1:1200) (FIG. 43). The experimental rate law k[PO][1-AlCl][PPN] is consistent with a pre-equilibrium kinetic model in which epoxide binding is fast relative to subsequent ring-opening (FIG. 2). Polymerization kinetics using 1-AlCl/[CyPr]Cl afforded excellent agreement with those performed using [PPN]Cl (FIG. 48), indicating that the change in reaction order at low loadings is a shared feature of binary catalyst systems.

Figure 9:
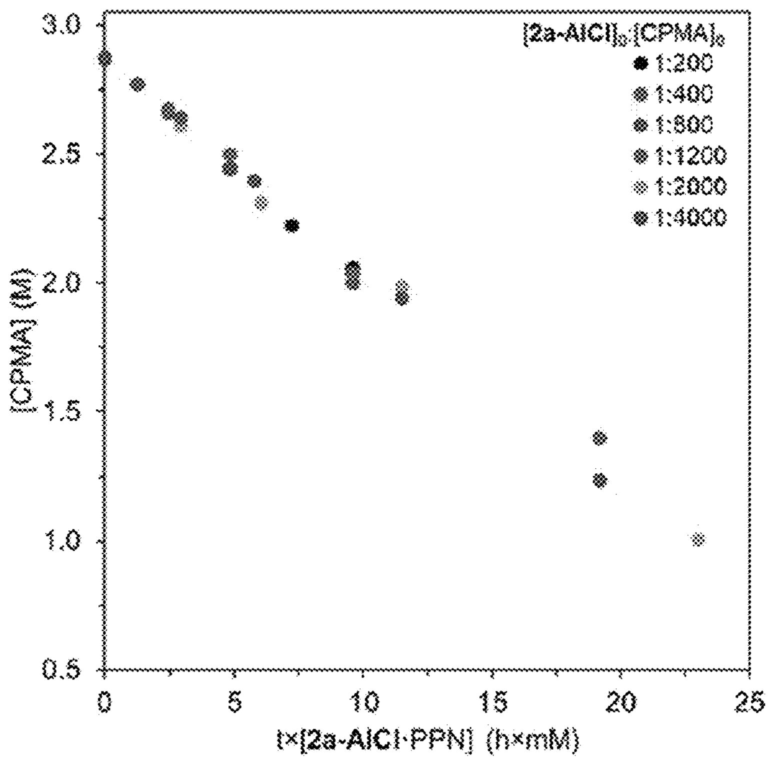
FIG. 9. Anhydride decay versus normalized time scale showing first-order behavior in bifunctional catalyst 2a-AlC1 at a variety of catalyst loadings $[2a\text{-AlCl}]_0$:$[\text{CPMA}]_0$:$[\text{PO}]_0$=1:200:1000-1:4000:20000.
Figure 50:
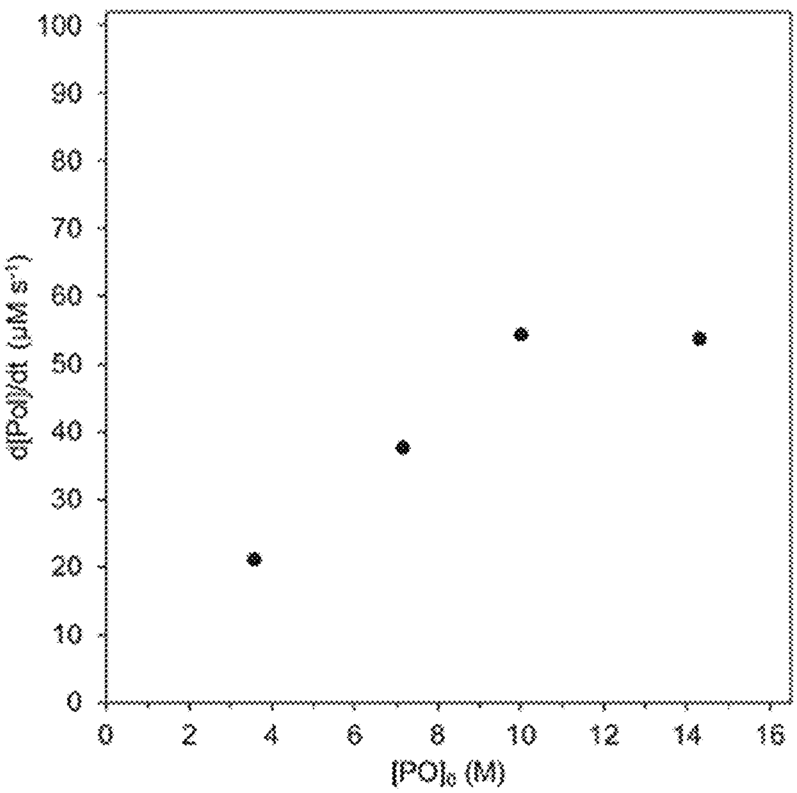
FIG. 50. Initial rates of PO/CPMA copolymerization (<20% conversion) versus initial PO concentration using the bifunctional catalyst 2a-AlCl.
Figure 52:
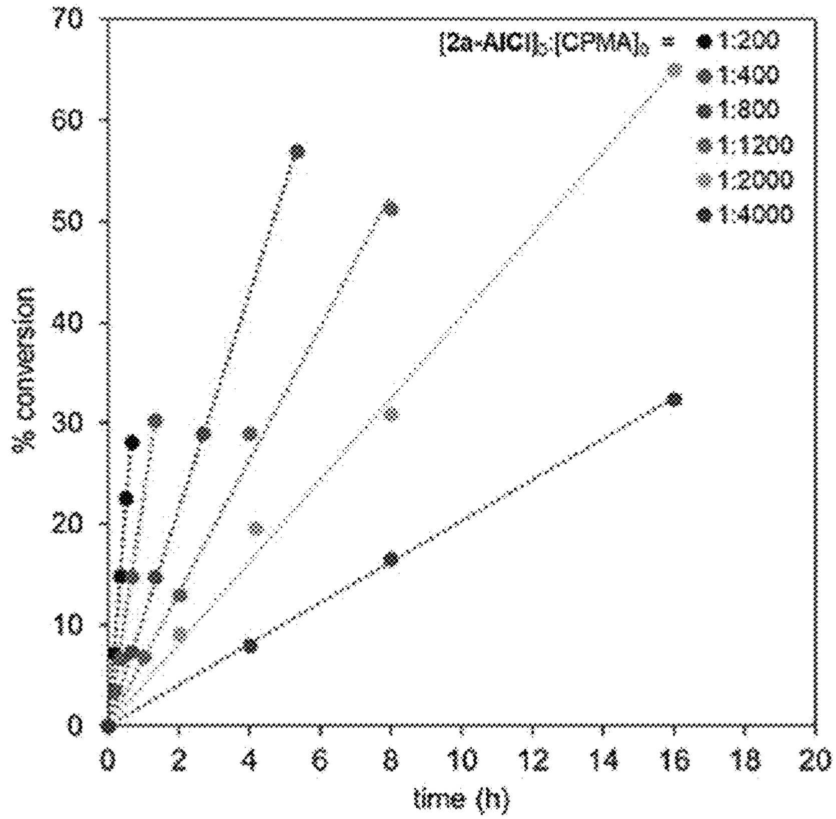
FIG. 52. PO/CPMA copolymerization kinetics using bifunctional catalyst 2a-AlCl.

We anticipated that covalently tethering the Lewis acid catalyst and nucleophilic cocatalyst would facilitate intramolecular epoxide ring-opening and eliminate the second-order dependence on catalyst pair concentration observed in the binary system. Accordingly, a series of polymerization kinetics experiments were performed in which the catalyst concentration was varied from 0.7-14.3 mM ($[2a\text{-AlCl}]_0$: $[CPMA]_0:[PO]_0$=1:200:1000-1:4000:20000). A linear dependence of the rate of cyclic anhydride consumption on catalyst concentration was observed, which is consistent with a first-order dependence on [2a-AlCl]. A time normalization of t×[2a-AlCl] afforded excellent overlay of the reaction profiles at all catalyst loadings studied, providing further support for first-order behavior (FIG. 9). As in the binary system, the ROCOP of PO and CPMA catalyzed by 2a-AlC1 is first-order in [PO] prior to the onset of saturation kinetics and zero-order in [CPMA](FIGS. 50 and 52, respectively). Taken together, these kinetic results are consistent with a bis-carboxylate resting-state from which epoxide binding is fast relative to intramolecular ring-opening.

Figure 53:
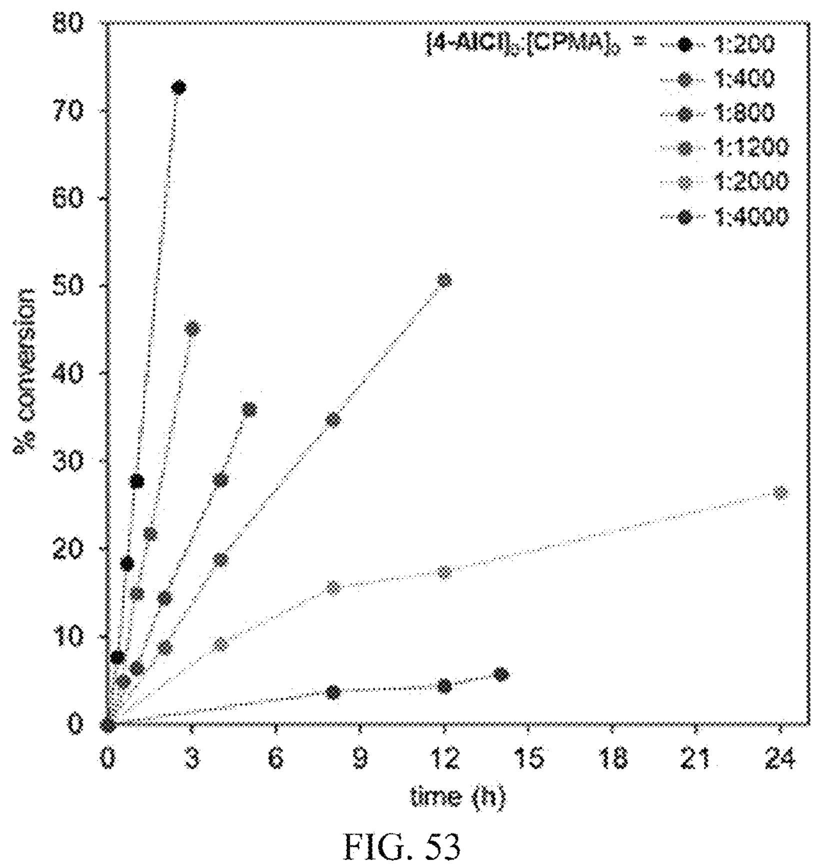
FIG. 53. PO/CPMA copolymerization kinetics using bifunctional catalyst 4-AlCl.
Figure 54:
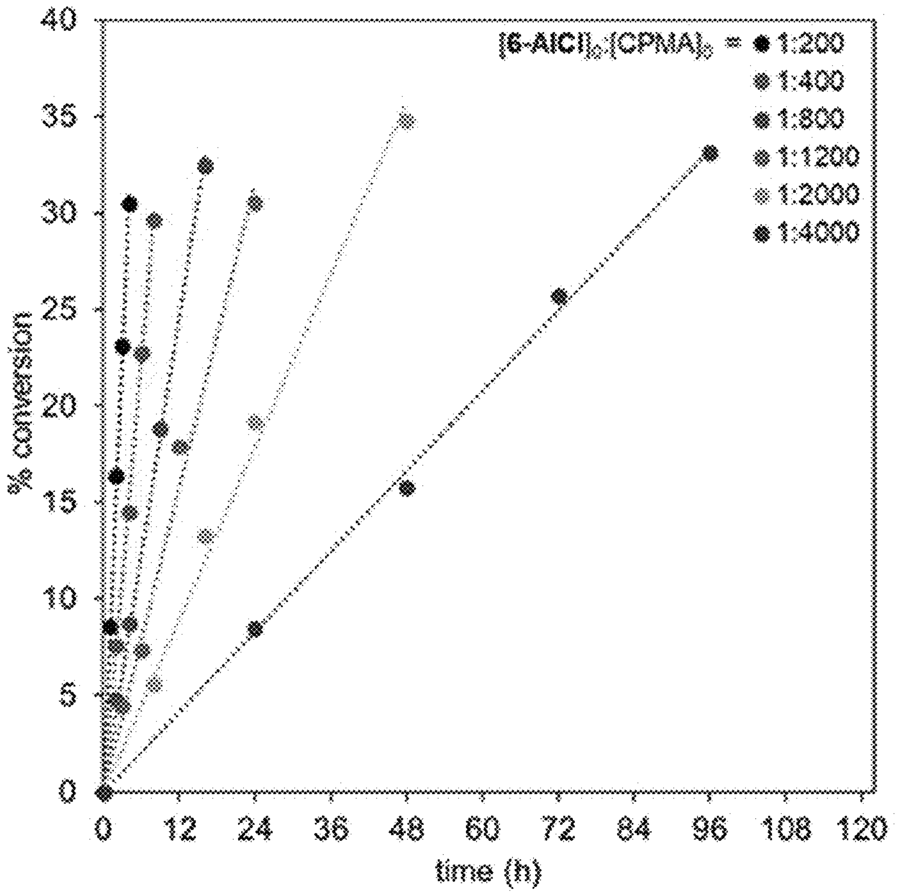
FIG. 54. PO/CPMA copolymerization kinetics using bifunctional catalyst 6-AlCl.

While bifunctional catalyst 6-AlC1 was notably slower than 2a-AlCl, polymerization rates also depended linearly on [6-AlCl] (FIG. 54). Similarly, polymerizations performed with bifunctional catalyst 4-AlC1 exhibited a first-order rate dependence on [4-AlCl] for catalyst concentrations above $[4\text{-AlCl}]_0:[CPMA]_0:[PO]_0$=1:1200:6000 (FIG. 53). At lower concentrations of 4-AlCl, the polymerization rate slowed over extended reaction times, and the reaction mixtures darkened from yellow to brown, which may indicate catalyst decomposition. The apparent first-order dependence on catalyst concentration across the bifunctional systems further supports that the covalent tether is responsible for maintaining high activities at low loadings.

Figure 10:
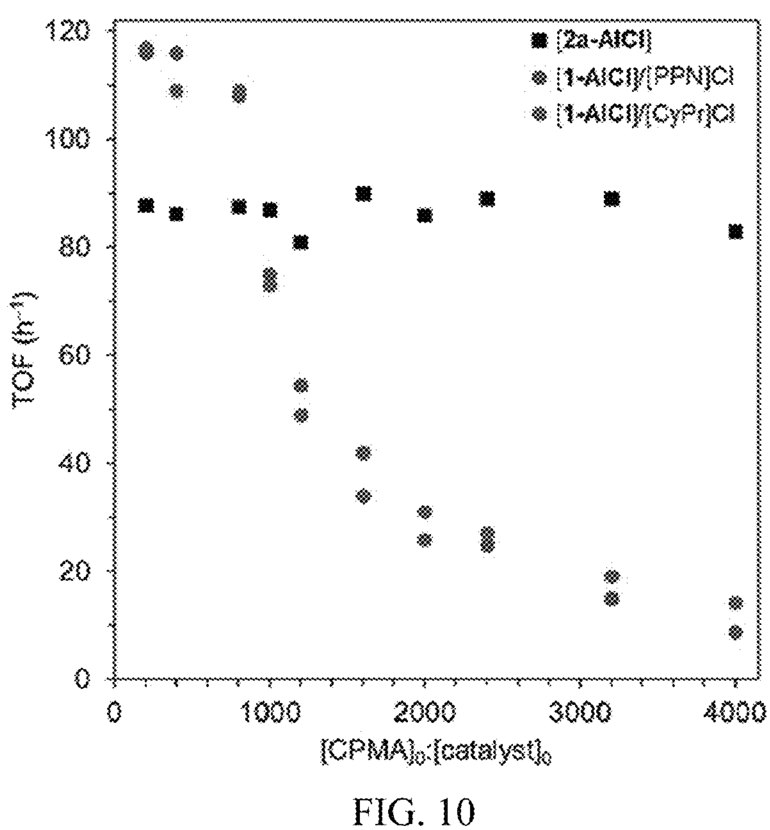
FIG. 10. Turnover frequency as a function of catalyst loading showing attenuated polymerization activity in the binary catalyst system (1-AlCl) and maintained activity in the bifunctional catalyst system (2a-AlCl), $[\text{catalyst}]_0$:$[\text{CPMA}]_0$:$[\text{PO}]_0$=1:200:1000-1:4000:20000. For polymerizations performed using 1-AlCl, $[\text{catalyst}]_0$:[cocatalyst]o=1:1. TOF=Turnover frequency, mol anhydride consumed×mol catalyst$^{-1}$×h$^{-1}$.

The mechanistic disparity between the binary and bifunctional catalyst systems is particularly apparent when comparing their respective TOFs as the catalyst loading is reduced (FIG. 10). Though faster than the bifunctional system at high loadings, the binary catalyst systems 1-AlCl/[PPN]Cl and 1-AlCl/[CyPr]Cl rapidly decelerate with decreasing concentration (TOFs decrease from 115 to 9 $h^{-1}$). In contrast, the bifunctional system 2a-AlC1 maintains excellent activity (TOF 90 $h^{-1}$) even at extremely low catalyst loadings ($[2a\text{-AlCl}]_0:[CPMA]_0:[PO]_0$=1:4000: 20000), further validating the bifunctional approach. Covalently tethering the cocatalyst and Lewis acid affords catalysts that are immune to dilution effects, enabling polymerizations at low catalysts loadings without sacrificing activity.

Figure 11:
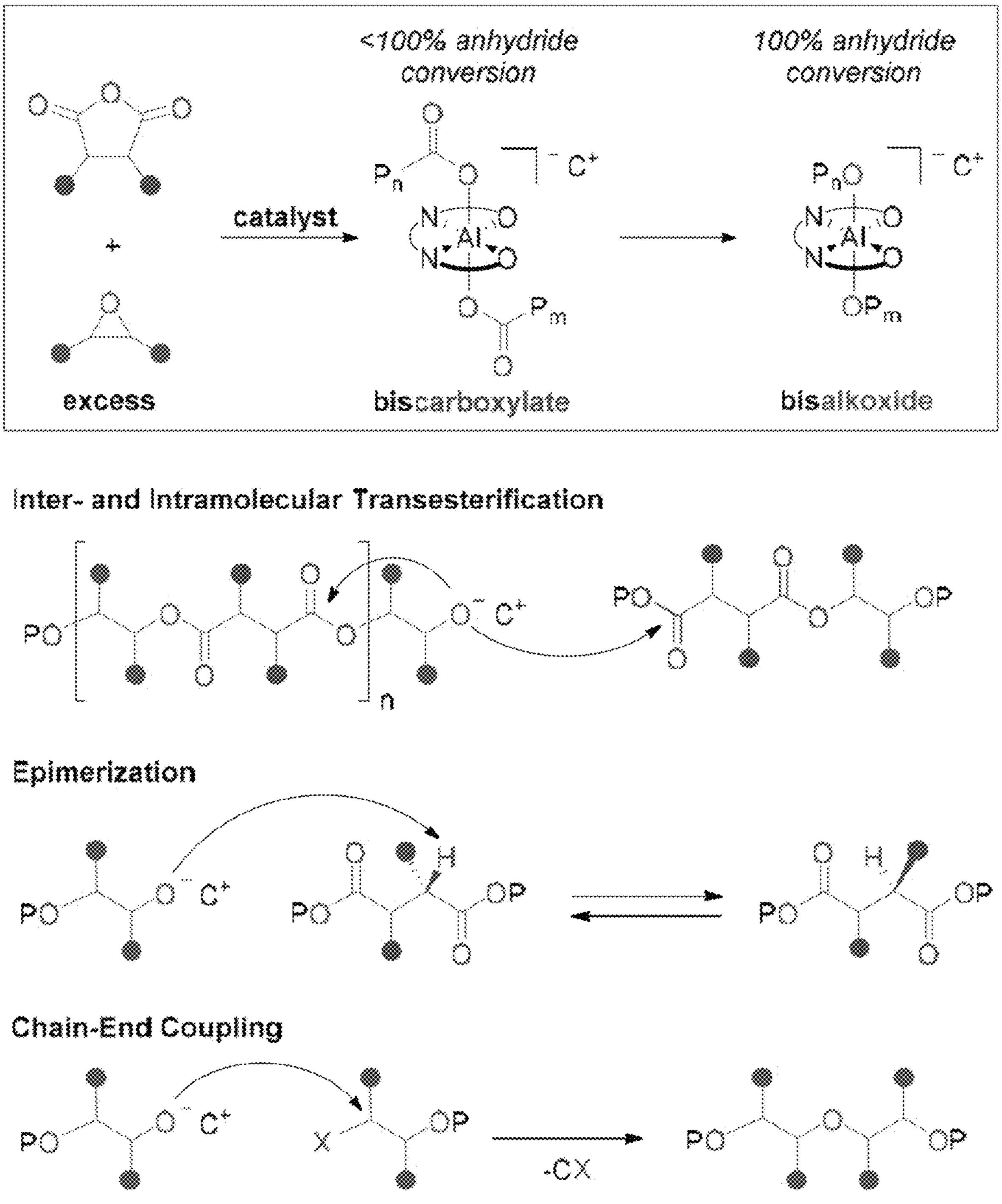
FIG. 11. Scheme showing side reactions commonly observed at high cyclic anhydride conversion.

Transesterification and Epimerization with [PPN]Cl and [CyPr]Cl Cocatalysts. At high monomer conversions, ROCOPs of epoxides and cyclic anhydrides catalyzed by salen complexes often undergo undesirable side reactions that degrade the polymer backbone and change polymer properties. Reactions performed using excess epoxide are particularly prone to transesterification and epimerization due to persistent alkoxide chain-ends that form after full consumption of the cyclic anhydride (FIG. 11). In 2016, Coates and coworkers reported that installing an electron-withdrawing p-F group on the salicylidene of an aluminum salph complex suppresses transesterification and epimerization for up to 6 h beyond full conversion of CPMA. The authors proposed that the enhanced Lewis acidity of the p-F catalyst relative to 1-AlC1 promotes formation of a hexacoordinate aluminate complex, preventing the alkoxide chain-ends from degrading the polymer backbone. Unfortunately, the p-F substituted catalyst also exhibited retarded rates of polymerization relative to 1-AlC1 (TOFs 49 and 88 h-, respectively, in THF at 60° C.).

Figure 12:
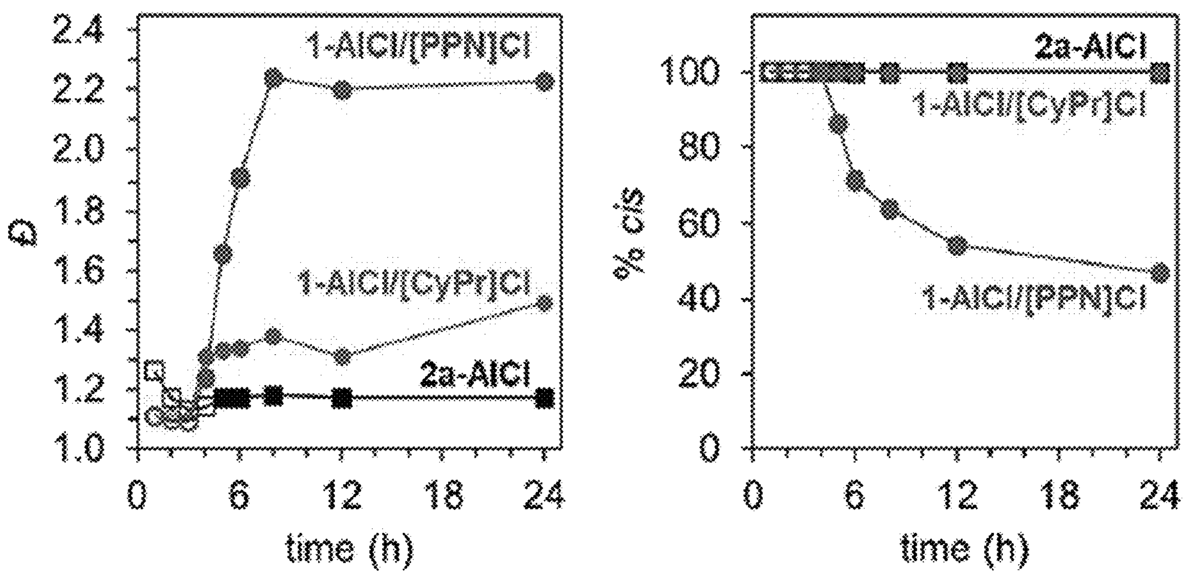
FIG. 12. Effect of cocatalyst identity on polyester dispersity (left) and diester stereochemistry (right) in the binary systems 1-AlCl/[PPN]Cl and 1-AlCl/[CyPr]Cl and the bifunctional system 2a-AlCl. Open circle=copolymerization quenched prior to reaching full conversion of CPMA determined by 1H NMRanalysis.

We investigated whether the most active bifunctional catalyst in this report, p-$^t$Bu-substituted 2a-AlCl, was similarly prone to deleterious side reactions as its previously studied binary analogue 1-AlCl. Polymerizations with 2a-AlC1 performed in excess neat epoxide were allowed to run beyond full conversion of anhydride (~4 h to 100% conversion). Aliquots were analyzed by gel permeation chromatography (GPC) to identify transesterification by observing increased dispersities and $^{13}C$ NMR to quantify cis-diester content (FIG. 12). Gratifyingly, no significant transesterification or epimerization were observed with 2a-AlCl, as evidenced by low dispersities (1.10-1.20) and cis-diester content (>99%) preserved even at 24 h. As reported previously, reactions catalyzed by 1-AlCl/[PPN]Cl were subject to extensive transesterification and epimerization immediately after the cyclic anhydride was fully consumed (FIG. 12).

Figure 29:
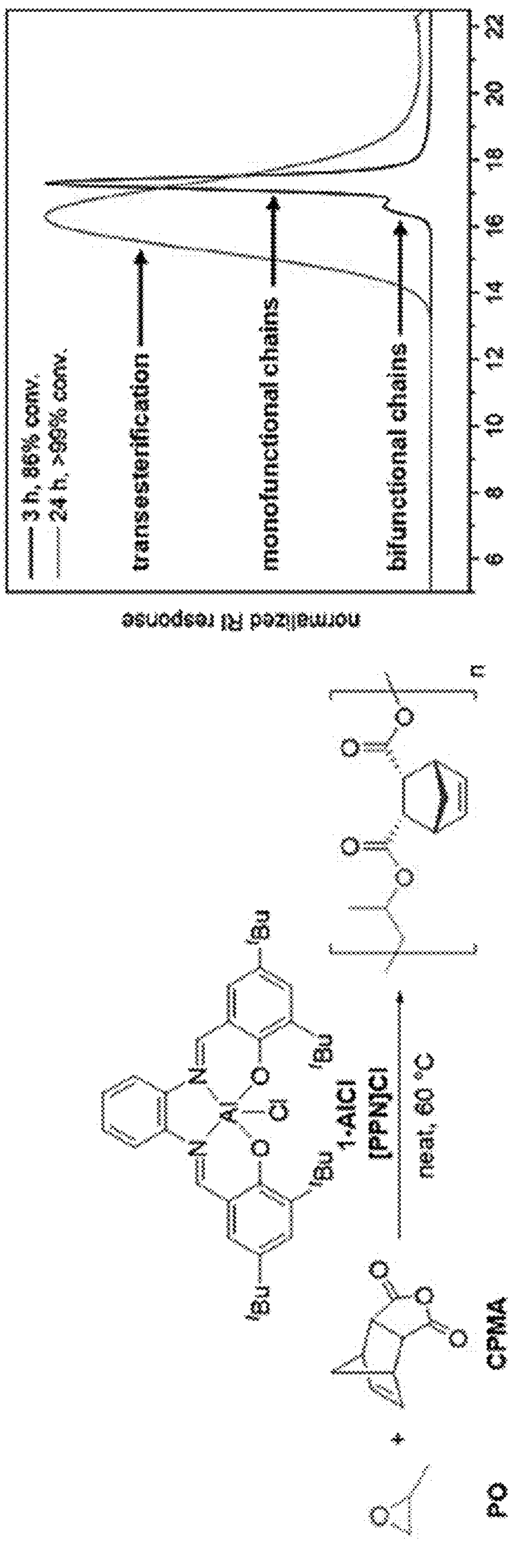
FIG. 29. GPC traces of PO/CPMA copolymerizations catalyzed by 1-AlCl/[PPN]Cl before (black) and after (red) full conversion of cyclic anhydride.
Figure 30:
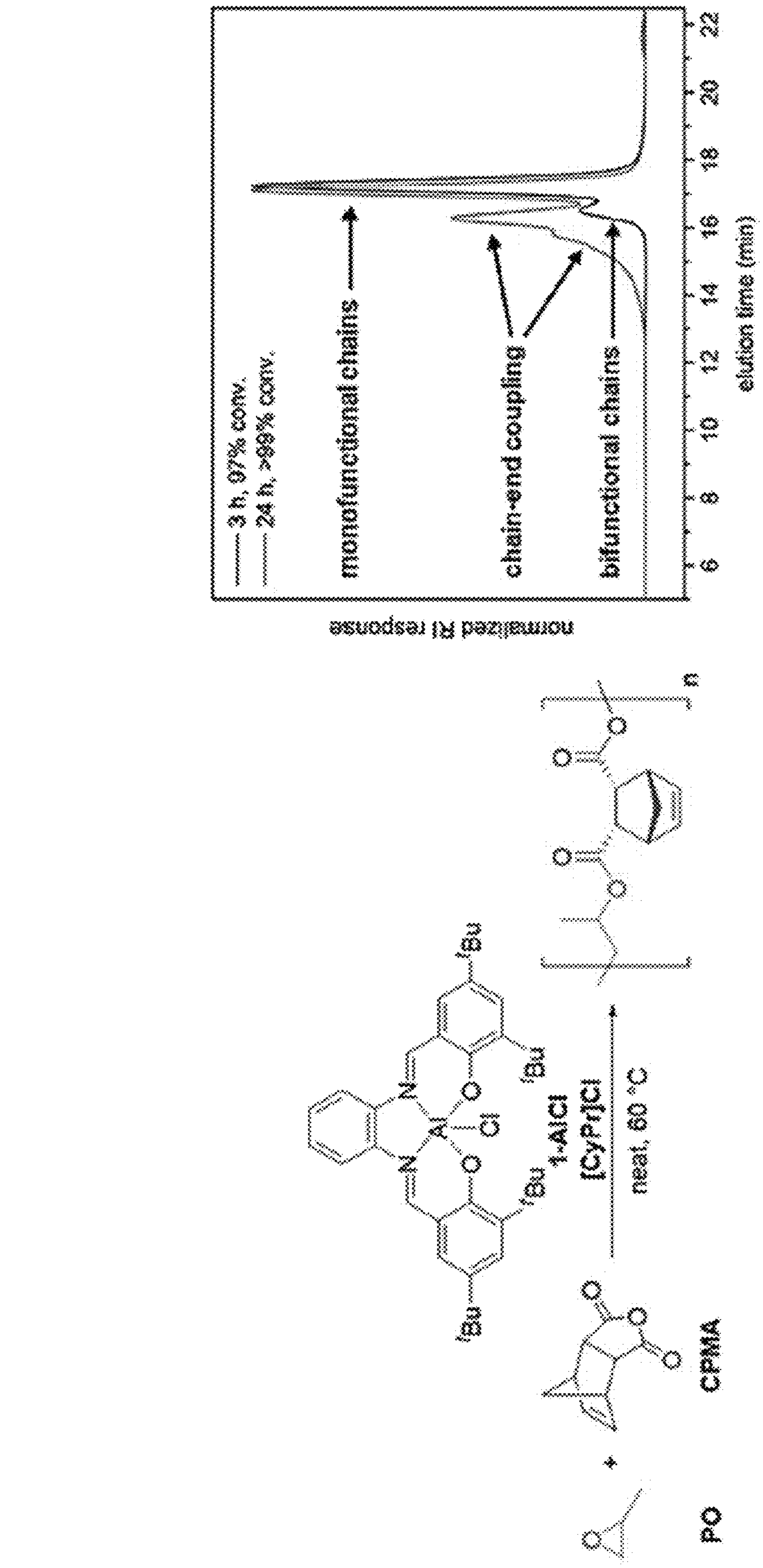
FIG. 30. GPC traces of PO/CPMA copolymerizations catalyzed by 1-AlCl/[CyPr]Cl before (black) and after (red) full conversion of cyclic anhydride.

Because the salph ligand is conserved across binary and bifunctional catalysts 1-AlC1 and 2a-AlCl, we sought to determine whether the cocatalyst identity (PPN vs. CyPr) or covalent tether is responsible for suppressed side reactions in the bifunctional system. Polymerizations using 1-AlCl/[CyPr]Cl were therefore run beyond full conversion of CPMA. No change in the cis-diester content was observed in the 1-AlCl/[CyPr]Cl, but the dispersity increased slightly (FIG. 12). The absence of epimerization suggests that the persistent alkoxide chain-ends are not sufficiently basic to deprotonate the polymer backbone. While dispersity increases uniformly in the 1-AlCl/[PPN]Cl binary system, 1-AlCl/[CyPr]Cl-catalyzed polymerizations revealed an enlarged high molecular weight shoulder and tailing (FIGS. 29 and 30, respectively). The continued increase in molecular weight beyond full anhydride conversion is consistent with chain-end coupling at the end of the reaction. We propose that the especially non-coordinating nature of the cyclopropenium cation enhances the nucleophilicity of the persistent alkoxide, allowing $S_N2$-type chemistry at the chloride chain-ends.

Figure 31:
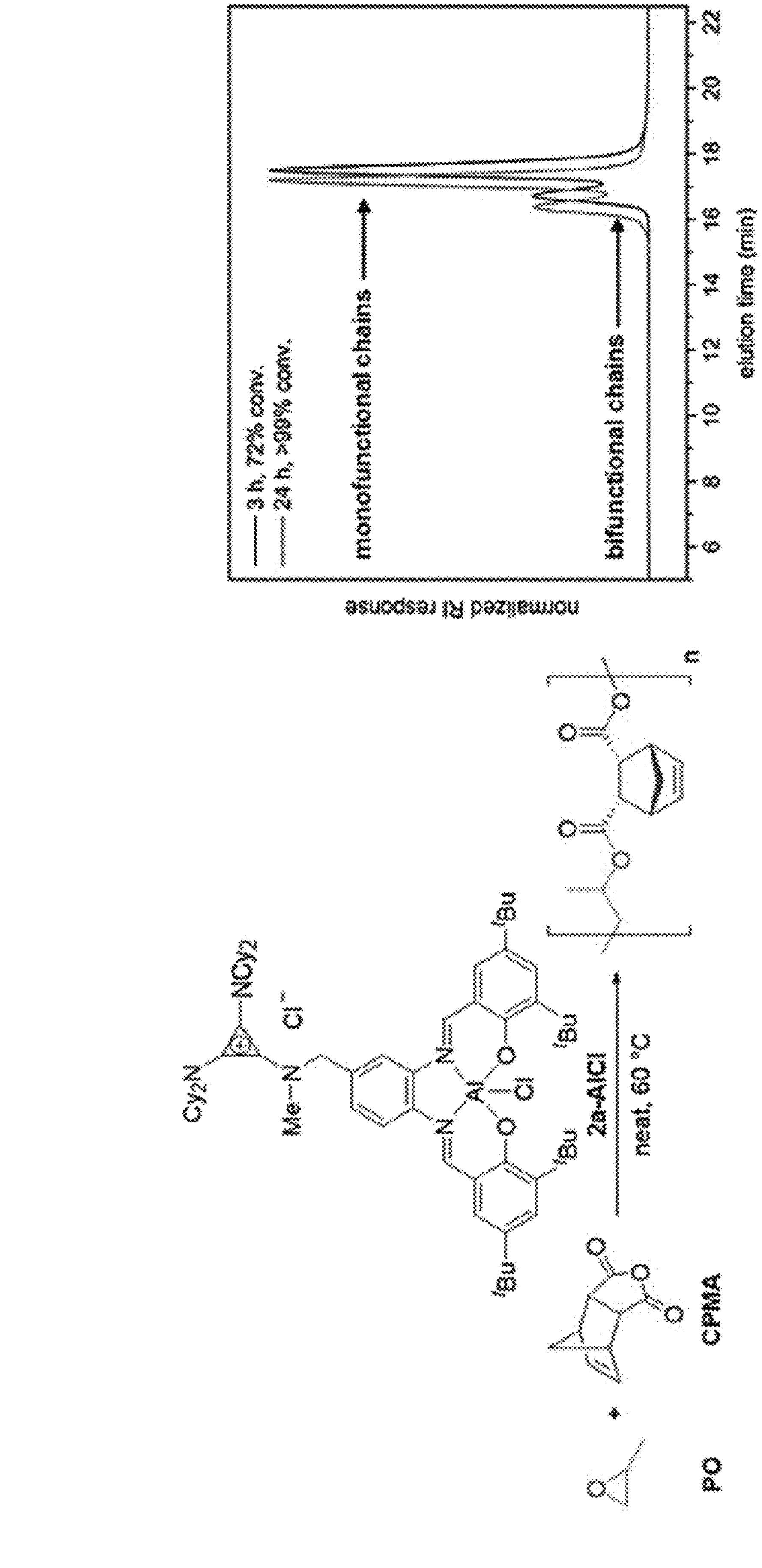
FIG. 31. GPC traces of PO/CPMA copolymerizations catalyzed by 2a-AlC1 before (black) and after (red) full conversion of cyclic anhydride.

Notably, we observe only minimal chain-end coupling using the bifunctional 2a-AlC1 system at extended reaction times (FIG. 31). We hypothesize that covalently linking the cocatalyst to the Lewis acid keeps alkoxide chain-ends close to the metal center and favors the inert hexacoordinate aluminate species (FIG. 2). The proximity enforced by the covalent anchor therefore prevents chain-end coupling, while the aminocyclopropenium cocatalyst suppresses transesterification and epimerization. Ongoing efforts are focused on fully elucidating the mechanism of chain-end coupling and developing strategies to completely suppress it. Nevertheless, bifunctional 2a-AlC1 achieves excellent chain-end control, suppressing deleterious side reactions without sacrificing polymerization rate.

Monomer Scope. ROCOP is an attractive approach to polyester synthesis as it is applicable to a large library of structurally and functionally diverse monomers. Moreover, recent efforts have elucidated synthetic routes to several aromatic and tricyclic anhydrides from biorenewable sources. Bifunctional catalyst 2a-AlC1 was applied to copolymerizations of a variety of epoxides and cyclic anhydrides (FIG. 13). In all cases, perfectly alternating polyesters were obtained with controlled molecular weights up to 23.4 kDa and low dispersities (<1.24). As observed previously, ring-opening of the sterically-hindered cyclic anhydride TMA gave slower polymerization rates (FIG. 13, entry 3). Cyclohexene oxide (CHO)/cyclic anhydride copolymers have exhibited higher glass transition temperatures than their PO-derived analogues. Copolymerization of CHO with CPMA afforded a moderate molecular weight polyester with marginally higher dispersity due to increased water content in the epoxide (FIG. 13, entry 6). Glycidyl ethers were also readily polymerized with CPMA (FIG. 13, entries 8 and 9). The various epoxide and cyclic anhydride monomers are also effectively polymerized at low catalyst loadings ($[2a\text{-}AlCl]_0:[anhydride]_0:[epoxide]_0=1:1200:6000$, FIG. 28). The bifunctional catalyst 2a-AlC1 can therefore access a substrate scope comparable to those of existing salen systems, allowing tunable polymer properties and renewable content.

Figure 14:
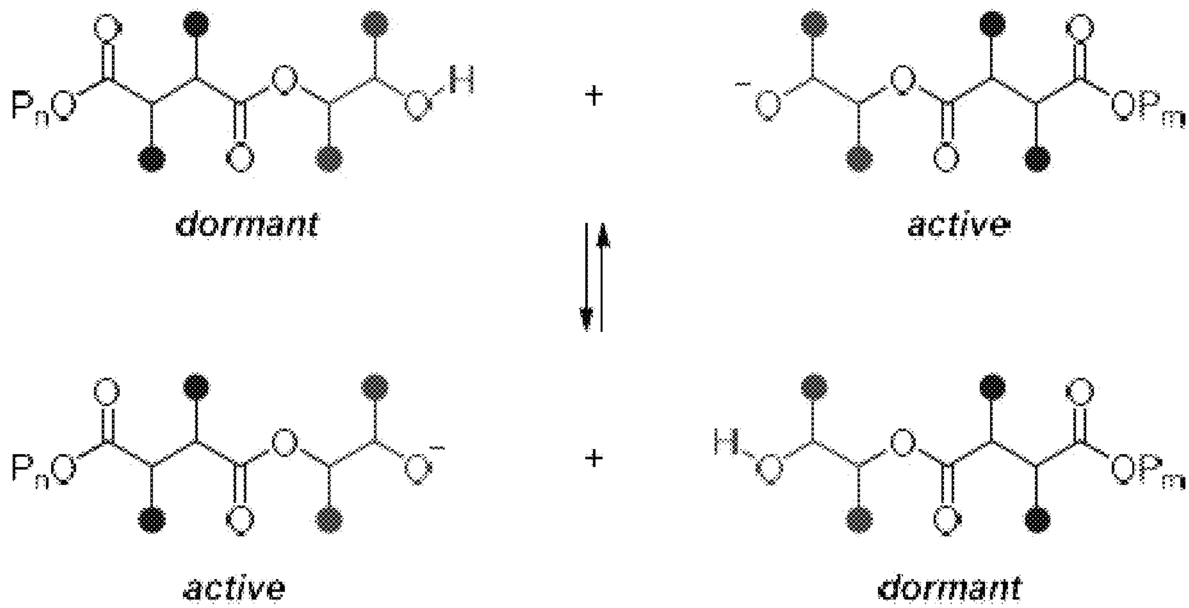
FIG. 14. Scheme showing reversible-deactivation chain transfer in epoxide/anhydride ring-opening copolymerization.

Chain Transfer Compatibility. Because catalyst is typically the most expensive component in a polymerization system, it is highly desirable to increase the number of polymer chains produced per catalyst to minimize the amount of catalyst required while maintaining control over molecular weight. In immortal polymerizations with protic chain transfer agents (CTAs), each equivalent of CTA produces a dormant protic chain in addition to the active anionic chains initially derived from the catalyst and cocatalyst anions. During each chain transfer event, a dormant chain protonates a growing chain-end to produce a new dormant species and a new propagating anionic species (FIG. 14).

A number of groups have developed immortal epoxide/cyclic anhydride copolymerizations in which a protic chain transfer agent (CTA) is used to introduce multiple polymer chains per catalyst. Yet close examination of our group's 2018 report reveals that catalyst activity was diminished in the presence of dormant chains (TOF=75 and 99 $h^{-1}$ with and without CTA, respectively), suggesting that protic chain-ends likely retard polymerization rates in binary aluminum salen systems. In contrast, Lee and coworkers did not observe a decline in polymerization rate with increased CTA loading using a quaternary ammonium-functionalized cobalt salen complex to polymerize PO and PA in the presence of ethanol. The resulting materials had moderate molecular weights (6.0-17.0 kDa) that varied with the ethanol loading and exhibited moderate dispersities (Đ≅1.4). We were therefore interested in elucidating the apparently divergent behavior of binary and bifunctional catalyst activities in the presence of dormant chains.

Figure 15:
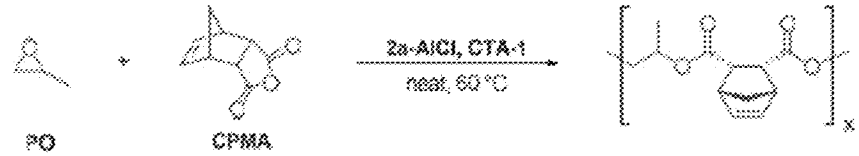
FIG. 15. Table showing the effect of CTA-1 concentration on PO/CPMA copolymerization using bifunctional catalyst 2a-AlCl.
Figure 16:
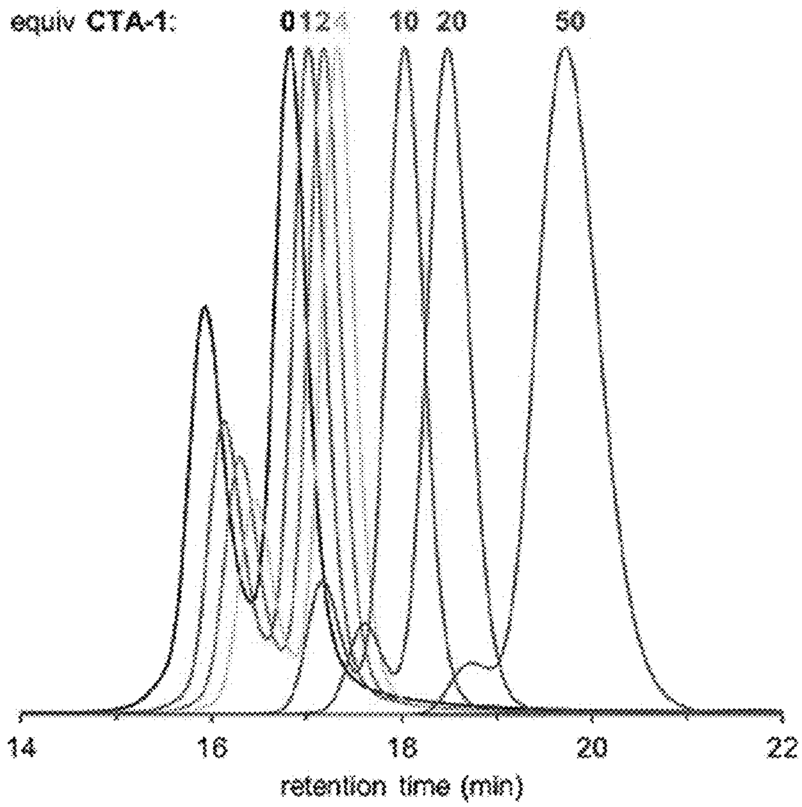
FIG. 16. The effect of increasing equivalents of CTA-1 on PO/CPMA copolymer molecular weight and dispersity as shown by normalized GPC traces. $[2a\text{-AlCl}]_0$:$[\text{CPMA}]_0$:$[\text{PO}]_0$=1:1200:6000.

We examined the effects of varying chain transfer agent loading on molecular weight and dispersity in PO/CPMA copolymerizations catalyzed by 2a-AlCl. As expected, increasing concentrations of CTA 1-adamantanecarboxylic acid (CTA-1) resulted in reduced molecular weights due to the greater number of initiating species (FIG. 15, entries 1-6 and FIG. 16). Progressively monomodal dispersities were observed with increasing [CTA-1] due to the higher ratio of monofunctional initiators derived from 2a-AlC1 and CTA-1 relative to bifunctional initiators derived from adventitious water (FIG. 16). Adjusting [CTA-1]:[2a-AlCl] provides a means of targeting desired molecular weights while reducing catalyst loading. To demonstrate this utility, we synthesized ~18 kDa PO/CPMA copolymers by replacing 2a-AlC1 with CTA-1 (FIG. 15, entries 7-11).

Figure 17:
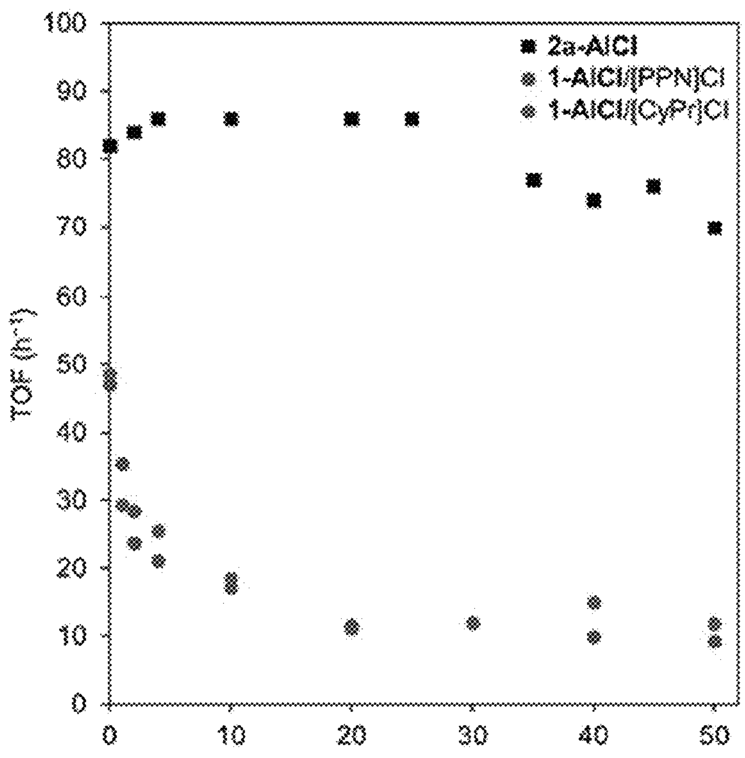
FIG. 17. Turnover frequency as a function of CTA-1 concentration in bifunctional (2a-AlCl) and binary (1-AlCl) catalyst systems. $[\text{Catalyst}]_0$:$[\text{CPMA}]_0$:$[\text{PO}]_0$=1:1200:6000. For polymerizations performed using 1-AlCl, $[\text{catalyst}]_0$:[cocatalyst]o=1:1. TOF=Turnover frequency, mol anhydride consumed×mol catalyst$^{-1}$×h$^{-1}$.

In order to elucidate the effect of CTA on the binary and bifunctional systems, we compared the abilities of 2a-AlC1 and 1-AlCl/[CyPr]Cl to catalyze the immortal copolymerization of PO and CPMA in the presence of CTA-1. In the bifunctional system, polymerization rates were invariant up to ~20 equivalents of CTA-1 relative to 2a-AlC1 (FIG. 17). At high CTA loadings, polymerization rates declined modestly, but 2a-AlC1 maintained good catalytic activity (TOF 70 $h^{-1}$ when $[2a\text{-}AlCl]_0:[CTA\text{-}1]_0:[CPMA]_0:[PO]_0=1:50:1200:6000$). This resilience of the bifunctional catalyst to the addition of CTA is in sharp contrast to the sensitivity of the binary catalyst system: a significant decline in polymerization rate is observed using 1-AlCl/[CyPr]Cl with even a few equivalents of CTA-1 (FIG. 17). Polymerizations performed with the more common 1-AlCl/[PPN]Cl system and CTA-1 exhibit nearly identical catalytic activities (FIG. 17). Similar deceleration of the two binary systems suggests that intermolecular catalytic approaches are vulnerable to the presence of dormant chains.

Figure 18:
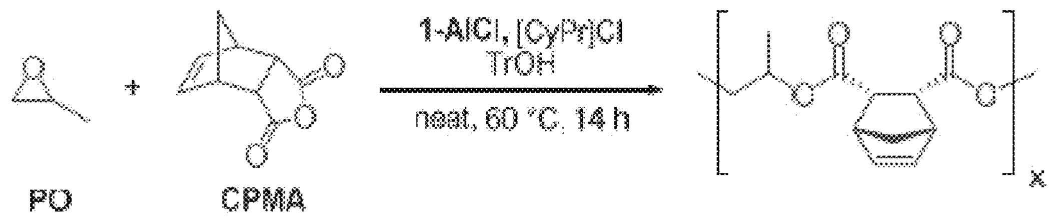
FIG. 18. Table showing the effect of non-initiating alcohol concentration on PO/CPMA copolymerization catalyzed by binary system 1-AlCl/[CyPr]Cl.
Figure 33:
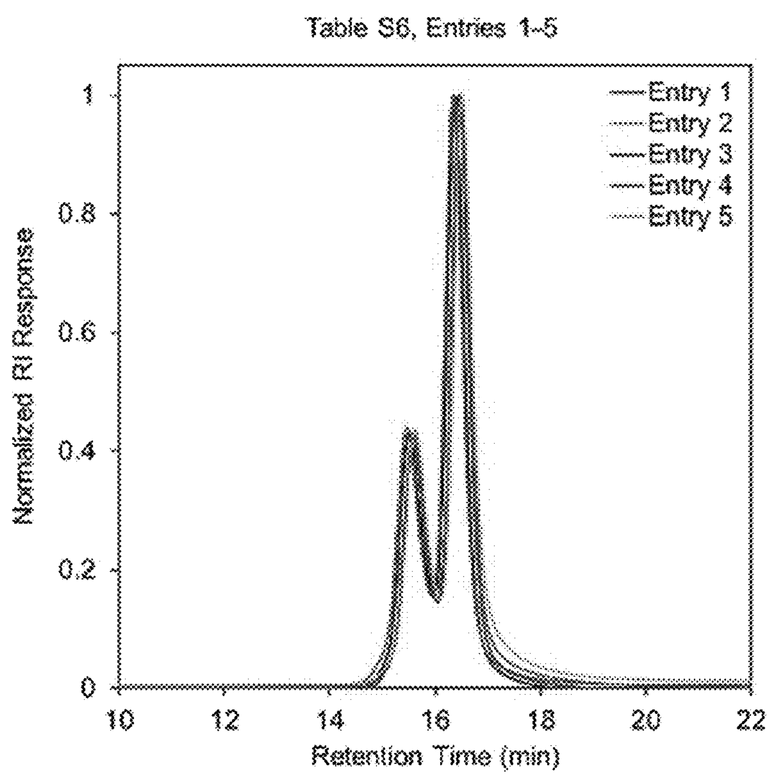
FIG. 33. GPC traces for FIG. 58.
Figure 58:
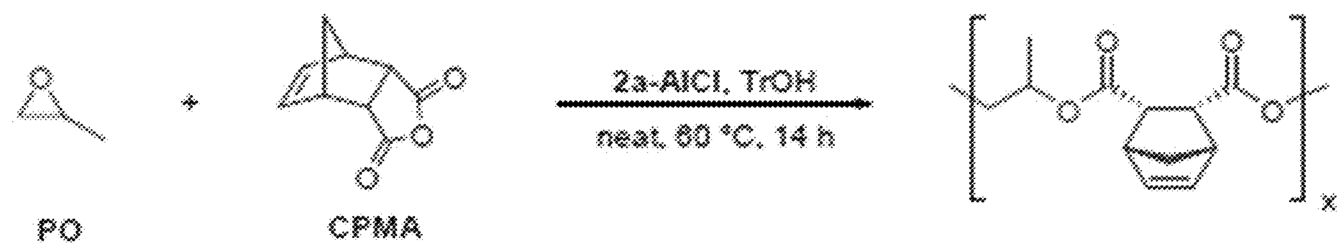
FIG. 58. Table showing effect of non-initiating alcohol TrOH concentration on CPMA/PO copolymerization catalyzed by 2a-AlCl.
Figure 59:
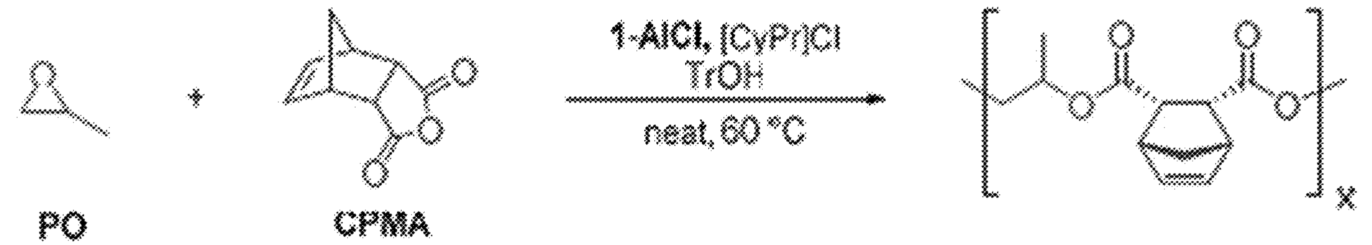
FIG. 59. Table showing effect of non-initiating alcohol TrOH concentration on molecular weight at full conversion of CPMA/PO copolymerization catalyzed by 1-AlCl/[CyPr]Cl.

Role of the dormant chains. We hypothesized that hydrogen bonding between active and dormant chain-ends is responsible for the reduction in catalytic activity. Hydrogen bonding interactions likely attenuate the nucleophilicity of the growing alkoxide- or carboxylate-terminated chain, impeding ring-opening of cyclic anhydride or epoxide, respectively. To decouple the effects of chain transfer and hydrogen bonding, we performed polymerizations in the presence of a non-initiating alcohol, triphenyl methanol (TrOH). As the concentration of TrOH was varied in copolymerizations catalyzed by either 2a-AlC1 or 1-AlCl/[CyPr]Cl, molecular weights at full conversion of cyclic anhydride remained constant, confirming that TrOH does not initiate a polymer chain (FIG. 33, FIG. 58, and FIG. 59). In polymerizations catalyzed by 1-AlCl/[CyPr]Cl, rates declined with increasing amounts of TrOH, implicating hydrogen bonding in slowing the binary system (FIG. 18). As anticipated, when 2a-AlC1 was used, polymerization rates were immune to [TrOH](FIG. 58).

Based on $pK_a$ differences, we hypothesized that most dormant chains are terminated in an alcohol rather than a more acidic carboxylic acid. $^{19}F$ NMR studies of model complexes corroborated that alcohols are the predominant dormant species in solution (see Supporting Information for experimental details and NMR spectra). Combining 1-AlOAc (a catalyst-bound carboxylate-terminal polymer mimic) with 4-fluorobenzoic acid favored the salph aluminum 4-fluorobenzoate complex, whereas the addition of trifluoroethanol instead produced only small amounts of the aluminum trifluoroethoxide complex. Combining 1-AlO$^i$Pr (a catalyst-bound alkoxide-terminal polymer mimic) with 4-fluorobenzoic acid exclusively yielded the aluminum 4-fluorobenzoate. By contrast, treating 1-AlO$^i$Pr with trifluoroethanol produced a mixture of the two alkoxide species that favored the aluminum trifluoroethoxide. These studies suggest that pKa governs the resting state of protic chain-ends, corroborating that most dormant chains are alcohol-terminated. Moreover, we expect that chain transfer from a dormant alcohol chain-end to a growing alkoxide chain-end is favored over chain transfer involving a growing carboxylate chain-end.

Figure 66:
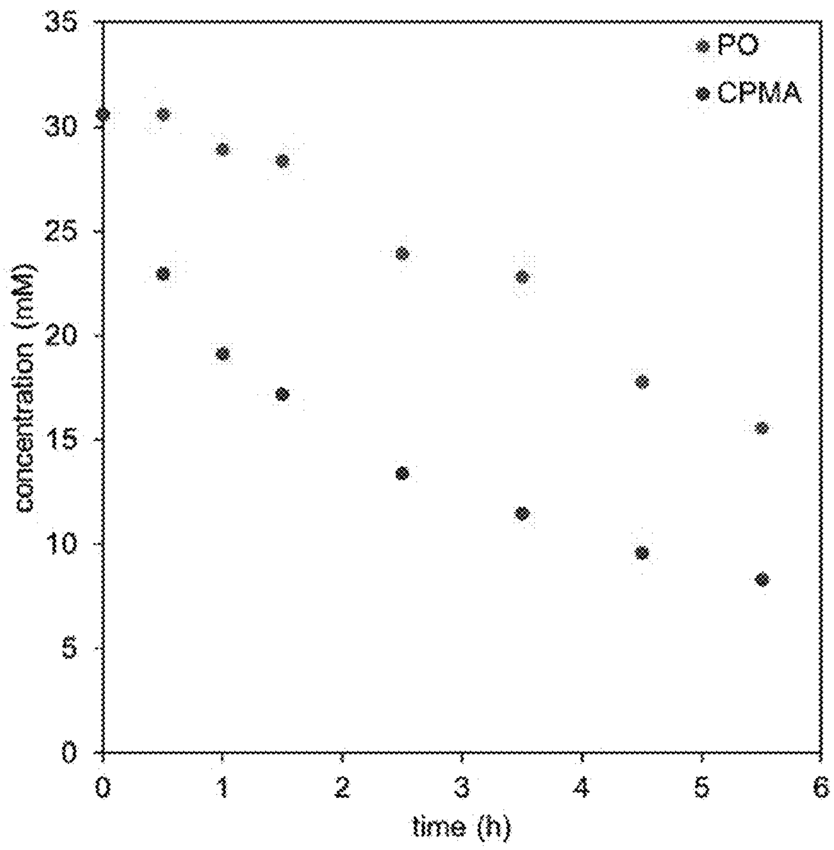
FIG. 66. Concentration decay plot for the 1-AOiPr/[PPN]OAc competition experiment with PO and CPMA at 60° C. in $CDCl_3$.

Binary and bifunctional mechanisms of reversible deactivation ROCOP. We studied the polymerization kinetics in the binary and bifunctional catalyst systems in order to understand the disparate effects of CTA on reaction rate. Studies of these systems in the absence of CTA provide a useful reference: from a bis-carboxylate resting state, epoxide binding at the Lewis acid is followed by ratelimiting ring-opening to generate a mixed alkoxidecarboxylate intermediate that rapidly ring-opens cyclic anhydride (vide supra). A competition experiment in the presence of TrOH revealed that, from a mixed alkoxide/carboxylate intermediate, anhydride ring-opening is fast relative to epoxide ring-opening (FIG. 66). This result suggests that the presence of dormant chains does not change the primary propagation cycle.

Figure 67:
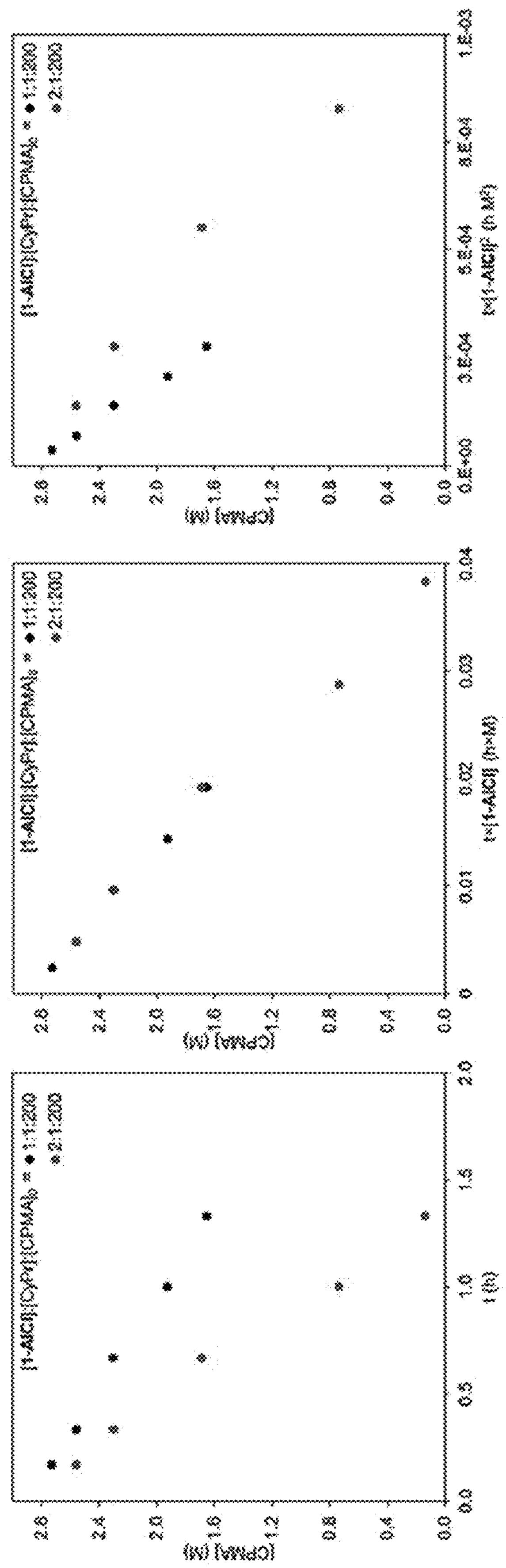
FIG. 67. Anhydride decay versus normalized time scale for zero-order (left), first-order (middle) and second-order (right) behavior in 1-AlCl. $[1\text{-AlCl}]_0$:[CyPrCl]:$[CTA\text{-}1]_0$:$[CPMA]_0$:$[PO]_0$=1:1:2:200:1000 (black), $[1\text{-AlCl}]_0$:[CyPrCl]:$[CTA\text{-}1]_0$:$[CPMA]_0$:$[PO]_0$=2:1:2:200:1000 (red).
Figure 68:
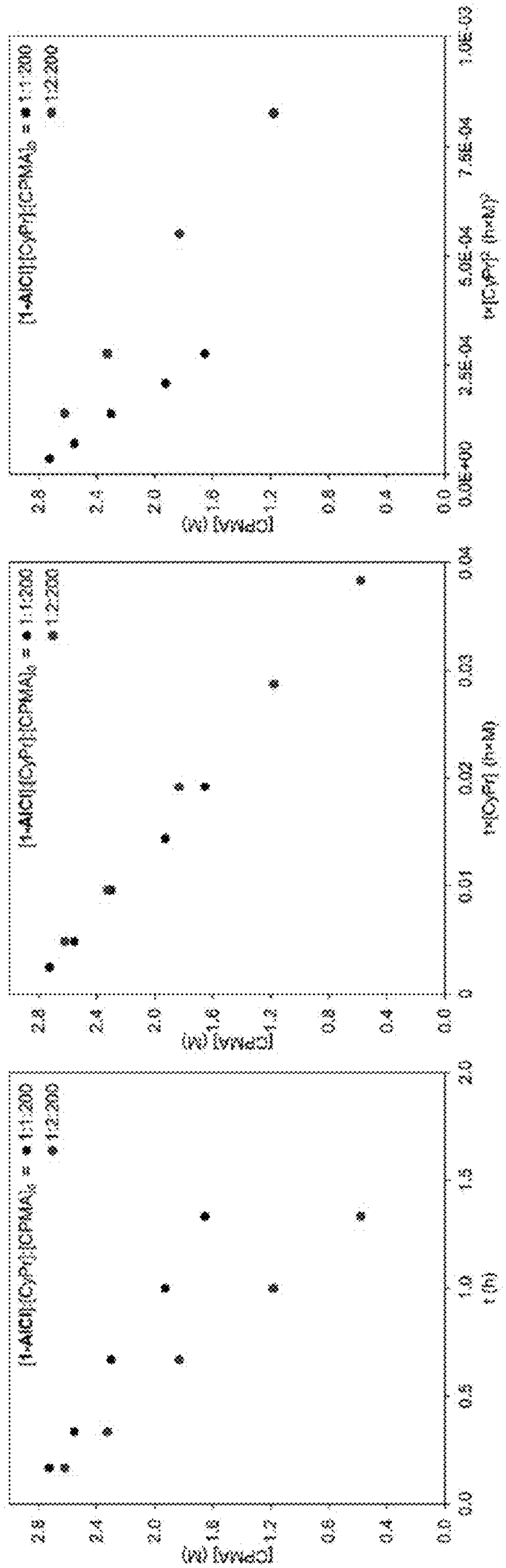
FIG. 68. Anhydride decay versus normalized time scale for zero-order (left), first-order (middle) and second-order (right) behavior in [CyPr]Cl. $[1\text{-AlCl}]_0$:[CyPrCl]:$[CTA\text{-}1]_0$:$[CPMA]_0$:$[PO]_0$=1:1:2:200:1000 (black), $[1\text{-AlCl}]_0$:[CyPrCl]:$[CTA\text{-}1]_0$:$[CPMA]_0$:$[PO]_0$=1:2:2:200:1000 (blue).
Figure 71:
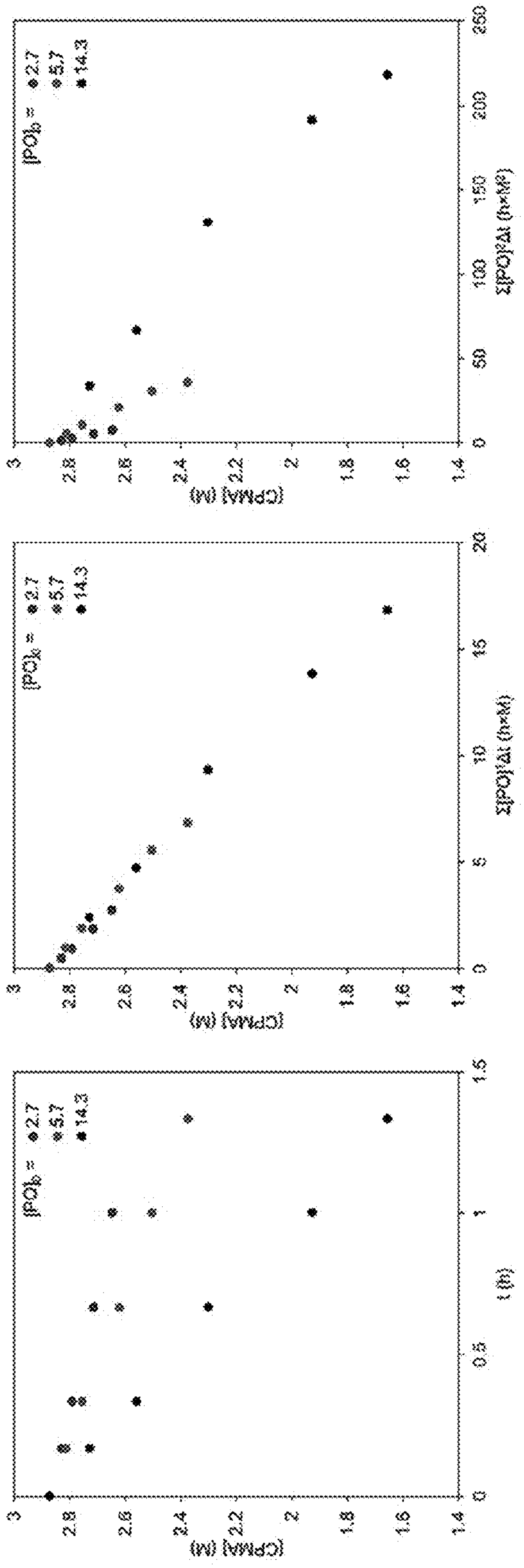
FIG. 71. Anhydride decay versus normalized time scale for zero-order (left), first-order (middle) and second-order (right) behavior in PO. $[1\text{-AlCl}]_0$:[CyPrCl]:$[CTA\text{-}1]_0$:$[CPMA]_0$:$[PO]_0$=1:1:2:200:1000 (black), $[1\text{-AlCl}]_0$:[CyPrC]:$[CTA\text{-}1]_0$:$[CPMA]_0$:$[PO]_0$=1:1:2:200:400 (red), $[1\text{-AlCl}]_0$:[CyPrC]:$[CTA\text{-}1]_0$:$[CPMA]_0$:$[PO]_0$=1:1:2:200:200 (blue).
Figure 72:
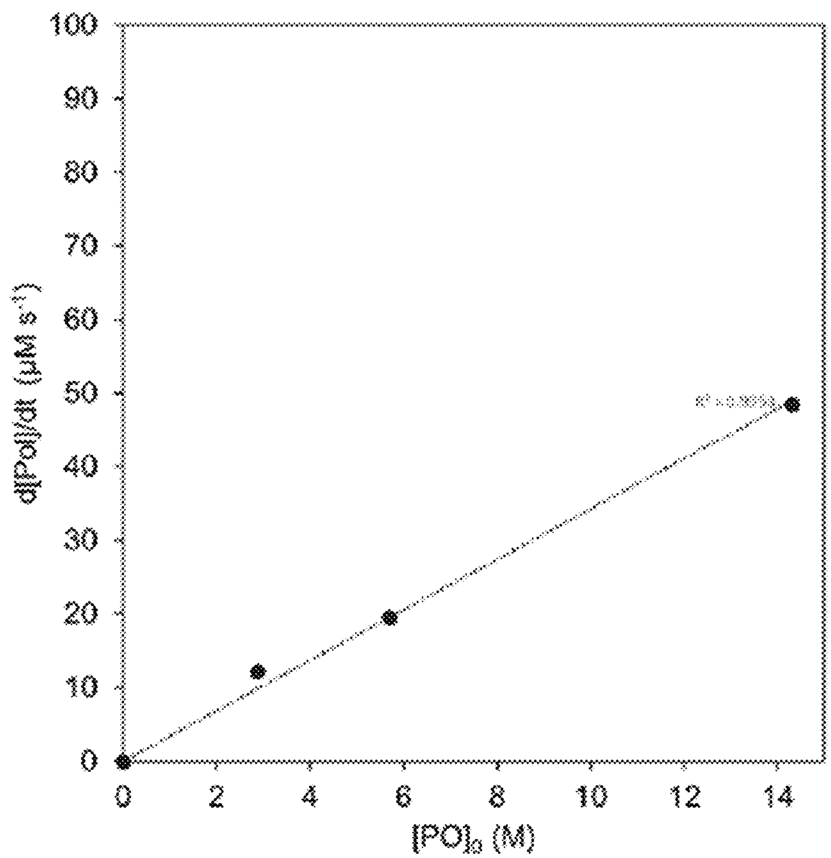
FIG. 72. Initial rates of PO/CPMA copolymerization (<20% conversion) versus initial PO concentration using 1-AlCl/[CyPr]Cl.
Figure 73:
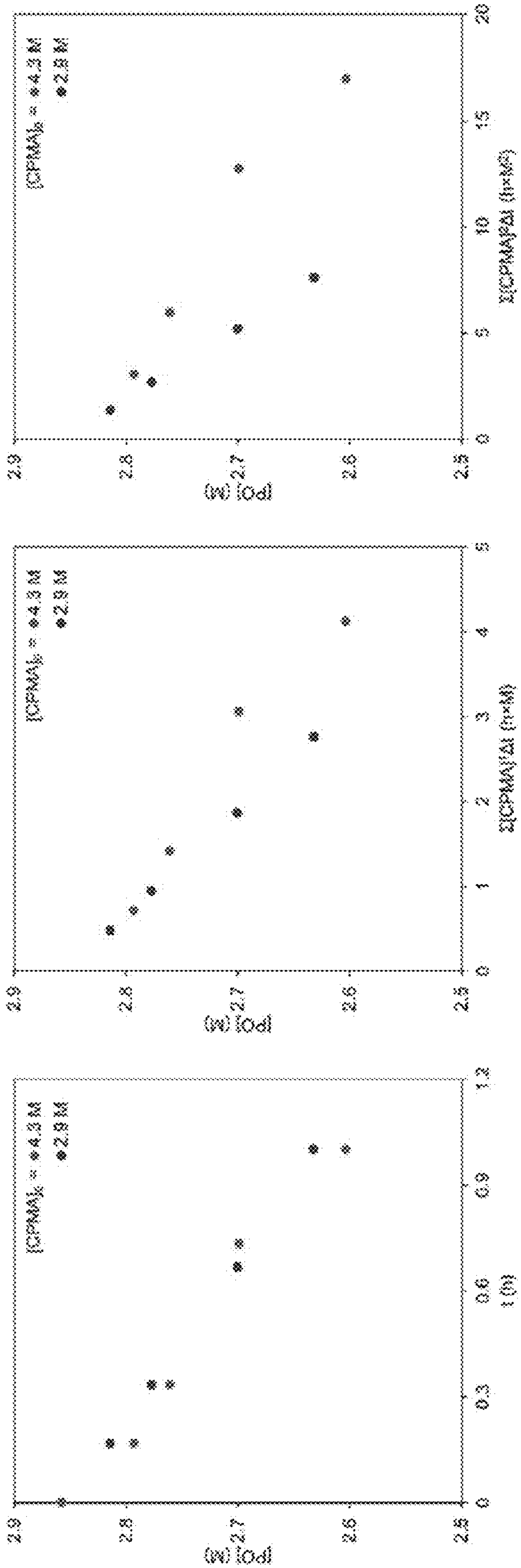
FIG. 73. Anhydride decay versus normalized time scale for zero-order (left), first-order (middle) and second-order (right) behavior in PO. $[1\text{-AlCl}]_0$:[CyPrCl]:$[CTA\text{-}1]_0$:$[CPMA]_0$:$[PO]_0$=1:1:2:200:200 (blue), $[1\text{-AlCl}]_0$:[CyPrCl]:$[CTA\text{-}1]_0$:$[CPMA]_0$:$[PO]_0$=1:1:2:300:200 (green).

To identify the resting state and rate-limiting steps in the immortal binary system, we performed whole reaction polymerization kinetics experiments. Polymerization rates exhibited a first-order dependence on epoxide concentration and a zero-order dependence on cyclic anhydride concentration (FIGS. 71-73): CPMA therefore enters the catalytic cycle before the resting state, and PO binding occurs after the resting state and before the rate-limiting step. Unlike living systems in the absence of CTA, the immortal binary system with CTA-1 did not exhibit saturation kinetics at high epoxide concentrations, suggesting that the presence of protic chain-ends may disrupt epoxide binding (FIG. 72). Variable time normalization analysis 68 was used to determine the orders in catalyst and cocatalyst and revealed excellent agreement when first-order normalizations of t×[1-AlCl]and t×[CyPr] were applied (FIGS. 67 and 68, respectively). This overall second-order dependence on the catalytic pair implicates both the Lewis acid and the cocatalyst between the resting state and rate-limiting step.

Because each reversible-deactivation chain transfer event consumes one protic chain-end and generates another, the concentration of dormant chains is constant throughout the reaction and equal to the initial concentration of CTA. The variable time normalization principles developed by Bures to determine reaction orders in catalyst can therefore be applied to determine the order in dormant chains (PnOH). When whole reaction polymerization kinetic experiments with 1-AlCl/[CyPr]Cl were performed at three different loadings of CTA-1 ($[1\text{-AlCl}]_0$:[CTA-1]o=1:1, 1:2, 1:6), a time normalization of $t\times[PnOH]^{-0.5}$ afforded excellent overlay of the reaction traces (FIG. 19). This unusual reaction order is consistent with two dormant chains dissociating from the catalyst/cocatalyst unit between the resting state and rate-limiting step. At high CTA loadings, 1-AlCl/[CyPr]Cl catalyzed polymerizations become pseudo zero-order in the dormant species, presumably due to saturation behavior ($[1\text{-AlCl}]_0$:$[\text{CTA-1}]_0$=1:20, 1:50, FIG. 70). In this case, the alcohol dormant chain-ends likely stay associated with the carboxylate species through nucleophilic attack.

Based on the observed reaction orders, we propose that when CTA is used in the binary 1-AlCl/[CyPr]Cl system, the resting state comprises an off-cycle species involving two dormant chains (FIG. 20, red): the Lewis basic alcohol of a dormant chain competes with epoxide to bind at an open coordination site of the aluminum salen, while the cocatalyst-associated carboxylate hydrogen-bonds with a protic chain-end. CTA in the binary system therefore doubly disrupts rate-limiting epoxide ring-opening by both impeding epoxide activation and attenuating the nucleophilicity of the attacking carboxylate. The observed reaction order in the dormant chain-ends does not preclude resting states in which two protic chain-ends are associated with either the cocatalyst or Lewis acid. However, we believe epoxide binding at the Lewis acid is disrupted: in the absence of CTA, high epoxide concentrations produce saturation kinetics, however, the addition of CTA produces a first-order dependence on [PO] that persists even when the reaction is run in neat epoxide.

Figure 76:
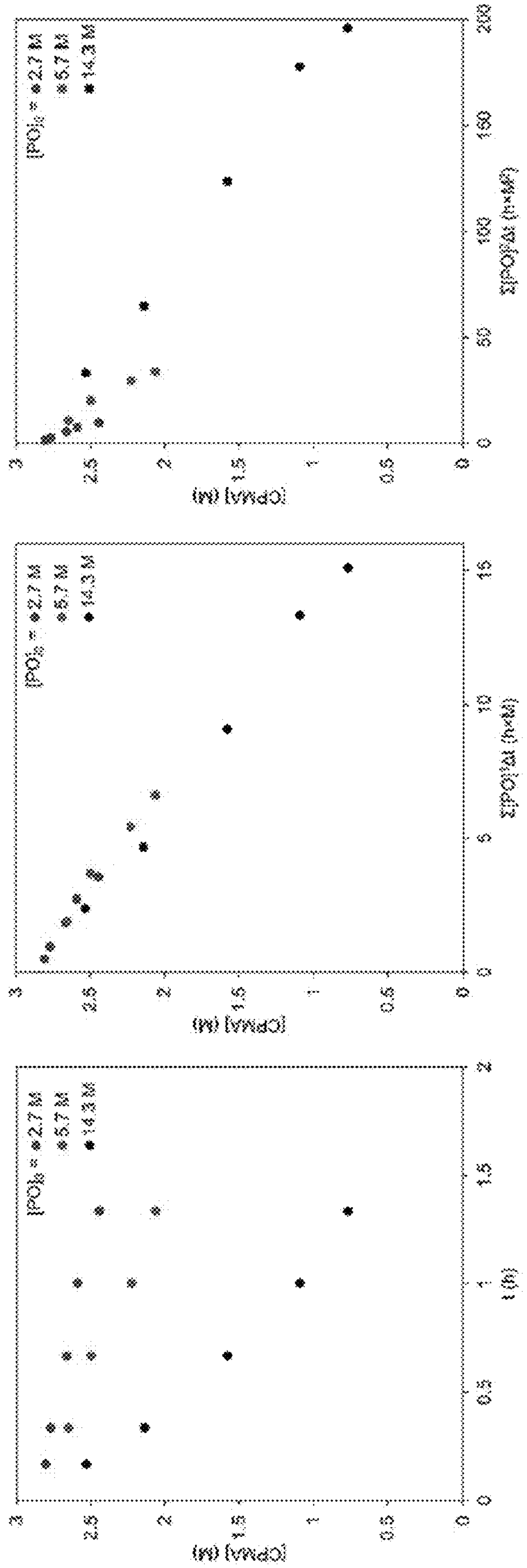
FIG. 76. Anhydride decay versus normalized time scale for zero-order (left), first-order (middle) and second-order (right) behavior in PO. $[2a\text{-AlCl}]_0$:$[CTA\text{-}1]_0$:$[CPMA]_0$:$[PO]_0$=1:2:200:1000 (black), $[2a\text{-AlCl}]_0$:$[CTA\text{-}1]_0$:$[CPMA]_0$:$[PO]_0$=1:2:200:400 (red), $[2a\text{-AlCl}]_0$:$[CTA\text{-}1]_0$:$[CPMA]_0$:$[PO]_0$=1:2:200:200 (blue).
Figure 77:
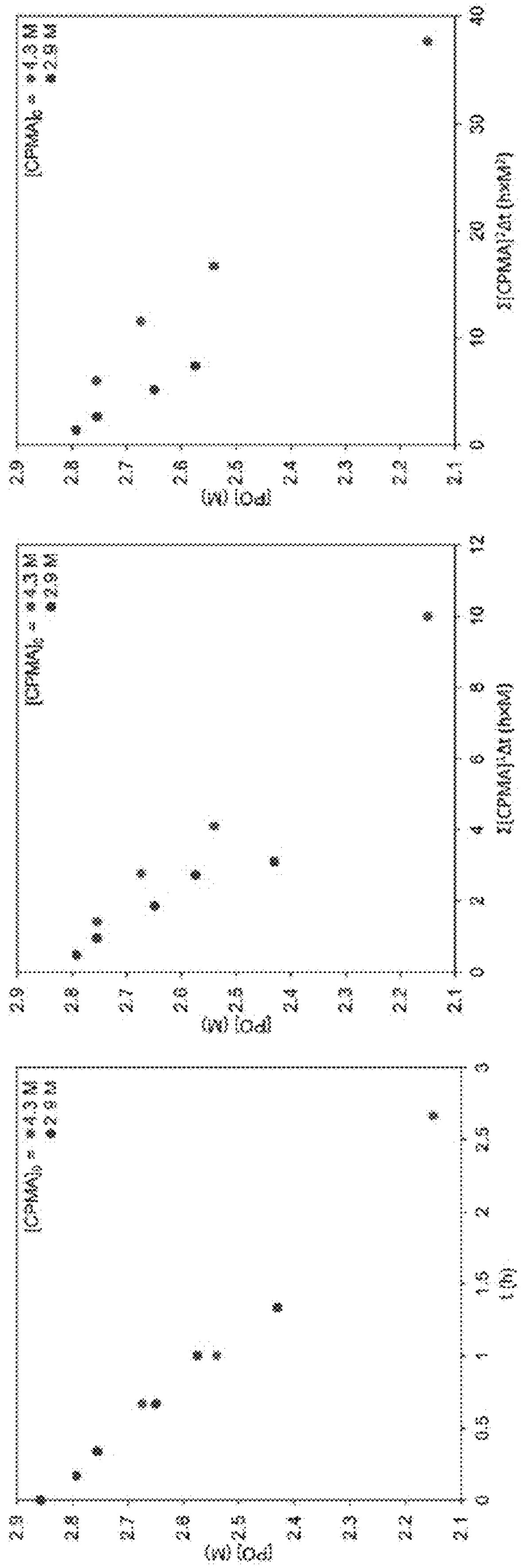
FIG. 77. Anhydride decay versus normalized time scale for zero-order (left), first-order (middle) and second-order (right) behavior in CPMA. $[2a\text{-AlCl}]_0$:$[CTA\text{-}1]_0$:$[CPMA]_0$:$[PO]_0$=1:2:200:200 (blue), $[2a\text{-AlCl}]_0$:$[CTA\text{-}1]_0$:$[CPMA]_0$:$[PO]_0$=1:2:300:200 (green).

To elucidate the mechanistic origins of the bifunctional catalyst's resilience to dormant species, whole reaction polymerization kinetics were performed using 2a-AlC1 and CTA-1. Variable time normalization analyses demonstrated the reaction is first-order in catalyst, first-order in epoxide, and zero-order in cyclic anhydride (FIGS. 76 and 77). In contrast to the binary system, polymerizations performed with 2a-AlC1 and CTA-1 exhibited a zero-order dependence on the concentration of dormant chains (FIG. 19). The observed reaction orders in comonomers, catalyst, and CTA are consistent with either epoxide binding or epoxide ring-opening rate-limiting steps.

Figure 20:
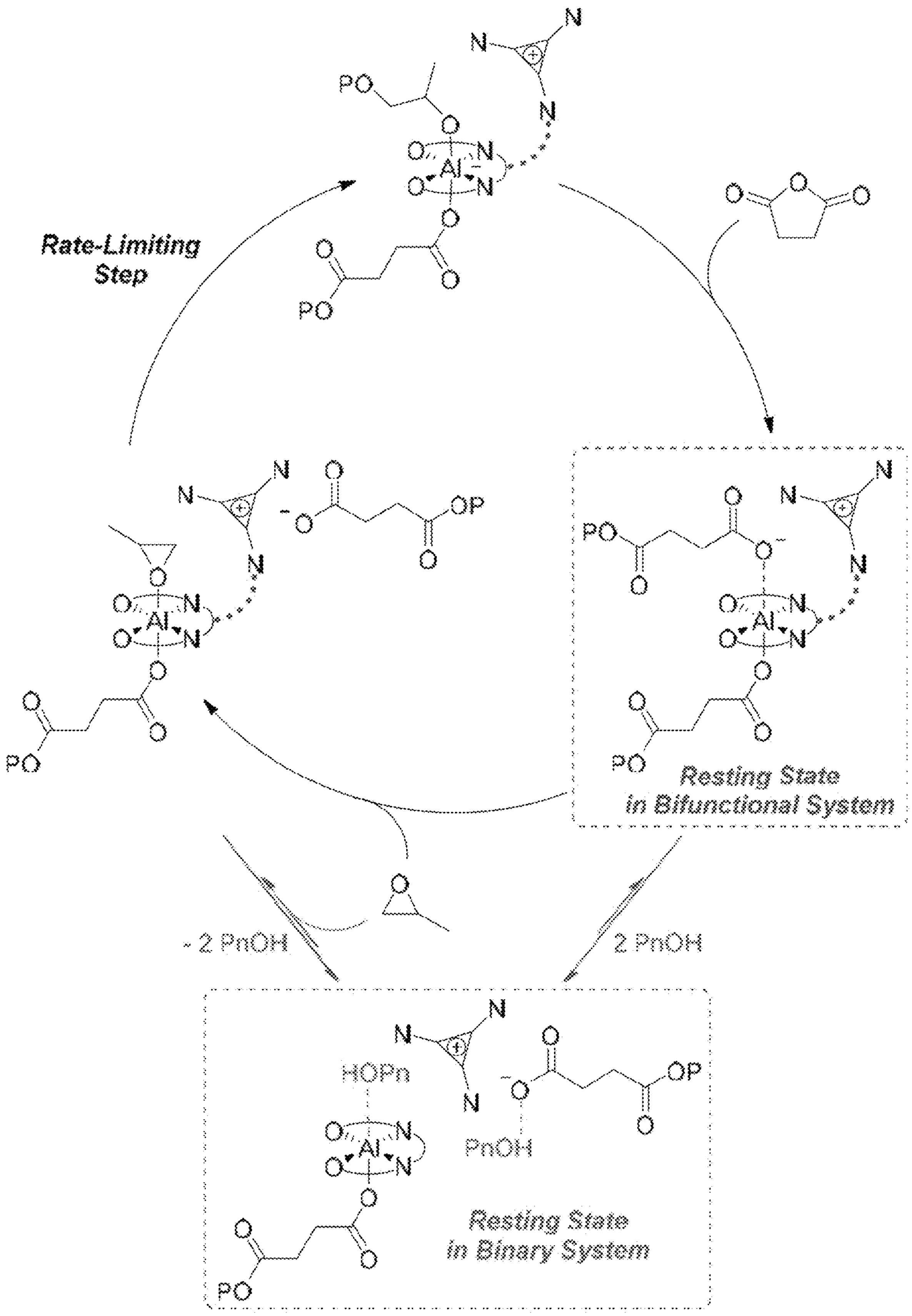
FIG. 20. Scheme showing proposed immortal ring-opening copolymerization mechanisms in the presence of moderate amounts of CTA (<20 equiv) in the bifunctional (2a-AlCl, blue) and binary (1-AlCl, red) catalyst systems. Cyclic anhydride, ligand, and cocatalyst truncated for clarity.
Figure 22:
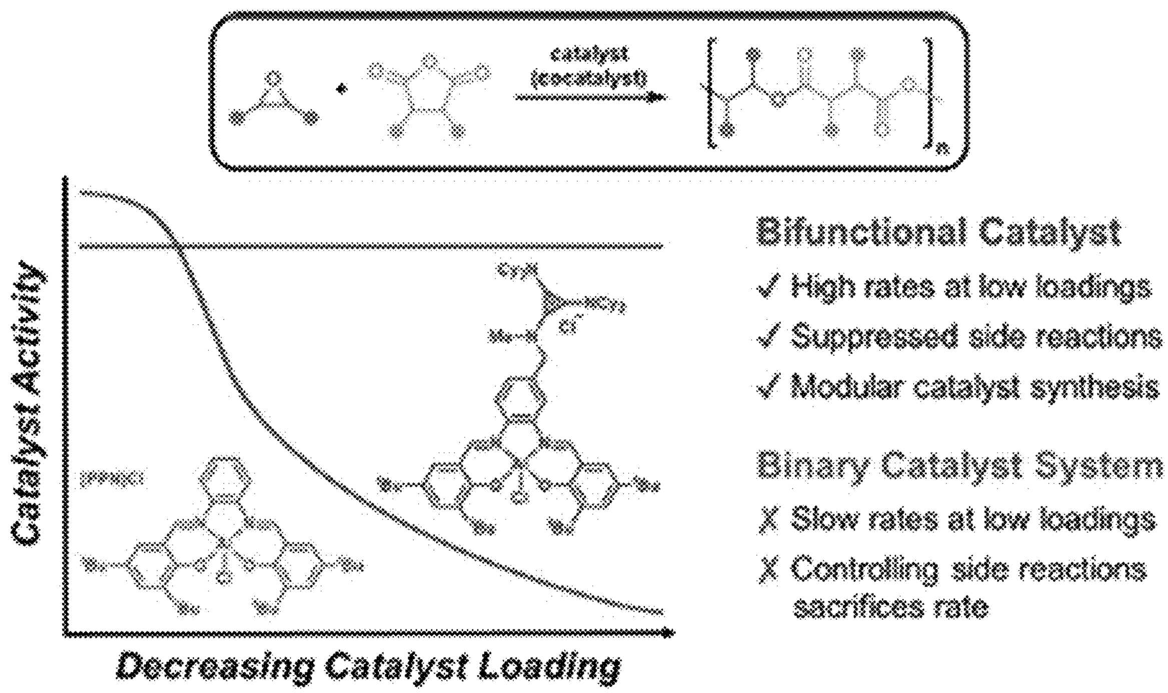
FIG. 22. (Top) Polymerization scheme of the present disclosure. (Bottom) Comparison of bifunctional catalyst system and binary catalyst system.
Figure 23:
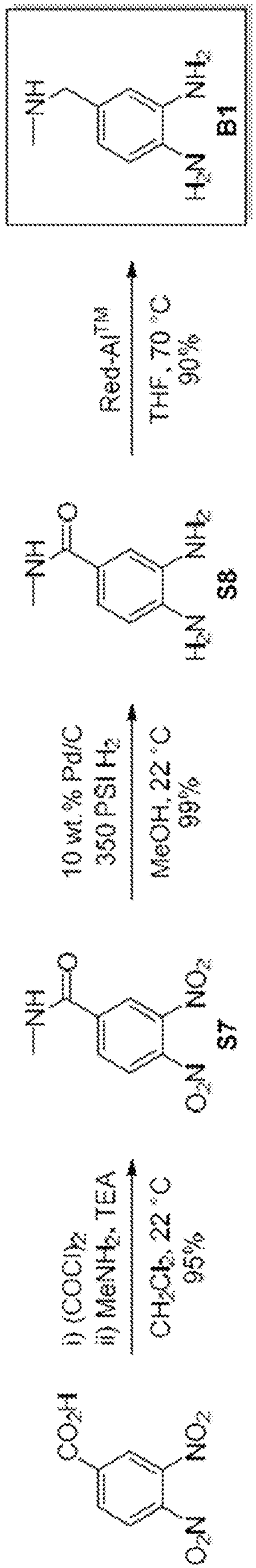
FIG. 23. Scheme showing synthesis of 4-N-methyl-methanamine-1,2-diaminobenzene (B1).
Figure 24:
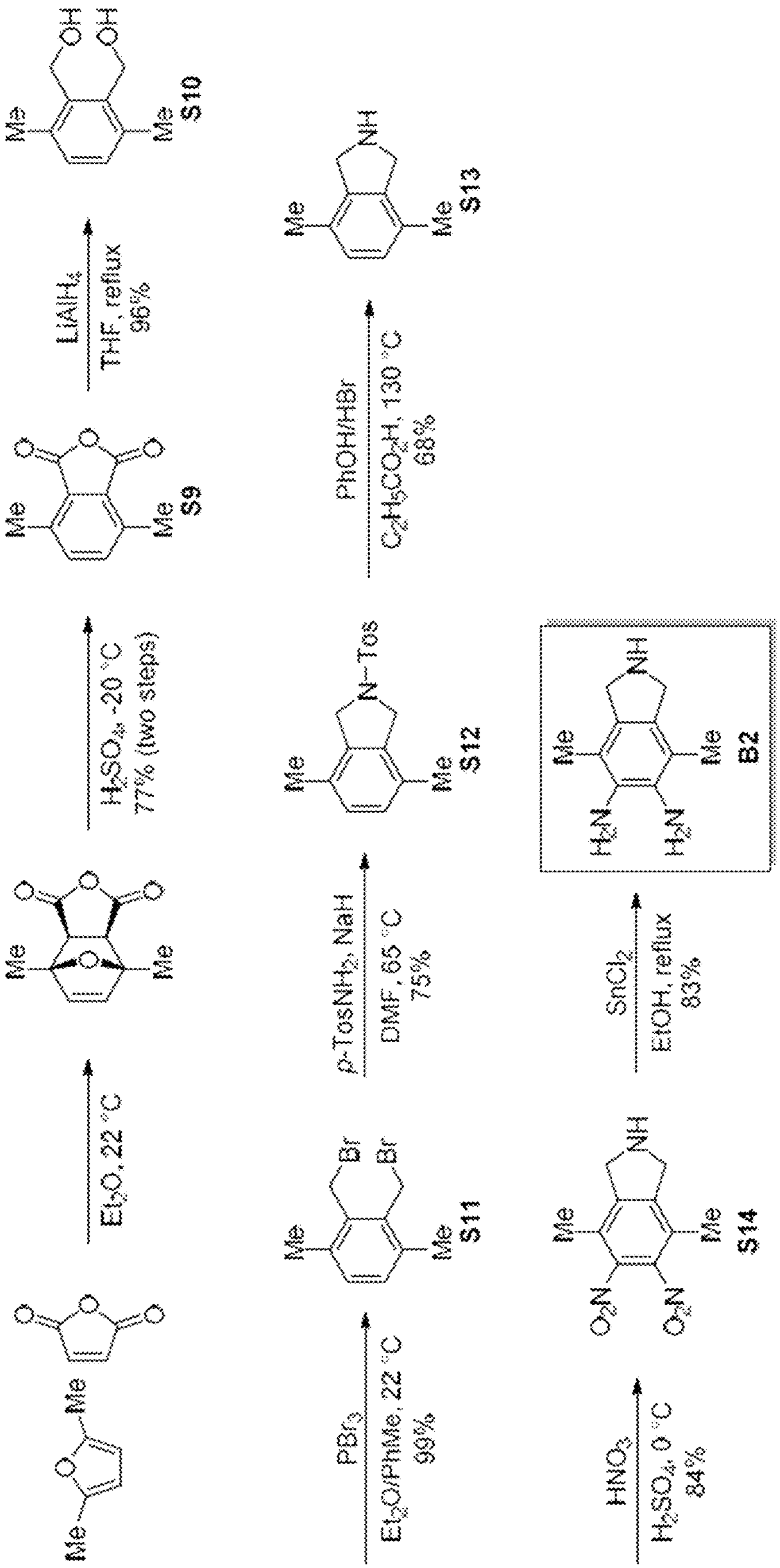
FIG. 24. Scheme showing synthesis of 4-N-methyl-methanamine-1,2-diaminobenzene (B2).
Figure 25:
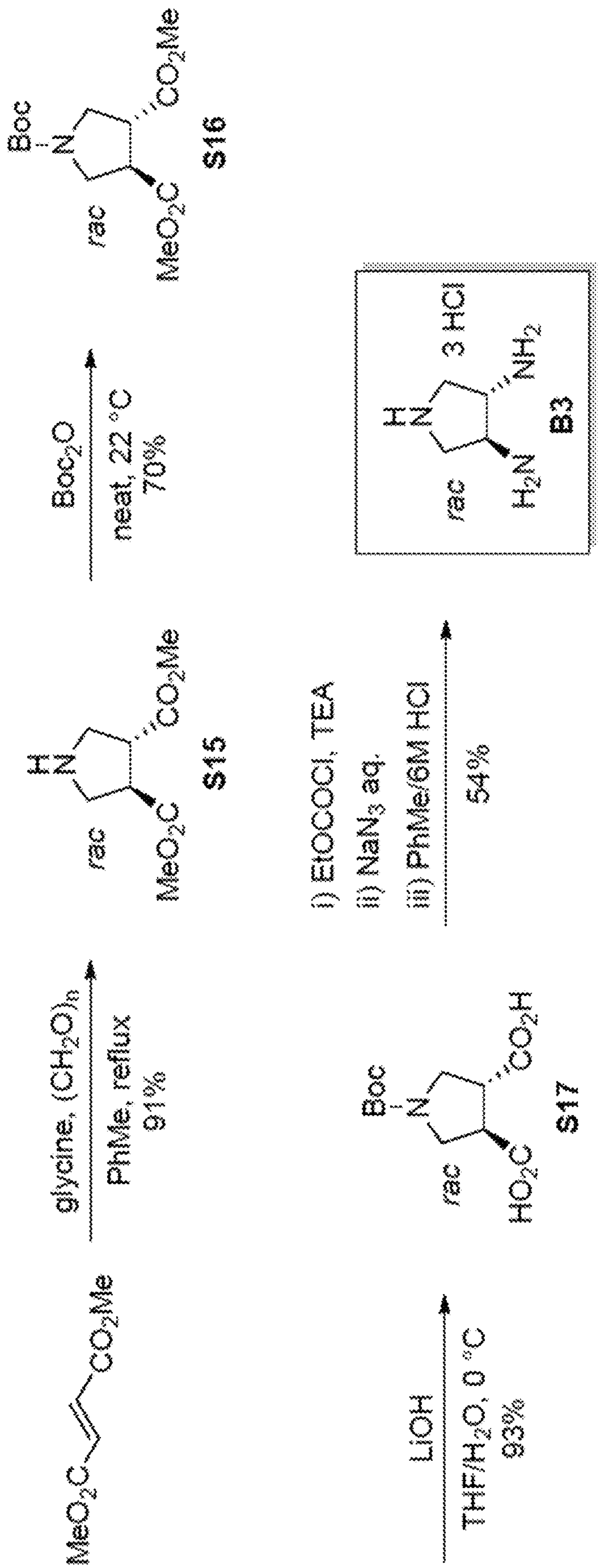
FIG. 25. Scheme showing trans-3,4-Pyrrolidine diamine trihydrochloride (B3).
Figure 78:
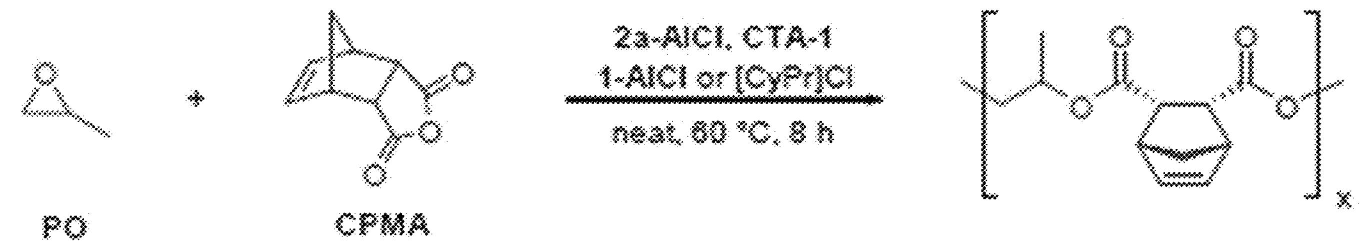
FIG. 78. Table showing effect of additional Lewis Acid or cocatalyst on rates of CPMA/PO copolymerization catalyzed by 2a-AlCl.

To distinguish between these potential rate-limiting steps, 2a-AlCl-catalyzed polymerizations were performed with exogeneous 1-AlC1 or [CyPr]Cl. Additional Lewis acid did not accelerate polymerization rates, suggesting that epoxide binding is not rate-limiting in the bifunctional system with CTA (FIG. 78, entries 2-4). Interestingly, exogenous [CyPr]Cl did not accelerate reaction rates when the total number of growing chains was fewer than the number of dormant chains ([2a-AlCl]+[CyPrCl]<[CTA-1], (FIG. 78, entries 5 and 6). Upon adding sufficient [CyPr]Cl such that the number of anionic chain-ends exceeded the number of protic chain-ends, reaction rates increased with increasing $[CyPrCl]_0$ (FIG. 78, entry 7). Accordingly, we propose that epoxide ring-opening is rate-limiting when 2a-AlCl is used with CTA (FIG. 20, blue). Moreover, we believe that the initial rate invariance with [CyPr]Cl concentrations that produce fewer growing than dormant chains further supports that cocatalyst-associated chains in solution are deactivated by hydrogen-bonding. Therefore, we propose that 2a-AlCl's resilience to CTA arises from intramolecular ring-opening within the catalytic unit to the exclusion of protic chain-ends.

Chain transfer from protic functionality to access varied polymer architectures. The robustness of 2a-AlC1 both at extremely low catalyst loadings and towards dormant species enables access to moderate molecular weight polyesters that would be unattainable in comparable binary systems. We screened a variety protic functional groups to identify which species are competent for chain transfer with 2a-AlC1 (FIG. 21, entries 1-5). In addition to carboxylic acids and alcohols (FIG. 21, entries 1 and 2), thiols also promote chain transfer (FIG. 21, entry 5) as evidenced by reduced molecular weights and low dispersities as compared to reactions performed in the absence of CTA (FIG. 21, entry 1). By contrast, N-methylbenzamide (CTA-3) and 1-naphthyl amine (CTA-4) did not function as a CTAs (FIG. 21, entries 3 and 4), though alkyl amines promote chain transfer.

We applied 2a-AlC1 with a variety of CTAs to access not only mono- and bifunctional linear chains, but also di- and tri-block copolymers, as well as star, branched, and brush architectures. Polymerization from hydroxy-terminated poly (ethyleneglycol) (CTA-7) afforded ester-ether-ester triblock copolymers with moderate molecular weight and low dispersity (FIG. 21, entry 7). Polymerization from a carboxylic acid-functionalized RAFT agent (CTA-8) afforded polyester chains with intact trithiocarbonate terminus, which may allow for block copolymer synthesis via sequential ROCOP and reversible addition-fragmentation chain transfer (RAFT) polymerization. Star architectures can be accessed through multifunctional protic CTAs, such as CTA-9 and CTA-10. Post-polymerization reductive cleavage of CTA-10's disulfide bond will enable synthesis of a four-armed star comprising two different pairs of arms. Efforts to graft polyesters from polymers containing pendant protic functional groups (CTA-11) were only moderately successful, yielding broad molecular weight distributions due to partial initiation (FIG. 21, entry 11). Better controlled grafts may be accessed by using CTAs with greater spacing between the protic units. Hyperbranched architectures are accessible by using a comonomer bearing pendent protic functionality, as with CTA-12 (FIG. 21, entry 12). The degree of branching can be controlled by varying the stoichiometry of the comonomers.

We have developed a modular bifunctional aminocyclopropenium-salen catalyst for ROCOP of epoxides and cyclic anhydrides. Anchoring the aminocyclopropenium cocatalyst on the salen backbone permits synthetically facile steric and electronic perturbations to optimize catalytic activity. The aminocyclopropenium cocatalyst not only achieves comparable activity to that observed with traditional iminium salts but also successfully prevents transesterification and epimerization side reactions that are commonly observed in PPN-cocatalyzed systems. Studying the polymerization kinetics with the binary and bifunctional catalysts provided new mechanistic insight into the rate-limiting ring-opening step in the binary system and validated the advantages of the bifunctional design. Moreover, the bifunctional catalyst demonstrates a distinct advantage over the binary system in its resilience to chain transfer agents: the bifunctional catalyst is compatible with a variety of protic chain transfer agents and maintains good activity even at high CTA loadings. The covalent linkage between cocatalyst and Lewis acid affords high catalytic activity under conditions that suppress polymerization rates in comparable binary systems, allowing access to extremely low catalyst loadings (>0.025 mol %) to reduce costs, minimize catalyst residue, and increase molecular weights. Ongoing work focuses on further exploring side reactions in aminocyclopropenium-cocatalyzed systems.

General Considerations All manipulations of air and water sensitive compounds were carried out under nitrogen in an MBraun Labmaster glove box or by using standard Schlenk line technique. $^1H$ and $^{13}C$ NMR spectra were recorded on a Bruker AV III HD ($^1H$, 500 MHz) spectrometer with a broad band Prodigy cryoprobe or Varian IVarian INOVA 400 ($^1H$, 400 MHz) spectrometer. Chemical shifts (6) for $^1H$ and $^{13}C$ NMR spectra were referenced to protons on the residual solvent (for $^1H$) and deuterated solvent itself (for $^{13}C$). Chemical shifts (6) for $^{19}F$ NMR spectra were referenced a fluorobenzene internal standard added to each sample (15 μL, −113.15 ppm). High-resolution mass spectrometry (HRMS) analyses were performed on a Thermo Scientific Exactive Orbitrap MS system equipped with an Ion Sense DART ion source.

Gel permeation chromatography (GPC) analyses were carried out using an Agilent 1260 Infinity GPC System equipped with an Agilent 1260 Infinity autosampler and a refractive index detector. The Agilent GPC system was equipped with two Agilent PolyPore columns (5 micron, 4.6 mm ID) which were eluted with THE at 30° C. at 0.3 mL/min and calibrated using monodisperse polystyrene standards. Flash column chromatography was performed using silica gel (particle size 40-64 m, 230-400 mesh).

General Materials. Solvents for air sensitive reactions were purchased from Fisher and sparged with ultrahigh purity (UHP) grade nitrogen and either passed through two columns containing reduced copper (Q-5) and alumina (hexanes, PhMe, and THF) or passed through two columns of alumina (DCM) and dispensed into an oven-dried Straus flask, followed by three freeze-pump-thaw cycles, and vacuum transferred before use. Otherwise, solvents (EtOAc, $Et_2O$, hexanes, MeOH, EtOH, CHCl3, DMF, pentane, heptane) were used as received. Triethylamine was dried over calcium hydride for three days, vacuum transferred to an oven-dried Schlenk flask, degassed by three freeze-pump-thaw cycles, and stored under nitrogen. All other chemicals and reagents, except for polymerization materials (vide infra), were purchased from commercial sources (Aldrich, Oakwood Chemical, Strem, Advanced ChemBlocks Inc., TCI, Alfa Aesar, Acros, and Fisher) and used without further purification.

Polymerization Materials. Carbic anhydride (CPMA; Acros>99%) was recrystallized from a saturated solution of EtOAc and dried in vacuo 18 h before subliming at 65° C. under dynamic vacuum and storing under nitrogen. Phthalic anhydride (PA; Aldrich>99%) was purified by heating a 10 wt. % solution of PA in CHCl3 to reflux for 30 min, followed by hot filtration through Celite. The filtrate was concentrated to 50% the original volume and PA recrystallized at −10° C., followed by sublimation at 70° C. under dynamic vacuum. 3,6-Dimethylphthalic anhydride (DMA)[1] and rac-cis-endo-1-isopropyl-4-methyl-bicyclo[2.2.2]oct-5-ene-2,3-dicarboxylic anhydride (TMA)[2] were synthesized according to literature procedures and sublimed under dynamic vacuum. All anhydrides were stored at 22° C. in a glove box under nitrogen atmosphere.

Epoxides were stirred over calcium hydride for at least three days, vacuum transferred to an oven-dried Straus flask, degassed by three freeze-pump-thaw cycles, and stored in a glove box under nitrogen atmosphere.

Bis(triphenylphosphine)iminium chloride ([PPN]Cl, 97%, Aldrich) was recrystallized by layering a saturated DCM solution with dry, degassed $Et_2O$. The resulting crystals were ground into a fine powder and then dried at 60° C. under vacuum prior to use. Tetrabutyl ammonium bromide (>98% Aldrich) was dried in vacuo at 60° C. for 18 h prior to use.

1-Adamantanecarboxylic acid (CTA-1, Aldrich, 99%), 1-adamantanemethanol (CTA-2, Lancaster Synthesis, 95%), N-methylbenzamide (CTA-3, Aldrich, >99%), 1-naphthylamine (CTA-4, Aldrich, >99%), and 2-naphthalenethiol (CTA-5, Aldrich, 99%) were sublimed at 65° C. under dynamic vacuum. 1,6-Hexanediol (CTA-6, Aldrich, >99%) was sublimed at 22° C. under dynamic vacuum. Poly (ethylene glycol) (hydroxy-terminated, average mol wt 8000, CTA-7, Aldrich), trans-4,5-dihydroxy-1,2-dithiane (CTA-10, Aldrich, >99%), poly(vinyl alcohol) (CTA-11, Aldrich), and 4-cyano-4-[(ethylsulfanylthiocarbonyl)sulfanyl]pentanoic acid (CTA-8) were dried in vacuo at 22° C. for 18 h. Pentaerythritol ethoxylate (3/4 EO/OH, average Mn~270, CTA-9, Aldrich) was stirred over 3 Å molecular sieves while sparging with nitrogen for 8 h. 1,2,4-Benzenetricarboxylic anhydride (CTA-12, Aldrich, 97%) and triphenylmethanol (TrOH, Aldrich, 97%) were sublimed at 80° C. under dynamic vacuum. After purification and drying, all chain transfer agents (CTA-1-CTA-12) and non-initiating TrOH were stored in a glove box under nitrogen. CTA-8 was stored in the dark at −35° C.

Salicylaldehyde Syntheses.
2-tert-Butyl-4-fluorophenol (S1)

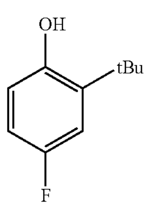

Concentrated sulfuric acid (4 mL) was added dropwise to a solution of 4-fluorophenol (5.0 g, 44.6 mmol, 1.0 equiv) in tert-butanol (8.50 mL, 88.9 mmol, 2.0 equiv), resulting in a color change from pale yellow to orange. The reaction mixture was stirred at 22° C. for 18 h before diluting with $Et_2O$ (70 mL). The lower acid layer was removed, and the resulting organic phase neutralized with saturated aq. $NaHCO_3$ (12 mL) then washed with brine (100 mL) and dried over $MgSO_4$. The concentrated product was purified by silica column chromatography (95:5, hexanes:EtOAc $R_f$=0.30) to afford a pale yellow oil (2.83 g, 38% yield). $^1H$ NMR (500 MHz, $CDCl_3$): δ 6.99 (dd, J=10.9, 2.9 Hz, 1H), 6.76 (m, 1H), 6.59 (dd, J=8.7, 4.9 Hz, 1H), 4.67 (s, 1H), 1.40 (s, 9H). $^{13}C$ NMR (125 MHz, $CDCl_3$): δ 157.1, 150.0, 138.0, 116.9, 114.0, 112.6, 34.7, 29.3. HRMS (DART-MS): m/z calculated for C10H13FO $[M]^{-30}$ 168.0950, found 168.0949. Characterization data were consistent with literature reports.

2-(Adamantan-1-yl)-4-tert-butylphenol (S2)

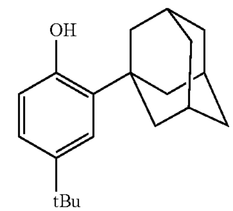 [SMILES: CC(C)(C)c1ccc(O)c(C23CC4CC(CC(C4)C2)C3)c1]

Tert-butyl phenol (4.0 g, 26.6 mmol, 1.0 equiv) and 1-adamantanol (4.05 g, 26.6 mmol, 1.0 equiv) were dissolved in DCM (45 mL) and the solution cooled to 0° C. Concentrated sulfuric acid (1.6 mL, 30.0 mmol, 1.13 equiv) was added dropwise, and the reaction mixture warmed to 22° C. and stirred for 18 h. The acid layer was removed, and the organic phase neutralized with 1 M NaOH before washing with saturated aq. $NaHCO_3$ and brine before drying over $MgSO_4$. Concentrating in vacuo afforded a white solid that was purified by silica column chromatography (95:5 hexanes:EtOAc, $R_f$=0.33) to yield a white solid (5.58 g, 74% yield). $^1H$ NMR (500 MHz, $CDCl_3$): δ 7.27 (s, 1H), 7.08 (d, J=8.2 Hz, 1H), 6.59 (d, J=8.2 Hz, 1H), 4.59 (br s, 1H), 2.19-2.13 (m, 6H), 2.13-2.08 (m, 3H), 1.85-1.75 (m, 6H), 1.31 (s, 9H). $^{13}C$ NMR (125 MHz, $CDCl_3$): δ 151.96, 143.06, 135.50, 123.28, 123.28, 116.12, 40.59, 37.08, 36.86, 34.33, 31.63, 29.08. HRMS (DART-MS): m/z calculated for $C_{20}H_{28}O$ $[M]^{\cdot+}$284.2140, found 284.2137. Characterization data were consistent with literature reports.

General Formylation Procedure. To an oven dried Schlenk flask equipped with stir bar was added the appropriately substituted phenol. The flask was placed under nitrogen, dry THF added via cannula, and the resulting solution cooled to 0° C. MeMgBr (3.0 M in $Et_2O$) was added dropwise via syringe over 5 min. The reaction mixture was warmed to 22° C. and stirred for 30 min. Dry triethylamine was added via syringe, followed by paraformaldehyde against positive nitrogen pressure. The reaction mixture was then heated to reflux (70° C.) for 18 h. After cooling to 0° C., an equal volume of 1 M HCl was added and the resulting biphasic mixture transferred to a separatory funnel. The mixture was extracted three times with $Et_2O$. The combined organic extracts were washed with brine before drying over magnesium sulfate. Filtering and concentrating in vacuo afforded the crude product that was further purified by recrystallization or column chromatography as indicated below.

3-tert-Butyl-5-fluorosalicylaldehyde (S3)

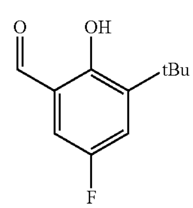 [SMILES: CC(C)(C)c1cc(F)cc(C=O)c1O]

According to the general formylation procedure, a solution of 2-tert-butyl-4-fluorophenol (Si) (4.32 g, 25.7 mmol, 1.00 equiv) in dry THF (30 ML) was treated with 3.0 M in $Et_2O$ MeMgBr (8.70 mL, 28.9 mmol, 1.12 equiv), triethylamine (5.74 mL, 41.1 mmol, 1.60 equiv), and paraformaldehyde (2.32 g, 77.1 mmol, 3.00 equiv). The product was recrystallized by cooling a saturated hexanes solution to −10° C. and was isolated as a yellow crystalline solid (4.74 g, 94% yield). $^1$H NMR (500 MHz, $CDCl_3$): δ 11.58 (s, 1H), 9.82 (s, 1H), 7.29 (dd, J=10.5, 3.1 Hz, 1H), 7.07 (dd, J=7.0, 3.1, 1H), 1.41 (s, 9H). $^{13}$C NMR (125 MHz, $CDCl_3$): δ 196.24, 157.71, 156.32, 154.43, 141.23, 122.54, 122.35, 120.00, 119.94, 115.67, 115.50, 35.25, 29.10. HRMS (DART-MS): m/z calculated for $C_{11}H_{14}FO_2$ $[M+H]^+$ 197.09723, found 197.09792. Characterization data were consistent with literature reports.

3-tert-Butyl-5-methoxysalicylaldehyde (S4)

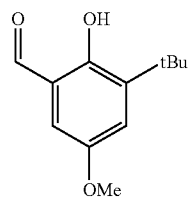 [SMILES: COc1cc(C=O)c(O)c(C(C)(C)C)c1]

According to the general formylation procedure, a solution of 2-tert-butyl-4-methoxyphenol (S2) (5.00 g, 27.7 mmol, 1.00 equiv) in dry THF (50 mL) was treated with 3.0 M in $Et_2O$ MeMgBr (11.6 mL, 34.7 mmol, 1.25 equiv), triethylamine (6.19 mL, 44.3 mmol, 1.60 equiv), and paraformaldehyde (2.50 g, 83.2 mmol, 3.00 equiv). The crude product was purified by column chromatography (95:5 hexanes:EtOAc, $R_f$=0.31) to give a yellow oil (5.20 g, 90% yield). $^1$H NMR (500 MHz, $CDCl_3$): δ 11.51 (s, 1H), 9.84 (s, 1H), 7.17 (d, J=3.0 Hz, 1H), 6.81 (d, J=3.1 Hz, 1H), 3.81 (s, 3H), 1.41 (s, 9H). $^{13}$C NMR (125 MHz, $CDCl_3$): δ 196.76, 156.33, 152.15, 140.29, 124.00, 119.94, 111.83, 55.90, 35.12, 29.24. HRMS (DART-MS): m/z calculated for $C_{12}H_{16}O_3$ $[M]^{\cdot+}$208.1099, found 208.1097. Characterization data were consistent with literature reports.

3-Methyl-5-tert-butylsalicylaldehyde (S5)

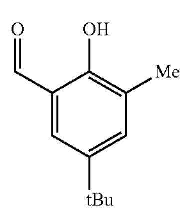 [SMILES: Cc1cc(C(C)(C)C)cc(C=O)c1O]

According to the general formylation procedure, a solution of 2-methyl-4-tert-butylphenol (7.00 g, 42.6 mmol, 1.0 equiv) in dry THE (50 mL) was treated with 3.0 M in $Et_2O$ MeMgBr (15.6 mL, 46.9 mmol, 1.1 equiv), triethylamine (9.51 mL, 68.2 mmol, 1.6 equiv), and paraformaldehyde (3.84 g, 128 mmol, 3.0 equiv). The crude product was purified by column chromatography (95:5 hexanes:EtOAc, $R_f$=0.26) to give a pale yellow oil that solidified upon drying 18 h in vacuo (5.80 g, 71% yield). $^1$H NMR (500 MHz, $CDCl_3$): δ 11.11 (s, 1H), 9.87 (s, 1 h), 7.44 (s, 1H), 7.35 (s, 1H), 2.28 (s, 3H), 1.32 (s, 9H). 13C NMR (125 MHz, $CDCl_3$): δ 196.93, 157.88, 142.15, 135.72, 127.31, 126.23, 119.39, 33.98, 31.27, 15.28. HRMS (DART-MS): m/z calculated for C12H16O2 $[M]^{\cdot+}$ 192.1150, found 192.1147. Characterization data were consistent with literature reports.

3-(Adamantan-1-yl)-5-tert-butylsalicylaldehyde (S6)

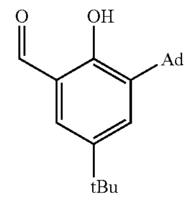

According to the general formylation procedure, 2-(adamantan-1-yl)-4-tert-butylphenol (S2) (5.0 g, 17.6 mmol, 1.0 equiv) was treated with 3.0 M in $Et_2O$ MeMgBr (6.45 mL, 19.4 mmol, 1.1 equiv), triethylamine (3.90 mL, 28.2 mmol, 1.6 equiv), and paraformaldehyde (1.58 g, 52.8 mmol, 3 equiv). No additional purification following work up was required. The product was isolated as a white solid (4.59, 48% yield). $^1$H NMR (500 MHz, $CDCl_3$): δ 11.70 (s, 1H), 9.87 (s, 1H), 7.54 (s, 1H), 7.34 (s, 1H), 2.18-2.13 (m, 6H), 2.13-2.07 (m, 3H), 1.81-1.78 (m, 6H), 1.34 (s, 9H). $^{13}$C NMR (125 MHz, $CDCl_3$): δ 197.42, 159.34, 141.69, 137.78, 131.95, 127.68, 119.96, 40.18, 37.21, 37.00, 34.28, 31.31, 28.96. HRMS (DART-MS): m/z calculated for $C_{21}H_{28}O_2$ $[M]^{\cdot+}$ 312.2089, found 312.2089. Characterization data were consistent with literature reports.

Diamine Backbone Syntheses.

3,4-Dinitro-N-methyl-benzamide (S7)

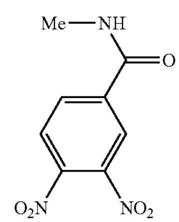 [SMILES: CNC(=O)c1ccc([N+](=O)[O-])c([N+](=O)[O-])c1]

A round bottom flask equipped with stir bar was charged with 3,4-dinitrobenzoic acid (6.37 g, 30.0 mmol, 1.0 equiv) and placed under nitrogen. Dry, degassed DCM (100 mL) was then added via syringe. The solution was cooled to 0° C., and oxalyl chloride (3.09 mL, 36.0 mmol, 1.2 equiv) was added via syringe, followed by 12 drops of dry DMF. The mixture was stirred at 0° C. for 10 min before warming to 22° C. and stirring for 2 h. The reaction mixture was then concentrated in vacuo. The crude acid chloride was redissolved in dry $CH_2Cl_2$ (100 mL), and the resultant solution cooled to 0° C. Dry triethylamine (6.28 mL, 45.0 mmol, 1.5 equiv) and a 2.0 M solution of methylamine in THE (16.5 mL, 33.0 mmol, 1.1 equiv) were added sequentially via syringe. The reaction mixture was stirred at 0° C. for 30 min and then at 22° C. for 4 h. The reaction mixture was then concentrated by rotary evaporation and the resulting solid suspended in 0.1 M HCl (100 mL). After stirred for 30 min at 22° C., the solids were isolated by vacuum filtration. The resulting pale-yellow powder S7 was dried for 18 h in vacuo at 22° C. (6.44 g, 95% yield). $^{1}H$ NMR (500 MHz, DMSO-$d_6$): δ 8.97 (s, 1H), 8.58 (s, 1H), 8.34 (s, 2H), 2.83 (d, J=4.6 Hz, 3H). $^{13}C$ NMR (125 MHz, DMSO-$d_6$): δ 162.93, 143.21, 141.64, 139.23, 133.07, 126.00, 124.35, 26.50. HRMS (DART-MS): m/z calculated for $C_8H_8N_3O_5$ $[M+H]^+$ 226.04585, found 226.04585.

3,4-Diamino-N-methyl-benzamide(S8)

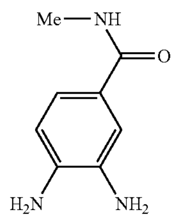

A 100 mL beaker containing stir bar was charged with 3,4-dinitro-N-methyl-benzamide (S7) (6.15 g, 27.3 mmol, 1.0 equiv), 10 wt. % Pd/C (0.35 g), and methanol (80 mL), and the beaker placed in a Parr pressure reactor. The reactor was pressurized with $H_2$ to 350 PSI and vented three times before pressurizing with $H_2$ to a final pressure of 350 PSI and sealing. The reaction mixture was stirred at 22° C. for 18 h before slowly venting into a fume hood. The solution was filtered through a plug of Celite, and the filtrate and washed with methanol (3×20 mL). The filtrate was collected, diluted with PhMe (50 mL), and the solvent removed by rotary evaporation. The resulting dark oil was azeotroped with PhMe (3×50 mL) until a reddish-brown powder was obtained (4.50 g, 99% yield). The isolated solid S8 was stored at −10° C. under nitrogen. $^{1}H$ NMR (500 MHz, DMSO-$d_6$): δ 7.82 (d, J=4.3 Hz, 1H), 7.04 (d, J=1.8 Hz, 1H), 6.93 (dd, J=8.1, 1.9 Hz, 1H), 6.46 (d, J=8.1 Hz, 1H), 4.91 (s, 1H), 4.53 (s, 1H), 2.69 (d, J=4.5 Hz, 3H). $^{13}C$ NMR (125 MHz, DMSO-$d_6$): δ 167.34, 138.15, 133.85, 123.09, 116.83, 113.75, 112.75, 26.13. HRMS (DART-MS): m/z calculated for $C_8H_{12}N_3O$ $[M+H]^+$ 166.09749, found 166.09806.

4-N-Methyl-methanamine-1,2-diaminobenzene(B1)

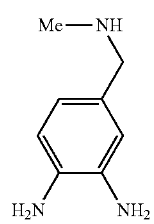

A 250 mL round-bottom flask containing a stir bar was charged with 3,4-diamino-N-methyl-benzamide (S8) (4.30 g, 26.0 mmol, 1.0 equiv), fitted with a reflux condenser, and placed under nitrogen by evacuating/backfilling the reaction setup with nitrogen three times. The condenser was then fitted with a nitrogen inlet/outlet, and dry THE (125 mL) was added via cannula before cooling the resulting solution to 0° C. RedAl® (65 wt % in PhMe) (42 mL, 142 mmol, 5.4 equiv) was added via syringe over 10 min and the reaction mixture heated to 75° C. for 18 h under nitrogen. The reaction mixture was then quenched by cooling to 0° C., slowly adding $H_2O$ (4.0 mL) then 2 M NaOH (4.0 mL), and subsequently stirring the mixture at 22° C. for 15 min. $MgSO_4$ (8 g) was added and the mixture stirred a further 15 min at 22° C. before filtering through Celite and washing the filtrand with EtOAc (50 mL). The filtrate was concentrated in vacuo to give a dark brown oil that was dried in vacuo for 18 h to provide the product B1 as a sticky brown solid that was stored under nitrogen at −10° C. (3.55 g, 90% yield). $^{1}H$ NMR (500 MHz, DMSO-$d_6$): δ 6.46 (s, 1H), 6.42 (s, 1H), 6.41 (s, 1H), 6.32 (s, 1H), 6.30 (s, 1H), 3.55-3.50 (m, 1H), 3.36 (s, 2H), 3.33-3.27 (m, 2H), 3.23 (s, 2H), 2.20 (s, 3H). $^{13}C$ NMR (125 MHz, DMSO-$d_6$): δ 134.64, 133.39, 129.48, 117.03, 114.59, 114.19, 55.35, 35.49. HRMS (DART-MS): m/z calculated for $C_8H_{13}N_3$ $[M]^{\cdot+}$ 151.11095, found 151.11040.

3,6-Dimethylphthalic anhydride (S9)

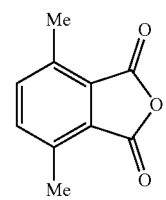 [SMILES: Cc1ccc(C)c2c1C(=O)OC2=O]

Using a modified procedure, 1 a mixture of mortar-ground maleic anhydride (13.6 g, 139 mmol, 1.00 equiv) and 2,5-dimethylfuran (15.0 mL, 146 mmol, 1.05 equiv) in $Et_2O$ (15 mL) was prepared in a 250 mL round-bottom flask containing a stir bar and stirred for 3 h at 22° C. The heterogenous mixture was then diluted with hexanes (15 mL), cooled to 0° C. using an ice bath, and the resulting solids isolated by vacuum filtration. The isolated product was washed once with a 1:1 (v:v) mixture of hexanes:$Et_2O$ (75 mL) before drying in vacuo for 1 h, affording the product as a white crystalline solid (19.0 g, 71% yield). The product was used immediately in the next step due to rapid decomposition of the Diels-Alder adduct intermediate under ambient temperature. A 500 mL round-bottom flask was first charged with concentrated sulfuric acid (190 mL) and subsequently cooled to −20° C. using an ice-methanol bath. The Diels-Alder adduct intermediate (17.1 g, 88.1 mmol, 1 equiv) was then added portionwise as a solid over 30 min to vigorously stirred concentrated sulfuric acid (175 mL) while cooling the reaction mixture with a −20° C. salt/ice bath. The pale orange reaction mixture was stirred for 30 min at −20° C. and then 3 h at 0° C. before pouring onto ice (1000 g). The resulting solids were isolated by vacuum filtration, rinsed with deionized $H_2O$ (2×100 mL), and dried for 18 h in vacuo to give the product as a white solid (13.2 g, 77% yield). $^{1}H$ NMR (500 MHz, $CDCl_3$): δ 7.50 (s, 2H), 2.67 (s, 6H). $^{13}C$ NMR (125 MHz, $CDCl_3$): δ 163.39, 137.92, 137.89, 128.61, 17.50. HRMS (DART-MS): m/z calculated for $C_{10}H_9O_3$ $[M+H]^+$ 177.0546, found 177.05539. Characterization data were consistent with literature reports.

3,6-Dimethyl-1,2-bis(hydroxymethyl)benzene (S10)

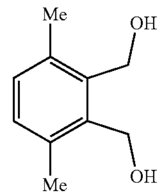 [SMILES: Cc1ccc(C)c(CO)c1CO]

Using a modified procedure, a suspension of $LiAlH_4$ (8.82 g, 233 mmol, 4.0 equiv) in dry THE (90 mL) was first prepared under nitrogen in a 500 mL 3-neck round bottom flask equipped with reflux condenser and nitrogen inlet and outlet. A solution of 3,6-dimethylphthalic anhydride (S9) (10.2 g, 58.0 mmol, 1.0 equiv) in dry THE (90 mL) was then added via cannula over 45 min at 22° C. to the stirred suspension of $LiAH_4$ in THF while venting the reaction to an oil bubbler. The reaction mixture was then stirred at reflux (70° C.) for 18 h and subsequently cooled to 0° C. using an ice bath. The reaction mixture was diluted with $Et_2O$ (200 mL) and slowly quenched via sequential addition of $H_2O$ (8.8 mL), 15 wt. % aq. NaOH (8.8 mL), and $H_2O$ (24 mL). The mixture was stirred at 22° C. for 15 min, $MgSO_4$ (10 g) added, and stirring continued for an additional 15 min. The mixture was then filtered through a Celite pad and the filtrand washed with a 90:10 (v:v) mixture of EtOAc:EtOH (300 mL). The combined filtrates were dried over $Na_2SO_4$ and the solvent removed by rotary evaporation to give an oil that solidified into a pale-yellow solid upon drying in vacuo (9.23 g, 96% yield). $^1$H NMR (500 MHz, $CDCl_3$): δ 7.04 (s, 2H), 4.71 (d, J=3.9 Hz, 4H), 3.26 (s, 2H), 2.37 (s, 6H). $^{13}$C NMR (125 MHz, $CDCl_3$): δ 138.13, 135.01, 130.44, 59.38, 19.63. HRMS (DART-MS): m/z calculated for C10H14O2 [M]+166.0994, found 166.0990. Characterization data were consistent with literature reports.

3,6-Dimethyl-1,2-bis(bromomethyl)benzene (S11)

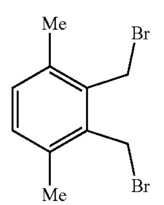 [SMILES: Cc1ccc(C)c(CBr)c1CBr]

According to a literature procedure, a solution of $PBr_3$ (11.0 mL, 116 mmol, 2.1 equiv) in dry $Et_2O$ (21 mL) was added over 5 min at 22° C. to a stirred solution of 3,6-dimethyl-1,2-bis(hydroxymethyl)benzene (S10) (9.20 g, 55.3 mmol, 1.0 equiv) in dry PhMe (21 mL) and $Et_2O$ (21 mL). The mixture was then stirred for 18 h at 22° C., followed by pouring onto ice (220 g) and neutralizing with saturated aq. $NaHCO_3$ solution (65 mL). The solution was then transferred to a separatory funnel and extracted with $Et_2O$ (3×150 mL). The organic extracts were combined, washed with brine (1×300 mL), and dried over $Na_2SO_4$. The solvent was removed in vacuo to give S11 as a white solid (16.2 g, 99% yield). $^1$H NMR (500 MHz, $CDCl_3$): δ 7.07 (s, 2H), 4.68 (s, 4H), 2.39 (s, 6H). $^{13}$C NMR (125 MHz, $CDCl_3$): δ 136.10, 135.05, 131.28, 27.82, 19.28. Characterization data were consistent with literature reports.

4,7-Dimethyl-2-tosylisoindoline (S12)

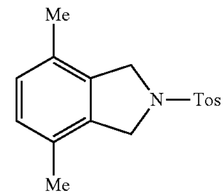

Using an adapted procedure, a suspension of 95% NaH (0.82 g, 34.2 mmol, 2.5 equiv) in dry DMF (30 mL) was first prepared under nitrogen in a 250 mL round-bottomed flask fitted with a nitrogen inlet and outlet. A solution of ptoluenesulfonamide (5.86 g, 34.2 mmol, 2.5 equiv) in dry DMF (20 mL) was next added dropwise by syringe over 30 min at 22° C. to the stirred suspension of NaH, accompanied by the vigorous evolution of H2 gas. The reaction mixture was stirred for 1 h at 22° C. and then heated to 65° C. for 1 h. A solution of 3,6-dimethyl-1,2-bis(bromomethyl)benzene (S11) (4.00 g, 13.7 mmol, 1.0 equiv) in dry DMF (45 mL) was next added to the p-toluenesulfonamide sodium salt solution at 110° C. and the reaction stirred for 3 h at 110° C. The reaction mixture was cooled to 22° C. and poured onto ice (600 g), followed by stirring for 30 min. The resulting solids were isolated by vacuum filtration, rinsed with $H_2O$ (150 mL), and dried in vacuo to give an off-white solid that was further purified by column chromatography to afford the product as a white solid (3.51 g, 75% yield). $^1$H NMR (500 MHz, $CDCl_3$): δ 7.79 (d, J=8.2 Hz, 2H), 7.33 (d, J=8.0 Hz, 2H), 6.94 (s, 2H), 4.57 (s, 4H), 2.41 (s, 6H), 2.16 (s, 3H). $^{13}$C NMR (125 MHz, $CDCl_3$): δ 143.74, 134.93, 134.02, 129.96, 129.84, 128.89, 127.70, 53.58, 21.65, 18.41. HRMS (DART-MS): m/z calculated for C17H20NO2S $[M+H]^+$ 302.1209, found 302.1215.

4,7-Dimethylisoindoline (S13)

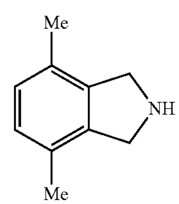 [SMILES: Cc1ccc(C)c2c1CNC2]

Using an adapted procedure, a 50 mL round-bottom flask containing stir bar was charged with 4,7-dimethyl-2-tosylisoindoline (S12) (1.50 g, 4.98, 1.0 equiv), phenol (1.50 g), 48 wt. % HBr (12.0 mL), and propionic acid (2.0 mL). The reaction mixture was stirred vigorously while heating at 135° C. for 6 h. Upon cooling to 22° C., the dark colored mixture was transferred to a separatory funnel and washed with $Et_2O$ (2×50 mL), discarding the organic extracts. The remaining aqueous layer was then added dropwise over 10 min to a stirred solution of NaOH (10 g) in $H_2O$ (25 mL). The basified aqueous layer was extracted with a 9:1 (v:v) mixture of $Et_2O$:EtOAC (5×45 mL), the organic extracts dried over anhydrous $Na_2SO_4/K_2CO_3$, and the solvent removed in vacuo to give the product as a dark colored oil that was stored under nitrogen in the dark at −10° C. (0.50 g, 68% yield). $^{1}$H NMR (500 MHz, $CDCl_3$): δ 6.94 (s, 2H), 4.22 (s, 4H), 2.23 (s, 6H), 2.20 (s, 1H). $^{13}$C NMR (125 MHz, $CDCl_3$): δ 140.21, 129.38, 127.80, 52.56, 18.61. HRMS (DART-MS): m/z calculated for $C_{10}H_{14}N$ $[M+H]^+$ 148.1121, found 148.1126.

4,7-Dimethyl-5,6-dinitroisoindoline (S14)

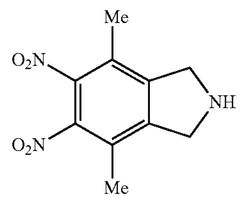

A mixture of concentrated sulfuric acid (12 mL) and 16 M nitric acid (3 mL) was first prepared at 0° C. and then added to a flask containing 4,7-dimethylisoindoline (S13) (0.50 g, 3.4 mmol, 1.0 eq). The mixture was stirred at 0° C. for 6 h, followed by stirring at 22° C. for 1 h. The reaction mixture was then added dropwise over 20 min to a stirred solution of NaOH (25 g) in $H_2O$ (110 mL) at 0° C. The basified solution was transferred to a separatory funnel and extracted with $CH_2C_2$ (5×40 mL), followed by washing the combined organic extracts with saturated aq. $NaHCO_3$ (1×200 mL) and drying over $Na_2SO_4$. Solvent removal in vacuo afforded the product as a yellow solid (0.68 g, 84% yield). $^{1}$H NMR (500 MHz, $CDCl_3$): δ 4.33 (s, 4H), 2.28 (s, 6H), 2.10 (s, 1H). $^{13}$C NMR (125 MHz, $CDCl_3$): δ 145.33, 143.57, 124.83, 53.35, 15.10. HRMS (DART-MS): m/z calculated for $C_{10}H_{12}N_3$ $O_4$ z[M+H]+ 238.0822, found 238.0830.

4,7-Dimethyl-5,6-diaminoisoindoline (B2)

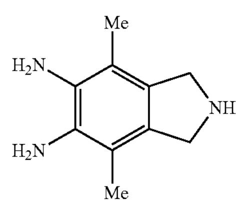 [SMILES: Cc1c2c(c(C)c([N+](=O)[O-])c1[N+](=O)[O-])CNC2]

A solution of 4,7-dimethyl-5,6-dinitroisoindoline (S14) (1.36 g, 5.7 mmol, 1.0 equiv) and $SnCl_2$ (10.9 g, 57.3 mmol, 10 equiv) in absolute EtOH (50 mL) and H2O (1 mL) was prepared under nitrogen and heated to reflux for 18 h. The reaction mixture was then cooled to 0° C. and the resulting yellow solids isolated by vacuum filtration. The solids were then dissolved in 2 M NaOH (50 mL) at 0° C. and the aqueous mixture extracted with $CHCl_3$ (3×75 mL), followed by drying the combined organic extracts over $Na2SO_4$. The solvent was removed in vacuo to give the product as an orange solid that was stored under nitrogen (0.85 g, 83% yield). $^{1}$H NMR (500 MHz, DMSO-$d_6$): δ 3.96 (s, 4H), 3.93 (b, 5H), 1.92 (s, 6H). $^{13}$C NMR (125 MHz, DMSO-$d_6$): δ 131.43, 128.54, 112.97, 52.28, 14.05. HRMS (DARTMS): m/z calculated for $C_{10}H_{16}N_3$ [M+H]+ 178.1339, found 178.1346.

trans-3,4-Pyrrolidinedicarboxylic acid dimethyl ester (S15)

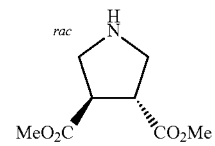

According to a modified procedure, a solution of dimethyl fumarate (6.00 g, 41.6 mmol, 1.0 equiv) in dry PhMe (200 mL) was prepared in a 500 mL 3-necked round-bottom flask equipped with Dean-Stark trap and reflux condenser. The solution was vigorously refluxed by heating in an oil bath heated to 150° C., while a mortar-ground mixture of glycine (5.62 g, 74.9 mmol, 1.8 equiv) and paraformaldehyde (4.38 g, 146 mmol, 3.5 equiv) was added portion wise in 15 min intervals over 2 h. Stirring was continued for an additional 2 h at 150° C., followed by cooling to 22° C. and filtering the mixture by vacuum filtration. The filtrate was collected and washed with saturated aq. $NaHCO_3$ (2×200 mL), brine (1×200 mL), and then dried over $Na_2SO_4$. Removal of the solvent in vacuo afforded the product as a pale-yellow oil that was used without further purification (7.06 g, 91% yield). $^{1}$H NMR (500 MHz, $CDCl_3$): δ 3.66 (s, 6H), 3.36 (p, J=6.1 Hz, 2H), 3.13 (d, J=5.3 Hz, 1H), 2.96-2.88 (m, 2H), 2.78 (m, 2H). $^{13}$C NMR (125 MHz, $CDCl_3$): δ 173.90, 74.59, 74.31, 55.10, 55.04, 52.27, 45.22. HRMS (DART-MS): m/z calculated for $CH_{14}NO_4$ [M+H]+ 188.09173, found 188.09240. Characterization data were consistent with literature reports.

N-Boc trans-3,4-Pyrrolidinedicarboxylic acid, dimethyl ester (S16)

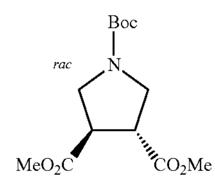 [SMILES: COC(=O)[C@H]1CN(C(=O)OC(C)(C)C)C[C@@H]1C(=O)OC]

S15 (6.64 g, 35.5 mmol, 1.0 equiv) and di-tert-butyl dicarbonate (9.29 g, 42.6 mmol, 1.2 equiv) were combined in a 250 mL round-bottom flask under nitrogen and the mixture stirred for 24 h at 45° C. The reaction mixture was then cooled to 22° C. and diluted with $Et_2O$ (125 mL), followed by washing with 0.1 M HCl (1×100 mL), $H_2O$ (1×100 mL), saturated aq. $NaHCO_3$ (1×100 mL), and brine (1×100 mL). The organic layer was isolated and dried over anhydrous $MgSO_4$, followed by concentration in vacuo to give an oil that was further purified by column chromatography (70:30 hexanes:EtOAc, $R_f$=0.35), affording the product as a waxy solid (5.60 g, 70% yield). $^{1}$H NMR (500 MHz, $CDCl_3$): δ 3.72 (s, 8H), 3.49 (s, 2H), 3.39 (s, 2H), 1.43 (s, 9H). $^{13}$C NMR (125 MHz, $CDCl_3$): δ 172.24, 153.95, 80.07, 52.55, 47.96, 45.89, 45.12, 28.53. HRMS (DART-MS): m/z calculated for $C_8H_{14}NO_4$ [M−Boc+H]+188.09173, found 188.09241.

N-Boc trans-3,4-Pyrrolidinedicarboxylic acid (S17)

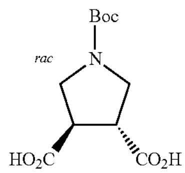

A solution of S16 (5.40 g, 19.2 mmol, 1.0 equiv) in a 1:1 (v:v) mixture of THF and $H_2O$ (100 mL) was initially prepared at 22° C. and the cooled to 0° C. using an ice bath. $LiOH.H_2O$ (4.03 g, 96.0 mmol, 5.0 equiv) was added as a solid and the mixture vigorously stirred at 0° C. for 3 h. The reaction mixture was warmed to 22° C. and concentrated to approximately half the original volume. The solution was then cooled to 0° C. and acidified to pH~2 by slow addition of 1 M HCl. The acidified mixture was saturated with NaCl (35 g) and extracted with $CHCl_3$ (5×75 mL), adding small amounts (~5 mL) of 1 M HCl to the aqueous phase after isolation of each organic extract. The organic extracts were combined, diluted with EtOH (100 mL) and dried over anhydrous $Na_2SO_4$. Note: the addition of EtOH improves the solubility of the diacid product to prevent precipitation while drying over $Na_2SO_4$. The solvent was removed in vacuo and the product obtained as a white solid (4.56 g, 93% yield). $^1$H NMR (500 MHz, DMSO-d6): δ 3.51 (t, J=8.1 Hz, 2H), 3.34 (q, J=10.3 Hz, 2H), 3.21-3.03 (m, 2H), 1.39 (s, 9H). $^{13}$C NMR (125 MHz, DMSO-d6): δ 173.45, 153.23, 78.51, 48.07, 45.46, 44.65, 28.14. HRMS (DART-MS): m/z calculated for $C_6H_{10}NO_4$ [M−Boc+H]+160.06043, found 160.06118. Characterization data were consistent with literature reports.

Trans-3,4-Pyrrolidine Diamine Trihydrochloride (B3)

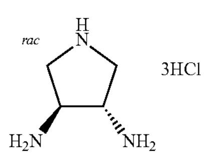

CAUTION: Sodium azide is toxic and must be kept away from acids, halogenated solvents, and heavy metals due to the risk of forming energetically unstable compounds. Organic azides can decompose energetically in response to thermal or mechanical shock. Such compounds must be handled carefully and only by skilled persons in accordance with Environmental Health & Safety guidelines.12 A solution of S17 (4.60 g, 17.7 mmol, 1.0 equiv) and dry triethylamine (12.4 mL, 88.7 mmol, 5.0 equiv) in dry THE (200 mL) was prepared under nitrogen in a 500 mL round-bottom flask equipped with a stir bar and the solution cooled to 0° C. using an ice bath. Ethyl chloroformate (6.76 mL, 70.9 mmol, 4.0 equiv) was added dropwise by syringe over 5 min and the reaction mixture stirred for 30 min at 0° C. A solution of $NaN_3$ (9.23 g, 142 mmol, 8.0 equiv) in $H_2O$ (40 mL) was then added via syringe and the reaction mixture stirred vigorously for 3 h at 0° C. Upon warming to 22° C., the reaction mixture was transferred to a separatory funnel and extracted with $Et_2O$ (3×120 mL). The organic extracts were combined, washed with brine (1×250 mL), and dried over $MgSO_4$. The solution of bisacyl azide was transferred to an oven-dried 500 mL round-bottom flask containing dry PhMe (125 mL) and a stir bar. The flask was fitted with a reflux condenser and concentrated at 22° C. in vacuo to a final volume of −80 mL, followed by backfilling with nitrogen. Note: do not fully concentrate or isolate the bisacyl azide due to the potential instability of this compound in its pure form. The solution of bisacyl azide in PhMe was then heated at reflux for 1 h, accompanied by slow evolution of nitrogen gas during the Curtius rearrangement. The reaction mixture was cooled to 22° C. and diluted with 6 M HCl (100 mL) and the mixture stirred vigorously for 18 h at 22° C. The aqueous layer was isolated, washed with PhMe (1×50 mL), and vacuum distilled to dryness. The resulting pink-colored solid was triturated with methanol (3×15 mL) and dried in vacuo to give a hygroscopic off-white solid (2.01 g, 54% yield). $^1$H NMR (500 MHz, $D_2O$): δ 4.42 (p, J=6.0 Hz, 2H), 4.12 (dd, J=13.2, 7.7 Hz, 2H), 3.70 (dd, J=13.2, 6.8 Hz, 2H). $^{13}$C NMR (125 MHz, D20): δ 52.31, 47.67. HRMS (DART-MS): m/z calculated for $C_4H_{12}N_3$ [M+H]+ 102.10312, found 102.10348.

1,4-Dimethyl-2,3-dinitrobenzene (S18)

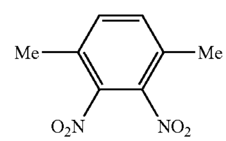

According to a literature procedure, p-xylene (11.5 mL, 93.3 mmol, 1.0 equiv) was added to concentrated sulfuric acid (10 mL) at 0° C., followed by the dropwise addition of a 1:1 (v:v) mixture of concentrated sulfuric acid and concentrated nitric acid (24 mL) over 5 min. The reaction was then heated at 80° C. for 30 min, cooled to 22° C., and the mixture poured onto ice (100 g). The aqueous mixture was extracted with $CH_2Cl_2$ (3×60 mL) and the combined organic extracts washed with $H_2O$ (3×60 mL), saturated aq. $NaHCO_3$ (1×60 mL), and dried over $MgSO_4$, followed by solvent removal in vacuo to give a pale-yellow solid. The crude product was further purified by column chromatography (75:25 hexanes:EtOAc, $R_f$=0.38) to afford the product as a yellow solid (5.80 g, 32% yield). H NMR (500 MHz, $CDCl_3$): δ 7.39 (s, 2H), 2.42 (s, 6H). $^{13}$C NMR (125 MHz, $CDCl_3$): δ 134.08, 130.78, 18.00. HRMS (DART-MS): m/z calculated for $C_8H_7N_2O_4$ [M−H]− 195.0400, found 195.0407.

3,6-Dimethyl-1,2-diaminobenzene(S19)

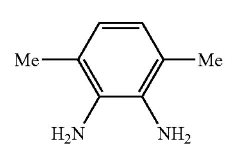

A 20 mL vial containing a stir bar was charged with 1,4-dimethyl-2,3-dinitrobenzene (S18) (1.00 g, 5.1 mmol, 1.0 equiv), 10 wt. % Pd/C (100 mg), and MeOH (3 mL), followed by placing the uncapped vial in a Parr pressure reactor. The reactor was filled and vented four times with H2 to 350 PSI, sealing the reactor after the fourth pressurization. The reaction was stirred for 18 h at 22° C., vented, and the solution filtered through Celite while rinsing the Celite pad with MeOH (5 mL). The filtrate was collected and concentrated in vacuo to give the product as a brown solid that was stored under nitrogen at −10° C. (0.69 g, 99% yield). $^{1}$H NMR (500 MHz, $CDCl_3$): δ 6.59 (s, 2H), 3.37 (s, 4H), 2.21 (s, 6H). $^{13}$C NMR (125 MHz, $CDCl_3$): δ 132.67, 121.43, 120.94, 17.51. HRMS (DART-MS): m/z calculated for $C_8H_{13}N_2$ [M+H]+ 137.1073, found 137.1077.

Cocatalyst Syntheses.
1-Butyl-4-dimethylaminopyridinium bromide ([DMAP]Br)

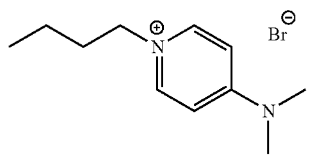

A solution of 4-dimethylaminopyridine (1.32 g, 10 mmol, 1.0 equiv) and 1-bromobutane (1.51 g, 11.0 mmol, 1.1 equiv) in PhMe (10 mL) was prepared in a 20 mL scintillation vial containing stir bar and the mixture heated at 90° C. for 18 h. The heterogeneous reaction mixture was then cooled to 22° C. and the solids isolated by vacuum filtration, followed by rinsing with PhMe (10 mL) and hexanes (20 mL). The resulting solids were dried in vacuo to afford the product as a white powder (2.40 g, 92% yield). $^{1}$H NMR (500 MHz, $CDCl_3$) δ 8.53-8.46 (m, 2H), 7.03-6.95 (m, 2H), 4.29 (t, J=7.3 Hz, 2H), 3.21 (s, 6H), 1.80 (p, J=7.5 Hz, 2H), 1.29 (sx, J=7.4 Hz, 2H), 0.86 (t, J=7.4 Hz, 3H). $^{13}$C NMR (125 MHz, $CDCl_3$): δ 156.19, 142.54, 108.40, 57.90, 40.53, 33.05, 19.30, 13.56. HRMS-ESI: m/z calculated for $C_{11}H_{19}N_2$ $[M]^{\cdot+}$ 179.15428, found 179.15503. Characterization data were consistent with literature reports.

Butyltriphenylphosphonium bromide ($[PPh_3]$Br)

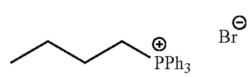

A solution of triphenylphosphine (2.62 g, 10.0 mmol, 1.0 equiv) 1-bromobutane (1.51 g, 11.0 mmol, 1.1 equiv) in PhMe (10 mL) was prepared in a 20 mL scintillation vial containing stir bar and the mixture heated at 90° C. for 18 h. The heterogeneous reaction mixture was cooled to 22° C. and the solids isolated by vacuum filtration, followed by rinsing with PhMe (10 mL) and hexanes (20 mL). The resulting solids were dried in vacuo to afford the product as a white powder (2.40 g, 92% yield). $^{1}$H NMR (500 MHz, CDCl3): δ 7.86-7.72 (m, 9H), 7.70-7.64 (m, 6H), 3.78-3.65 (m, 2H), 1.70-1.46 (m, 4H), 0.86 (t, J=7.2 Hz, 3H). $^{13}$C NMR (125 MHz, $CDCl_3$): δ 135.09, 135.06, 133.73, 133.65, 130.61, 130.51, 118.71, 118.03, 24.69, 24.65, 23.85, 23.72, 22.90, 22.50, 13.83. HRMS-ESI: m/z calculated for $C_{22}H_{24}P$ $[M]^{\cdot+}$ 319.16101, found 319.16230. Characterization data were consistent with previous literature reports.

Pentachlorocyclopropane (S20)

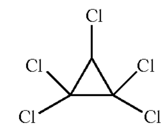

A 2 L 3-neck round-bottom flask fitted with reflux condenser was charged with sodium trichloroacetate (300 g, 1.00 eq, 1.62 mol), trichloroethylene (500 mL, 3.44 eq, 5.56 mol), and dimethoxyethane (145 mL) and the reaction mixture heated to reflux at 90° C. for three days. The dark brown heterogeneous mixture was cooled to 0° C. and then filtered. The isolated precipitate was dissolved in $H_2O$ (1 L) and extracted with DCM (3×150 mL). The organic extracts were combined with the filtrate, dried over magnesium sulfate, filtered, and concentrated in vacuo to give a crude oil. The product was isolated by vacuum distillation (60 g, 17% yield). $^{1}$H NMR (500 MHz, $CDCl_3$): δ 3.91 (s, 1H). $^{13}$C NMR (125 MHz, $CDCl_3$): δ 66.42, 51.67. Characterization data were consistent with literature reports.

2,3-Bis(dicyclohexylamino)-1-chlorocyclopropenium chloride (S21)

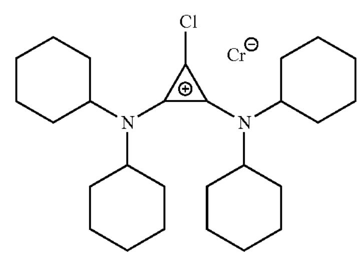

Dicyclohexylamine (64.0 mL, 322 mmol, 6.0 equiv) was added dropwise over 30 min via addition funnel to a stirred solution of pentachlorocyclopropane (S20) (11.50 g, 53.7 mmol, 1.0 equiv) in DCM (500 mL) at 0° C. The reaction mixture was stirred at 22° C. for 48 h, followed by addition of 12 M HCl (2.0 mL). The amine salts were removed by vacuum filtration, rinsed with DCM (100 mL), and the combined filtrates transferred to a separatory funnel and washed with 1.0 M HCl (5×400 mL) and brine (1×400 mL). The organic layer was dried over $MgSO_4$, filtered, and concentrated in vacuo to give a tan-colored solid. The crude solid was then suspended in EtOAc (150 mL) and stirred at 50° C. for 30 min, followed by filtering the hot solution by vacuum filtration. The isolated solids were rinsed with EtOAc (50 mL) and dried in vacuo to give the product as a white solid (18.98 g, 76% yield). $^{1}$H NMR (500 MHz, $CDCl_3$): δ 3.63 (tt, J=12.1, 3.5 Hz, 2H), 3.38 (tt, J=12.4, 3.8 Hz, 2H), 2.05 (d, J=11.3 Hz, 4H), 1.96-1.80 (m, 12H), 1.69 (d, J=13.1 Hz, 4H), 1.63-1.44 (m, 8H), 1.31 (ddt, J=26.3, 13.1, 8.2 Hz, 8H), 1.15 (m, 4H). $^{13}$C NMR (125 MHz, $CDCl_3$): δ 132.68, 93.72, 66.08, 57.15, 33.04, 31.14, 25.80, 25.62, 24.92, 24.80. HRMS (DART-MS): m/z calculated for $C_{27}H_{44}ClN_2$ [M].+431.31875, found 431.31973. Characterization data were consistent with literature reports.

Tris(cyclohexylmethyl)cyclopropenium chloride ([CyPr]Cl)

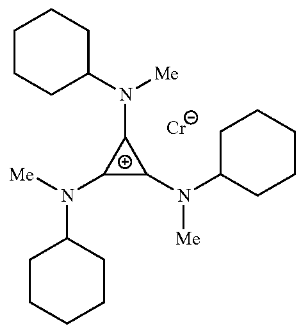

N-Methylcyclohexylamine (23.5 mL, 180 mmol, 9.0 equiv) was added dropwise over 10 min via syringe to a stirred solution of pentachlorocyclopropane (S20) (4.29 g, 20.0 mmol, 1.0 equiv) in DCM (150 mL) at 0° C. The reaction mixture was then stirred at 22° C. for 18 h, followed by removal of the solvent in vacuo to give a light orange solid that was taken up in 1.0 M HCl (100 mL). The aqueous mixture was extracted with DCM (3×75 mL) and the combined organic extracts washed vigorously with 1.0 M HCl (2×100 mL), brine (1×100 mL), and dried over Na2$SO_4$. The solvent was removed in vacuo, and the crude solid was suspended in EtOAc (85 mL) and stirred at 50° C. for 30 min, followed by vacuum filtering the hot solution. The isolated solids were rinsed with EtOAc (15 mL) and dried in vacuo to give the product as a white solid (5.06 g, 62% yield). $^1$H NMR (500 MHz, $CDCl_3$): δ 3.24 (tt, J=11.8, 3.2 Hz, 3H), 2.99 (s, 9H), 1.91-1.71 (m, 12H), 1.69-1.56 (m, 3H), 1.49 (qd, J=12.6, 3.5 Hz, 6H), 1.21 (qt, J=13.2, 3.4 Hz, 6H), 1.07 (qt, J=13.1, 3.5 Hz, 3H). $^{13}$C NMR (125 MHz, $CDCl_3$): δ 117.01, 63.16, 34.19, 30.92, 30.29, 25.57, 24.83. HRMS (DART-MS): m/z calculated for $C_{24}H_{42}N_3$ [M].+ 372.33732, found 372.33869.

Ligand Synthesis and Tethering Reactions. N, N'-Bis(3,5-di-tert-butylsalicylidene)-1,2-diaminobenzene (1)

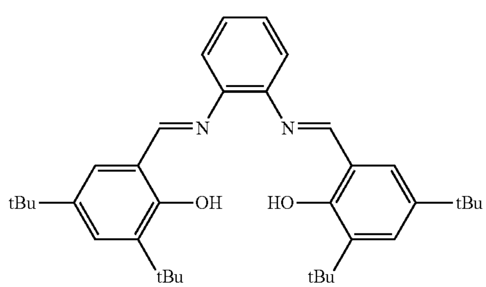 [SMILES: CC(C)(C)c1cc(/C=N/c2ccccc2/N=C/c2cc(C(C)(C)C)cc(C(C)(C)C)c2O)c(O)c(C(C)(C)C)c1]

Phenylenediamine (0.100 g, 0.92 mmol, 1 equiv) and 3,5-ditert-butylsalicylaldehyde (0.455 g, 1.94 mmol, 2.1 equiv) were stirred in MeOH (8 mL) at reflux for 18 h. Upon cooling to 22° C., 1 precipitated as a bright yellow powder which was isolated by filtration (0.342 g, 68% yield). $^1$H NMR (500 MHz, $CDCl_3$): δ 13.54 (s, 2H), 8.67 (s, 2H), 7.45 (d, J=2.4 Hz, 2H), 7.32 (dd, J=5.9, 3.4 Hz, 2H), 7.24 (dd, J=5.9, 3.4 Hz, 2H), 7.22 (d, J=2.4 Hz, 2H), 1.45 (s, 18H), 1.33 (s, 18H). $^{13}$C NMR (125 MHz, $CDCl_3$): δ 164.85, 158.71, 142.90, 140.44, 137.33, 128.31, 127.44, 126.91, 119.94, 118.49, 35.27, 34.31, 31.62, 29.58. HRMS (DART-MS): m/z calculated for $C_{36}H_{48}N_2O_2$ [M].+540.3716, found 540.371559. Characterization data were consistent with literature reports.

N'-Bis(3,5-di-tert-butylsalicylidene)-3,6-dimethyl-1, 2-diaminobenzene(3)

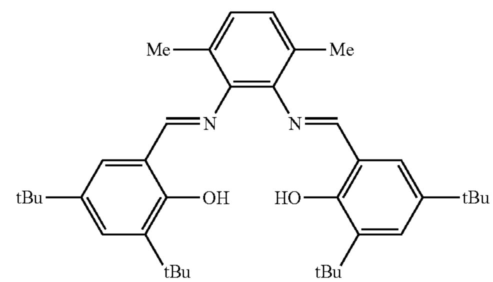 [SMILES: Cc1ccc(C)c(/N=C/c2cc(C(C)(C)C)cc(C(C)(C)C)c2O)c1/N=C/c1cc(C(C)(C)C)cc(C(C)(C)C)c1O]

A solution of S19 (0.70 g, 5.1 mmol, 1.0 equiv) and 3,5-ditert-butyl salicylaldehyde (2.47 g, 10.5 mmol, 2.05 equiv) in methanol (30 mL) was heated at 60° C. for 18 h under a nitrogen atmosphere. The reaction mixture was subsequently cooled to 0° C. using an ice bath and the bright orange solids isolated by vacuum filtration, rinsed with cold methanol (5 mL), and dried in vacuo to give the product as an orange solid (2.20 g, 75% yield). $^1$H NMR (500 MHz, $CDCl_3$): δ 13.38 (s, 2H), 8.45 (s, 2H), 7.39 (d, J=2.2 Hz, 2H), 7.06 (d, J=2.3 Hz, 2H), 7.02 (s, 2H), 2.28 (s, 6H), 1.41 (s, 18H), 1.27 (s, 18H). $^{13}$C NMR (125 MHz, $CDCl_3$): δ 169.02, 158.49, 140.39, 136.99, 128.17, 127.17, 126.85, 117.98, 35.18, 34.23, 31.54, 29.57, 18.77. HRMS (DART-MS): m/z calculated for $C_{38}H_{52}N_2O_2$ [M].+568.4029, found 568.4032.

N, N'-Bis(3,5-di-tert-butylsalicylidene)-trans-1,2-diaminocyclopentane (5)

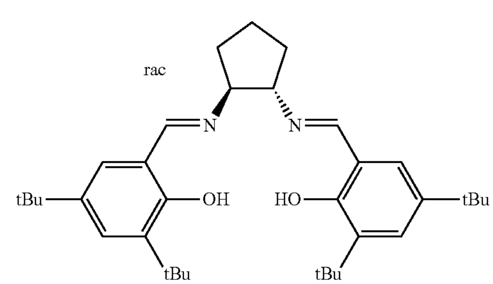 [SMILES: CC(C)(C)c1cc(/C=N/[C@H]2CCC[C@@H]2/N=C/c2cc(C(C)(C)C)cc(C(C)(C)C)c2O)c(O)c(C(C)(C)C)c1]

A solution of trans-cyclopentane-1,2-diamine dihydrochloride (75.0 mg, 0.433 mmol, 1 equiv) and $K_2CO_3$ (225 mg, 1.62 mmol, 3.75 equiv) in MeOH (5 mL) was stirred at 22° C. for 5 min. 3,5-Di-tert-butyl salicylaldehyde (213 mg, 0.909 mmol, 2.1 equiv) was added, and the resulting mixture stirred at 60° C. for 18 h. Upon cooling to 22° C., the product was isolated as an off-white powder by filtration (176 mg, 76% yield). $^{1}H$ NMR (500 MHz, $CDCl_3$): δ 13.77 (s, 2H), 8.41 (s, 2H), 7.45 (d, J=2.4 Hz, 2H), 7.13 (d, J=2.4 Hz, 2H), 3.83 (m, 2H), 2.28 (m, 2H), 2.13-1.95 (m, 4H), 1.55 (s, 18H), 1.36 (s, 18H). $^{13}C$ NMR (125 MHz, $CDCl_3$): δ 165.84, 158.09, 140.19, 136.62, 127.00, 126.24, 117.94, 76.67, 35.16, 34.24, 33.33, 31.63, 29.63, 22.28. HRMS (DART-MS): m/z calculated for $C_{35}H_{52}N_2O_2$ [M].+ 532.4029, found 532.404738. Characterization data were consistent with literature reports.

N, N'-Bis(3,5-di-tert-butylsalicylidene)-4-N-methyl-methanamine-1,2-diaminobenzene (S22).

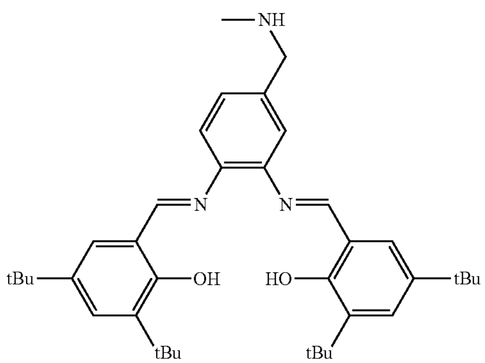 [SMILES: CNCc1ccc(/N=C/c2cc(C(C)(C)C)cc(C(C)(C)C)c2O)c(/N=C/c2cc(C(C)(C)C)cc(C(C)(C)C)c2O)c1]

To a solution of 4-N-methyl-methanamine-1,2-diamino-benzene (B1) (3.50 g, 23.1 mmol, 1.0 equiv) inMeOH (150 mL) was added 3,5-di-tert-butylsalicylaldehyde (10.9 g, 46.3 mmol, 2.0 equiv). The red-brown reaction mixture was heated at 40° C. for 18 h, resulting in precipitation of an orange-colored solid. Upon cooling to 22° C., the resulting solids were isolated by filtration, washed with cold MeOH (5 mL), and dried for 18 h in vacuo at 22° C. to give the product as a dark yellow powder (12.10 g, 90% yield). $^{1}H$ NMR (500 MHz, $CDCl_3$): δ 13.57 (s, 1H), 13.55 (s, 1H), 8.70 (s, 1H), 8.67 (s, 1H), 7.46-7.42 (m, 2H), 7.28-7.19 (m, 5H), 3.83 (s, 2H), 2.52 (s, 3H), 1.44 (s, 18H), 1.32 (s, 18H). $^{13}C$ NMR (125 MHz, $CDCl_3$): δ 164.79, 164.50, 158.72, 158.69, 142.82, 141.71, 140.41, 139.77, 137.30, 137.28, 128.28, 128.23, 127.13, 126.97, 126.86, 119.81, 119.54, 118.52, 118.51, 55.80, 36.32, 35.26, 34.31, 31.62, 29.58. HRMS (DART-MS): m/z calculated for $C_{38}H_{53}N_3O_2$ 583.4138, found 583.4089.

N, N'-Bis(3,5-di-tert-butylsalicylidene)-3,4-diamino-pyrrolidine(S23)

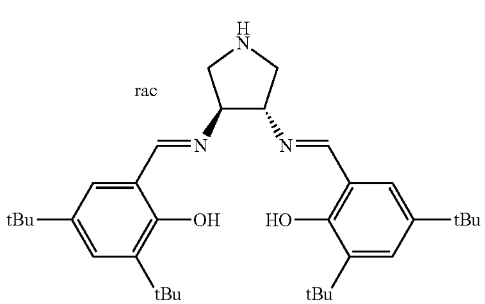 [SMILES: CC(C)(C)c1cc(/C=N/[C@H]2CNC[C@@H]2/N=C/c2cc(C(C)(C)C)cc(C(C)(C)C)c2O)c(O)c(C(C)(C)C)c1]

A solution of trans-3,4-pyrrolidine diamine trihydrochloride (B3) (0.60 g, 2.85 mmol, 1.00 equiv) and K2CO3 (1.18 g, 8.55 mmol, 3.00 equiv) in H2O (2.5 mL) and EtOH (25 mL) was first prepared in a 100 mL round-bottom flask and stirred for 5 min at 22° C. 3,5-Di-tert-butylsalicyladlehyde (1.37 g, 5.84 mmol, 2.05 equiv) was added and the mixture heated at reflux (90° C.) for 4 h. The reaction was then cooled to 22° C., concentrated in vacuo, diluted with brine (60 mL), and extracted with DCM (3×60 mL). The organic extracts were combined, dried over $Na2SO_4$, and concentrated in vacuo to give an orange solid that was further purified by column chromatography using a gradient of 90:10 (v:v) hexanes:EtOAc to 90:10 (v:v) $CH_2Cl_2$:MeOH, affording the product as a microcrystalline orange solid (1.01 g, 66% yield). $^{1}H$ NMR (500 MHz, $CDCl_3$): δ 13.37 (s, 2H), 8.34 (s, 2H), 7.39 (s, 2H), 7.06 (s, 2H), 3.90 (p, J=4.2 Hz, 2H), 3.52 (dd, J=11.8, 6.2 Hz, 2H), 3.18 (dd, J=12.0, 5.1 Hz, 2H), 2.33 (s, 1H), 1.45 (s, 19H), 1.28 (s, 19H). $^{13}C$ NMR (125 MHz, $CDCl_3$): δ 166.49, 157.91, 140.52, 136.78, 127.41, 126.37, 117.78, 78.00, 54.89, 35.18, 34.28, 31.60, 29.58. HRMS (DART-MS): m/z calculated for $C_{34}H_{51}N_3O_2$ [M].+533.3981, found 533.3917. Characterization data were consistent with literature reports.

Aminocyclopropenium Ligand (2a)

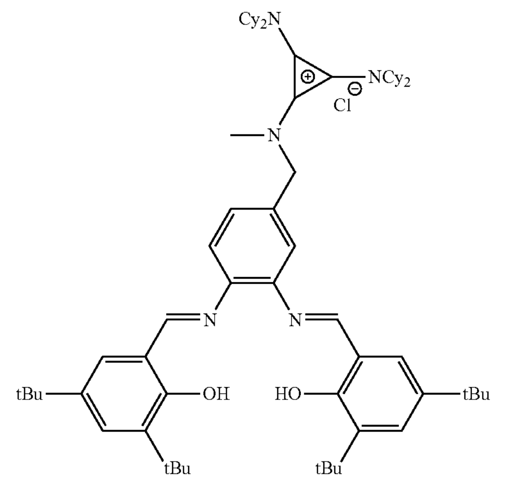

2,3-Bis(dicyclohexylamino)-1-chlorocyclopropenium chloride (S21) (0.90 g, 1.92 mmol, 1.05 equiv) and dry triethylamine (0.51 mL, 3.67 mmol, 2.0 equiv) were added sequentially to a solution of ligand S22 (1.07 g, 1.83 mmol, 1.0 equiv) in CHCl3 (8.0 mL) in a 20 mL vial containing a stir bar. The vial was capped and stirred for 18 h at 22° C. before concentrating in vacuo. The residue was taken up in a 4:1 (v:v) mixture of $Et_2O$ and CH2Cl2 (50 mL) and stirred for 3 h at 22° C. before removal of the precipitated amine salts by syringe filtration through a 0.45 m syringe filter. The filtered solution was concentrated in vacuo and the residue triturated with hexanes (4×15 mL). The resulting orange solids were dried in vacuo (1.80 g, 97% yield). $^{1}H$ NMR (500 MHz, $CDCl_3$): δ 13.42 (s, 1H), 13.42 (s, 1H), 8.69 (s, 1H), 8.66 (s, 1H), 7.43 (t, J=2.6 Hz, 3H), 7.34 (d, J=8.2 Hz, 1H), 7.28 (d, J=8.1 Hz, 1H), 7.22 (dd, J=3.9, 2.5 Hz, 2H), 7.17 (s, 1H), 5.03 (s, 2H), 3.39 (tt, J=12.4, 3.5 Hz, 4H), 3.36 (s, 3H), 1.94-1.80 (m, 16H), 1.70-1.58 (m, 12H), 1.42 (s, 9H), 1.40 (s, 9H), 1.34-1.20 (m, 26H), 1.09 (q, J=13.2 Hz, 4H). $^{13}C$ NMR (125 MHz, $CDCl_3$): δ 165.80, 165.10, 158.64, 143.33, 142.24, 140.69, 140.64, 137.25, 137.22, 134.57, 128.60, 128.53, 127.12, 127.04, 125.96, 120.65, 120.07, 119.23, 118.39, 118.33, 118.30, 60.88, 57.77, 40.26, 35.21, 34.29, 33.17, 32.31, 31.56, 29.53, 26.39, 25.81, 24.76. HRMS-ESI: m/z calculated for $C_{65}H_{96}N_5O_2$ [M].+ 978.75585, found 978.75585.

Aminocyclopropenium Ligand (6)

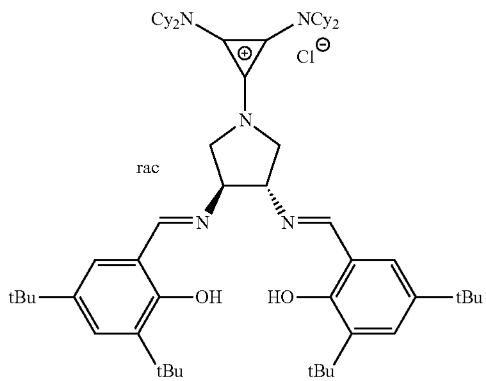

2,3-Bis(dicyclohexylamino)-1-chlorocyclopropenium chloride (S21) (1.62 g, 3.5 mmol, 1.05 equiv) and dry triethylamine (0.92 mL, 6.6 mmol, 2.0 equiv) were added sequentially to a solution of ligand S23 (1.07 g, 1.83 mmol, 1.0 equiv) in CHCl3 (8.0 mL) in a 20 mL vial containing a stir bar. The vial was capped and stirred for 18 h at 22° C., after which the solvent was removed in vacuo. The crude product was taken up into 9:1 (v:v) mixture of $Et_2O$:EtOAc (50 mL) and stirred at 22° C. for 1 h before removal of the precipitated amine salts by syringe filtration through a 0.45 m syringe filter. The filtrate was collected, washed with 0.1 M HCl (1×15 mL), $H_2O$ (1×15 mL), brine (1×15 mL), and the organic layer dried over $Na2SO_4$. The solvent was removed in vacuo, affording the product as a microcrystalline orange solid (3.09 g, 97% yield). $^1$H NMR (500 MHz, $CDCl_3$): δ 12.85 (s, 2H), 8.64 (s, 2H), 7.39 (d, J=2.2 Hz, 2H), 7.15 (d, J=2.3 Hz, 2H), 4.47 (dd, J=8.8, 4.5 Hz, 2H), 4.25 (s, 2H), 3.96-3.86 (m, 2H), 3.42-3.28 (m, 4H), 2.00-1.80 (m, 16H), 1.74-1.57 (m, 12H), 1.40 (s, 18H), 1.37-1.29 (b, 8H), 1.28-1.22 (s, 18H), 1.20-1.11 (m, 4H). $^{13}$C NMR (125 MHz, $CDCl_3$): δ 169.27, 157.88, 140.90, 136.67, 128.17, 127.17, 118.16, 117.54, 115.76, 72.96, 60.47, 57.18, 35.09, 34.25, 33.13, 31.88, 31.51, 29.46, 26.36, 25.71, 24.77, 22.76, 14.19. HRMS-ESI: m/z calculated for $C_{61}H_{94}N_5O_2$ [M].+928.74020, found 928.74026.

One-Pot Condensation and Tethering Procedure. In a 20 mL vial containing 3 Å molecular sieves and a stir bar, a solution of 4-N-methylmethanamine-1,2-diaminobenzene and the appropriate salicylaldehyde in $CHCl_3$ was stirred at 22° C. for 24 h. 2,3-Bis(dicyclohexylamino)-1-chlorocyclopropenium chloride and triethylamine were added and the reaction mixture stirred for an additional 24 h at 22° C. The reaction mixture was S30 concentrated in vacuo and a 2:1 mixture of PhMe:hex was added. The resulting suspension was stirred at 22° C. for 1 h and then centrifuged to remove solids, followed by filtering through a 0.45 μm syringe filter and concentrating. Dry hexanes was added to the resulting solid, and the mixture sonicated to afford an orange powder that was isolated by filtration, washed with hexanes, and dried in vacuo at 22° C. for 18 h.

Aminocyclopropenium Ligand (2b)

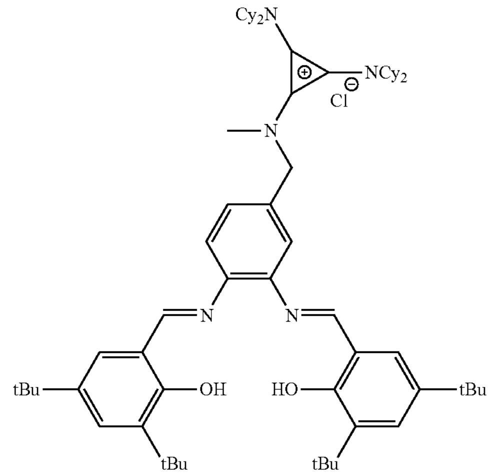

Synthesized from B1 and S3 according to the general procedure detailed above. (220 mg, 24% yield). $^1$H NMR (500 MHz, $CDCl_3$): δ 13.50 (s, 1H), 13.42 (s, 1H), 8.90 (s, 1H), 8.61 (s, 1H), 7.55 (s, 1H), 7.31 (s, 2H), 7.08 (qd, J=10.3, 8.8, 3.0 Hz, 4H), 6.95 (dd, J=7.7, 3.0 Hz, 1H), 4.98 (s, 2H), 3.41-3.33 (m, 4H), 3.31 (s, 3H), 1.92-1.78 (m, 16H), 1.66-1.56 (m, 12H), 1.38 (s, 9H), 1.37 (s, 9H), 1.30-1.17 (m, 8H), 1.05 (q, J=13.0 Hz, 4H). $^{13}$C NMR (125 MHz, $CDCl_3$): δ 164.83, 163.88, 157.10, 157.02, 155.99, 154.13, 142.51, 141.90, 140.17, 140.13, 139.92, 139.87, 134.99, 126.13, 120.64, 119.57, 118.74, 118.68, 118.57, 118.52, 118.37, 118.32, 115.51, 115.33, 115.04, 114.86, 77.37, 60.83, 40.07, 35.18, 35.14, 33.11, 32.24, 29.16, 26.34, 25.76, 24.70. HRMS-ESI: m/z calculated for $C_{57}H_{78}F_2N_5O_2$ [M].+ 902.61181, found 902.61199.

Aminocyclopropenium Ligand (2c)

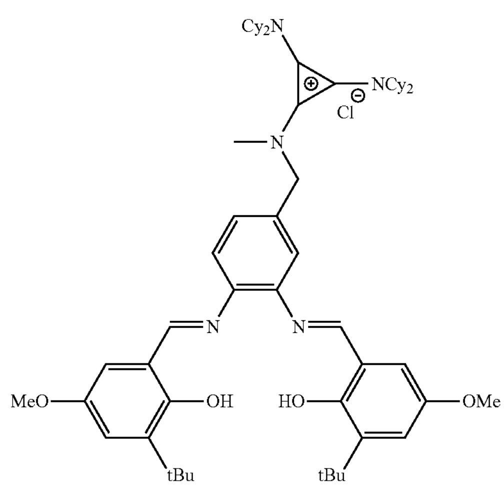

Synthesized from B1 and S4 according to the general procedure detailed above (590 mg, 82% yield). $^1$H NMR (500 MHz, $CDCl_3$): δ 13.29 (s, 1H), 13.26 (s, 1H), 8.79 (s, 1H), 8.65 (s, 1H), 7.34 (s, 1H), 7.31 (d, J=8.1 Hz, 1H), 7.27 (s, 1H), 6.99 (s, 2H), 6.81 (d, J=2.8 Hz, 1H), 6.73 (d, J=2.9 Hz, 1H), 4.96 (s, 2H), 3.75 (s, 6H), 3.35 (t, J=12.1 Hz, 4H), 3.30 (s, 3H), 1.89-1.78 (m, 16H), 1.66-1.56 (m, 12H), 1.37 (s, 18H), 1.28-1.18 (m, 8H), 1.05 (q, J=11.6, 10.2 Hz, 4H). $^{13}$C NMR (125 MHz, $CDCl_3$): δ 165.36, 164.53, 155.59, 155.56, 151.49, 142.86, 142.02, 139.48, 139.35, 134.38, 125.67, 120.72, 120.14, 120.05, 119.77, 119.54, 118.42, 118.38, 118.25, 112.12, 111.91, 65.87, 60.81, 55.92, 55.88, 40.08, 35.07, 33.08, 32.20, 29.28, 26.31, 25.72, 24.65, 15.31. HRMS-ESI: m/z calculated for $C_9H_{84}N_5O_4$ [M].+ 926.65178, found 926.65192.

Aminocyclopropenium Ligand (2d)

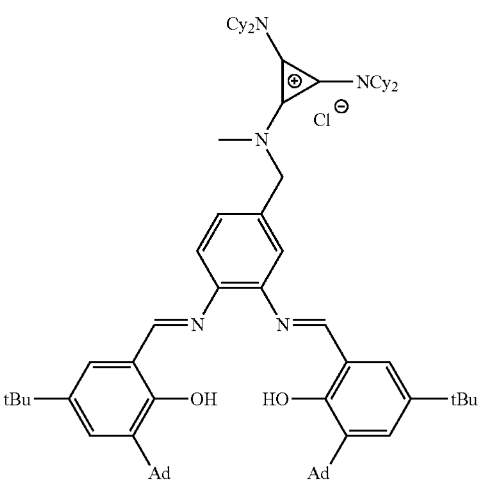

Synthesized from B1 and S5 according to the general procedure detailed above (398 mg, 64% yield). $^1$H NMR (500 MHz, $CDCl_3$): δ 13.26 (s, 1H), 13.26 (s, 1H), 8.60 (s, 1H), 8.60 (s, 1H), 7.36-7.34 (dd, J=2.46, 2.49, 2H), 7.27 (d, J=2.1, 8.1 Hz, 1H), 7.20 (d, J=8.1 Hz, 1H), 7.18 (dd, J=2.44, 2.45, 2H), 7.04 (d, J=2.1, 1H), 4.93 (s, 2H), 3.39-3.32 (m, 4H), 3.30 (s, 3H), 2.15-2.08 (m, 12H), 2.02-1.96 (m, 6H), 1.89-1.79 m, 16H), 1.76-1.68 (m, 12H), 1.65-1.57 (m, 12H), 1.27 (s, 9H), 1.26 (s, 9H), 1.25-1.20 (m, 8H), 1.09-1.04 (q, J=9.78, 4H). $^{13}$C NMR (125 MHz, $CDCl_3$): δ 166.21, 165.51, 158.66, 143.43, 142.26, 140.72, 140.65, 137.30, 134.42, 128.50, 128.46, 126.94, 126.87, 126.81, 120.81, 120.05, 119.18, 118.31, 118.25, 118.13, 117.51, 60.74, 40.18, 37.26, 37.11, 34.21, 33.03, 32.18, 31.43, 29.07, 26.26, 25.69, 24.64. HRMS-ESI: m/z calculated for $C_{77}H_{108}N_5O_2$ [M].+1134.84975, found 1134.85052.

Aminocyclopropenium Ligand (2e)

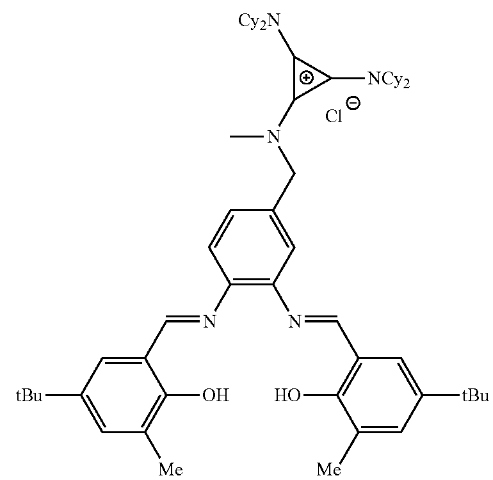

Synthesized from B1 and S6 according to the general procedure detailed above (277 mg, 30% yield). $^1$H NMR (500 MHz, $CDCl_3$): δ 12.92 (s, 1H), 12.87 (s, 1H), 8.69 (s, 1H), 8.66 (s, 1H), 7.39-7.34 (m, 1H), 7.28 (d, J=3.7 Hz, 3H), 7.24 (d, J=2.3 Hz, 1H), 7.22 (d, J=2.3 Hz, 1H), 7.17 (d, 1H), 5.05 (s, 2H), 3.44-3.37 (m, 4H), 3.37 (s, 3H), 2.28 (s, 3H), 2.26 (s, 3H), 1.88 (t, J=27.3 Hz, 16H), 1.70-1.58 (m, 12H), 1.34-1.24 (m, 26H), 1.09 (q, J=11.8, 10.3 Hz, 4H). $^{13}$C NMR (125 MHz, $CDCl_3$): δ 165.90, 165.00, 157.53, 143.20, 142.02, 141.41, 141.36, 134.71, 132.39, 132.37, 126.83, 126.66, 126.12, 125.86, 125.79, 121.18, 119.89, 118.30, 117.86, 117.82, 60.90, 40.27, 34.07, 32.35, 31.57, 25.84, 24.79, 15.93. HRMS-ESI: m/z calculated for $C_9H_{84}N_5O_2$ [M].+895.66531, found 895.66502.

Aminocyclopropenium Ligand (4)

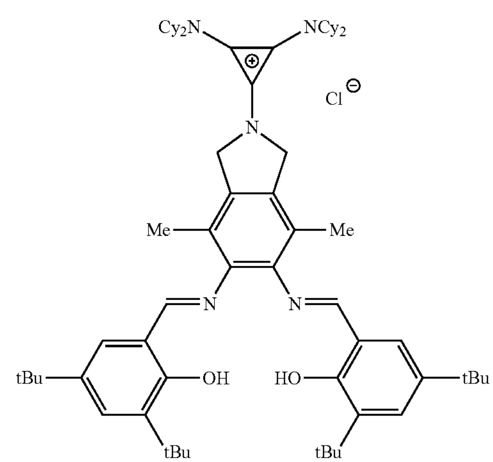

In a glove box, an oven dried 10 mL round bottomed flask containing a stir bar was charged with 4,7-dimethyl-5,6-diaminoisoindoline (B2) (0.125 g, 0.71 mmol, 1.0 equiv),3, 5-di-tert-butylsalicylaldehyde (0.331 g, 1.4 mmol, 2.0 equiv), 3 Å molecular sieves (0.4 g), and dry CHCl3 (3.5 mL). The flask was fitted with a rubber septum and stirred for 24 h at 22° C. upon which a solution of 2,3-is(dicyclohexylamino)-1-chlorocyclopropenium chloride (0.346 g, 0.74 mmol, 1.05 equiv) and dry triethylamine (0.20 mL, 1.4 mmol, 2.0 equiv) in dry $CHCl_3$ (3.5 mL) was added to the reaction mixture via syringe. The dark orange mixture was stirred for 18 h at 22° C. to give a mixture of atropisomers that were isomerized into one species by heating the reaction mixture at 60° C. for 30 min, followed by cooling to 22° C. The mixture was then filtered through a 0.45 m syringe filter and concentrated in vacuo. The resulting solid was taken up into a 1:1 (v:v) mixture of PhMe:$Et_2O$ (15 mL), followed by stirring the suspension at 22° C. for 1 h to promote precipitation of residual salts. The solution was filtered through a 0.45 m syringe filter and the solvent removed before azeotroping the resulting solid with PhMe (2×10 mL) to remove residual triethylamine. After drying for 18 h in vacuo at 22° C. the product was obtained as an orange powder (0.70 g, 96% yield). $^1$H NMR (500 MHz, $CDCl_3$): δ 13.11 (s, 2H), 8.40 (s, 2H), 7.38 (d, J=2.2 Hz, 2H), 7.05 (d, J=2.2 Hz, 2H), 5.24 (s, 4H), 3.50 (tt, J=12.2, 3.5 Hz, 4H), 2.18 (s, 6H), 1.96 (d, J=11.3 Hz, 16H), 1.83 (d, J=12.1 Hz, 2H), 1.78-1.68 (m, 16H), 1.66-1.59 (m, 4H), 1.44-1.38 (m, 2H), 1.36 (s, 18H), 1.24 (s, 18H). $^{13}$C NMR (125 MHz, $CDCl_3$): δ 169.81, 158.41, 141.02, 140.60, 136.98, 131.20, 128.50, 127.04, 121.88, 117.80, 117.63, 117.18, 116.03, 60.72, 58.45, 58.34, 35.13, 34.21, 33.17, 31.89, 31.48, 29.50, 26.40, 25.93, 25.32, 24.88, 15.49. HRMS-ESI m/z calculated for $C_{67}H_{98}N_5O_2$ [M].+1004.77150, found 1004.77166.

Metalations. General Aluminum Metalation. In a glove box, salen ligand was dissolved in dry, degassed PhMe in an oven-dried Schlenk flask equipped with stir bar. A 1 M solution of $Et_2AlC1$ was added while stirring for 5 min. The flask was then sealed, removed from the glove box, and heated at 90° C. for 18 h. After cooling to 22° C., the resulting solids were filtered and washed with dry, degassed hexanes. If no precipitate formed, the reaction mixture was concentrated in vacuo and dry, degassed hexanes added via cannula. The resulting suspension was sonicated and then filtered to afford the desired complex as a powder. The isolated complexes were dried in vacuo for 18 h at 22° C. before storing in a nitrogen-filled glove box.

Complex 1-AlCl.

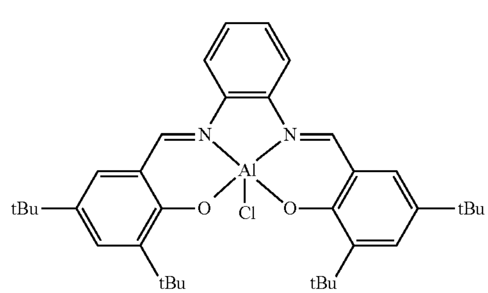

1-AlC1 was prepared according to the general aluminum metalation procedure. The product precipitated as a yellow powder, which was isolated by filtration and washed with dry, degassed hexanes before drying at 22° C. in vacuo (1.40 g, 45% yield). $^1$H NMR (500 MHz, $CDCl_3$): δ 8.96 (s, 2H), 7.75 (dd, J=6.2, 3.4 Hz, 2H), 7.68 (d, J=2.5. 2H), 7.39 (dd, J=6.2, 3.3 Hz, 2H), 7.24 (d, J=2.5, 2H), 1.61 (s, 18H), 1.36 (s, 18H). $^{13}$C NMR (125 MHz, $CDCl_3$): δ 164.33, 162.45, 141.56, 139.67, 137.74, 133.04, 128.21, 128.13, 118.45, 115.40, 35.67, 34.11, 31.25, 29.82. HRMS-ESI: m/z calculated for $C_{36}H_{46}AlN_2O_2$ [M].+565.33747, found 565.33671. Characterization data were consistent with literature reports.

Complex 2a-AlCl

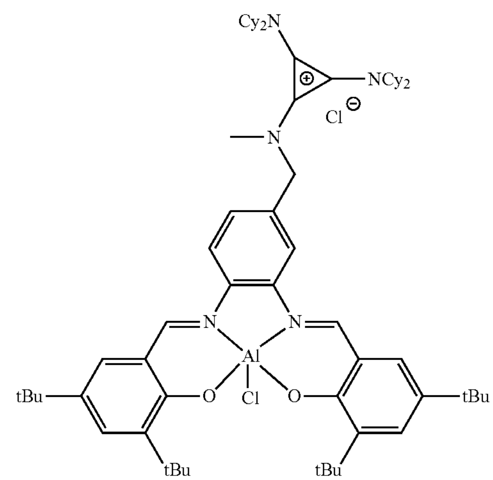

2a-AlC1 was prepared according to the general aluminum metalation procedure. As no precipitate formed, solvent was removed in vacuo to afford a glassy solid which was triturated with 20 mL dry, degassed hexanes and the solids briefly isolated by vacuum filtration. The resulting orangeyellow powder was dried in vacuo for 18 h at 22° C. (2.10 g, 91% yield). $^1$H NMR (500 MHz, $CDCl_3$): δ 9.42 (s, 1H), 9.07 (s, 1H), 8.33 (s, 1H), 7.89 (d, J=8.5 Hz, 1H), 7.64 (d, J=2.1 Hz, 2H), 7.56 (s, 1H), 7.35 (d, J=8.5 Hz, 1H), 7.33 (d, J=1.9 Hz, 1H), 5.07 (s, 2H), 3.42-3.34 (m, 4H), 3.34 (s, 3H), 1.93-1.79 (m, 16H) 1.67-1.59 (m, 12H), 1.58 (s, 18H), 1.34 (s, 9H), 1.33 (s, 9H), 1.24 1.30-1.18 (m, 8H), 1.06 (q, J=12.4, 12.0 Hz, 4H). $^{13}$C NMR (125 MHz, $CDCl_3$): δ 164.50, 164.42, 164.40, 162.81, 141.56, 141.14, 139.81, 139.73, 138.73, 137.60, 135.78, 133.21, 133.09, 129.40, 128.51, 126.09, 119.97, 119.05, 118.71, 118.60, 116.58, 116.27, 60.89, 57.86, 40.28, 35.78, 35.75, 34.31, 34.26, 32.30, 31.46, 31.40, 29.99, 29.96, 25.82, 24.76. HRMS-ESI: m/z calculated for $C_{65}H_{94}AlClN_5O_2$ [M].+1038.69059, found 1038.69174.

Complex 2b-AlCl

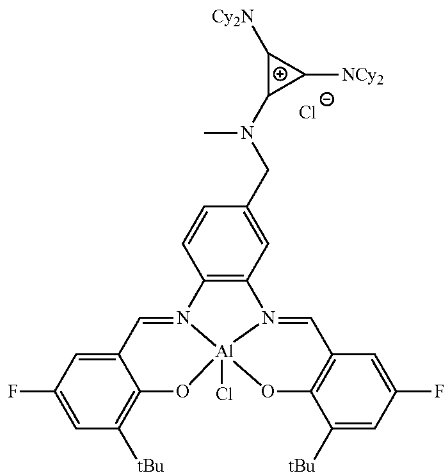

2b-AlC1 was prepared according to the general aluminum metalation procedure. As no precipitate formed, solvent was removed in vacuo to afford a glassy solid, which was triturated with 20 mL dry, degassed hexanes and isolated by filtration. The resulting orange solids were dried in vacuo at 22° C. for 18 h (151 mg, 64% yield). H NMR (500 MHz, $CDCl_3$): δ 10.02 (s, 1H), 9.26 (s, 1H), 8.85 (s, 1H), 8.15-8.04 (m, 1H), 7.68 (d, J=5.9 Hz, 1H), 7.28 (d, J=2.4 Hz, 1H), 7.24 (s, 1H), 4.83 (s, 2H), 3.37-3.30 (m, 4H), 3.30 (s, 3H), 1.84 (dd, J=40.9, 11.6 Hz, 16H), 1.62-1.55 (m, 12H), 1.54 (s, 9H), 1.54 (s, 9H), 1.25-1.13 (m, 8H), 1.02 (q, J=12.7, 12.0 Hz, 4H). $^{13}C$ NMR (125 MHz, $CDCl_3$): δ 165.20, 162.61, 162.45, 162.39, 155.04, 154.99, 153.17, 153.12, 144.44, 144.39, 143.61, 143.56, 138.81, 137.18, 136.23, 129.14, 128.33, 126.55, 125.40, 123.20, 123.07, 123.00, 122.87, 120.06, 119.48, 119.40, 118.85, 118.73, 118.66, 117.61, 117.17, 116.98, 115.83, 115.65, 60.90, 40.26, 35.81, 35.72, 32.33, 29.68, 25.84, 24.80. HRMS-ES: m/z calculated for $C_{57}H_{76}AlClF_2N_5O_2$ [M].+962.54655, found 962.54734.

Complex 2c-AlCl

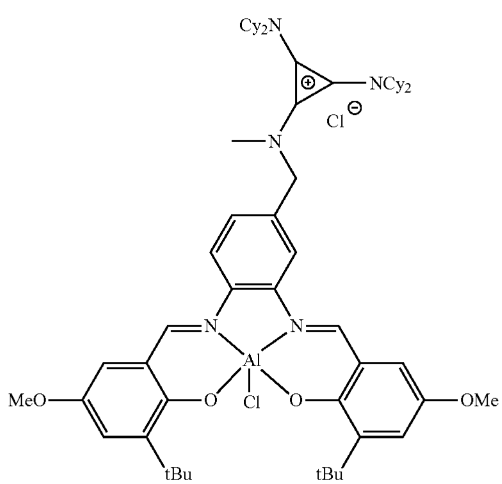

2c-AlC1 was prepared according to the general aluminum metalation procedure. As no precipitate formed, solvent was removed in vacuo to afford a glassy solid which was triturated with 20 mL dry, degassed hexanes and isolated by filtration. The resulting orange solids were dried in vacuo at 22° C. for 18 h (317 mg, 99% yield. H NMR (500 MHz, DMSO-d6): δ 9.33 (d, J=3.7 Hz, 1H), 8.20 (d, J=8.7 Hz, 1H), 8.16 (s, 1H), 7.50 (d, J=8.4 Hz, 1H), 7.15-7.08 (m, 4H), 4.77 (s, 2H), 3.76 (s, 6H), 3.49-3.42 (m, 4H), 3.17 (s, 3H), 1.85-1.74 (m, 16H), 1.73-1.63 (m, 12H), 1.54 (s, 18H), 1.31-1.22 (m, 8H), 1.14-1.06 (m, 4H). $^{13}C$ NMR (125 MHz, DMSO-d6): δ 161.50, 161.27, 160.50, 160.40, 148.96, 141.58, 141.53, 137.74, 136.93, 136.07, 126.44, 123.85, 119.27, 118.54, 118.25, 117.21, 115.63, 113.87, 113.51, 113.38, 59.54, 58.45, 57.10, 55.34, 35.12, 31.29, 31.20, 29.44, 25.14, 24.16, 24.00. HRMS-ESI: m/z calculated for $C_9H_{82}AlClN_5O_4$ [M].+986.58652, found 986.58755.

Complex 2d-AlCl

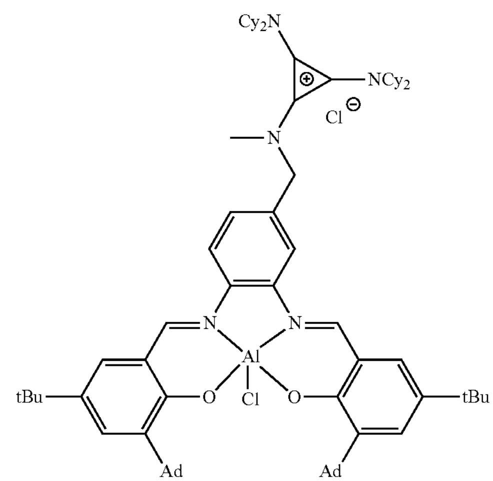

2d-AlC1 was prepared according to the general aluminum metalation procedure. As no precipitate formed, solvent was removed in vacuo to afford a glassy solid which was triturated with 20 mL dry, degassed hexanes and isolated by filtration. The resulting orange solids were dried in vacuo at 22° C. for 18 h (330 mg, 79% yield). $^1H$ NMR (500 MHz, DMSO-d6): δ 9.06 (s, 1H), 8.95 (s, 1H), 7.99-7.97 (d, J=8.5 Hz, 1H), 7.90 (s, 1H), 7.51-7.50 (d, J=2.4 Hz, 2H), 7.47-7.46 (m, 2H), 7.38-7.36 (d, J=2.4 Hz, 1H), 4.77 (s, 2H), 3.51-3.42 (m, 4H), 3.14 (s, 3H), 2.27-2.17 (m, 12H), 2.10-2.04 (m, 6H), 1.84-1.63 (m, 44H), 1.60-1.54 (m, 4H), 1.29 (s, 18H), 1.12-1.07 (m, 4H). $^{13}C$ NMR (125 MHz, DMSO-d6): δ 164.52, 164.25, 164.11, 139.72, 139.57, 138.87, 138.11, 137.57, 137.52, 135.85, 131.41, 131.37, 129.60, 129.27, 126.57, 119.78, 119.58, 119.04, 118.07, 117.48, 115.87, 59.54, 57.07, 40.88, 40.85, 37.38, 36.56, 34.19, 33.73, 33.69, 31.16, 31.12, 28.41, 25.14, 24.16. HRMS-ESI: m/z calculated for C77H106AlClN5O2 $[M]^{\cdot+}$ 1194.78450, found 1194.78608.

Complex 2e-AlCl

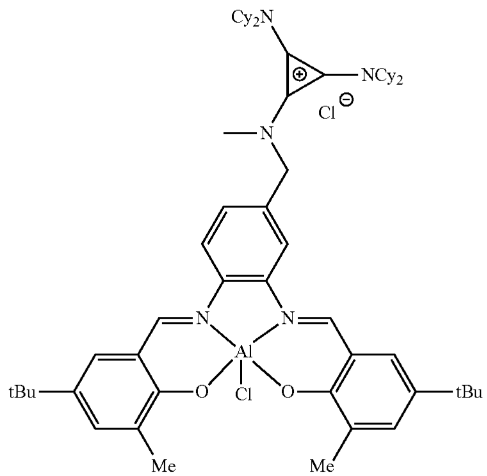

2e-AlC1 was prepared according to the general aluminum metalation procedure. As no precipitate formed, solvent was removed in vacuo to afford a glassy solid which was triturated with 20 mL dry, degassed hexanes and isolated by filtration. The resulting yellow solids were dried in vacuo at 22° C. for 18 h (282 mg, 96% yield). H NMR (500 MHz, DMSO-$d_6$): δ 9.32 (s, 1H), 9.27 (s, 1H), 8.19 (d, J=8.7 Hz, 1H), 8.12 (s, 1H), 7.57-7.56 (m, 1H), 7.57 (d, J=2.8 Hz, 1H), 7.55 (d, J=2.6 Hz, 1H), 7.52 (s, 1H), 7.48-7.45 (m, 2H), 4.75 (s, 2H), 3.45 (t, J=9.1 Hz, 4H), 3.18 (s, 3H), 2.33 (s, 6H), 1.86-1.73 (m, 16H), 1.71-1.62 (m, 12H), 1.31 (s, 18H), 1.29-1.22 (m, 8H), 1.10 (q, J=12.1, 10.4 Hz, 4H). $^{13}$C NMR (125 MHz, DMSO-$d_6$): δ 162.09, 161.90, 161.70, 137.93, 137.84, 137.12, 136.07, 135.02, 134.92, 129.17, 129.02, 128.58, 128.42, 126.49, 119.13, 118.38, 117.73, 117.59, 117.37, 115.64, 59.56, 57.07, 33.62, 31.20, 25.13, 24.16, 16.27. HRMS-ESI: m/z calculated for C59H82AlClN5O2 $[M]^{\cdot+}$ 954.59669, found 954.59763.

Complex 2a-Zn

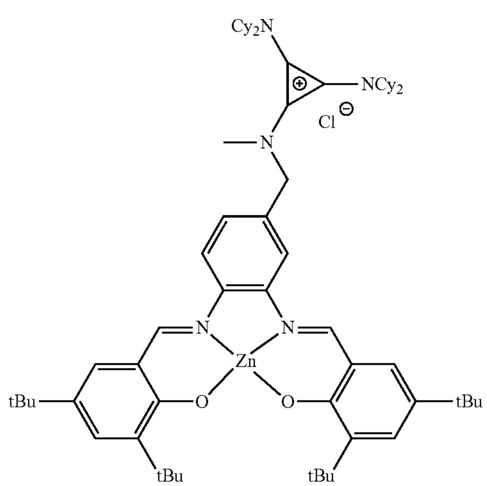

In a glove box, a solution of 2a (0.500 g, 0.49 mmol, 1.0 equiv) in dry PhMe (10 mL) was prepared in an oven-dried Schlenk tube containing a stir bar, followed by the dropwise addition of 2 M $Me_2Zn$ in PhMe (0.26 mL, 0.52 mmol, 1.05 equiv) over 1 min. The mixture was stirred open in the glove box for 10 min, the flask stoppered and removed from the glove box, and the reaction mixture heated at 60° C. for 4 h. Upon cooling to 22° C., dry hexanes (20 mL) was added to the reaction mixture, followed by isolating the resulting solids by vacuum filtration in air. The solids were rinsed with dry hexanes (10 mL) and dried for 18 h in vacuo at 22° C. to give the product as a bright orange solid (0.441 g, 83% yield). $^1$H NMR (500 MHz, $CDCl_3$): δ 8.58 (s, 1H), 8.33 (s, 1H), 7.40 (d, J=8.4 Hz, 1H), 7.30 (dd, J=8.1, 2.5 Hz, 3H), 7.03 (s, 1H), 6.90 (d, J=2.4 Hz, 1H), 6.83 (d, J=2.4 Hz, 1H), 6.78 (d, J=8.1 Hz, 1H), 4.62-4.25 (m, 3H), 3.24 (t, J=12.1 Hz, 6H), 2.97 (s, 3H), 1.74 (t, J=14.3 Hz, 16H), 1.57 (s, 9H), 1.56 (s, 9H), 1.54-1.42 (m, 12H), 1.31 (s, 9H), 1.30 (s, 9H), 1.23-1.10 (m, 8H), 0.99 (q, J=13.0 Hz, 4H). $^{13}$C NMR (125 MHz, $CDCl_3$): δ 172.29, 172.23, 160.66, 160.52, 142.58, 142.43, 141.66, 140.81, 132.39, 132.33, 132.31, 128.48, 128.39, 128.30, 123.08, 119.95, 118.42, 118.30, 118.13, 115.42, 112.60, 60.61, 57.77, 41.13, 35.75, 35.72, 33.79, 33.78, 32.10, 31.57, 31.54, 29.84, 25.63, 24.62. HRMSESI. m/z calculated for $C_{65}H_{94}N_5O_2Zn$ $[M]^{\cdot+}$ 1040.66935, found 1040.66965.

Complex 2a-CrCl

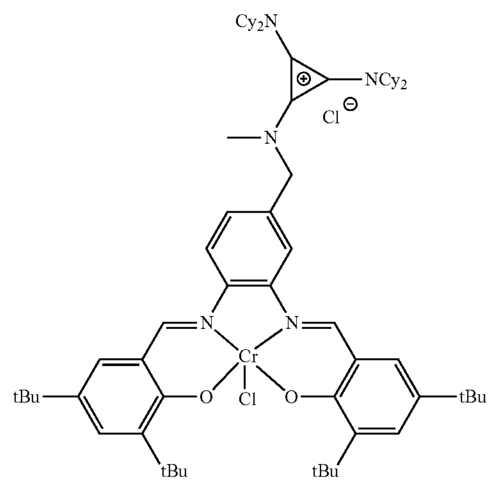

2a (0.400 g, 0.39 mmol, 1.0 equiv) was added to an ovendried Schlenk flask equipped with stir bar against a positive pressure of nitrogen. Dry, degassed THE (5 mL) was added via cannula. In the glove box, a separate Schlenk flask was charged with $CrCl_2$ (51 mg, 0.41 mmol, 1.05 equiv). The sealed flask was brought out of the box, and dry, degassed THF (5 mL) was added via cannula, followed by the ligand solution. The resulting reaction mixture stirred at 40° C. for 3 h and then opened to dry air and stirred for 18 h at 22° C. The resulting bright red solids were isolated by filtration and washed with $Et_2O$. The isolated product was sonicated in pentane, filtered, and dried in vacuo at 55° C. for 6 h (0.258 g, 60% yield). HRMS-ESI m/z calculated for $C_{65}H_{94}ClCrN_5O_2$ [M].+1063.64957, found 1063.65118. Due to the paramagnetic nature of the catalyst, the $^1$H NMR spectrum exhibited significant broadening resulting in peak overlap. Further NMR characterization was not performed.

Complex 2a-MnOAc.

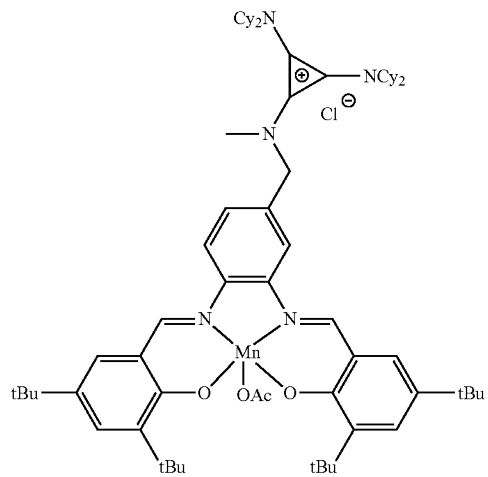

A solution of 2a (0.400 g, 0.39 mmol, 1.0 equiv) and manganese(III) acetate dihydrate (116 mg, 0.43 mmol, 1.1 equiv) was stirred at reflux in EtOH (10 mL) for 2 h before concentrating in vacuo. The resulting brown glassy solids were sonicated in pentane, filtered, and dried in vacuo at 55° C. for 6 h (0.425 g, 94% yield). HRMS-ESI m/z calculated for $C_{65}H_{94}CMnN_5O_2$ [M].+1066.64711, found 1066.64800. The $^1$H NMR spectrum exhibited significant broadening and was paramagnetically shifted. Further NMR characterization was not performed due to the paramagnetic nature of the catalyst.

Complex 2a-FeCl

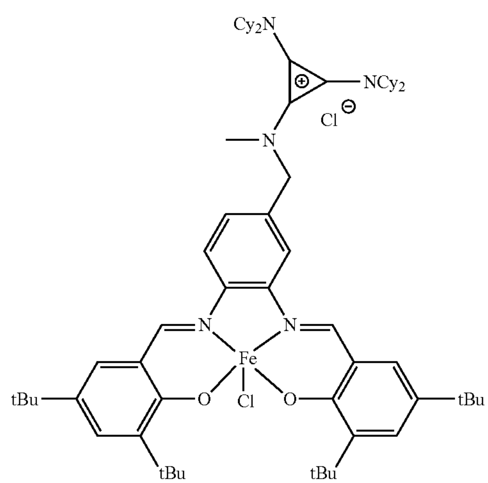

A solution of 2a (0.400 g, 0.39 mmol, 1.0 equiv) and iron(III) chloride hexahydrate (116 mg, 0.43 mmol, 1.1 equiv) was stirred in MeOH (5 mL) at reflux for 2 h. The resulting brown solids were isolated by filtration through Celite while washing with methanol. The green filtrate was concentrated, triturated with pentane, and filtered to afford a brown powder that was dried in vacuo at 55° C. for 6 h (0.117 g, 27% yield). HRMS-ESI. m/z calculated for $C_{65}H_{94}ClFeN_5O_2$ $[M]^{\cdot+}$ 1067.64400, found 1067.64516. The $^1$H NMR spectrum exhibited significant broadening and was paramagnetically shifted. Further NMR characterization was not performed due to the paramagnetic nature of the catalyst.

Complex 2a-Co

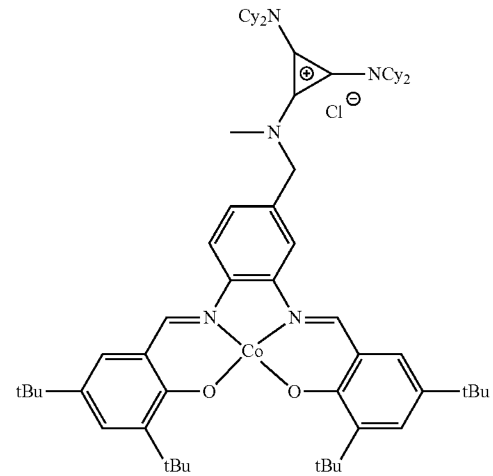

2a (0.700 g, 0.69 mmol, 1.0 equiv) was placed in a Schlenk flask under nitrogen to which was added dry, degassed DCM via cannula. In a separate Schlenk flask, cobalt(II) acetate tetrahydrate (0.172 g, 0.69 mmol, 1 equiv) was dehydrated by heating in vacuo, resulting in a color change from pink to dark purple. Dry, degassed MeOH was added to the cobalt(II) acetate, followed by the solution of 2a via cannula. The reaction mixture was stirred at 22° C. for 12 h before concentrating in vacuo. The residue was suspended in dry, degassed hexanes, sonicated, and isolated by filtration. The resulting red powder was dried in vacuo at 22° C. for 18 h (0.401 g, 54% yield). HRMS-ESI. m/z calculated for $C_{65}H_{94}CoN_5O_2$ $[M]^{\cdot+}$1035.67340, found 1035.67823. The $^1$H NMR spectrum exhibited significant broadening and was paramagnetically shifted. Further NMR characterization was not performed due to the paramagnetic nature of the catalyst.

Complex 2a-CoOAc

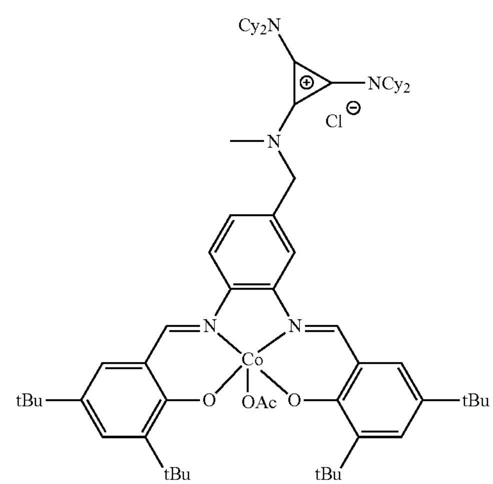

Acetic acid (213 μL) was added to a solution of 2a-Co in DCM (10 mL). The reaction was stirred open to air at 22° C. for 18 h, resulting in evaporation of the solvent. Dry PhMe (8 mL) was added and evaporated 4 times to remove residual acetic acid. The residue was suspended in heptane, filtered, washed with heptane, and dried in vacuo at 60° C. for 18 h to afford the product as dark red microcrystals (0.390 g, 91% yield). HRMS-ESI. m/z calculated for $C_{67}H_{97}CoN_5O_4$ $[M{-}OAc]^+$ 1094.68671, found 1094.68762. The $^1$H NMR spectrum in $CDCl_3$ exhibited significant broadening and was paramagnetically shifted. Further NMR characterization was not performed due to the paramagnetic nature of the catalyst.

Complex 3-AlCl

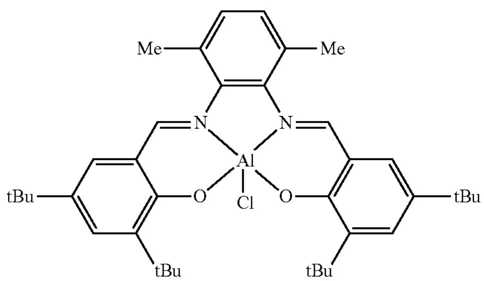

3-AlC1 was prepared according to the general aluminum metalation procedure (1.07 g, 84% yield). $^1$H NMR (500 MHz, $CDCl_3$): δ 8.65 (s, 2H), 7.63 (d, J=2.2 Hz, 2H), 7.14, (s, 2H), 7.09 (d, J=2.2 Hz, 2H), 2.59 (s, 6H), 1.56 (s, 18H), 1.33 (s, 18H). $^{13}$C NMR (125 MHz, $CDCl_3$): δ 166.94, 163.64, 141.35, 139.36, 138.77, 132.58, 131.40, 127.35, 126.75, 118.20, 35.65, 34.21, 31.44, 30.13, 20.47. HRMS-ESI: m/z calculated for $C_3H_{50}AlN_2O_2$ $[M]^{\cdot+}$ 593.36877, found 593.36849.

Complex 4-AlCl

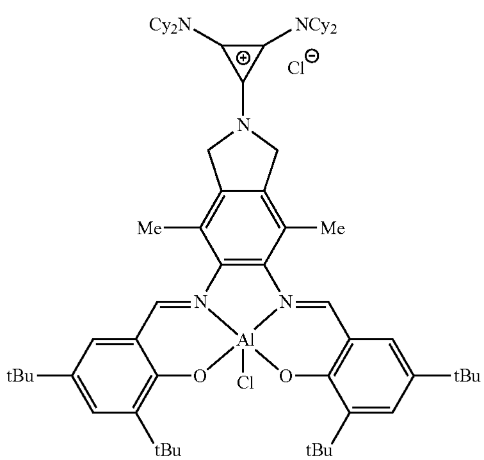

4-AlC1 was prepared according to the general aluminum metalation procedure (0.41 g, 67% yield). $^1$H NMR (500 MHz, $CDCl_3$): δ 8.63 (s, 2H), 7.62 (d, J=2.3 Hz, 2H), 7.12 (d, J=2.2 Hz, 2H), 5.38 (s, 4H), 3.51 (t, J=12.1 Hz, 4H), 2.50 (s, 6H), 1.97 (d, J=11.0 Hz, 16H), 1.81-1.67 (m, 12H), 1.53 (s, 18H), 1.47-1.36 (m, 8H), 1.32 (s, 18H), 1.28-1.17 (m, 4H). $^{13}$C NMR (125 MHz, $CDCl_3$): δ 167.25, 163.62, 139.38, 138.88, 135.02, 132.65, 127.51, 121.12, 118.05, 117.23, 116.02, 60.59, 58.61, 35.48, 34.10, 31.84, 31.29, 30.02, 25.83, 24.86, 17.10. HRMS-ESI: m/z calculated for $C_{67}H_{96}AlClN_5O_2$ $[M]^{\cdot+}$ 1064.70624, found 1064.70694.

Complex 5-AlCl

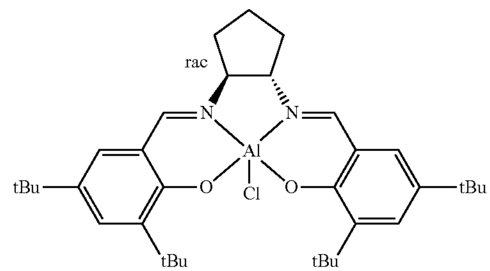

5-AlC1 was prepared according to the general aluminum metalation procedure. As no precipitate formed, the reaction mixture was syringe filtered, and solvent was removed in vacuo to afford a pale green powder. The residue was resuspended in PhMe, centrifuged, and filtered to remove a dark oil. The resulting yellow solution was concentrated in vacuo to afford a pale yellow solid (308 mg, 79% yield). $^1$H NMR (500 MHz, PhMe-$d_8$): δ 7.78 (d, J=2.2 Hz, 1H), 7.76 (d, J=2.7 Hz, 1H), 7.61 (d, J=2.0 Hz, 1H), 7.03 (d, J=2.2 Hz, 1H), 3.83 (td, J=11.2, 5.5 Hz, 1H), 2.31 (td, J=12.1, 10.2, 6.5 Hz, 1H), 1.85 (s, 9H), 1.83 (s, 9H), 1.50-1.40 (m, 2H), 1.37 (s, 9H), 1.35 (s, 9H), 1.32-1.26 (m, 2H), 0.88 (ddd, J=23.7, 11.9, 8.6 Hz, 2H). $^{13}$C NMR (125 MHz, PhMe-ds): δ 168.27, 164.03, 162.92, 162.07, 141.84, 141.56, 138.64, 137.99, 131.08, 130.09, 118.59, 118.43, 69.68, 65.83, 35.86, 35.76, 33.87, 33.83, 31.28, 31.21, 30.01, 29.84, 22.33, 21.31. HRMS-ESI: m/z calculated for $C_{35}H_{50}AlN_2O_2$ $[M]^{\cdot+}$ 557.36877, found 557.36830.

Complex 6-AlCl

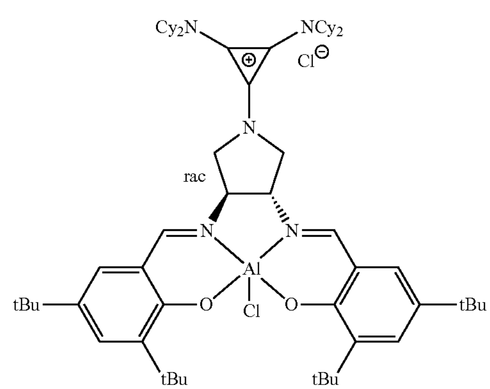

6-AlC1 was prepared according to the general aluminum metalation procedure. $^1$H NMR (500 MHz, $CDCl_3$): δ 8.04 (s, 2H), 7.52 (d, J=2.0 Hz, 2H), 6.91 (d, J=2.0 Hz, 2H), 4.93 (s, OH), 4.46 (s, 2H), 4.28 (s, 2H), 3.46 (t, J=11.8 Hz, 4H), 2.02-1.86 (m, 16H), 1.81-1.62 (m, 12H), 1.51 (s, 18H), 1.44-1.35 (m, 8H), 1.29 (s, 18H), 1.22-1.14 (m, 4H). $^{13}$C NMR (125 MHz, $CDCl_3$): δ 166.86, 162.84, 141.09, 138.21, 137.86, 131.26, 129.03, 128.22, 127.65, 125.29, 117.92, 117.45, 117.21, 63.99, 60.52, 50.82, 35.57, 33.88, 32.00, 31.69, 31.45, 31.28, 29.68, 25.82, 25.77, 24.80, 22.66, 21.46, 14.13. HRMS-ES: m/z calculated for $C_{61}H_{92}AlClN_5O_2$ $[M]^{\cdot+}$988.67494, found 988.67543.

Complex 1-AlO$^i$Pr

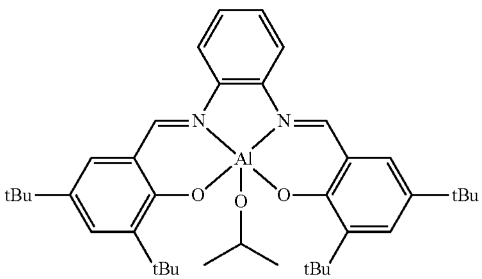

In a glove box, 1 (1.26 g, 2.33 mmol, 1.0 equiv) was dissolved in dry, degassed PhMe (20 mL) in an oven-dried Schlenk flask, and freshly distilled aluminum tris(isopropoxide) (0.500 g, 2.45 mmol, 1.05 equiv) was added. The sealed flask was removed from the glove box and heated at 60° C. for 48 h. Upon cooling to 22° C., solvent was removed in vacuo and the reaction diluted with dry, degassed hexanes (20 mL). After stirring for 20 min at 22° C., the solids were isolated by vacuum filtration under nitrogen. The product was dried in vacuo for 18 h at 22° C. and stored under nitrogen in a glove box (1.30 g, 89% yield). $^1H$ NMR (500 MHz, $CDCl_3$): δ: 8.85 (s, 2H), 7.95 (s, 2H), 7.67 (dd, J=9.3, 2.9 Hz, 2H), 7.36 (dd, J=9.4, 2.9 Hz, 2H), 7.23 (d, J=3.2 Hz, 2H), 3.61 (m, J=6.2 Hz, 1H), 1.58 (s, 18H), 1.24 (s, 18H), 0.68 (d, 6.2 Hz, 6H). HRMS (DART-MS): m/z calculated for $[M]^{\cdot+}$ 624.3872, found 624.2385, calculated for $[OCH(CH_3)_2]$−59.0497, found 59.05024. Characterization data were consistent with literature reports.

Complex 1-AlOAc

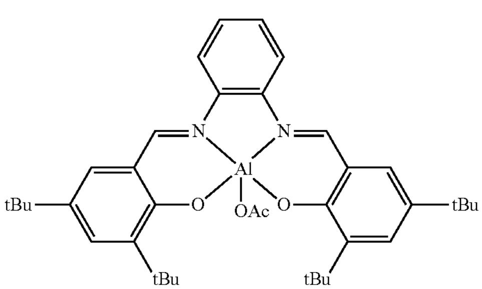

In a glove box, sodium acetate (28 mg, 0.34 mmol, 2.0 equiv) and 1-AlC1 (100 mg, 0.17 mmol, 1.01 equiv) were combined in 8 mL dry, degassed THE in an oven-dried 20 mL vial. The vial was sealed, taken out of the glove box, and stirred at 60° C. for 18 h. Upon cooling to room temperature, the reaction mixture was filtered through a 45 m syringe filter and solvent removed in vacuo to afford an orange solid (99 mg, 95% yield). $^1H$ NMR (500 MHz, $CDCl_3$): δ 8.94 (b, 2H), 7.53 (b, 4H), 7.42 (b, 2H), 6.69 (b, 2H), 2.10 (s, 3H), 1.54 (bs, 18H), 1.39 (s, 18H). $^{13}C$ NMR (125 MHz, $CDCl_3$): δ 174.02, 164.88, 160.74, 141.41, 138.21, 137.75, 132.43, 128.24, 126.92, 118.21, 115.82, 35.46, 34.10, 31.43, 29.53, 23.79. HRMS (DART-MS): m/z calculated for $[M]^{\cdot+}$ 624.35077, found 624.2386, calculated for [OAc]-59.0133, found 59.0141.

Complex 1-AlMe

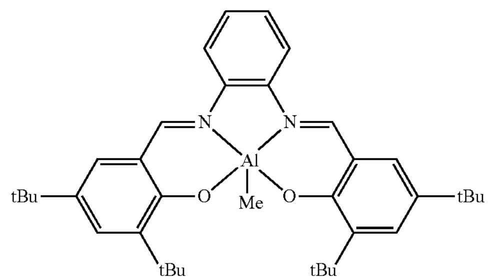

In a glove box, 1 (1.0 g, 1.8 mmol, 1 equiv) was dissolved in PhMe (20 mL) in an oven-dried Schlenk flask equipped with stir bar. A 2 M solution of trimethyl aluminum in toluene (1.0 mL, 2.0 mmol, 1.1 equiv) was added, and the resulting solution allowed to stir 5 min. The flask was then sealed, taken out of the glove box, and stirred at 22 C for 18 h before concentrating in vacuo to a final volume of 5 mL. Dry, degassed hexanes (10 mL) was added, and the resulting suspension vacuum filtered to obtain a yellow powder (0.83 g, 86%). $^1H$ NMR (500 MHz, $CDCl_3$): δ 8.80 (s, 2H), 7.75 (dd, J=9.5, 2.7 Hz, 2H), 7.60 (d, J=2.3, 2H), 7.39 (dd, J=9.5, 2.8 Hz, 2H), 7.24 (d, J=2.3, 2H), 1.57 (s, 18H), 1.35 (s, 18H), −1.19 (s, 3H). $^{13}C$ NMR (125 MHz, $CDCl_3$): δ 164.90, 161.84, 141.40, 138.87, 138.27, 131.98, 127.93, 127.80, 118.55, 115.65, 35.63, 34.02, 31.30, 29.78. HRMS (DART-MS): m/z calculated for $[M+H]^+$ 581.3688, found 581.3693. Characterization data were consistent with literature reports.

Complex 1-A$OCH_2CH_3$

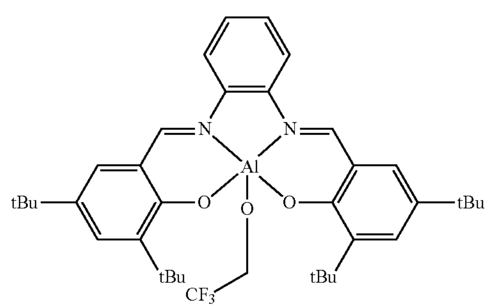

To a solution of 1-AlC1 (50 mg, 0.083 mmol, 1 equiv) in dry, degassed THE (5 mL) in an oven-dried vial with stir bar was added sodium trifluoroethoxide (9.7 mg, 0.079 mmol, 0.95 equiv). The vial was sealed and heated at 60° C. for 18 h. Upon cooling to room temperature, the solution was filtered through a 45 m syringe filter and solvent removed in vacuo to afford a yellow powder. $^1H$ NMR (500 MHz, $CDCl_3$): δ 9.02 (s, 2H), 7.78 (b, 2H), 7.65 (b, 2H), 7.45 (b, 2H), 7.24, (b, 2H), 6.82 (b, 2H), 1.59 (s, 18H), 1.36 (s, 18H).

$^{13}C$ NMR (125 MHz, $CDCl_3$): δ 164.61, 162.75, 141.25, 139.26, 138.42, 132.71, 132.18, 128.19, 118.47, 115.35, 114.38, 103.80, 35.61, 34.09, 31.30, 29.69. $^{19}F$ NMR (376 MHz, proteo-THF, referenced to fluorobenzene): δ −77.4. HRMS (DART-MS): m/z calculated for $[M+H]^+$ 665.3512, found 665.8667, calculated for $[OCH_2CF_3]$-99.0058, found 99.0077.

Complex 1-Al($O_2CAr^F$)

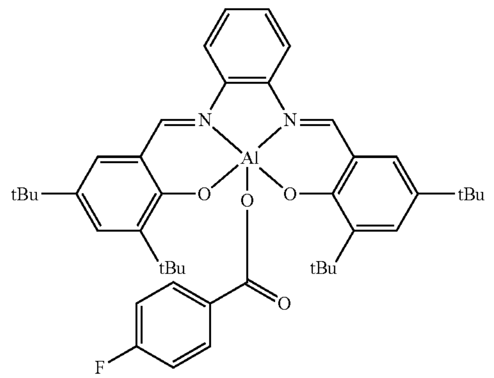

In the glove box, sodium 4-fluorobenzoate (25 mg, 0.154 mmol, 1 equiv) and 1-AlC1 (88 mg, 0.146 mmol, 0.95 equiv) were combined in 5 mL dry, degassed THE in an oven-dried 20 mL vial. The vial was sealed, taken out of the glove box, and stirred at 60° C. for 18 h. Upon cooling to room temperature, the reaction mixture was filtered through a 45 m syringe filter and solvent removed in vacuo to afford an orange solid (59 mg, 57% yield). $^1H$ NMR (500 MHz, $CDCl_3$): δ 8.92 (s, 2H), 7.71 (b, 1H), 7.62 (b, 1H), 7.51 (b, 2H), 7.44 (b, 2H) 7.34 (b, 1H), 7.21 (b, 1H), 6.6 (b, 1H), 3.33 (b, 2H), 1.57 (s, 9H), 1.42 (s, 9H), 1.34 (s, 9H), 1.19 (s, 9H). $^{13}C$ NMR (125 MHz, $CDCl_3$): δ 164.42, 164.23, 162.30, 160.90, 141.53, 141.45, 137.70, 136.77, 132.89, 128.42, 128.29, 128.17, 127.29, 118.40, 115.43, 35.33, 31.25, 29.23, 27.78. $^{19}F$ NMR (376 MHz, proteo-THF, referenced to fluorobenzene): 6-112.4 ppm. HRMS (DART-MS): m/z calculated for $[M+H]^+$ 705.3648, found 705.1351, calculated for $[C_7H_4O_2F]$−139.0195, found 139.0203.

Figure 26:
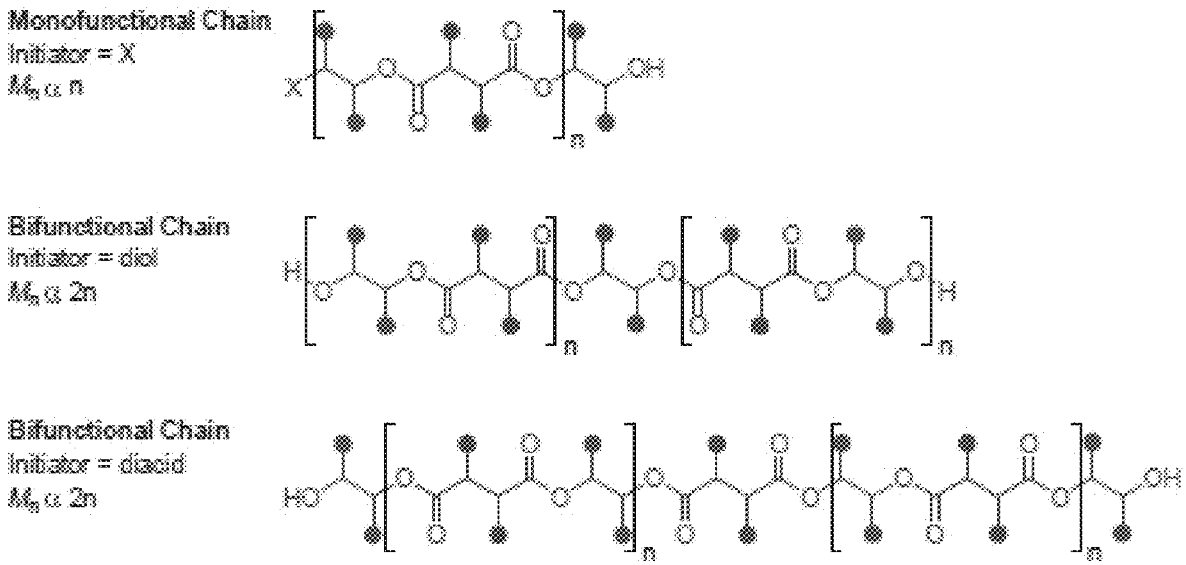
FIG. 26. Mono- and bifunctional chains initiated from catalyst/cocatalyst X-type ligand, ring-opened PO, and diacid.

Copolymerizations and Polymer Characterization Data. General Polymerization Procedure and Living Behavior Using 2a-AlCl. In a glove box, the appropriate amount of metal complex (1 equiv), cocatalyst (if required, 1 equiv), and CTA (if required, Y equiv) were weighed into an oven-dried 4 mL vial. Cyclicanhydride (X equiv) was then weighed into the vial, and epoxide (5× equiv) added by volume. The vial was sealed with a Teflon-lined cap, removed from the glove box, and placed in an oil bath preheated to 60° C. At desired time points, small aliquots were removed for $^1H$ NMR spectroscopic analysis and GPC to determine conversion of the anhydride and molecular weight and dispersity of the polymer, respectively. At low catalyst loadings, GPC traces of the polymers revealed a bimodal molecular weight distribution. This bimodality is common for anionic ring-opening copolymerizations and indicates the presence of adventitious water or diacid (FIG. 26).

In copolymerizations catalyzed by 2a-AlCl, molecular weights increase linearly with conversion and dispersities remain low, consistent with living polymerization behavior.

Figure 27:
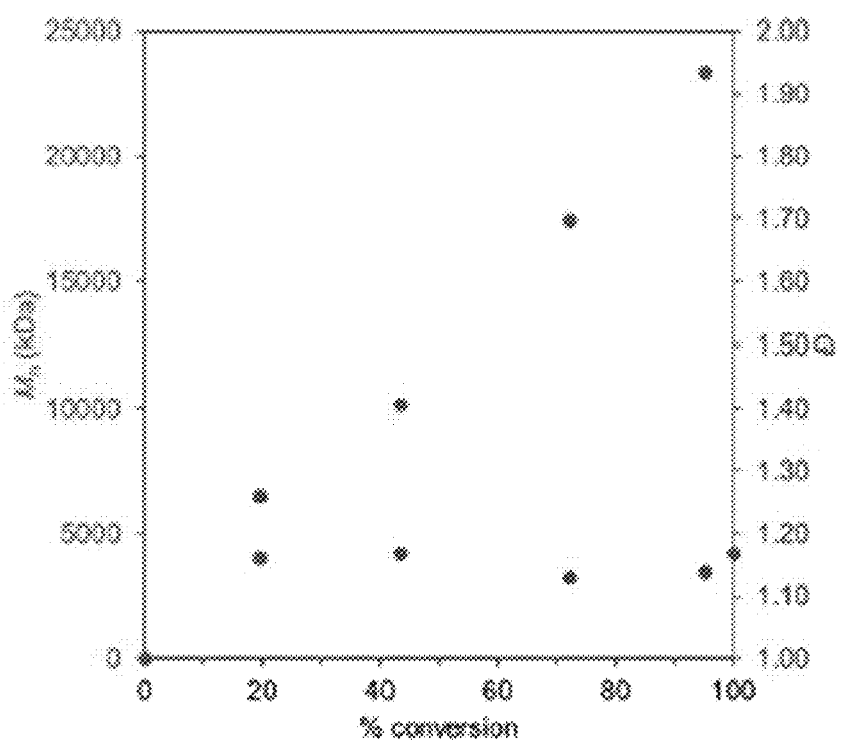
FIG. 27. Mn and D as a function of conversion for the copolymerization of PO and CPMA by 2a-AlC1 ($[2a\text{-AlCl}]_0$:$[\text{CPMA}]_0$:$[\text{PO}]_0$=1:400:2000).

Mn and D are plotted as a function of conversion for a representative copolymerization of PO and CPMA with 2a-AlC1 ($[2a\text{-}AlCl]_0:[CPMA]_0:[PO]_0=1:400:2000$, FIG. 27).

Figure 32:
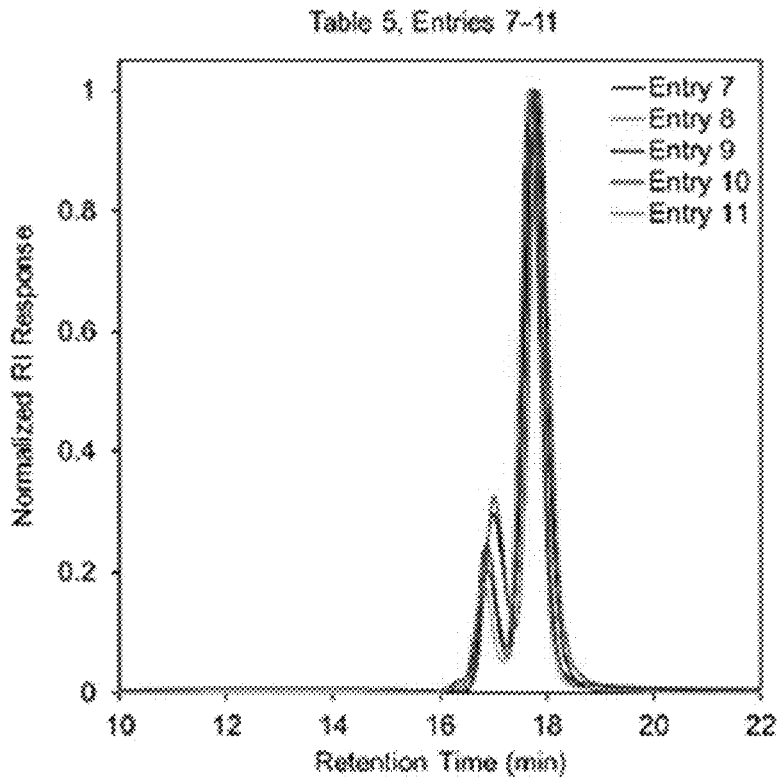
FIG. 32. GPC traces for FIG. 15, entries 7-11.

Copolymerization of Epoxides and Cyclic Anhydrides at Low Catalyst Concentration are shown in FIG. 28. Representative GPC Traces of Polyester Copolymers are shown in FIGS. 29-31. Excellent overlay of the GPC traces corroborates the similarity of ~18 kDa polyesters made by varying [2a-AlCl]:[CTA-1] (FIG. 15, entries 7-11, FIG. 32). Small variations in the high molecular weight shoulder are indicative of changes in adventitious water: the smaller shoulder at higher CTA loadings suggests that CTA-1 introduces less adventitious water than does 2a-AlCl.

Excellent overlay of the GPC traces of polyesters obtained from 2a-AlC1 and varied amounts of TrOH confirms that TrOH does not initiate polymer chains or introduce a discernable amount of adventitious water (FIG. 58, vide infra).

Figure 34:
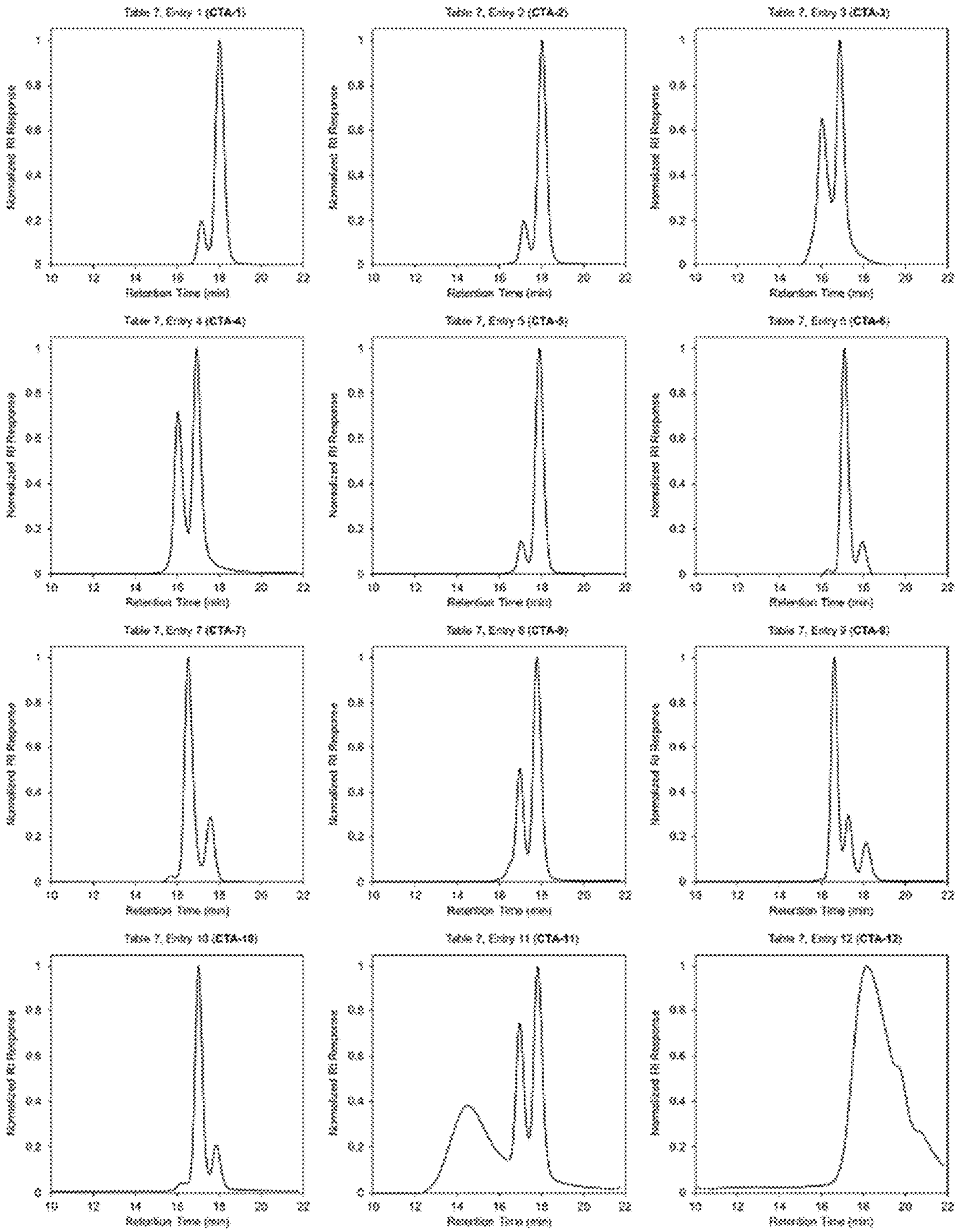
FIG. 34. GPC traces for FIG. 21.
Figure 35:
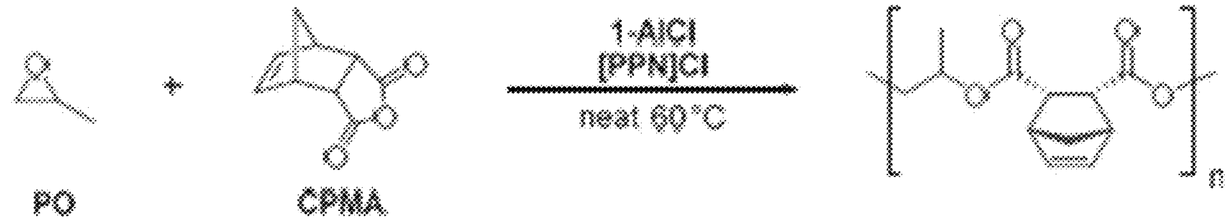
FIG. 35. Table showing transesterification and epimerization in the binary system 1-AlCl/[PPN]Cl.
Figure 36:
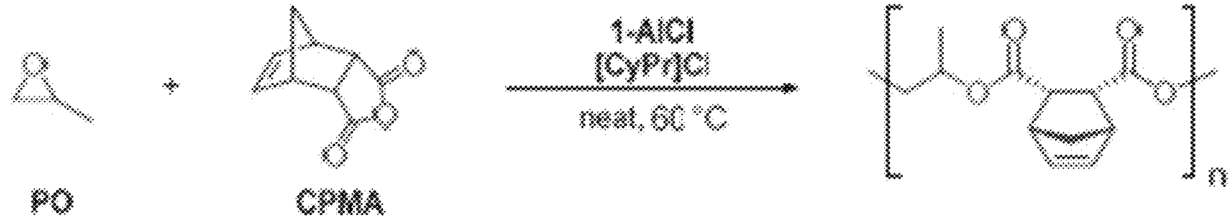
FIG. 36. Table showing transesterification and epimerization in the binary system 1-AlCl/[CyPr]Cl.
Figure 37:
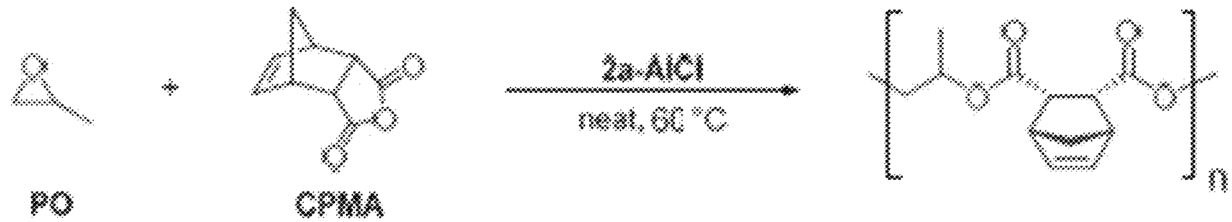
FIG. 37. Table showing transesterification and epimerization in the bifunctional system 2a-AlCl.
Figure 38:
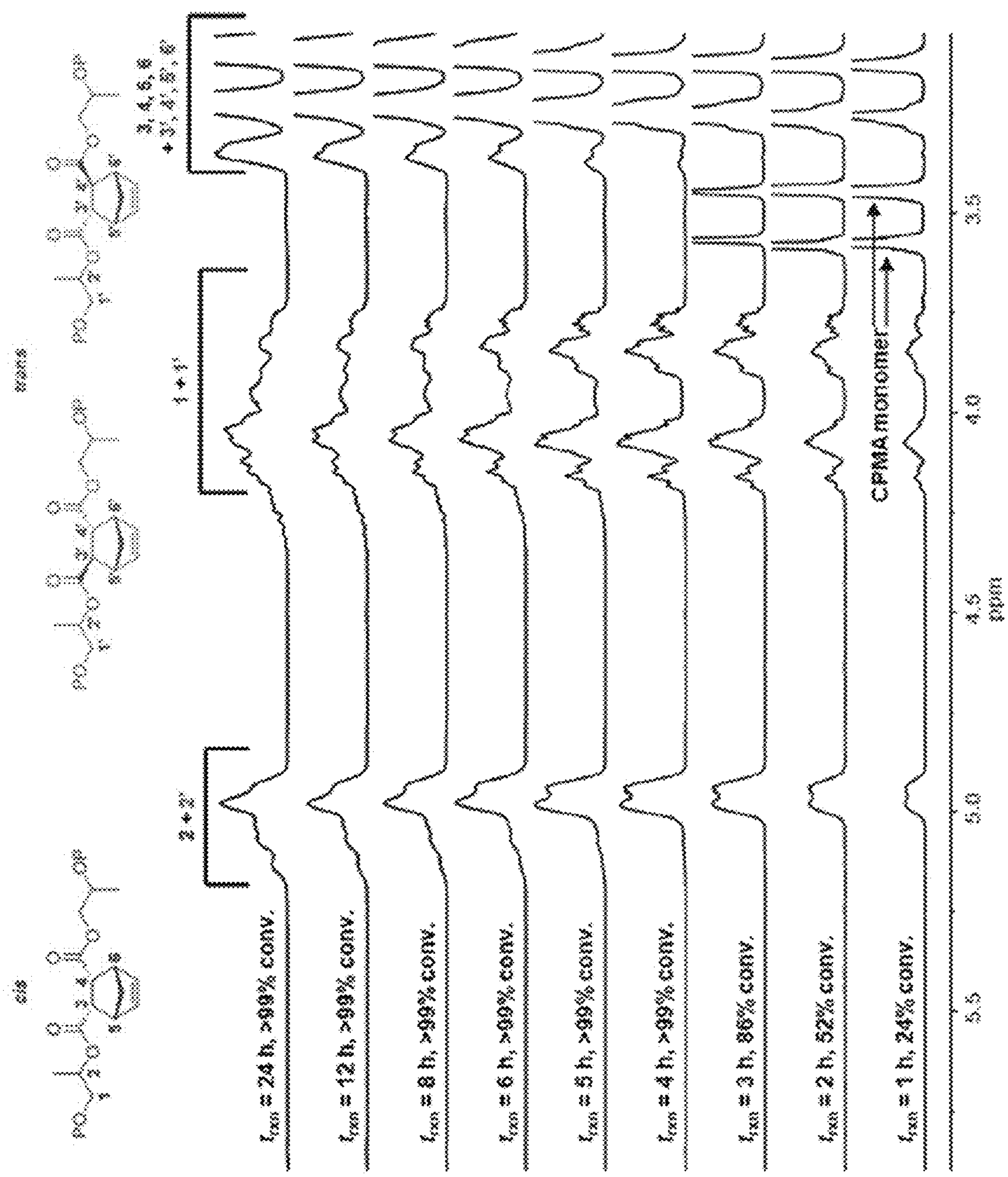
FIG. 38. $^1$H NMR spectra of CPMA/PO copolyester synthesized using 1-AlCl/[PPN]Cl showing transesterification and epimerization at extended reaction times.
Figure 39:
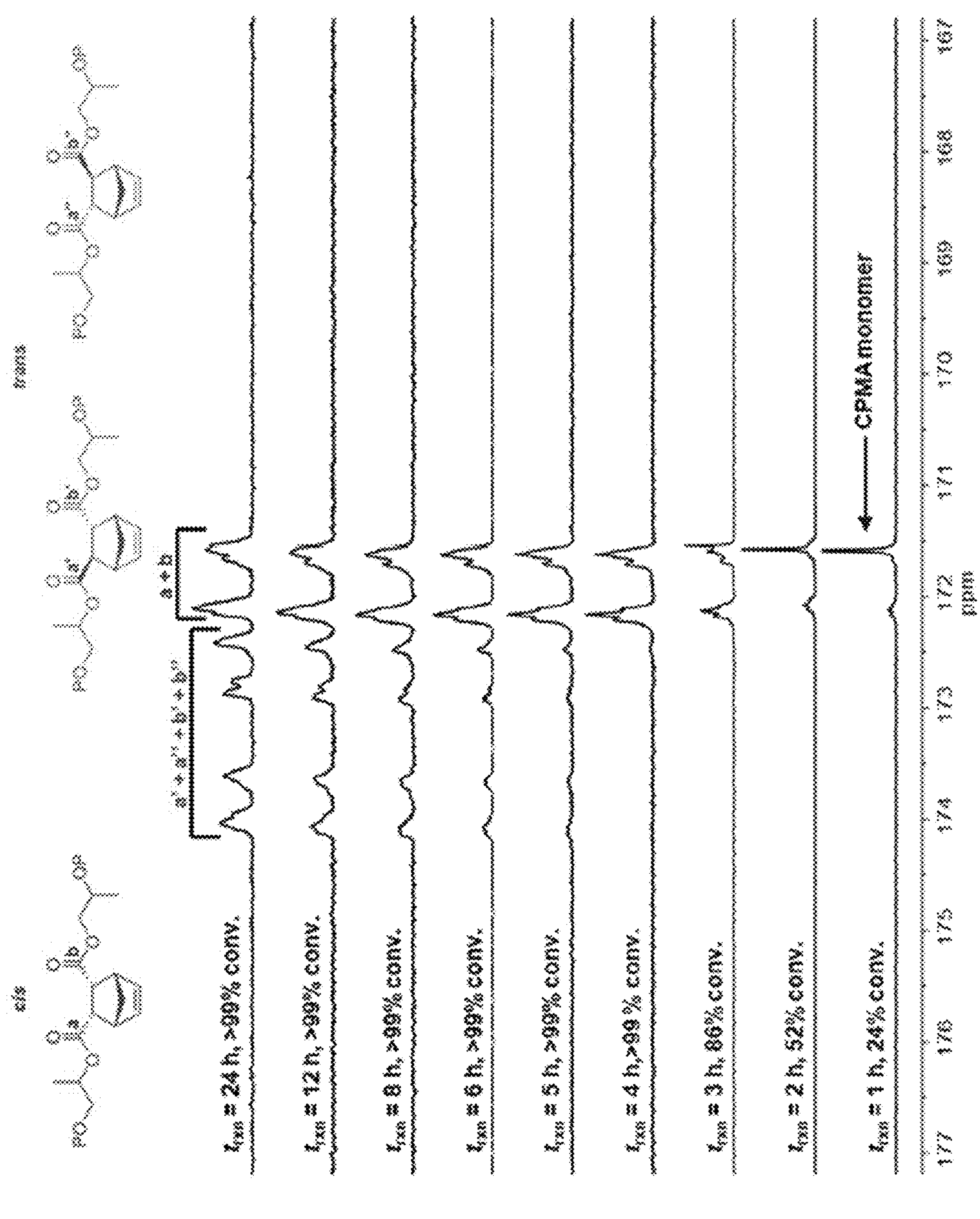
FIG. 39. $^{13}$C NMR spectra of CPMA/PO copolyester synthesized using 1-AlCl/[PPN]Cl showing transesterification and epimerization at extended reaction times.
Figure 40:
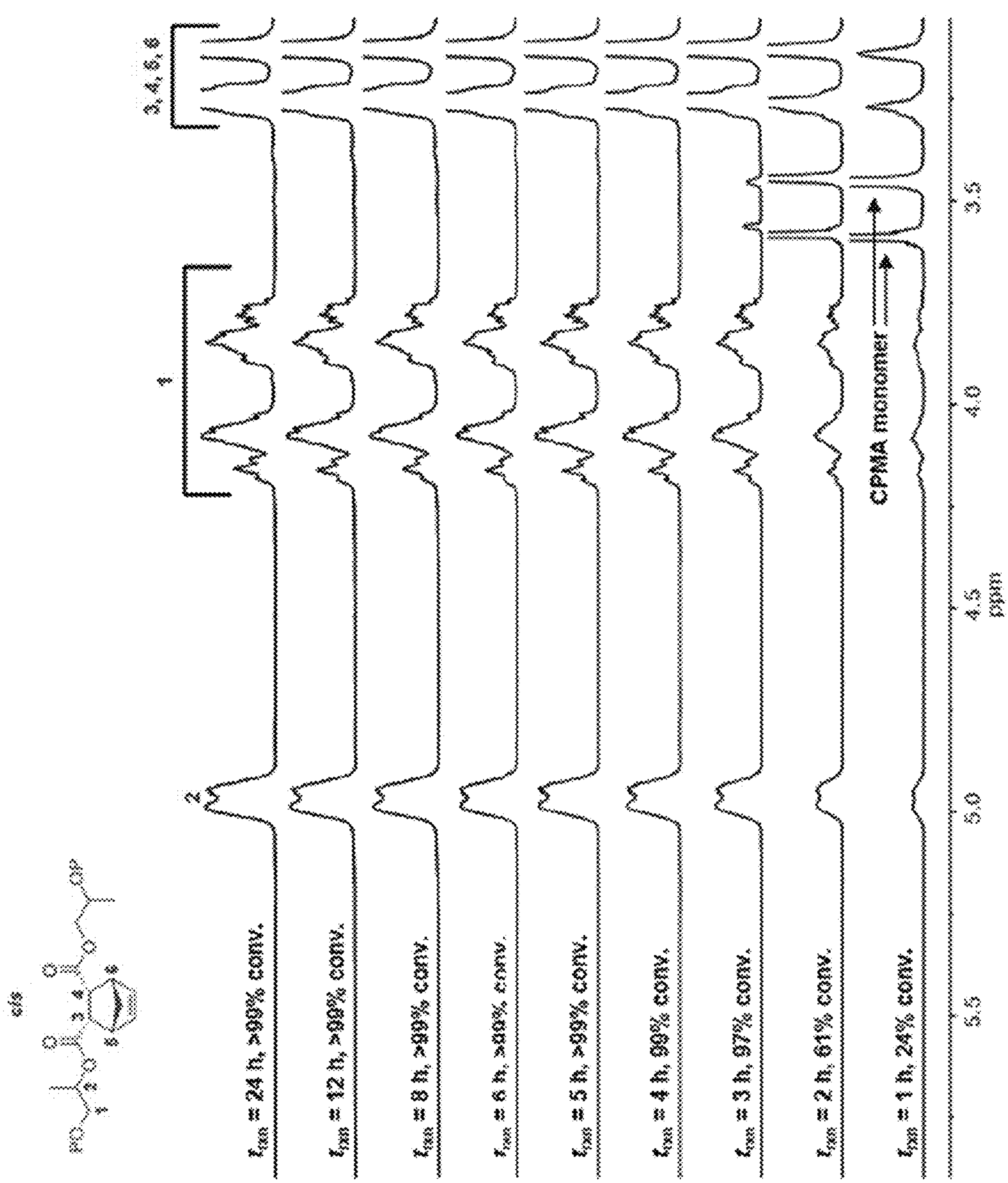
FIG. 40. $^1$H NMR spectra of CPMA/PO copolyester synthesized using 1-AlCl/[CyPr]Cl showing conserved diester stereochemistry at extended reaction times.
Figure 41:
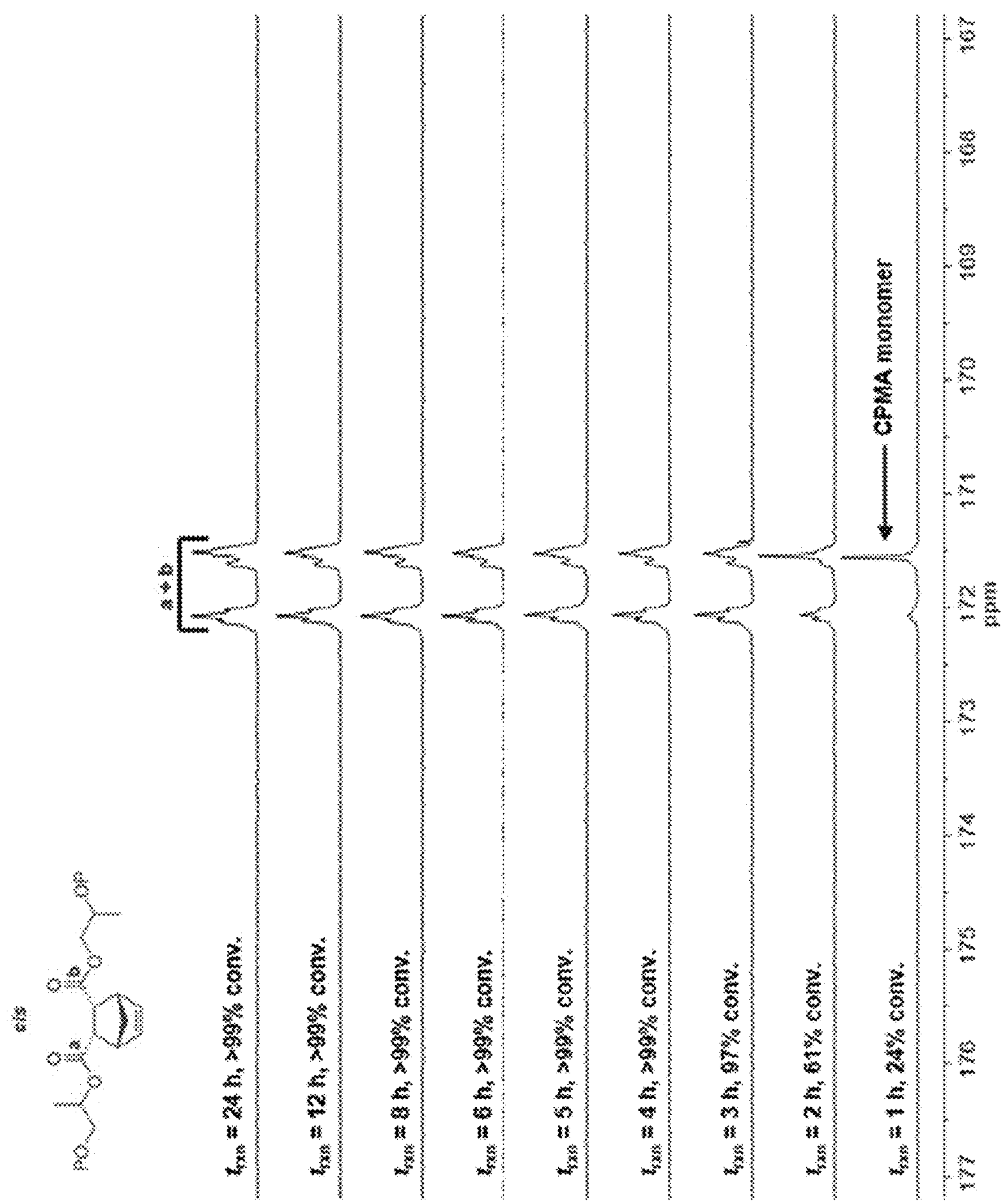
FIG. 41. $^{13}$C NMR spectra of CPMA/PO copolyester synthesized using 1-AlCl/[CyPr]Cl showing conserved diester stereochemistry at extended reaction times.
Figure 42:
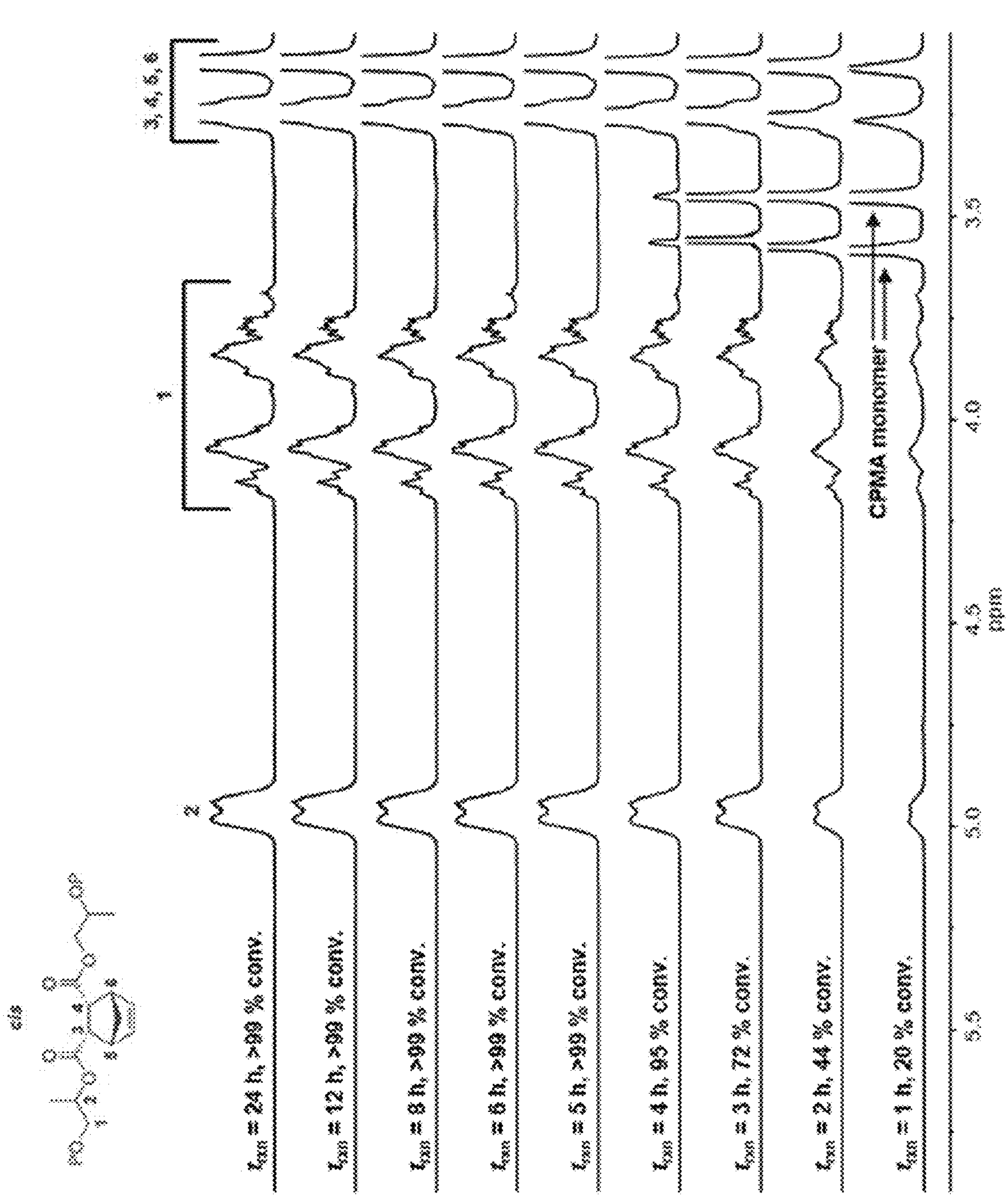
FIG. 42. $^1$H NMR spectra of CPMA/PO copolyester synthesized using 2a-AlCl showing conserved diester stereochemistry at extended reaction times.

FIG. 33 shows GPC traces for FIG. 58 and FIG. 34 shows GPC traces for FIG. 21.

Stereochemistry of Polyester Diester Units. The carbonyl region of the $^{13}C$ NMR spectrum is diagnostic for diester stereochemistry of the CPMA/PO copolyester. For highly regioregular copolymers, the two expected carbonyl signals (171.50 and 172.04 ppm) are observed. When the copolymerization using the binary 1-AlCl/[PPN]Cl system is run beyond full conversion, the $^{13}C$ NMR of the resulting polyester exhibits four new carbonyl signals (173.90, 173.47, 172.75, and 172.28 ppm) with similar integration values associated with the two possible trans-diester structures. Previous work has corroborated that the cis-diester content determined by $^{13}C$ NMR integrations is consistent the ratio of cis- and trans-diols obtained by degrading the copolymer with lithium aluminum hydride. Data is shown in FIGS. 35-43.

Procedures for Kinetic Measurements. Polymerizations for FIGS. 8, 9 and 10 were performed according to the general polymerization procedure, unless the amount of catalyst required was less than 1.5 mg. In that case, a stock solution of catalyst in PhMe (~0.1 mg/mL) was prepared. The appropriate amount of stock solution was added to an oven-dried 4 mL vial, and solvent removed in vacuo at 22° C. for 18 h. In the glove box, CPMA (0.250 g, 1.52 mmol, X equiv) was weighed into the vial containing catalyst and cocatalyst (if required), and PO was added by volume (0.53 mL, 7.61 mmol, 5× equiv). The vial was sealed with a Teflon-lined cap, removed from the glove box, and placed in an oil bath preheated to 60° C. At desired time points, small aliquots were removed for $^1H$ NMR spectroscopic analysis to determine conversion of the cyclic anhydride.

Figure 44:
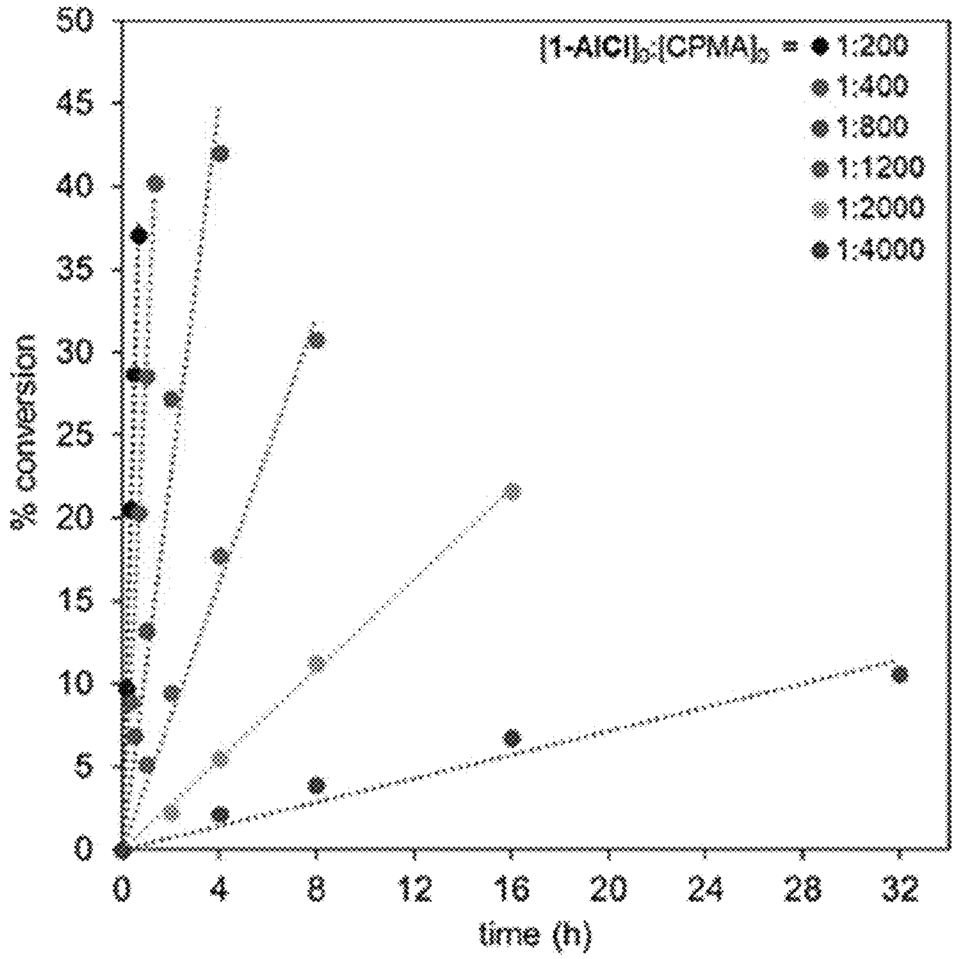
FIG. 44. PO/CPMA copolymerization kinetics with 1-AlCl/[PPN]Cl.

Polymerization Kinetics Using Binary Systems 1-AlCl/[PPN]Cl and 1-AlCl/[CyPr]Cl. Polymerization Kinetics at Various Loadings of 1-AlCl/[PPN]Cl. According to the general kinetics procedure, the catalyst, 1-AlCl, and cocatalyst, [PPN]Cl, concentrations were varied as a pair in a 1:1 ratio while the initial amounts of CPMA and PO were maintained. $^1H$ NMR analysis of aliquots removed throughout the course of the reactions revealed linear conversion of anhydride CPMA with time (FIG. 44). The reaction rates depended nonlinearly on the catalyst loading, and time normalization was used to determine the reaction order in catalyst (vide infra).

Determination of the Reaction Order in 1-AlCl/[PPN]Cl Using the Time Normalized Method. The normalized time scale method relies on the invariance of catalyst concentration during the course of a reaction. In the binary 1-AlCl/

[PPN]Cl system, both the concentration of the aluminum catalyst 1-AlC1 and the concentration of the [PPN] cocatalyst are constant throughout the reaction. Accordingly, the normalized time scale method can be used to identify the reaction order in both species. Using the normalized time scale method, the consumption of CPMA was plotted against the normalized time scale t×[1-AlCl]$^{n}$, where t is time in hours, [1-AlCl] is the initial concentration of the aluminum catalyst, and n is the order in catalyst. CPMA consumption at six different catalyst loadings was plotted against normalizations using possible reaction orders n. At high catalyst loadings ([1-AlCl]:[CPMA]≥1:800), excellent overlay was obtained for first order behavior in catalyst (FIG. 8, left). However, the normalized traces for low catalyst loadings ([1-AlCl]:[CPMA]<1:800) did not overlap with n=1 (FIG. 45, left). Accounting for [PPN] at low catalyst loadings with a time normalization of t×[1-AlCl]$^{1}$X [PPN]$^{1}$ afforded excellent overlay (FIG. 8, right), but applying the same t×[1-AlCl]$^{1}$×[PPN]$^{1}$ normalization at high catalyst loadings yield poor agreement (FIG. 45, right). The polymerization therefore appears to exhibit a change in reaction order at reduced loadings of the catalytic pair.

Due to the equivalent concentrations of 1-AlC1 and PPN, good overlay is also obtained with time normalizations of t×[PPN]$^{2}$ or t×[1-AlCl]$^{2}$ at low catalyst loadings. From the existing experimental and computation studies, however, there is no evidence implicating a mechanistic step in which two equivalents of the cocatalyst or two equivalents of the Lewis acid come together. Yet previous mechanistic investigations do suggest that PPN delivers a carboxylate chain-end to ring-open the Lewis-activated epoxide, consistent with the proposed orders [1-AlCl]i[PPN]$^{1}$.

Figure 46:
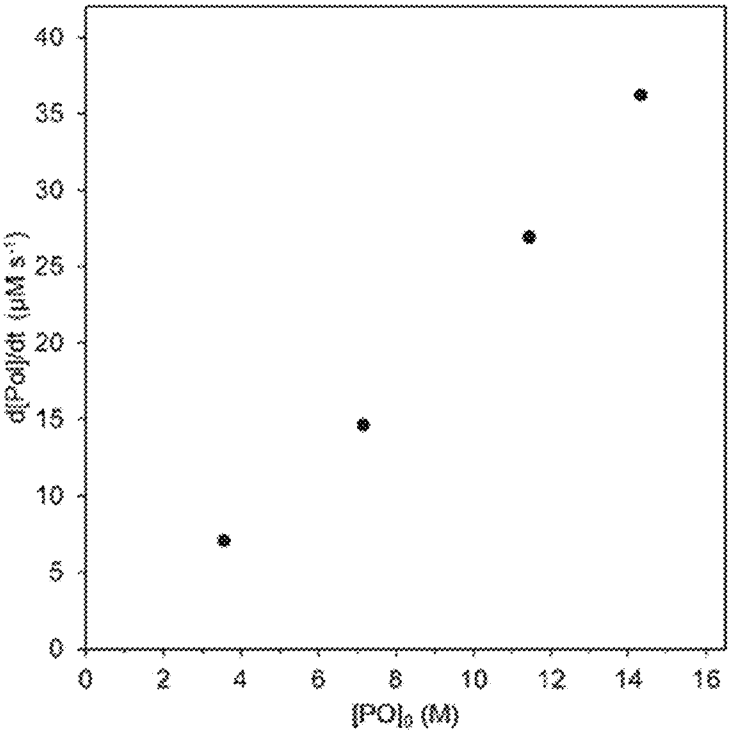
FIG. 46. Initial rates of PO/CPMA copolymerization (<20% conversion) versus initial PO concentration using the binary catalyst system 1-AlCl/[PPN]Cl.

Initial Rate Determination of the Reaction Order in Epoxide in the Binary System 1-AlCl/PPN. The order in epoxide in the binary catalyst system 1-AlCl/PPN was determined by varying the PO concentration while catalyst and CPMA concentrations were held constant. As the polymerizations are typically performed in neat epoxide, THE was added at lower epoxide concentrations to maintain a consistent total volume. A representative procedure follows: catalyst and cyclic anhydride were weighed into an oven-dried 4 mL glass vial in a nitrogen-filled glove box. Appropriate volumes of THE and PO were added sequentially via gastight syringe, and the vial was sealed with a Teflon coated cap. The vial was then transferred to an oil bath at 60° C. At desired time points, small aliquots were removed for $^{1}$H NMR spectroscopic analysis to determine conversion of anhydride. Initial rates were determined before 20% conversion of anhydride was reached. A linear correlation between polymerization rate and [PO] is consistent with first-order behavior in epoxide (FIG. 46).

Figure 47:
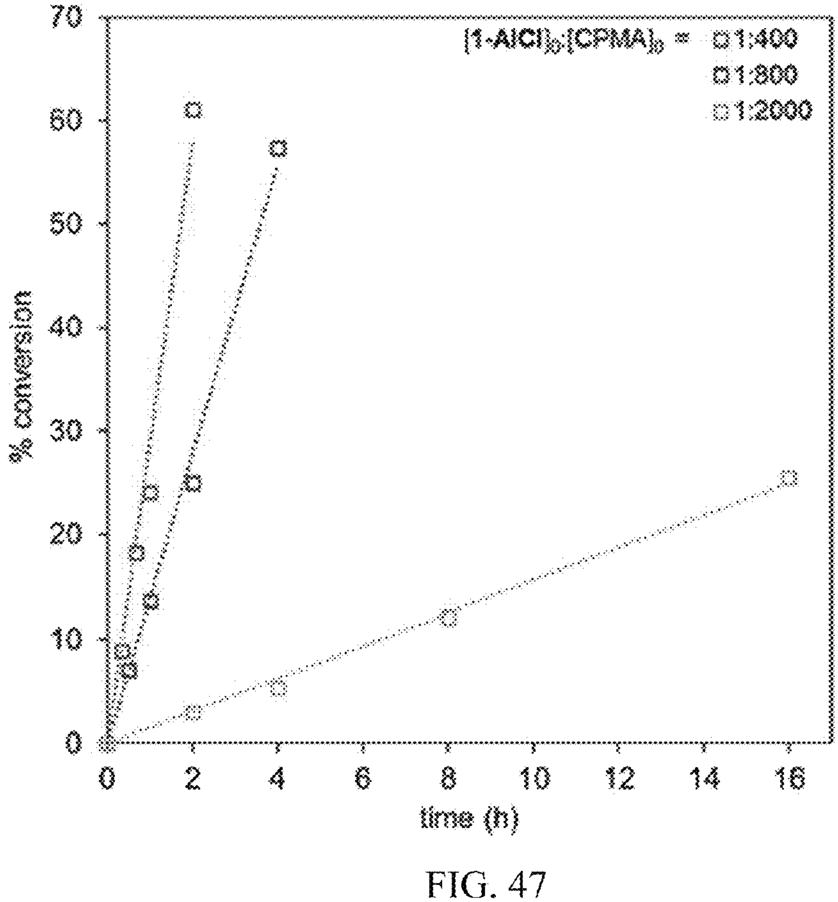
FIG. 47. PO/CPMA copolymerization kinetics with 1-AlCl/[CyPr]Cl.

Polymerization Kinetics Controls with Various Loadings of 1-AlCl/[CyPr]Cl. According to the general kinetics procedure, the catalyst, 1-AlCl, and cocatalyst, [CyPr]Cl, concentrations were varied as a pair in a 1:1 ratio while the initial amounts of CPMA and PO were maintained. Analysis of aliquots removed throughout the course of the reactions revealed linear conversion of anhydride CPMA with time (FIG. 47). The observed reaction profiles using [CyPr]Cl as a cocatalyst were in excellent agreement with those obtained using [PPN]Cl (FIG. 48), suggesting that the two cocatalysts in the binary systems perform similarly.

Figure 49:
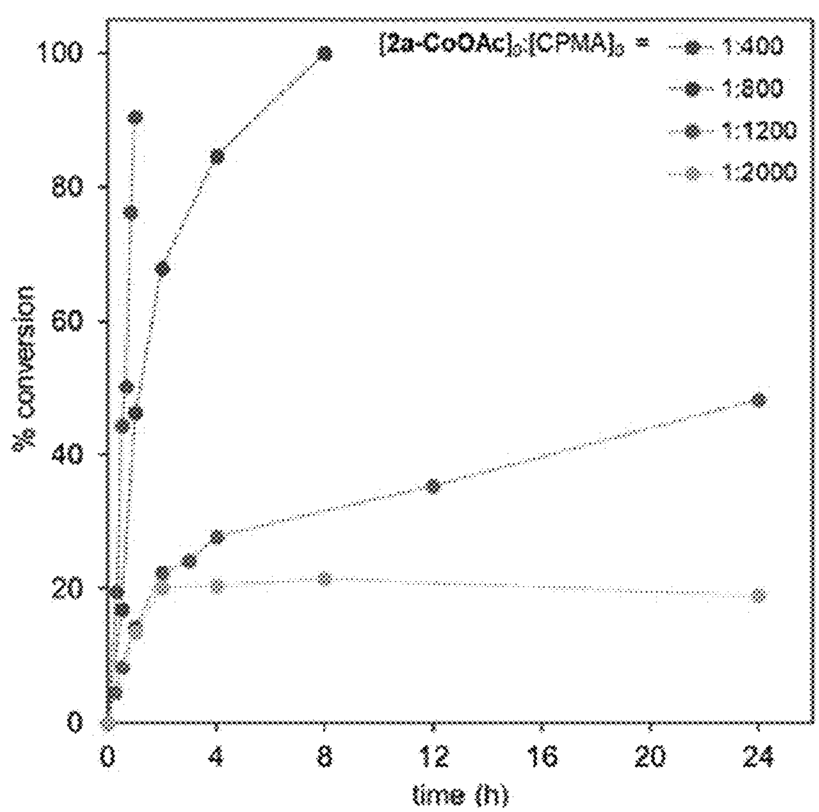
FIG. 49. PO/CPMA copolymerization kinetics with 2a-CoOAc demonstrating catalyst deactivation at low loadings.

Cobalt Catalyst Deactivation Kinetics in the Bifunctional System 2a-CoOAc. Despite first-order behavior in the bifunctional catalyst systems, PO/CPMA copolymerizations catalyzed by 2a-CoOAc exhibited non-linear conversion with time at low catalyst loadings (FIG. 49). Further evidence of catalyst deactivation was observed by formation of a paramagnetic species in the $^{1}$H NMR, consistent with reduction to inactive 2a-Co(II).

Polymerization Kinetics Using Bifunctional System 2a-AlCl. Initial Rate Determination of the Reaction Order in Epoxide. The order in epoxide in the bifunctional catalyst system was determined by varying the PO concentration while catalyst and CPMA concentrations were held constant. As the polymerizations are typically performed in neat epoxide, THE was added at lower epoxide concentrations to maintain a consistent total volume. A representative procedure follows: catalyst and cyclic anhydride were weighed into an oven-dried 4 mL glass vial in a nitrogen-filled glove box. Appropriate volumes of TH and PO were added sequentially via gastight syringe, and the vial was sealed with a Teflon coated cap. The vial was then transferred to an oil bath at 60° C. At desired time points, small aliquots were removed for $^{1}$H NMR spectroscopic analysis to determine conversion of anhydride. Initial rates were determined before 20% conversion of anhydride was reached.

A linear relationship between the initial rates of polymerization at various concentrations of PO (3.5-14 M, [2a-AlCl]$_{0}$:[CPMA]o=1:1200) indicates a first-order dependence on epoxide (FIG. 50). Upon increasing the initial concentration of PO above 10 M ([PO]$_{0}$:[CPMA]$_{0}$=3.5:1), no additional rate enhancement was observed, suggesting the onset of pseudo-zero-order kinetics.

Figure 51:
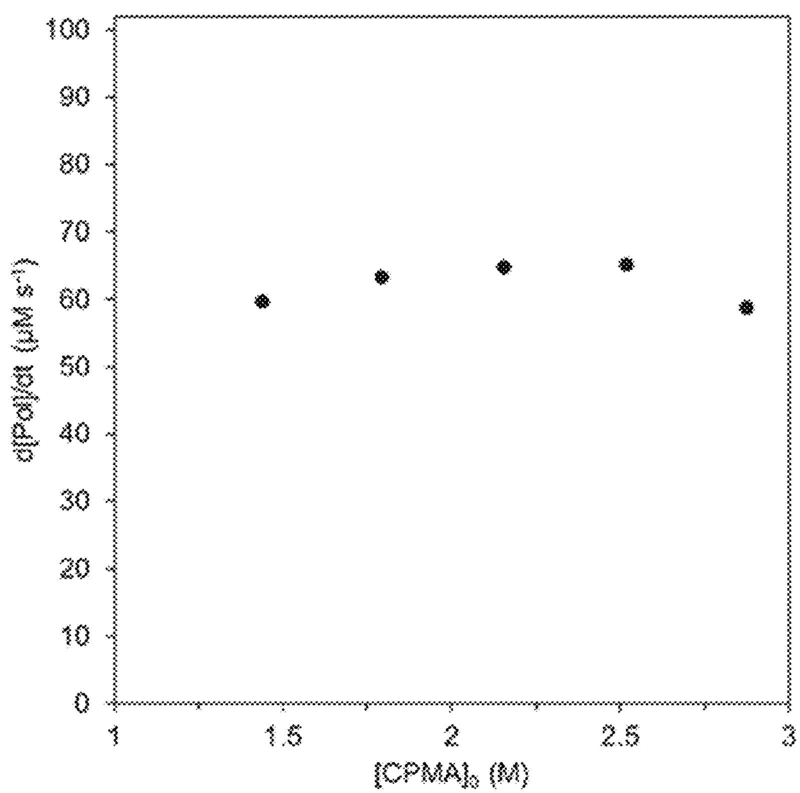
FIG. 51. Initial rates of PO/CPMA copolymerization (<20% conversion) versus initial CPMA concentration using the bifunctional catalyst 2a-AlCl.

Initial Rate Determination of the Reaction Order in Cyclic Anhydride. The order in cyclic anhydride in the bifunctional catalyst system was determined by varying the CPMA concentration while catalyst and PO concentrations were held constant. A representative procedure follows: catalyst and cyclic anhydride were weighed into an oven-dried 4 mL glass vial in a nitrogen-filled glove box. PO was added via syringe, and the vial was sealed with a Teflon coated cap. The vial was then transferred to an oil bath at 60° C. At desired time points, small aliquots were removed for $^{1}$H NMR spectroscopic analysis to determine conversion of anhydride. Initial rates were determined before 20% conversion of anhydride was reached. Polymerization rates were invariant with different initial concentrations of CPMA, indicating a zero-order dependence on cyclic anhydride (FIG. 51).

Polymerization Kinetics at Various Loadings of Bifunctional Catalysts 2a-AlCl, 4-AlCl, and 6-AlCl. According to the general kinetics procedure, the catalyst loading was varied while the initial amounts of CPMA and PO were maintained. Analysis of aliquots removed throughout the course of the reactions revealed linear conversion of cyclic anhydride with time for catalysts 2a-AlC1 (FIG. 52) and 6-AlC1 (FIG. 54). Catalyst 4-AlCl exhibited linear conversion of CPMA at high catalyst loadings, but extremely low catalyst loadings (<0.05 mol %) resulted in catalyst deactivation slowing conversion at extended reaction times (FIG. 53).

Figure 55:
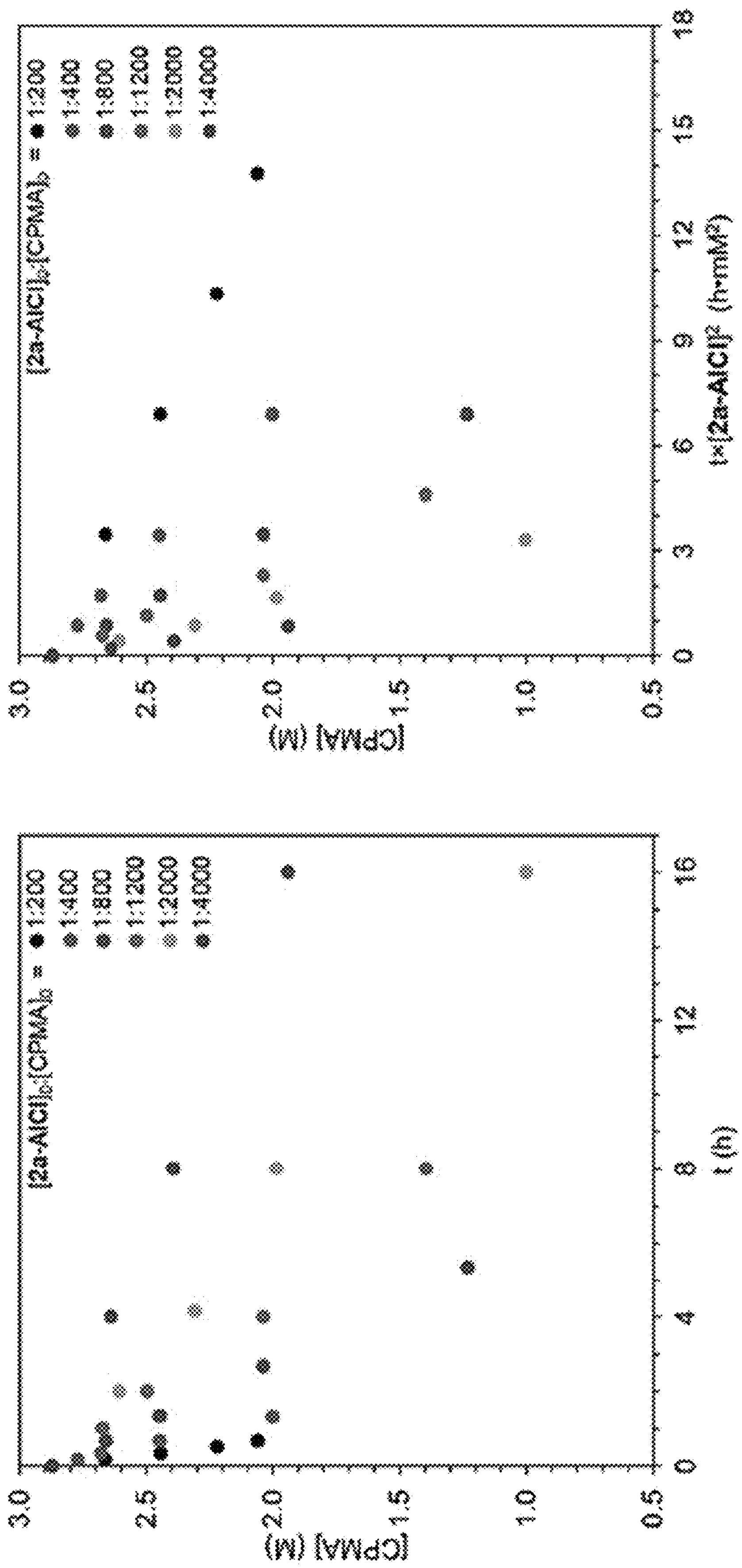
FIG. 55. Anhydride decay versus normalized time scale for zero-order (left) and second-order (right) behavior in the tethered catalyst system 2a-AlCl.

Determination of the Reaction Order in 2a-AlC1 Using the Time Normalized Method. Time normalization analysis was used to determine the reaction order in bifunctional catalyst 2a-AlCl. The consumption of [CPMA] was plotted against the normalized time scale t×[2a-AlCl]$^{n}$, where t is time in hours, [2a-AlCl] is the initial catalyst concentration, and n is the order in catalyst. The reaction progress for the six different catalyst loadings was plotted against normalizations using possible reaction orders n. At all catalyst loadings studied ([2a-AlCl]:[CPMA]=1:200-1:4000), excellent overlay was obtained for first-order behavior in catalyst (FIG. 9). Zero-order and second-order fits did not provide good overlay (FIG. 55).

Figure 57:
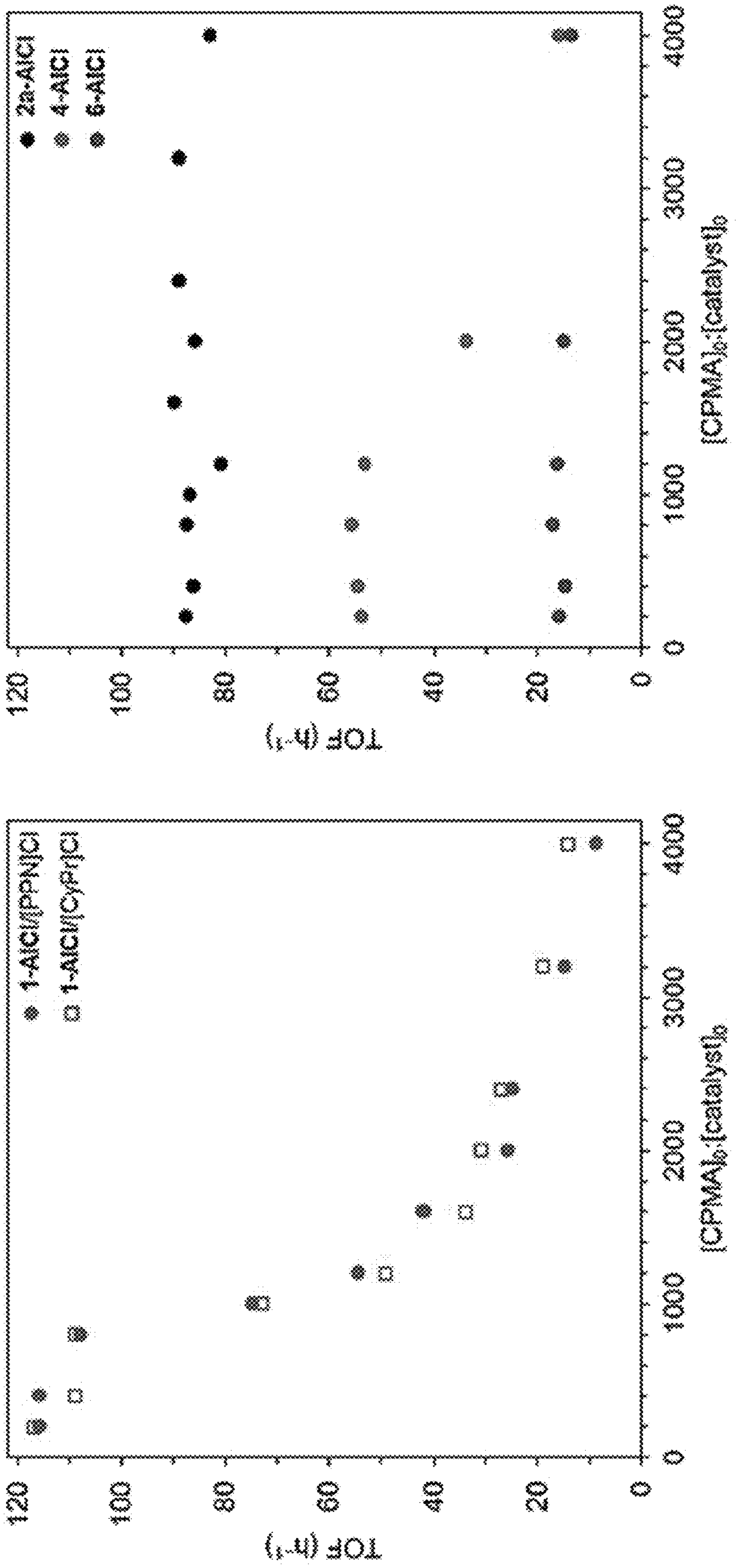
FIG. 57. Comparison of TOF in binary systems 1-AlCl/[PPN]Cl and 1-AlCl/[CyPr]Cl (left) and bifunctional systems 2a-AlCl, 4-AlCl, and 6-AlC1(right) as a function of catalyst loading for PO/CPMA copolymerization. $[catalyst]_0$:$[CPMA]_0$:$[PO]_0$=1:200:1000-1:4000:20000. For polymerizations performed using 1-AlCl, $[catalyst]_0$:[cocatalyst]o=1:1. TOF=Turnover frequency, mol anhydride consumed×mol catalyst$^{-1}$×h$^{-1}$.

TOF as a Function of Catalyst Loading in Binary and Bifunctional Catalyst Systems. Average turnover frequencies from kinetics experiments (FIG. 44, FIG. 47, FIGS. 52-54) and time points taken between 30-64% conversion (FIG. 56) were used to plot turnover frequency as a function of catalyst loading in the binary and bifunctional systems (FIG. 57).

Characterization of Dormant Chains. Polymerizations with Non-Initiating Alcohol TrOH. Polymerizations were performed according to the general polymerization procedure (vide supra) with the addition non-initiating alcohol TrOH as a solid. Polymerizations catalyzed by 2a-AlC1 produced rates and molecular weights that were invariant with [TrOH] (FIG. 58). By contrast, in polymerizations catalyzed by 1-AlCl, rates slowed with increasing [TrOH] (FIG. 18, FIG. 59). Nonetheless, molecular weights at full conversion remained roughly constant despite varied [TrOH] (FIG. 59). The slight decrease in molecular weights observed at high loadings of TrOH is attributed to additional adventitious water introduced from the non-initiating alcohol rather than to initiation from TrOH (e.g., FIG. 58, entries 2 to 20, polymer molecular weights decrease by only –6 kDa rather than roughly 5-fold as would be expected if TrOH initiates a chain).

Figure 60:
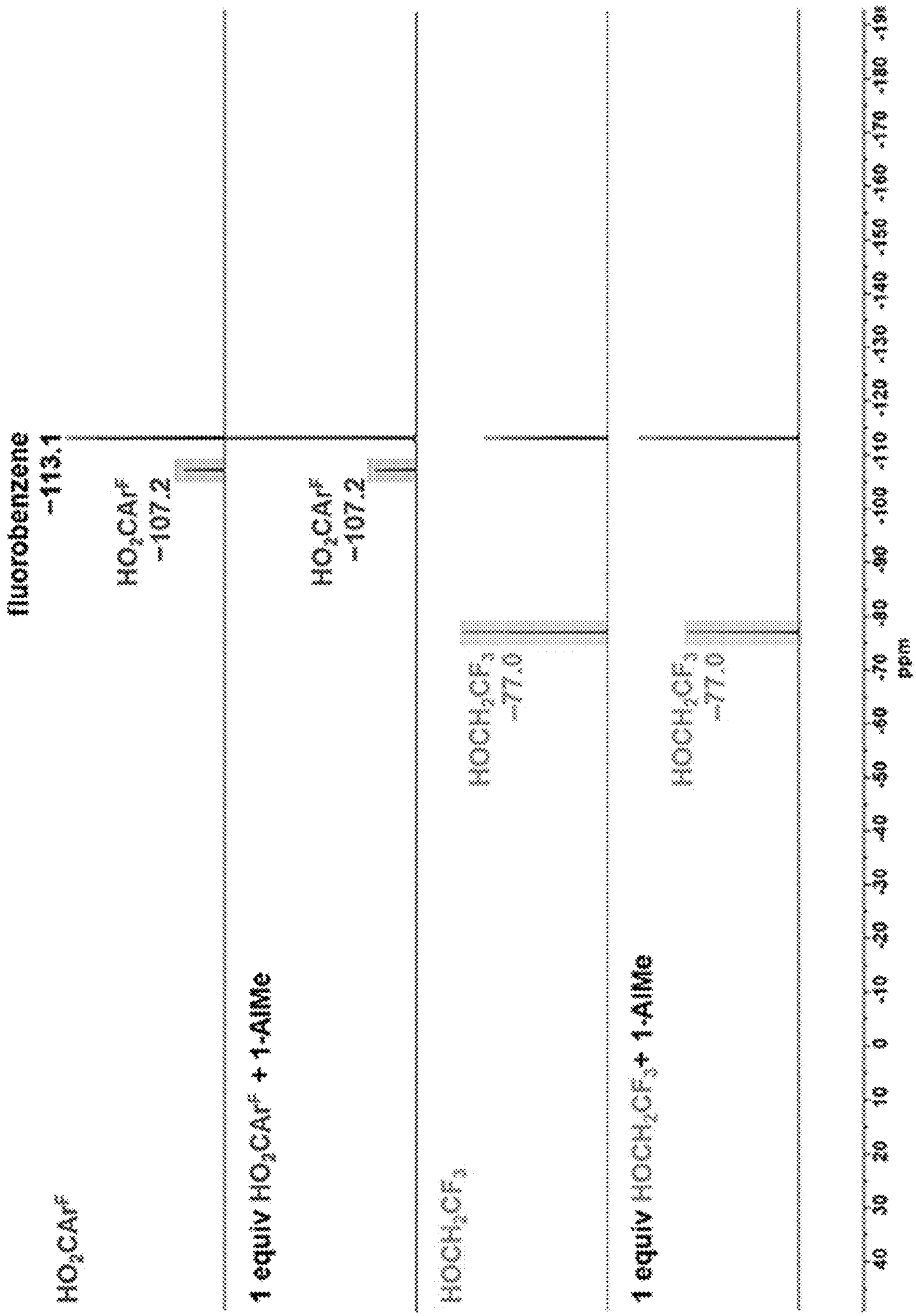
FIG. 60. $^{19}$F NMRs from top to bottom: 4-fluorobenzoic acid, 1-AlMe+1 equiv 4-fluorobenzoic acid, trifluoroethanol, and 1-AlMe+1 equiv trifluorethanol in THE referenced to fluorobenzene.

$^{19}$F NMR Model Compound Studies. As a control experiment, a salph aluminum complex with permanent axial ligand 1-AlMe (9.3 mg, 0.016 mmol, 1.0 equiv) was combined with either 4-fluorobenzoic acid (2.2 mg, 0.016 mmol, 1.0 equiv) or trifluorethanol (1.2 μL, 0.016 mmol, 1.0 equiv) in dry, degassed THF with dry, degassed fluorobenzene as an internal reference for $^{19}$F NMR. $^{19}$F NMR spectra of the two mixtures only exhibited peaks associated with the free benzoic acid or alcohol (FIG. 60). The absence of additional peaks or chemical shifts indicate that coordination of the Lewis basic moiety at aluminum occurs in only undetectably small amounts or is labile in THF.

Figure 61:
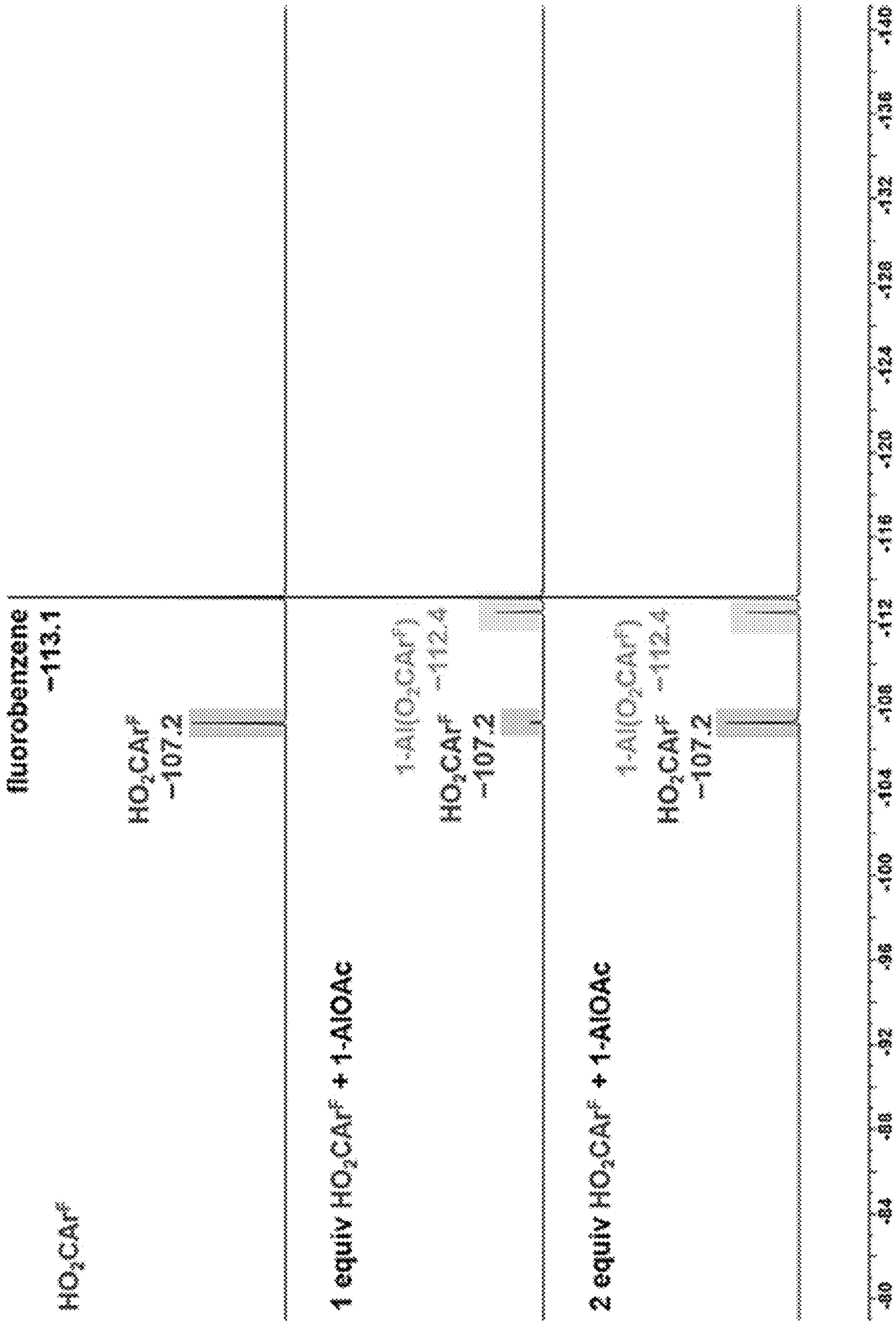
FIG. 61. $^{19}$F NMRs from top to bottom: 4-fluorobenzoic acid, 1-AlOAc+1 equiv 4-fluorobenzoic acid, 1-AlOAc+2 equiv 4-fluorobenzoic acid in THE referenced to fluorobenzene.

In dry, degassed THF, 1-AlOAc (10 mg, 0.016 mmol, 1.0 equiv) was treated with 4-fluorobenzoic acid (2.2 mg, 0.016 mmol, 1.0 equiv or 4.5 mg, 0.032 mmol, 2.0 equiv) and fluorobenzene (15 μL, 0.16 mmol, 10 equiv) was added as an internal reference. The resulting solutions were characterized by $^{19}$F NMR at 22° C. (FIG. 61).

Figure 62:
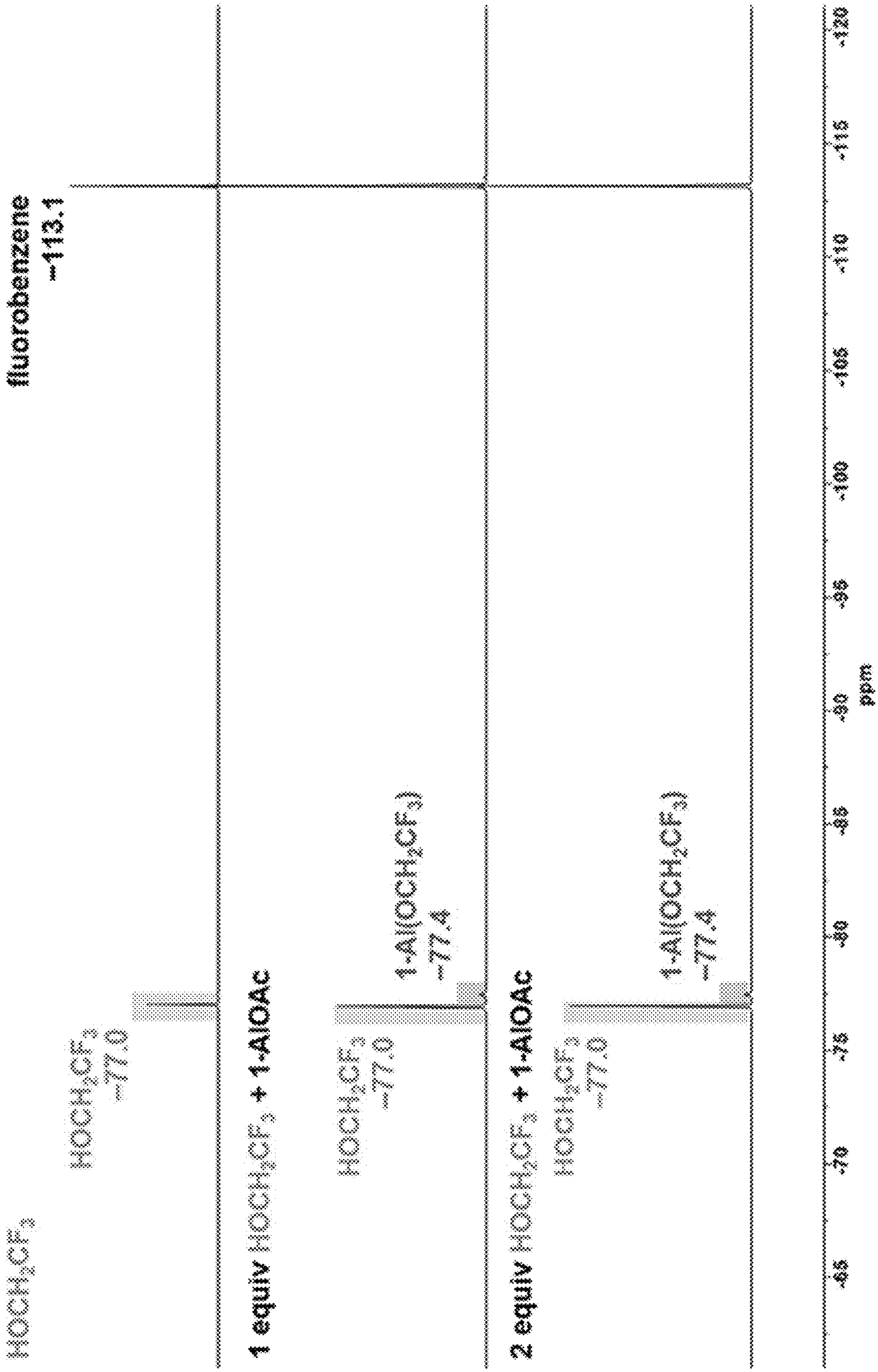
FIG. 62. $^{19}$F NMRs from top to bottom: 4-fluorobenzoic acid, 1-AlOAc+1 equiv trifluoroethanol, 1-AlOAc+2 equiv trifluoroethanol in THE referenced to fluorobenzene.

In dry, degassed THF, 1-AlOAc (10 mg, 0.016 mmol, 1.0 equiv) was treated with trifluoroethanol (1.2 μL, 0.016 mmol, 1.0 equiv or 2.4 μL, 0.032 mmol, 2.0 equiv) and fluorobenzene (15 μL, 0.16 mmol, 10 equiv) was added as an internal reference. The resulting solutions were characterized by $^{19}$F NMR at 22° C. (FIG. 62).

Figure 63:
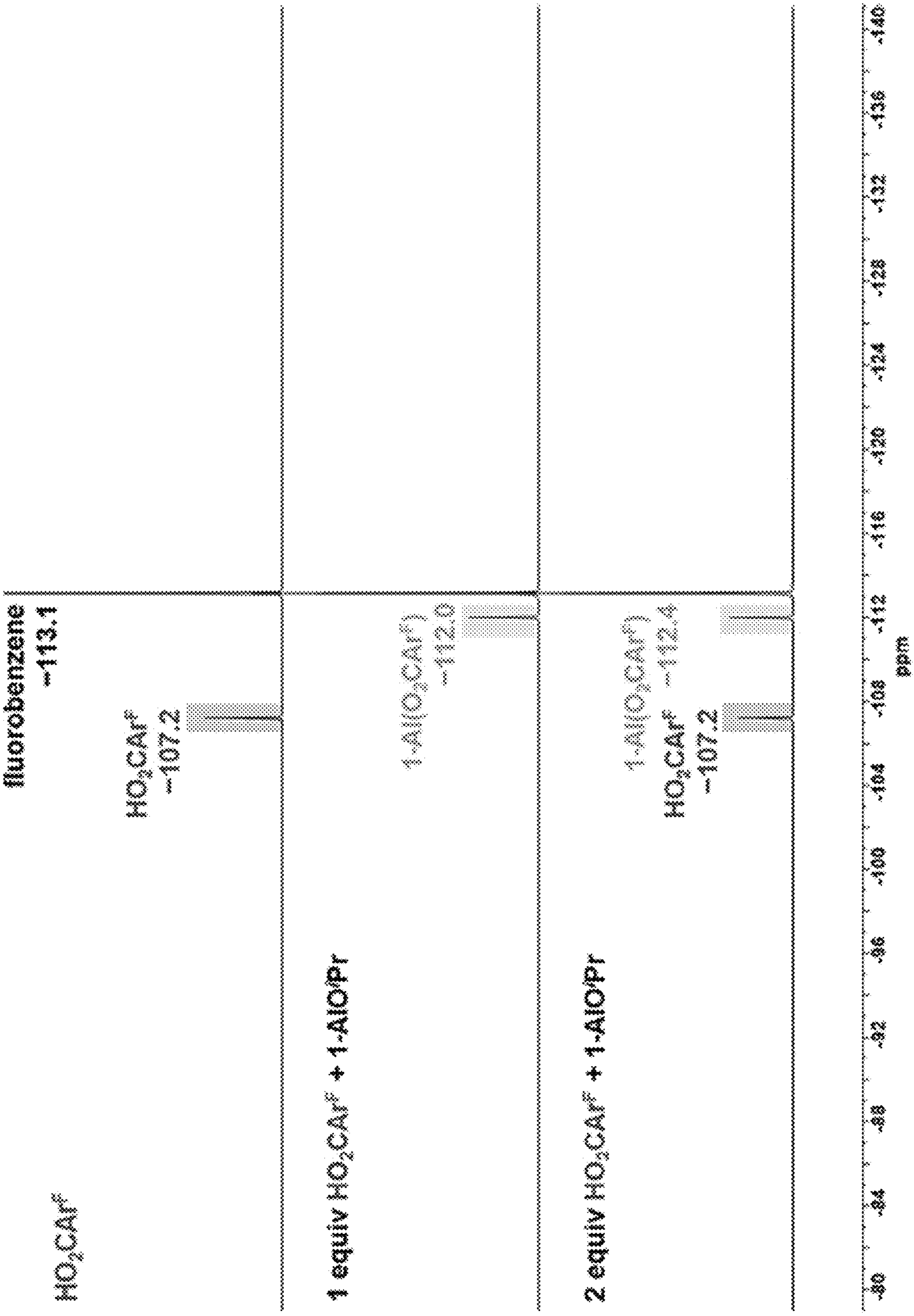
FIG. 63. $^{19}$F NMRs from top to bottom: 4-fluorobenzoic acid, 1-AlOiPr+1 equiv 4-fluorobenzoic acid, 1-AlOiPr+2 equiv 4-fluorobenzoic acid in THE referenced to fluorobenzene.

In dry, degassed THF, 1-AlOiPr (10 mg, 0.016 mmol, 1.0 equiv) was treated with 4-fluorobenzoic acid (2.2 mg, 0.016 mmol, 1.0 equiv or 4.5 mg, 0.032 mmol, 2.0 equiv) and fluorobenzene (15 μL, 0.16 mmol, 10 equiv) was added as an internal reference. The resulting solutions were characterized by $^{19}$F NMR at 22° C. (FIG. 63). With one and two equivalents of 4-fluorobenzoic acid, 100% of aluminum species in solution comprised 1-Al($O_2CAr_F$).

Figure 64:
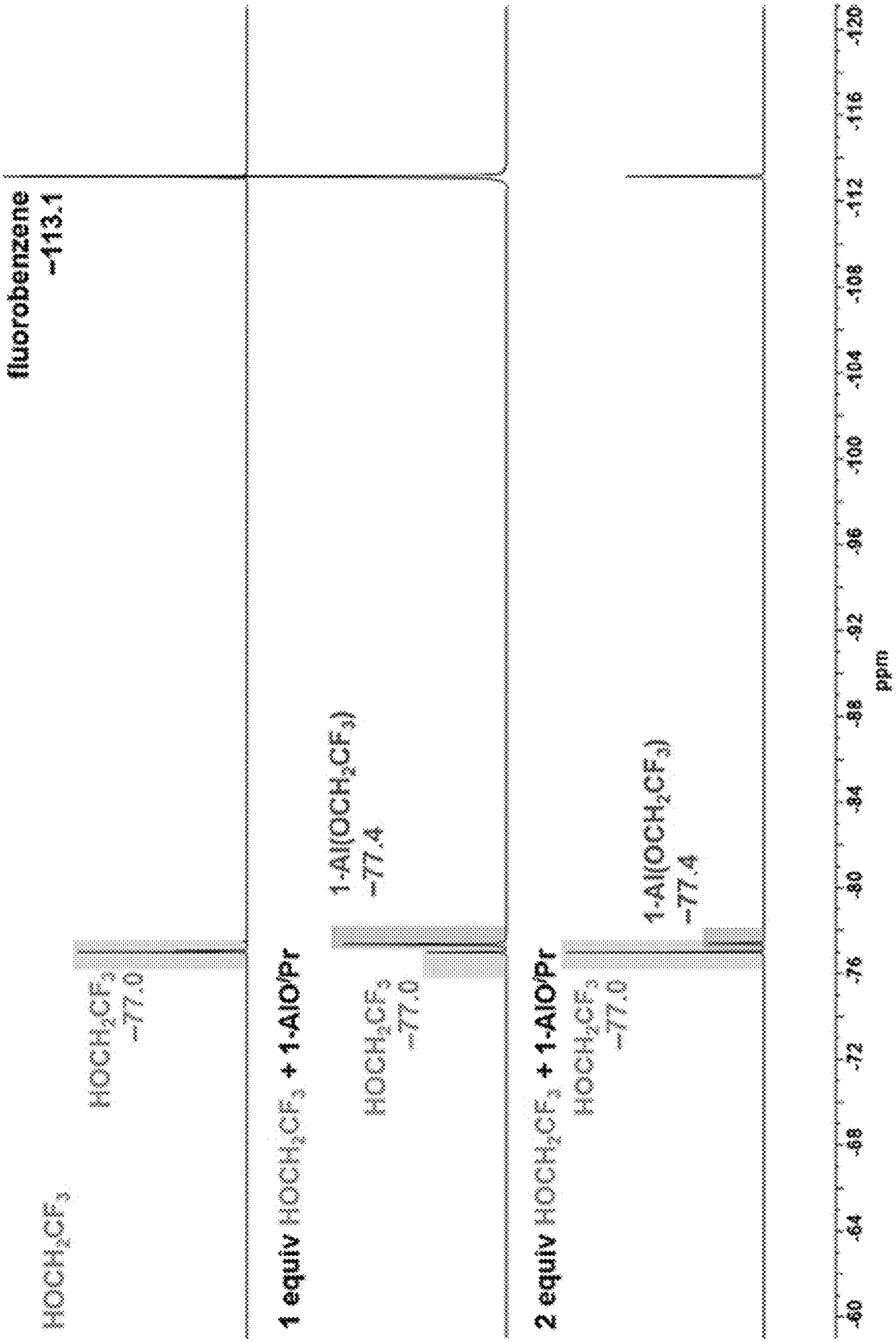
FIG. 64. $^{19}$F NMRs from top to bottom: trifluoroethanol, 1-AlOiPr+1 equiv trifluoroethanol, 1-AlOiPr+2 equiv trifluoroethanol in THE referenced to fluorobenzene.

In dry, degassed THF, 1-AlOiPr (10 mg, 0.016 mmol, 1.0 equiv) was treated with trifluoroethanol (1.2 μL, 0.016 mmol, 1.0 equiv or 2.4 μL, 0.032 mmol, 2.0 equiv) and fluorobenzene (15 μL, 0.16 mmol, 10 equiv) was added as an internal reference. The resulting solutions were characterized by $^{19}$F NMR at 22° C. (FIG. 64).

Figure 65:
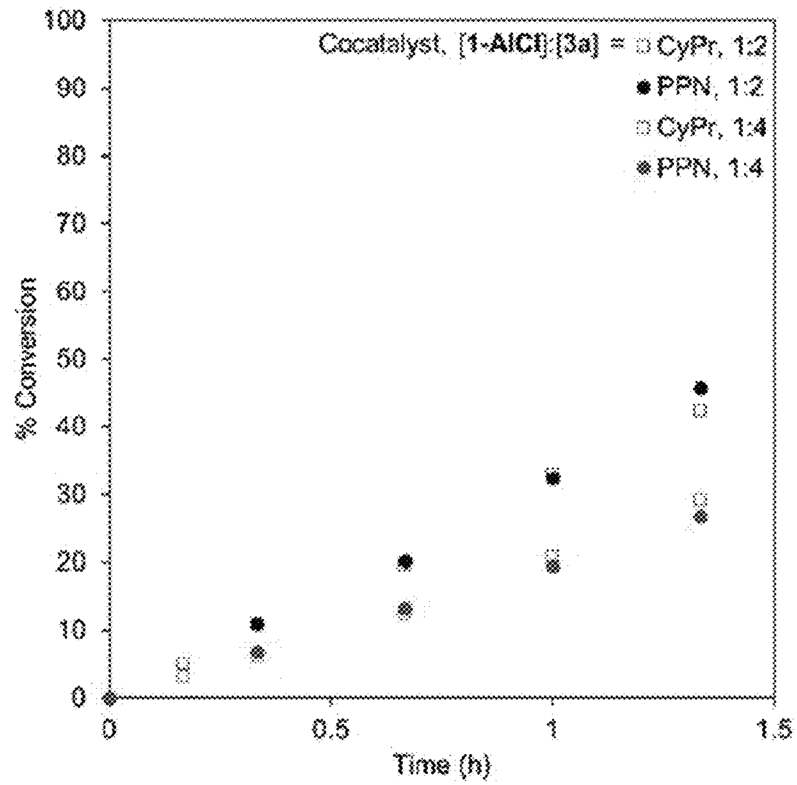
FIG. 65. Conversion of CPMA with time using 1-AlCl and [CyPr]C (open squares) or [PPN]Cl (solid circles) at two different loadings of CTA-1. $[1\text{-AlCl}]_0$:[cocatalyst]:$[CTA\text{-}1]_0$:$[CPMA]_0$:$[PO]_0$=1:1:2:200:1000 (black), $[1\text{-AlCl}]_0$:[cocatalyst]:$[CTA\text{-}1]_0$:$[CPMA]_0$:$[PO]_0$=1:1:4:200:1000 (red).

Procedures for Kinetic Measurements in the Presence of CTA. Comparison of Polymerization Kinetics Using Binary Systems 1-AlCl/[CyPr]Cl and 1-AlCl/[PPN]Cl in the Presence of CTA CTA-1. According to the general polymerization procedure, catalyst 1-AlCl, cocatalyst ([CyPr]Cl or [PPN]Cl), CPMA, and PO, concentrations were maintained while two different concentrations of CTA-1 were used. Aliquots were taken throughout the reaction time courses and analyzed by $^{1}$H NMR spectroscopy to determine conversion of the cyclic anhydride. The observed reaction profiles using [CyPr]Cl as a cocatalyst were in excellent agreement with those obtained using [PPN]Cl (FIG. 65), suggesting that the binary system performs similarly with either cocatalyst in the presence of CTA.

Polymerization Kinetics Using Bifunction System 1-AlCl/[CyPr]Cl and CTA CTA-1. Relative Rates of Ring-Opening Competition Experiment with 1-AlOiPr and [PPN] OAc. Based on a reported procedure, a competition study in which a mixture of 1-AlOiPr and [PPN]OAc was treated with PO and CPMA in $CDCl_3$ in a J. Young NMR tube. The reaction mixture was heated at 60° C. and monitored by $^{1}$H NMR spectroscopy. 1 equiv of a stock solution of [PPN] OAc (100 μL, 140 mM in $CDCl_3$) was combined with 2 equiv PO (200 μL, 140 mM in $CDCl_3$), 2 equiv CPMA (100 μL, 280 mM in $CDCl_3$), and 2 equiv TrOH (200 μL, 140 mM in $CDCl_3$). The solution was transferred to a J. Young NMR tube and 1 equiv of a stock solution of 1-AlOiPr (300 μL, 46 mM in $CDCl_3$) was added via syringe. A $^{1}$H NMR spectrum was acquired immediately to obtain initial concentrations relative to an internal standard. The reaction mixture was heated at 60° C. and $^{1}$H NMR spectra acquired every hour (accounting for the NMR acquisition time at 22° C.). The alkoxide/carboxylate mixture initially reacted more rapidly with CPMA than with PO (FIG. 66). After 50% conversion of cyclic anhydride, the rate of CPMA ring-opening slowed.

Determination of the Reaction Order in Catalyst 1-AlC1 and Cocatalyst [CyPr]Cl Using Variable Time Normalization Kinetic Analysis. The normalized time scale method to determine the reaction order in catalyst relies on the invariance of catalyst concentration during the course of a reaction. In the binary 1-AlCl/[CyPr]Cl system, both the concentration of the aluminum catalyst 1-AlCl and the concentration of the [CyPr] cocatalyst are constant throughout the reaction. Accordingly, the normalized time scale method can be used to identify the reaction order in each species.

Polymerizations were performed at different loadings of 1-AlC1 while holding the amounts of [CyPr]Cl, CTA-1, CPMA, and PO constant. Using the normalized time scale method, the consumption of CPMA was plotted against the normalized time scale $t\times[1\text{-AlCl}]^n$, where t is time in hours, [1-AlCl] is the initial concentration of the aluminum catalyst, and n is the order in catalyst. CPMA consumption at two different catalyst loadings was plotted against normalizations using possible reaction orders n (FIG. 67). A time normalization of t×[1-AlCl] afforded good graphical overlay, consistent with a first-order dependence of polymerization rate on catalyst 1-AlC1 concentration.

Polymerizations were performed at different loadings of [CyPr]Cl while holding the amounts of 1-AlCl, CTA-1, CPMA, and PO constant. Using the normalized time scale method, the consumption of CPMA was plotted against the normalized time scale $t\times[\text{CyPr}]_n$, where t is time in hours, [CyPr] is the initial concentration of the aminocyclopropenium cocatalyst, and n is the order in catalyst. CPMA consumption at two different catalyst loadings was plotted against normalizations using possible reaction orders n (FIG. 68). A time normalization of t×[CyPr] afforded good graphical overlay, consistent with a first-order dependence of polymerization rate on cocatalyst [CyPr]C concentration.

Figure 69:
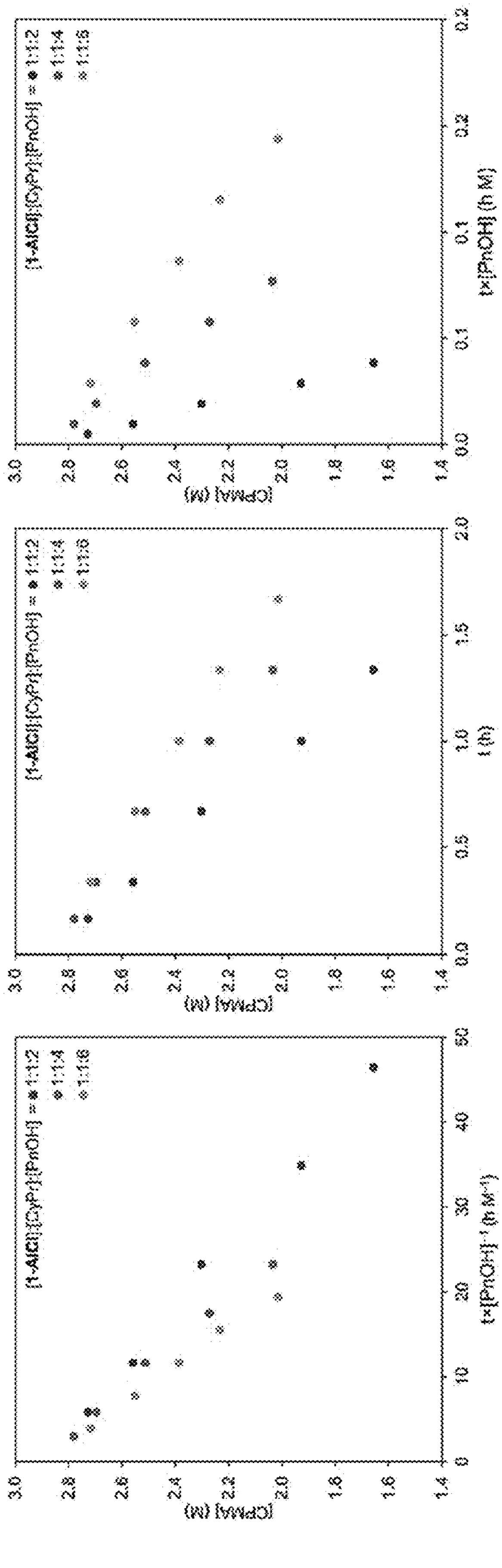
FIG. 69. Anhydride decay versus normalized time scale for inverse-first-order (left), zero-order (middle) and first-order (right) behavior in CTA-1 at low CTA loadings. $[1\text{-AlCl}]_0$:[CyPrCl]:$[CTA\text{-}1]_0$:$[CPMA]_0$:$[PO]_0$=1:1:2:200:1000 (purple), $[1\text{-AlCl}]_0$:[CyPrCl]:$[CTA\text{-}1]_0$:$[CPMA]_0$:$[PO]_0$=1:1:4:200:1000 (green), $[1\text{-AlCl}]_0$:[CyPrCl]:$[CTA\text{-}1]_0$:$[CPMA]_0$:$[PO]_0$=1:1:6:200:1000 (orange).
Figure 70:
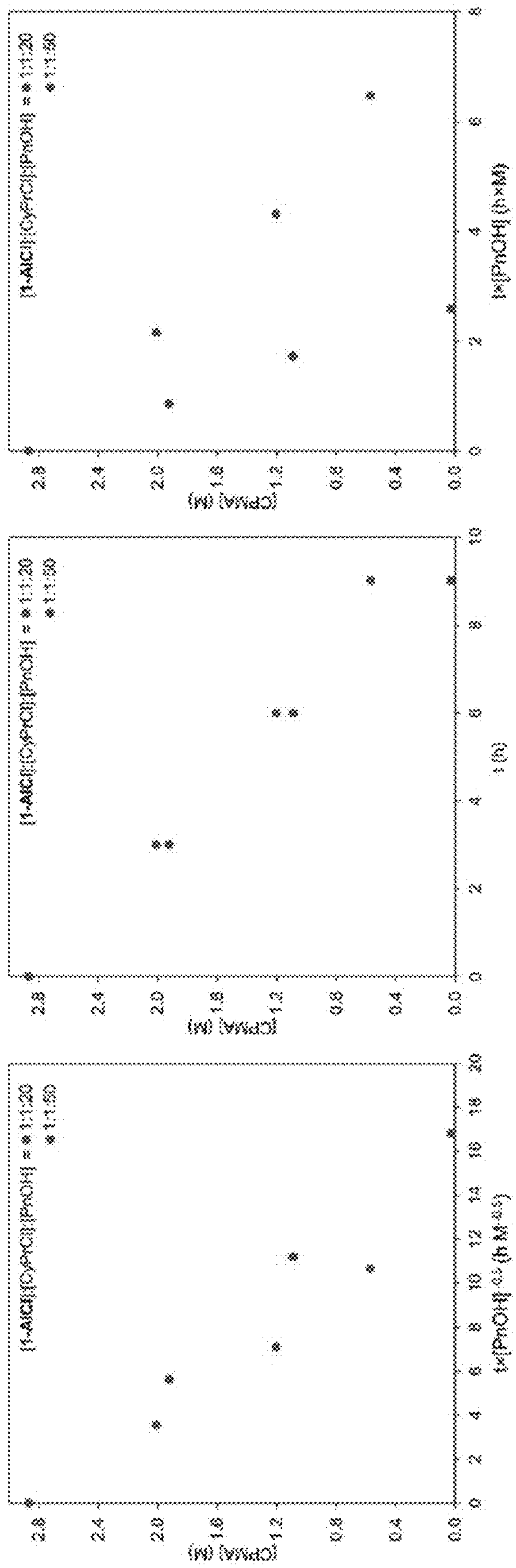
FIG. 70. Anhydride decay versus normalized time scale for inverse-half-order (left), zero-order (middle) and first-order (right) behavior in CTA-1 at high CTA loadings. $[1\text{-AlCl}]_0$:[CyPrCl]:$[CTA\text{-}1]_0$:$[CPMA]_0$:$[PO]_0$=1:1:20:200:1000 (maroon), $[1\text{-AlCl}]_0$:[CyPrCl]:$[CTA\text{-}1]_0$:$[CPMA]_0$:$[PO]_0$=1:1:50:200:1000 (blue).

The same normalized time scale method to determine the order in catalyst can be used to determine the reaction order in dormant chains, as the concentration of these species is constant throughout the course of a reaction. Polymerizations were performed at different loadings of CTA-1 while holding the amounts of 1-AlCl, [CyPr]Cl, CPMA, and PO constant (1:1:X:200:1000). Using the normalized time scale method, the consumption of CPMA was plotted against the normalized time scale t×[PnOH]$^n$, where t is time in hours, [PnOH] is the initial concentration of CTA (which is equivalent to the concentration of dormant chains), and n is the order in catalyst. CPMA consumption at three different CTA loadings was plotted against normalizations using possible reaction orders n. A time normalization of t×[PnOH]$^{-0.5}$ afforded good graphical overlay, consistent with a first-order dependence of polymerization rate on dormant chain concentration [PnOH] when small amounts of CTA were used (FIG. 19, top, FIG. 69). Upon increasing the concentration of CTA, saturation kinetic behavior was observed with a pseudo zero-order dependence on [PnOH] (FIG. 70).

Determination of the Reaction Order in CTA CTA-1 in the Binary System 1-AlCl/[CyPr]Cl Using Variable Time Normalization Kinetic Analysis. Data are shown in FIGS. 69 and 70.

Determination of the Reaction Order in Epoxide in the Binary System 1-AlCl/[CyPr]Cl Using Variable Time Normalization Kinetic Analysis and Initial Rates. The order in epoxide in the binary catalyst system was determined by varying the PO concentration while catalyst, cocatalyst, and CPMA concentrations were held constant. As the polymerizations are typically performed in neat epoxide, THE was added at lower epoxide concentrations to maintain a consistent total volume. A representative procedure follows: catalyst and cyclic anhydride were weighed into an oven-dried 4 mL glass vial in a nitrogen-filled glove box. Appropriate volumes of THF and PO were added sequentially via gastight syringe, and the vial was sealed with a Teflon coated cap. The vial was then transferred to an oil bath at 60° C. At desired time points, small aliquots were removed for 1H NMR spectroscopic analysis to determine conversion of anhydride. The whole reaction profile was used for variable time normalization kinetic analysis (FIG. 71). Initial rates were determined before 20% conversion of anhydride was reached (FIG. 72).

Determination of the Reaction Order in Cyclic Anhydride in the Binary System 1-AlCl/[CyPr]Cl Using Variable Time Normalization Kinetic Analysis. The order in cyclic anhydride in the binary catalyst system was determined by varying CPMA concentration while catalyst, cocatalyst, and PO concentrations were held constant. Upon addition of epoxide to the solids, the vial was sealed then transferred to an oil bath at 60° C. At desired time points, small aliquots were removed for $^1$H NMR spectroscopic analysis to determine conversion of anhydride. The whole reaction profile was used for variable time normalization kinetic analysis (FIG. 73), but good graphical overlay was obtained without applying a normalization, suggesting zero-order behavior. Efforts to apply time normalizations resulted in poor fits.

Figure 74:
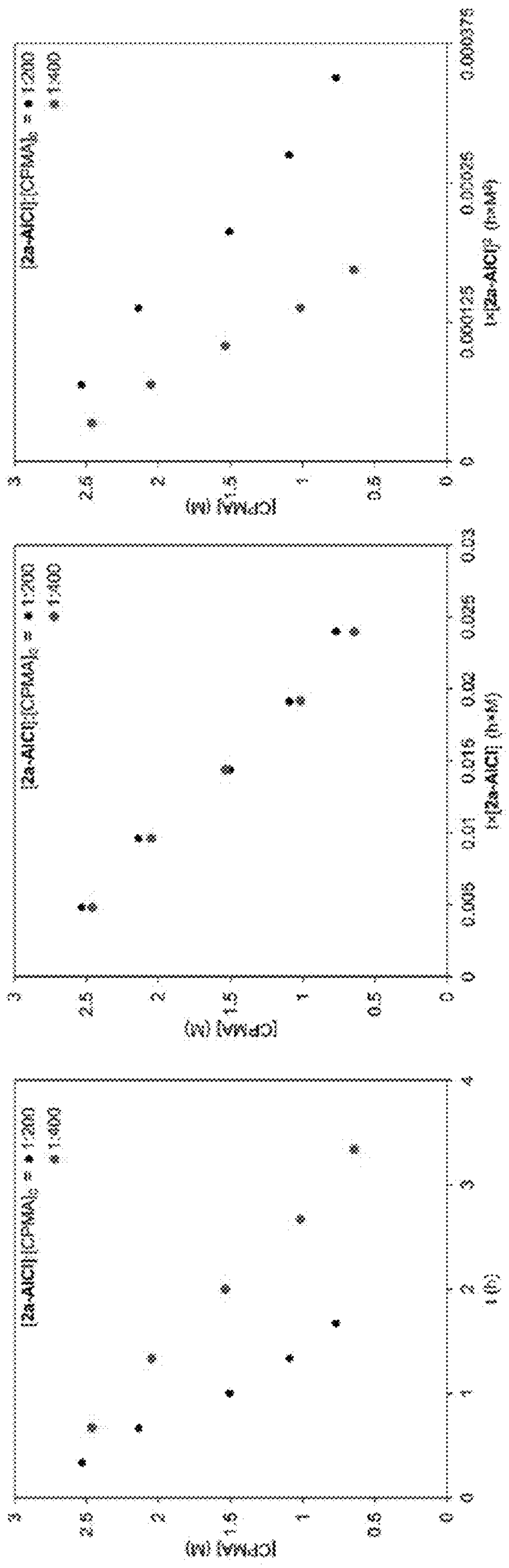
FIG. 74. Anhydride decay versus normalized time scale for zero-order (left), first-order (middle) and second-order (right) behavior in 2a-AlCl. $[2a\text{-AlCl}]_0$:$[CTA\text{-}1]_0$:$[CPMA]_0$:$[PO]_0$=1:2:200:1000 (black), $[2a\text{-AlCl}]_0$:$[CTA\text{-}1]_0$:$[CPMA]_0$:$[PO]_0$=1:2:400:2000 (red).

Polymerization Kinetics Using Bifunctional System 2a-AlC1 and CTA CTA-1. Determination of the Reaction Order in Catalyst 2a-AlC1 Using Variable Time. Normalization Kinetic Analysis. Time normalization kinetic analysis was used to determine the order in bifunctional catalyst 2a-AlC1 by performing polymerizations at different catalyst loadings. The amounts of CTA-1, CPMA, and PO were held constant. The consumption of CPMA, as determined by $^1$H NMR spectroscopic analysis, was plotted against the normalized time scale t×[2a-AlCl]$^n$, where t is time in hours, [2a-AlCl] is the initial concentration of the bifunctional aluminum catalyst, and n is the order in catalyst. CPMA consumption at two different catalyst loadings was plotted against normalizations using possible reaction orders n (FIG. 74). A time normalization of t×[2a-AlCl] afforded good graphical overlay, consistent with a first-order dependence of polymerization rate on catalyst 2a-AlC1 concentration.

Figure 75:
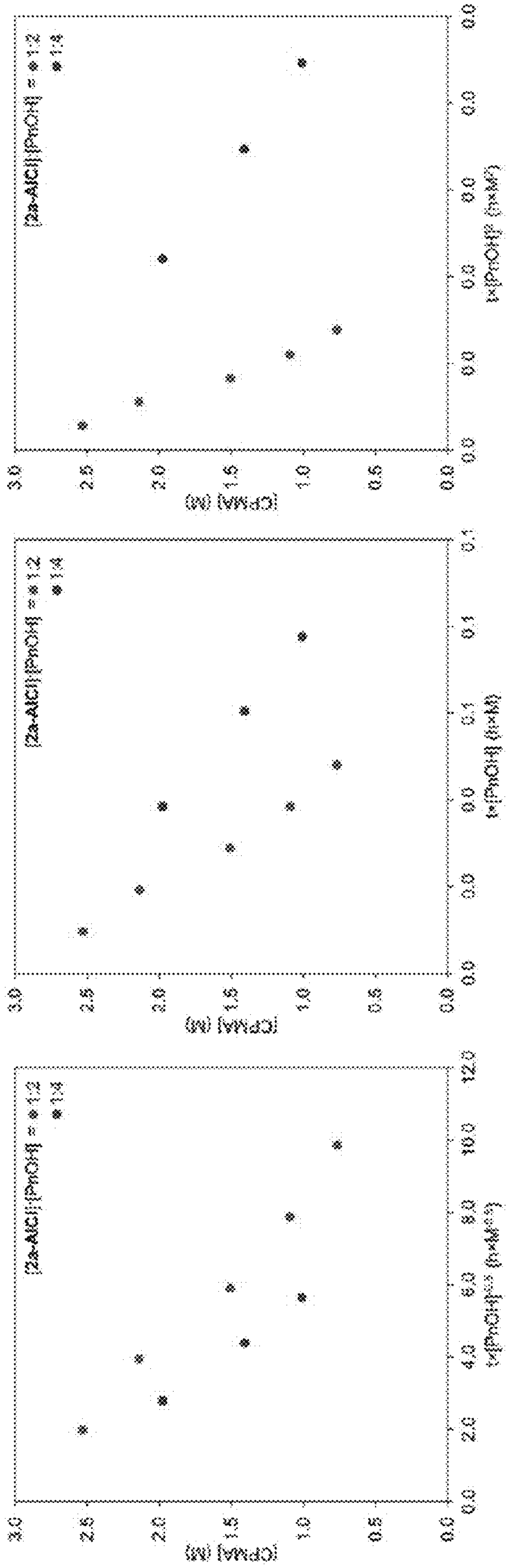
FIG. 75. Anhydride decay versus normalized time scale for inverse-half-order (left), first-order (middle) and second-order (right) behavior in CTA-1 at low CTA loadings. $[2a\text{-AlCl}]_0$:$[CTA\text{-}1]_0$:$[CPMA]_0$:$[PO]_0$=1:2:200:1000 (red), $[2a\text{-AlCl}]_0$:$[CTA\text{-}1]_0$:$[CPMA]_0$:$[PO]_0$=1:4:200:1000 (blue).

Determination of the Reaction Order in CTA-1 in the Bifunctional System 2a-AlCl Using Variable Time Normalization Kinetic Analysis. The same normalized time scale method to determine the order in catalyst can be used to determine the reaction order in dormant chains, as the concentration of these species is constant throughout the course of a reaction. Polymerizations were performed at different loadings of CTA-1 while holding the amounts of 2a-AlCl, CPMA, and PO constant (1:X:200:1000). The consumption of CPMA was plotted against the normalized time scale t×[PnOH]$^n$, where t is time in hours, [PnOH] is the initial concentration of CTA (which is equivalent to the concentration of dormant chains), and n is the order in catalyst. No time normalization was required to obtain good graphical overlay, consistent with a zero-order dependence of polymerization rate on dormant chain concentration [PnOH] in the bifunctional system (FIG. 19, bottom). Efforts to apply time normalizations afforded poorer fits (FIG. 75).

Determination of the Reaction Order in Epoxide in the Bifunctional System 2a-AlC1 Using Variable Time Normalization Kinetic Analysis. The order in epoxide in the bifunctional catalyst system was determined by varying the PO concentration while catalyst, cocatalyst, and CPMA concentrations were held constant. As the polymerizations are typically performed in neat epoxide, THE was added at lower epoxide concentrations to maintain a consistent total volume. A representative procedure follows: catalyst and cyclic anhydride were weighed into an oven-dried 4 mL glass vial in a nitrogen-filled glove box. Appropriate volumes of THE and PO were added sequentially via gastight syringe, and the vial was sealed with a Teflon coated cap. The vial was then transferred to an oil bath at 60° C. At desired time points, small aliquots were removed for $^1$H NMR spectroscopic analysis to determine conversion of anhydride. The whole reaction profile was used for variable time normalization kinetic analysis (FIG. 76).

Determination of the Reaction Order in Cyclic Anhydride in the Bifunctional System 2a-AlC1 Using Variable Time Normalization Kinetic Analysis. The order in cyclic anhydride in the bifunctional catalyst system was determined by varying CPMA concentration while catalyst, cocatalyst, and PO concentrations were held constant. Upon addition of epoxide to the solids, the vial was sealed then transferred to an oil bath at 60° C. At desired time points, small aliquots were removed for $^1$H NMR spectroscopic analysis to determine conversion of anhydride. Good graphical overlay of the reaction profiles was obtained without applying a time normalization, suggesting zero-order behavior in CPMA. (FIG. 77). Efforts to apply time normalizations resulted in poor fits.

Effect of Exogenous Lewis Acid (1-AiCl) or Cocatalyst ([CyPr]Cl) Added to the Bifunctional System 2a-AlC1 with CTA-1. In an effort to distinguish between epoxide binding and ring-opening rate-limiting steps, additional Lewis acid 1-AlC1 or cocatalyst [CyPr]Cl were added to polymerizations catalyzed by 2a-AlC1 in the presence of CTA CTA-1.

Minimal rate effects were observed when exogenous Lewis acid was used, suggesting that epoxide binding is not rate-limiting (FIG. 78, entries 2-4). By contrast, polymerization rates increased when sufficient [CyPr]Cl was added such that the number of active chains exceeded the number of dormant chains (FIG. 78, entries 5-7). We therefore assign epoxide ring-opening as the rate-limiting step in 2a-AlCl-catalyzed immortal polymerizations.

Although the present disclosure has been described with respect to one or more particular examples, it will be understood that other examples of the present disclosure may be made without departing from the scope of the present disclosure.

The invention claimed is:

1. A catalyst having the following structure:

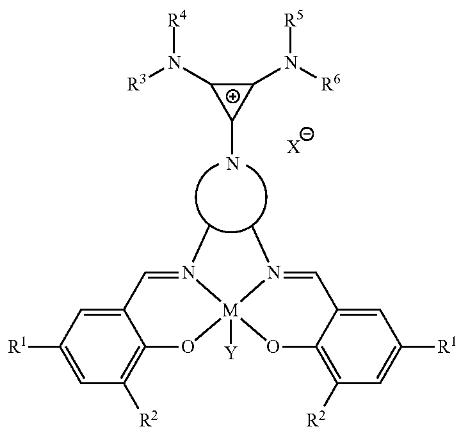

wherein

M is chosen from Al, Co, Cr, Fe, Zn, Mn, Ti, Ni, Ga, Sm, Y, and V;

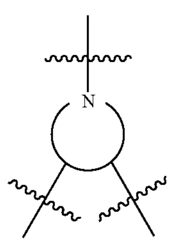

is chosen from

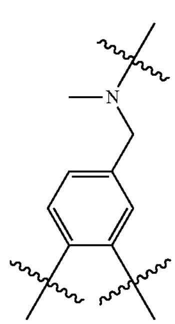

,

-continued

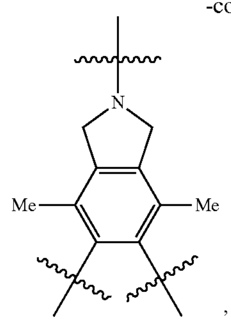

, and

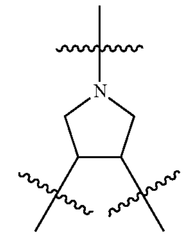

;

$R^1$ and $R^2$ are independently at each occurrence chosen from hydrogen, linear alkyl groups, branched alkyl groups, cycloaliphatic groups, polycycloaliphatic groups, unsaturated aliphatic groups, aryl groups, heterocyclic groups, heteroaliphatic groups, halogen-containing aliphatic groups, halogenated aliphatic groups, nitrile groups, and onium groups;

$R^3$, $R^4$, $R^5$, and $R^6$ are independently at each occurrence chosen from hydrogen, linear alkyl groups, branched alkyl groups, cycloaliphatic groups, polycycloaliphatic groups, unsaturated aliphatic groups, and aryl groups;

X is an anion chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, and $ClO_4$; and Y is optional and is a ligand chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, and $ClO_4$.

2. The catalyst of claim 1, wherein the catalyst is:

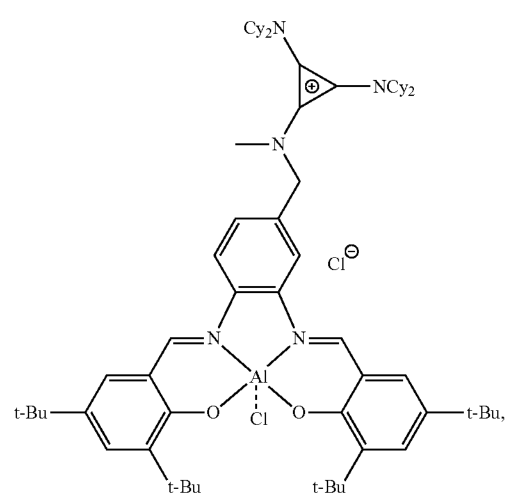

-continued
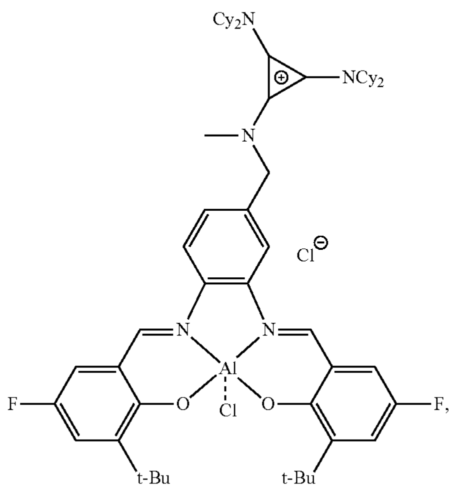
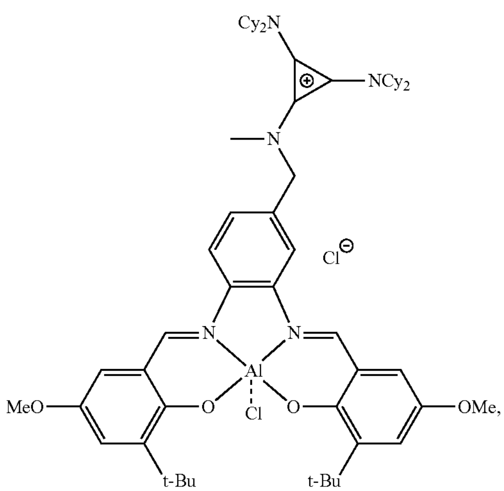
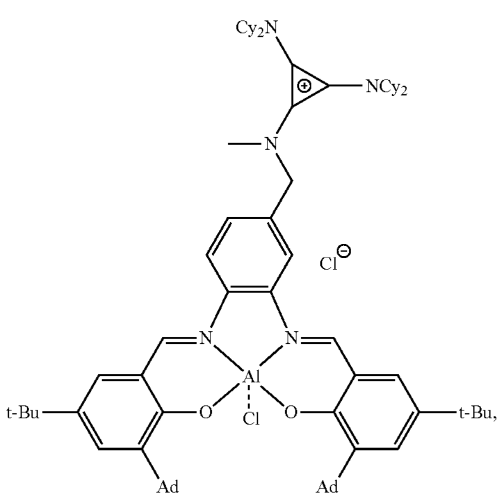
or
-continued
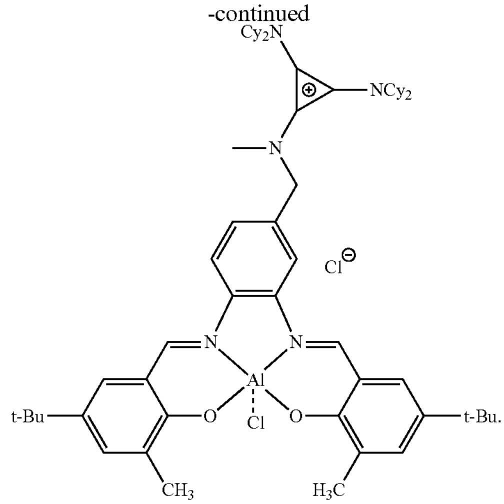
wherein Cy is a cyclohexyl group.
3. The catalyst of claim 2, wherein the catalyst is:
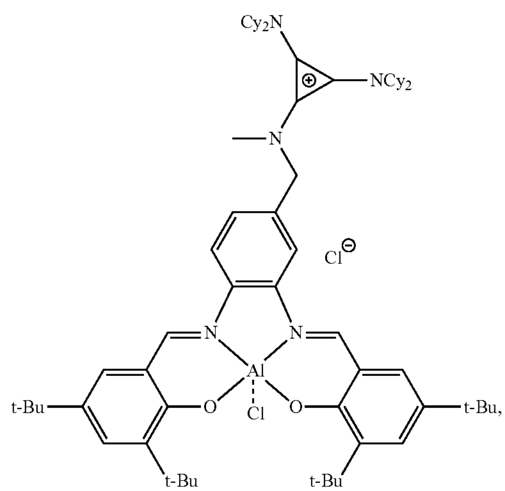
wherein Cy is a cyclohexyl group.
4. The catalyst of claim 1, wherein the catalyst is:
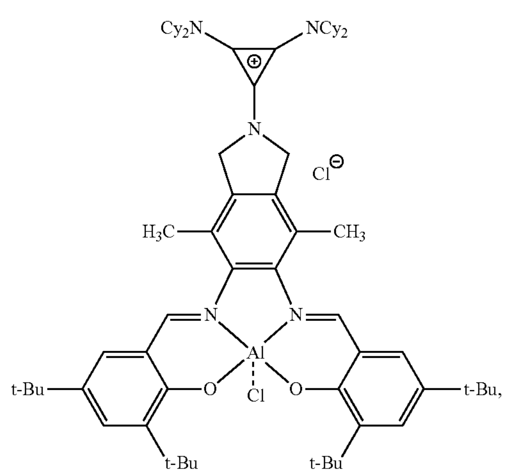
wherein Cy is a cyclohexyl group.

5. The catalyst of claim 1, wherein the catalyst is:

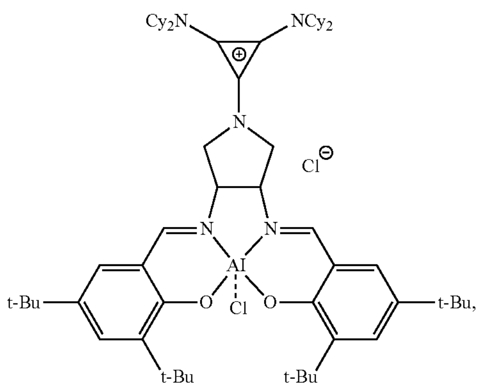

wherein Cy is a cyclohexyl group.

6. A method of making a catalyst of claim 1, comprising:

contacting a bridging group precursor, wherein the bridging group precursor is chosen from:

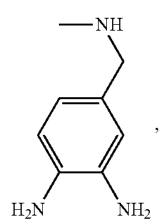

,

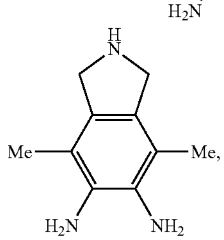

and

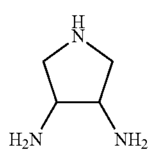

, with one or more substituted or unsubstituted salicylaldehyde(s), wherein the substituted or unsubstituted salicylaldehyde(s) independently have the following structure:

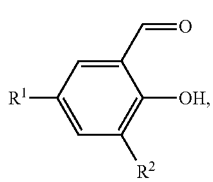

wherein $R^1$ and $R^2$ are independently chosen from hydrogen, linear alkyl groups, branched alkyl groups, cycloaliphatic groups, polycycloaliphatic groups, unsaturated aliphatic groups, aryl groups, heterocyclic groups, heteroaliphatic groups, halogen-containing aliphatic groups, halogenated aliphatic groups, nitrile groups, and onium groups, such that a first reaction product is formed;

contacting the first reaction product with an alkyl halide-functionalized co-catalyst, wherein the alkyl halide-functionalized co-catalyst has the following structure:

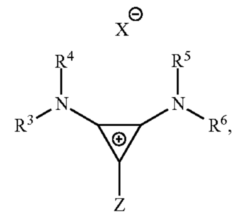

wherein $R^3$, $R^4$, $R^5$, and $R^6$ are independently chosen from hydrogen, linear alkyl groups, branched alkyl groups, cycloaliphatic groups, polycycloaliphatic groups, unsaturated aliphatic groups, and aryl groups and X is an anion chosen from F, CI, Br, I, $N_3$, $NO_3$ carboxylates, benzoates, alkoxides, phenoxides, enolates, thiolates, amides, sulfonamides, thiocyanates, CN, $O(SO_2)R$, $BPh_4$, $SbF_5$ and $ClO_4$ and Z is a halogen, that may have one or more substituent(s) such that a second reaction product is formed;

contacting the second reaction product with a Lewis acid such that the catalyst is formed;

optionally, oxidizing the catalyst; and optionally, isolating the catalyst.

7. The method of claim 6, wherein the Lewis acid comprises an oxidized metal (M) and one or more ligand(s), wherein the ligand(s) is/are chosen from alkyl groups, alkoxides, phenoxides, azide, nitrate, acetate, carboxylate, halides, and combinations thereof, and, optionally, the Lewis acid is a hydrate.

8. The method of claim 7, wherein the Lewis acid is chosen from $Et_2AlCl$, $Me_2Zn$, $CrCl_2$, $Mn(OAc)_3.2H_2O$, $FeCl_3.6H_2O$, and $Co(OAc)_2.4H_2O$.

9. The method of claim 6, wherein the catalyst is:

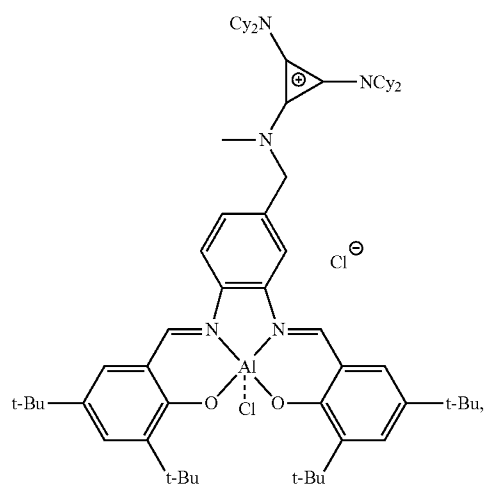

wherein Cy is a cyclohexyl group.

10. A method of making an aliphatic polyester or an aliphatic polycarbonate, comprising contacting an epoxide with i) a cyclic anhydride or $CO_2$ and ii) a catalyst of claim 1, wherein the aliphatic polyester or the aliphatic polycarbonate is formed.

11. The method of claim 10, wherein the ratio of catalyst to cyclic anhydride to epoxide or catalyst to $CO_2$ to epoxide is 1:≥100: >100 and there is more epoxide than cyclic anhydride.

12. The method of claim 10, wherein the epoxide is chosen from:

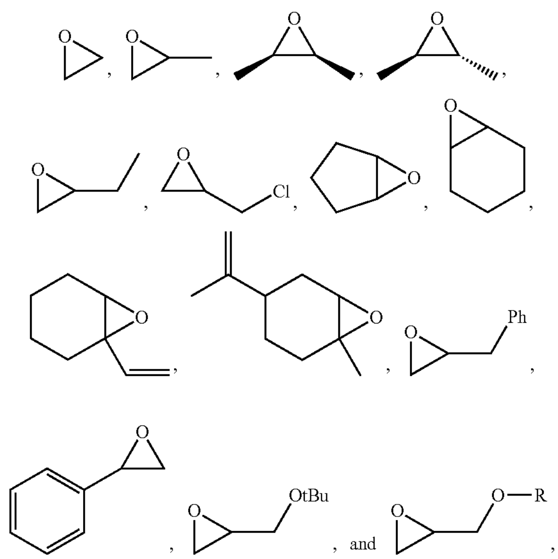

wherein R is a substituted or unsubstituted aliphatic group.

13. The method of claim 10, wherein the cyclic anhydride is chosen from:

substituted or unsubstituted cyclic anhydride Diels Alder adducts, substituted or unsubstituted

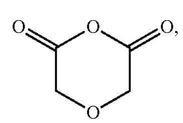

substituted or unsubstituted

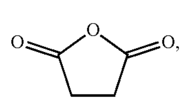

substituted or unsubstituted

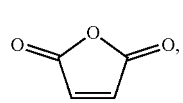

substituted or unsubstituted

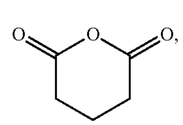

substituted or unsubstituted

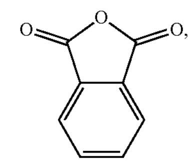 [SMILES: O=C1OC(=O)c2ccccc21]

substituted or unsubstituted

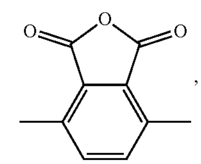

substituted or unsubstituted

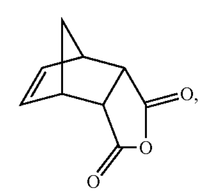 [SMILES: O=C1OC(=O)C2C3C=CC(C3)C12]

substituted or unsubstituted

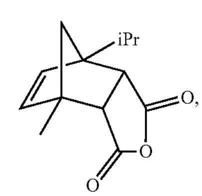 [SMILES: CC(C)C12C=CC(C)(C1)C1C(=O)OC(=O)C12]

and substituted or unsubstituted

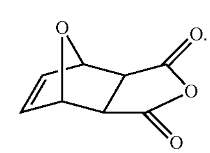 [SMILES: O=C1OC(=O)C2C3C=CC(O3)C12]

14. The method of claim 10, further comprising heating the mixture.

15. The method of claim 10, further comprising contacting the epoxide with one or more protic chain transfer agent(s) prior to contacting the epoxide with the cyclic anhydride.

16. The method of claim 10, wherein the catalyst is:
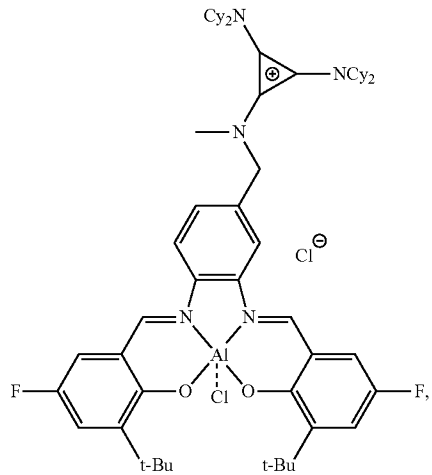
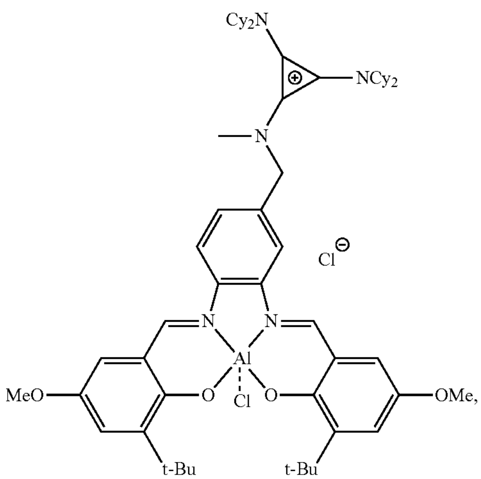
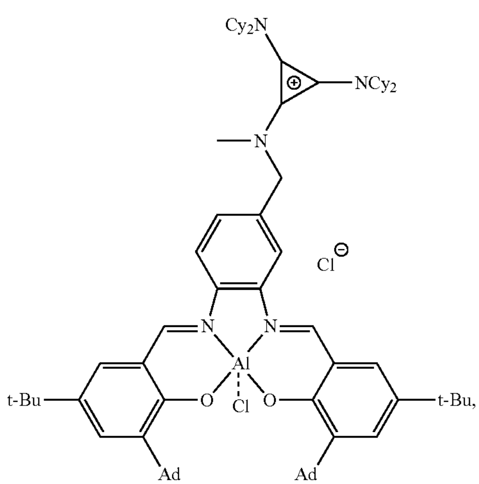
-continued
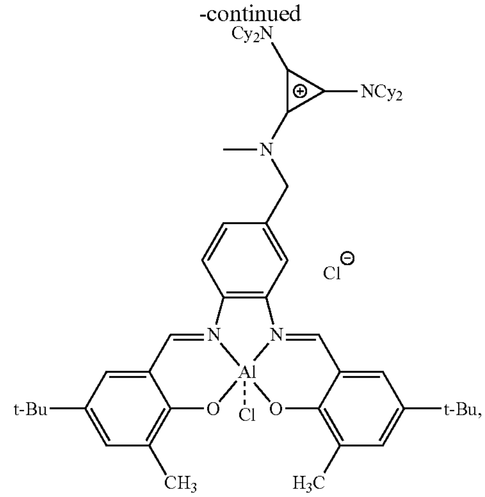
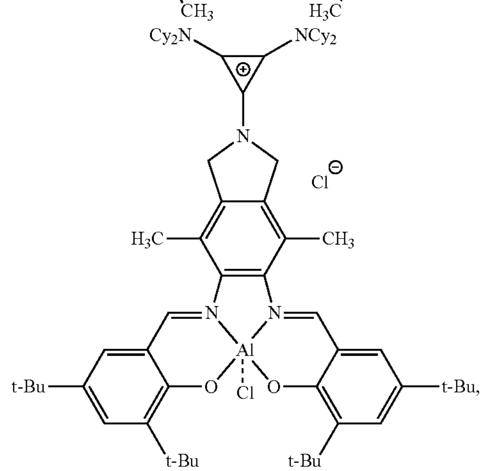
or
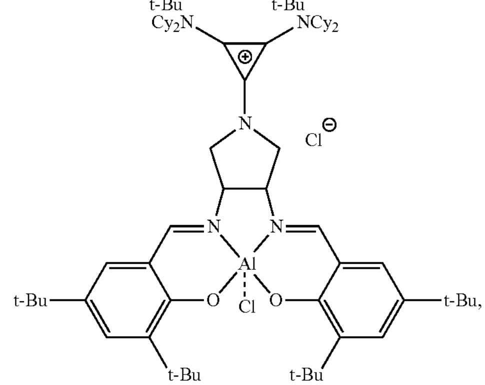
wherein Cy is a cyclohexyl group.
17. The method of 10, further comprising contacting the epoxide with a co-catalyst having the following structure:
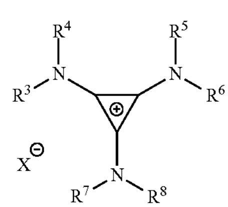
or
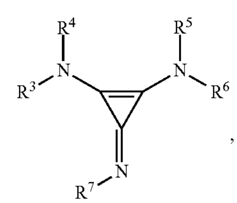
,
wherein $R^3$, $R^4$, $R^5$, $R^6$, $R^7$, and $R^8$ are independently at each occurrence chosen from hydrogen, linear alkyl groups, branched alkyl groups, cycloaliphatic groups, polycycloaliphatic groups, unsaturated aliphatic groups, and aryl groups; and X is an anion chosen from F, Cl, Br, I, $N_3$, $NO_3$, carboxylates, benzoates, alkoxides, phenoxides, enolates, thiolates, amides, sulfonamides, thiocyanates, CN, $O(SO_2)R$, $BPh_4$, $SbF_6$, and $ClO_4$.

* * * * *

UNITED STATES PATENT AND TRADEMARK OFFICE

CERTIFICATE OF CORRECTION

PATENT NO. : 11,260,379 B2
APPLICATION NO. : 16/898377
DATED : March 1, 2022
INVENTOR(S) : Geoffrey W. Coates, Brooks Abel and Claire Lidston It is certified that error appears in the above-identified patent and that said Letters Patent is hereby corrected as shown below:

In the Specification

| Column | Line | |
|---|---|---|
| 3 | 8 | "AIC1" should be -- AlCl -- |
| 3 | 27 | "AIC1" should be -- AlCl -- |
| 3 | 35 | "[cocatalyst]o" should be -- $[cocatalyst]_0$ -- |
| 3 | 44 | "NMRanalysis." should be -- NMR analysis. -- |
| 3 | 61 | "[cocatalyst]o" should be -- $[cocatalyst]_0$ -- |
| 4 | 25 | "D" should be -- Đ -- |
| 4 | 26 | "AIC1" should be -- AlCl -- |
| 4 | 29 | "AIC1" should be -- AlCl -- |
| 4 | 37 | "AIC1" should be -- AlCl -- |
| 5 | 31 | "AIC1" should be -- AlCl -- |
| 5 | 32 | "AIC1" should be -- AlCl -- |
| 5 | 35 | "AIC1" should be -- AlCl -- |
| 5 | 39 | "[cocatalyst]o" should be -- $[cocatalyst]_0$ -- |
| 5 | 50 | "THE" should be -- THF -- |
| 5 | 67 | "[CyPr]C" should be -- [CyPr]Cl -- |
| 6 | 36 | "PrC]" should be -- PrCl] -- |
| 6 | 37 | "[CyPrC]" should be -- [CyPr]Cl] -- |
| 13 | 45 | "." should be -- , -- |
| 13 | 48 (approx.) | "R" should be -- $R^1$ -- |
| 17 | 24 (approx.) | "$M^{+4}$" should be -- $M^{4+}$ -- |
| 18 | 65 | "$C_1$)." should be -- Cl). -- |
| 23 | 37 | "(Mn)" should be -- ($M_n$) -- |
| 23 | 38 | "(Mn)" should be -- $M_n$ -- |
| 32 | 34 | "M," should be -- $M^{1+}$, -- |
| 38 | 13 | "(Mn)" should be -- ($M_n$) -- |
| 39 | 9 (approx.) | "AIC1" should be -- AlCl -- |
| 39 | 10 (approx.) | "[PPN]C" should be -- [PPN]Cl -- |

Signed and Sealed this
Twenty-fifth Day of February, 2025

Coke Morgan Stewart
*Acting Director of the United States Patent and Trademark Office*

| | | |
|---|---|---|
| 39 | 34 (approx.) | "[CyPr]C" should be -- [CyPr]Cl -- |
| 40 | 6 | "AIC1" should be -- AlCl -- |
| 40 | 10 | "AIC1" should be -- AlCl -- |
| 40 | 14 | "AIC1" should be -- AlCl -- |
| 40 | 14 | "AIC1" should be -- AlCl -- |
| 40 | 15 | "h-1," should be -- $h^{-1}$, -- |
| 40 | 16 | "AIC1" should be -- AlCl -- |
| 40 | 19 | "AIC1" should be -- AlCl -- |
| 40 | 19 | "AIC1" should be -- AlCl -- |
| 40 | 28 | "AIC1" should be -- AlCl -- |
| 40 | 28 | "AIC1" should be -- AlCl -- |
| 40 | 29 | "AIC1" should be -- AlCl -- |
| 40 | 35 | "AIC1" should be -- AlCl -- |
| 40 | 35 | "AIC1" should be -- AlCl -- |
| 40 | 38 | "AIC1" should be -- AlCl -- |
| 40 | 67 | "AIC1" should be -- AlCl -- |
| 41 | 13 | "AIC1" should be -- AlCl -- |
| 41 | 14 | "AIC1" should be -- AlCl -- |
| 41 | 27 | "AIC1" should be -- AlCl -- |
| 41 | 32 | "AIC1" should be -- AlCl -- |
| 41 | 33 | "AIC1" should be -- AlCl -- |
| 41 | 37 | "[PPN]C" should be -- [PPN]Cl -- |
| 41 | 38 | "$[PPNC]_0$" should be -- $[PPNCl]_0$ -- |
| 41 | 40 | "AlCl PPN]" should be -- AlCl·PPN] -- |
| 41 | 45 | "$[PPNC]_0$" should be -- $[PPNCl]_0$ -- |
| 41 | 47 | "AlCl $PPN]^2$" should be -- AlCl·$PPN]^2$ -- |
| 41 | 51 | "[CPMA]o" should be -- $[CPMA]_0$ -- |
| 42 | 7 | "AIC1" should be -- AlCl -- |
| 42 | 12 | "AIC1" should be -- AlCl -- |
| 42 | 15 | "AIC1" should be -- AlCl -- |
| 42 | 32 | "AIC1" should be -- AlCl -- |
| 42 | 54 | "AIC1" should be -- AlCl -- |
| 42 | 64 | "AIC1" should be -- AlCl -- |
| 43 | 11 | "AIC1" should be -- AlCl -- |
| 43 | 32 | "AIC1" should be -- AlCl -- |
| 43 | 42 | "AIC1" should be -- AlCl -- |
| 43 | 50 | "AIC1" should be -- AlCl -- |
| 43 | 67 | "AIC1" should be -- AlCl -- |
| 44 | 42 | "AIC1" should be -- AlCl -- |
| 44 | 47 | "AIC1" should be -- AlCl -- |
| 44 | 50 | "AIC1" should be -- AlCl -- |
| 44 | 54 | "AIC1" should be -- AlCl -- |
| 44 | 56 | "AICl" should be -- AlCl -- |
| 45 | 11 | "AIC1" should be -- AlCl -- |
| 45 | 18 | "AIC1" should be -- AlCl -- |
| 46 | 18 | "AIC1" should be -- AlCl -- |

| | | |
|---|---|---|
| 46 | 18 | "[CTA-1]o" should be -- $[CTA\text{-}1]_0$ -- |
| 46 | 50 | "AIC1" should be -- AlCl -- |
| 46 | 55 | "AIC1" should be -- AlCl -- |
| 46 | 62 | "AIC1" should be -- AlCl -- |
| 47 | 16 | "AIC1" should be -- AlCl -- |
| 47 | 21 | "AIC1" should be -- AlCl -- |
| 47 | 30 | "AIC1" should be -- AlCl -- |
| 48 | 38 | "m" should be -- μm, -- |
| 50 | 1 | "$[M]^{-30}$" should be -- $[M]^+$ -- |
| 50 | 39 | "THE" should be -- THF -- |
| 51 | 2 | "(Si)" should be -- (S1) -- |
| 51 | 61 | "THE should be -- THF -- |
| 52 | 1 | "1 h)," should be -- 1h), -- |
| 52 | 2 | "13C" should be -- $^{13}C$ -- |
| 55 | 21 | "$LiAH_4$" should be -- $LiAlH_4$ -- |
| 55 | 38 (approx.) | "[M]+166.0994," should be -- $[M]^+$ 166.0994, -- |
| 57 | 30 | "$CH_2C_2$" should be -- $CH_2Cl_2$ -- |
| 57 | 38 (approx.) | "[M+H]+" should be -- $[M+H]^+$ -- |
| 57 | 60 | "$Na2SO_4$." should be -- $Na_2SO_4$. -- |
| 58 | 33 | "$CH_{14}NO_4$" should be -- $C_8H_{14}NO_4$ -- |
| 60 | 22 (approx.) | "D20):" should be -- $D_2O$): -- |
| 60 | 49 | "H NMR" should be -- $^1H$ NMR -- |
| 63 | 32 | "$Na2SO_4$." should be -- $Na_2SO_4$. -- |
| 66 | 7 | "$Na2SO_4$." should be -- $Na_2SO_4$. -- |
| 66 | 49 | "CHCl3" should be -- $CHCl_3$ -- |
| 66 | 54 | "0.45 m" should be -- 0.45 μm -- |
| 67 | 35-36 | "0.45 m" should be -- 0.45 μm -- |
| 67 | 38 (approx.) | "$Na2SO_4$." should be -- $Na_2SO_4$. -- |
| 69 | 18 (approx.) | "C9H84N5O4" should be -- $C_{59}H_{84}N_5O_4$ -- |
| 70 | 36 | "$C_9H_{84}N_5O_2$" should be -- $C_{59}H_{84}N_5O_2$ -- |
| 71 | 10 | "0.45 m" should be -- 0.45 μm -- |
| 71 | 16 (approx.) | "0.45 m" should be -- 0.45 μm -- |
| 71 | 32 | "HRMS-ESI" should be -- HRMS-ESI: -- |
| 71 | 40 | "AIC1" should be -- AlCl -- |
| 72 | 1 | "AIC1" should be -- AlCl -- |
| 72 | 41 | "AIC1" should be -- AlCl -- |
| 73 | 24 | "AIC1" should be -- AlCl -- |
| 73 | 29 (approx.) | "H NMR" should be -- $^1H$ NMR -- |
| 73 | 42 (approx.) | "ES:" should be -- "ESI: -- |
| 74 | 1 | "AIC1" should be -- AlCl -- |
| 74 | 6 (approx.) | "H NMR" should be -- $^1H$ NMR -- |
| 74 | 7 (approx.) | "d6):" should be -- dδ): -- |
| 74 | 14 | "d6):" should be -- dδ): -- |
| 74 | 20 (approx.) | "$C_9H_{82}AlClN_5O_4$" should be -- $C_{59}H_{82}AlClN_5O_4$ -- |
| 74 | 45 (approx.) | "AIC1" should be -- AlCl -- |
| 74 | 52 (approx.) | "d6):" should be -- dδ): -- |

| | | |
|---|---|---|
| 74 | 58 (approx.) | "d6):" should be -- dδ): -- |
| 75 | 24 | "AIC1" should be -- AlCl -- |
| 75 | 29 | "H NMR" should be -- $^1$H NMR -- |
| 76 | 23 | "HRMSESI." should be -- HRMS-ESI: -- |
| 77 | 28 | "ESI" should be -- ESI: -- |
| 77 | 29 | "$C_{65}H_{94}CMnN_5O_2$" should be -- $C_{65}H_{94}ClMnN_5O_2$ -- |
| 77 | 65 | "ESI" should be -- ESI: -- |
| 78 | 38 | "ESI" should be -- ESI: -- |
| 79 | 8 (approx.) | "ESI" should be -- ESI: -- |
| 79 | 31 | "AIC1" should be -- AlCl -- |
| 79 | 38 | "$C_3H_{50}AlN_2O_2$" should be -- $C_{38}H_{50}AlN_2O_2$ -- |
| 79 | 63 | "AIC1" should be -- AlCl -- |
| 80 | 24 (approx.) | "AIC1" should be -- AlCl -- |
| 80 | 36 | "ds):" should be -- $d_8$): -- |
| 80 | 62 | "AIC1" should be -- AlCl -- |
| 81 | 5 | "ES:" should be -- "ESI: -- |
| 81 | 60 | "AIC1" should be -- AlCl -- |
| 81 | 64 | "45 m" should be -- 45 μm -- |
| 82 | 43 (approx.) | "Complex 1-$AOCH_2CH_3$" should be -- Complex 1-$AlOCH_2CH_3$ -- |
| 82 | 59 | "AIC1" should be -- AlCl -- |
| 82 | 64 | "45 m" should be -- 45 μm -- |
| 83 | 30 | "AIC1" should be -- AlCl -- |
| 83 | 35 | "45 m" should be -- 45 μm -- |
| 83 | 44 | "6-" should be -- δ -- |
| 83 | 53 | "(5×" should be -- (5X -- |
| 84 | 1 | "D" should be -- Đ -- |
| 84 | 3 | "AIC1" should be -- AlCl -- |
| 84 | 16 | "AIC1" should be -- AlCl -- |
| 84 | 47 | "(5×" should be -- (5X -- |
| 85 | 2 | "AIC1" should be -- AlCl -- |
| 85 | 23 | "AIC1" should be -- AlCl -- |
| 85 | 32 | "[1-AlCl]i$[PPN]^1$." should be -- $[1\text{-}AlCl]^1[PPN]^1$. -- |
| 86 | 15 | "TH" should be -- THE -- |
| 86 | 24 (approx.) | "[CPMA]o" should be -- $[CPMA]_0$ -- |
| 86 | 52 | "AIC1" should be -- AlCl -- |
| 86 | 53 | "AIC1" should be -- AlCl -- |
| 86 | 58 | "AIC1" should be -- AlCl -- |
| 87 | 15 | "AIC1" should be -- AlCl -- |
| 87 | 52 | "AlOiPr" should be -- $AlO_iPr$ -- |
| 87 | 59 | "$Al(O_2CAr_F)$." should be -- $Al(O_2CA_{rF})$. -- |
| 87 | 60 | "AlOiPr" should be -- $AlO_iPr$ -- |
| 88 | 16 (approx.) | "AlOiPr" should be -- $AlO_iPr$ -- |
| 88 | 18 (approx.) | "AlOiPr" should be -- $AlO_iPr$ -- |
| 88 | 26 | "AlOiPr" should be -- $AlO_iPr$ -- |
| 88 | 33 | "50%" should be -- ~50% -- |
| 88 | 35 | "AIC1" should be -- AlCl -- |

| | | |
|---|---|---|
| 88 | 47 | "AIC1" should be -- AlCl -- |
| 88 | 57 | "AIC1" should be -- AlCl -- |
| 89 | 2 | "[CyPr]C" should be -- [CyPr]Cl -- |
| 89 | 41 | "1H" should be -- $^{1}H$ -- |
| 89 | 62 | "AIC1" should be -- AlCl -- |
| 89 | 63 | "AIC1" should be -- AlCl -- |
| 89 | 66 | "AIC1" should be -- AlCl -- |
| 90 | 10 | "AIC1" should be -- AlCl -- |
| 90 | 31 | "AIC1" should be -- AlCl -- |
| 90 | 49 | "AIC1" should be -- AlCl -- |
| 90 | 62 | "AIC1" should be -- AlCl -- |
| 90 | 63 | "AIC1" should be -- AlCl -- |
| 90 | 66 | "AIC1" should be -- AlCl -- |
| 90 | 67 | "AIC1" should be -- AlCl -- |